(12) United States Patent
Raleigh et al.

(10) Patent No.: US 10,841,839 B2
(45) Date of Patent: Nov. 17, 2020

(54) SECURITY, FRAUD DETECTION, AND FRAUD MITIGATION IN DEVICE-ASSISTED SERVICES SYSTEMS

(71) Applicant: Headwater Research LLC, Tyler, TX (US)

(72) Inventors: Gregory G. Raleigh, Woodside, CA (US); James Lavine, Corte Madera, CA (US); Jeffrey Green, Sunnyvale, CA (US)

(73) Assignee: Headwater Research LLC, Tyler, TX (US)

( * ) Notice: Subject to any disclaimer, the term of this patent is extended or adjusted under 35 U.S.C. 154(b) by 0 days.

(21) Appl. No.: 16/218,721

(22) Filed: Dec. 13, 2018

(65) Prior Publication Data

US 2019/0261222 A1    Aug. 22, 2019

Related U.S. Application Data

(63) Continuation of application No. 15/158,526, filed on May 18, 2016, now Pat. No. 10,492,102, which is a
(Continued)

(51) Int. Cl.
| | |
|---|---|
| *H04L 12/26* | (2006.01) |
| *H04W 28/10* | (2009.01) |
| *H04W 28/02* | (2009.01) |
| *H04L 29/06* | (2006.01) |
| *H04W 4/24* | (2018.01) |
| *H04W 12/08* | (2009.01) |
| *H04W 80/04* | (2009.01) |
| *H04W 84/12* | (2009.01) |
| *H04W 88/06* | (2009.01) |

(52) U.S. Cl.
CPC .......... *H04W 28/10* (2013.01); *H04L 63/105* (2013.01); *H04L 63/20* (2013.01); *H04W 4/24* (2013.01); *H04W 12/08* (2013.01); *H04W 28/02* (2013.01); *H04W 80/04* (2013.01); *H04W 84/12* (2013.01); *H04W 88/06* (2013.01)

(58) Field of Classification Search
CPC .................................................... H04W 28/10
See application file for complete search history.

(56) References Cited

U.S. PATENT DOCUMENTS

| | | |
|---|---|---|
| 5,131,020 A | 7/1992 | Liebesny et al. |
| 5,283,904 A | 2/1994 | Carson et al. |

(Continued)

FOREIGN PATENT DOCUMENTS

| | | |
|---|---|---|
| CA | 2688553 A1 | 12/2008 |
| CN | 1310401 A | 8/2001 |

(Continued)

OTHER PUBLICATIONS

Quintana, David, "Mobile Multitasking," Apr. 14, 2010.
(Continued)

*Primary Examiner* — Guang W Li
(74) *Attorney, Agent, or Firm* — James E. Harris

(57) ABSTRACT

Secure architectures and methods for improving the security of mobile devices are disclosed. Also disclosed are apparatuses and methods to detect and mitigate fraud in device-assisted services implementations.

13 Claims, 47 Drawing Sheets

Related U.S. Application Data continuation of application No. 14/098,523, filed on Dec. 5, 2013, now Pat. No. 9,351,193, which is a continuation-in-part of application No. 13/239,321, filed on Sep. 21, 2011, now Pat. No. 8,898,293, and a continuation-in-part of application No. 13/247,998, filed on Sep. 28, 2011, now Pat. No. 8,725,123, and a continuation-in-part of application No. 13/309,463, filed on Dec. 1, 2011, now Pat. No. 8,793,758, and a continuation-in-part of application No. 13/309,556, filed on Dec. 1, 2011, now Pat. No. 8,893,009, said application No. 13/239,321 is a continuation-in-part of application No. 13/237,827, filed on Sep. 20, 2011, now Pat. No. 8,832,777, said application No. 13/247,998 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, said application No. 13/309,463 is a continuation-in-part of application No. 13/134,028, filed on May 25, 2011, now Pat. No. 8,589,541, and a continuation-in-part of application No. 13/237,827, filed on Sep. 20, 2011, now Pat. No. 8,832,777, and a continuation-in-part of application No. 13/253,013, filed on Oct. 4, 2011, now Pat. No. 8,745,191, said application No. 13/309,556 is a continuation-in-part of application No. 13/134,028, filed on May 25, 2011, now Pat. No. 8,589,541, said application No. 13/237,827 is a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, said application No. 13/134,028 is a continuation-in-part of application No. 12/695,021, filed on Jan. 27, 2010, now Pat. No. 8,346,225, and a continuation-in-part of application No. 13/134,005, filed on May 25, 2011, now Pat. No. 8,635,335, said application No. 13/253,013 is a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, said application No. 12/695,019 is a continuation-in-part of application No. 12/380,778, filed on Mar. 2, 2009, now Pat. No. 8,321,526, said application No. 12/625,020 is a continuation-in-part of application No. 12/380,780, filed on Mar. 2, 2009, now Pat. No. 8,839,388, said application No. 12/694,445 is a continuation-in-part of application No. 12/380,780, filed on Mar. 2, 2009, now Pat. No. 8,839,388, said application No. 12/695,021 is a continuation-in-part of application No. 12/380,780, filed on Mar. 2, 2009, now Pat. No. 8,839,388, said application No. 13/134,005 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388.

(60) Provisional application No. 61/385,020, filed on Sep. 21, 2010, provisional application No. 61/387,243, filed on Sep. 28, 2010, provisional application No. 61/387,247, filed on Sep. 28, 2010, provisional application No. 61/420,727, filed on Dec. 7, 2010, provisional application No. 61/422,565, filed on Dec. 13, 2010, provisional application No. 61/418,509, filed on Dec. 1, 2010, provisional application No. 61/550,906, filed on Oct. 24, 2011, provisional application No. 61/418,507, filed on Dec. 1, 2010, provisional application No. 61/384,456, filed on Sep. 20, 2010, provisional application No. 61/348,022, filed on May 25, 2010, provisional application No. 61/381,159, filed on Sep. 9, 2010, provisional application No. 61/381,162, filed on Sep. 9, 2010, provisional application No. 61/407,358, filed on Oct. 27, 2010, provisional application No. 61/389,547, filed on Oct. 4, 2010, provisional application No. 61/270,353, filed on Jul. 6, 2009, provisional application No. 61/264,126, filed on Nov. 24, 2009, provisional application No. 61/275,208, filed on Aug. 25, 2009, provisional application No. 61/237,753, filed on Aug. 28, 2009, provisional application No. 61/252,151, filed on Oct. 15, 2009, provisional application No. 61/252,153, filed on Oct. 15, 2009, provisional application No. 61/422,572, filed on Dec. 13, 2010, provisional application No. 61/422,574, filed on Dec. 13, 2010, provisional application No. 61/435,564, filed on Jan. 24, 2011, provisional application No. 61/472,606, filed on Apr. 6, 2011, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009.

(56) References Cited

U.S. PATENT DOCUMENTS

| | | |
|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,915,226 A | 6/1999 | Martineau |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |

(56) References Cited

U.S. PATENT DOCUMENTS

| | | |
|---|---|---|
| 6,185,576 B1 | 2/2001 | Mcintosh |
| 6,198,915 B1 | 3/2001 | McGregor et al. |
| 6,219,786 B1 | 4/2001 | Cunningham et al. |
| 6,226,277 B1 | 5/2001 | Chuah |
| 6,246,870 B1 | 6/2001 | Dent et al. |
| 6,263,055 B1 | 7/2001 | Garland et al. |
| 6,292,828 B1 | 9/2001 | Williams |
| 6,317,584 B1 | 11/2001 | Abu-Amara et al. |
| 6,370,139 B2 | 4/2002 | Redmond |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,466,984 B1 | 10/2002 | Naveh et al. |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,522,629 B1 | 2/2003 | Anderson, Sr. |
| 6,532,235 B1 | 3/2003 | Benson et al. |
| 6,532,579 B2 | 3/2003 | Sato et al. |
| 6,535,855 B1 | 3/2003 | Cahill et al. |
| 6,535,949 B1 | 3/2003 | Parker |
| 6,539,082 B1 | 3/2003 | Lowe et al. |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,591,098 B1 | 7/2003 | Shieh et al. |
| 6,598,034 B1 | 7/2003 | Kloth |
| 6,601,040 B1 | 7/2003 | Kolls |
| 6,603,969 B1 | 8/2003 | Vuoristo et al. |
| 6,603,975 B1 | 8/2003 | Inouchi et al. |
| 6,606,744 B1 | 8/2003 | Mikurak |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,732,176 B1 | 5/2004 | Stewart et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,842,628 B1 | 1/2005 | Arnold et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gurnani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,202 B2 | 10/2005 | Heinonen et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,970,927 B1 | 11/2005 | Stewart et al. |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,031,733 B2 | 4/2006 | Alminana et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | Mckenna et al. |
| 7,113,997 B2 | 9/2006 | Jayapalan et al. |
| 7,120,133 B1 | 10/2006 | Joo et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |

(56) References Cited

U.S. PATENT DOCUMENTS

| | | |
|---|---|---|
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,200,551 B1 | 4/2007 | Senez |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,212,491 B2 | 5/2007 | Koga |
| 7,219,123 B1 | 5/2007 | Fiechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,315,892 B2 | 1/2008 | Freimuth et al. |
| 7,317,699 B2 | 1/2008 | Godfrey et al. |
| 7,318,111 B2 | 1/2008 | Zhao |
| 7,320,029 B2 | 1/2008 | Rinne et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,353,533 B2 * | 4/2008 | Wright .................. G06F 21/32 726/1 |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Alakoski et al. |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,433,362 B2 | 10/2008 | Mallya et al. |
| 7,436,816 B2 | 10/2008 | Mehta et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,466,652 B2 | 12/2008 | Lau et al. |
| 7,467,160 B2 | 12/2008 | McIntyre |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,756 B2 | 3/2009 | Bahl |
| 7,505,795 B1 | 3/2009 | Lim et al. |
| 7,508,799 B2 | 3/2009 | Sumner et al. |
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,549 B2 | 4/2009 | Karaoguz et al. |
| 7,522,576 B2 | 4/2009 | Du et al. |
| 7,526,541 B2 | 4/2009 | Roese et al. |
| 7,529,204 B2 | 5/2009 | Bourlas et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,875 B2 | 6/2009 | Mikkelsen et al. |
| 7,548,976 B2 | 6/2009 | Bahl et al. |
| 7,551,921 B2 | 6/2009 | Petermann |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,584,298 B2 | 9/2009 | Klinker et al. |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,606,918 B2 | 10/2009 | Holzman et al. |
| 7,607,041 B2 | 10/2009 | Kraemer et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,057 B2 | 10/2009 | Bahl et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,620,383 B2 | 11/2009 | Taglienti et al. |

(56) References Cited

U.S. PATENT DOCUMENTS

| | | |
|---|---|---|
| 7,627,314 B2 | 12/2009 | Carlson et al. |
| 7,627,600 B2 | 12/2009 | Citron et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,644,414 B2 | 1/2010 | Smith et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,668,966 B2 | 2/2010 | Klinker et al. |
| 7,676,673 B2 | 3/2010 | Weller et al. |
| 7,680,086 B2 | 3/2010 | Eglin |
| 7,681,226 B2 | 3/2010 | Kraemer et al. |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,688,792 B2 | 3/2010 | Babbar et al. |
| 7,693,107 B2 | 4/2010 | De Froment |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,721,296 B2 | 5/2010 | Ricagni |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,769,397 B2 | 8/2010 | Funato et al. |
| 7,770,785 B2 | 8/2010 | Jha et al. |
| 7,774,323 B2 | 8/2010 | Helfman |
| 7,774,412 B1 | 8/2010 | Schnepel |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,257 B1 | 9/2010 | Vanier et al. |
| 7,792,538 B2 | 9/2010 | Kozisek |
| 7,792,708 B2 | 9/2010 | Alva |
| 7,797,019 B2 | 9/2010 | Friedmann |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,522 B2 | 9/2010 | Schlüter et al. |
| 7,805,606 B2 | 9/2010 | Birger et al. |
| 7,809,351 B1 | 10/2010 | Panda et al. |
| 7,809,372 B2 | 10/2010 | Rajaniemi |
| 7,813,746 B2 | 10/2010 | Rajkotia |
| 7,817,615 B1 | 10/2010 | Breau et al. |
| 7,817,983 B2 | 10/2010 | Cassett et al. |
| 7,822,837 B1 | 10/2010 | Urban et al. |
| 7,822,849 B2 | 10/2010 | Titus |
| 7,826,427 B2 | 11/2010 | Sood et al. |
| 7,826,607 B1 | 11/2010 | De Carvalho Resende et al. |
| 7,835,275 B1 | 11/2010 | Swan et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,170 B1 | 12/2010 | Hargens et al. |
| 7,849,477 B2 | 12/2010 | Cristofalo et al. |
| 7,853,255 B2 | 12/2010 | Karaoguz et al. |
| 7,853,656 B2 | 12/2010 | Yach |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,873,001 B2 | 1/2011 | Silver |
| 7,873,344 B2 | 1/2011 | Bowser et al. |
| 7,873,346 B2 | 1/2011 | Petersson et al. |
| 7,873,540 B2 | 1/2011 | Arumugam |
| 7,873,705 B2 | 1/2011 | Kalish |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,882,247 B2 | 2/2011 | Sturniolo et al. |
| 7,882,560 B2 | 2/2011 | Kraemer et al. |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,925,740 B2 | 4/2011 | Math et al. |
| 7,925,778 B1 | 4/2011 | Wijnands et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,929,327 B2 | 4/2011 | Craft et al. |
| 7,930,446 B2 | 4/2011 | Kesselman et al. |
| 7,930,553 B2 | 4/2011 | Satarasinghe et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |

(56) References Cited

U.S. PATENT DOCUMENTS

| | | | |
|---|---|---|---|
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,969,950 B2 | 6/2011 | Iyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,979,889 B2 | 7/2011 | Gladstone et al. |
| 7,979,896 B2 | 7/2011 | McMurtry et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,449 B1* | 7/2011 | Marolia | H04L 67/1095 717/120 |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,015,249 B2 | 9/2011 | Nayak et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,024,424 B2 | 9/2011 | Freimuth et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,059,530 B1 | 11/2011 | Cole |
| 8,060,017 B2 | 11/2011 | Schlicht et al. |
| 8,060,463 B1 | 11/2011 | Spiegel |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,361 B2 | 1/2012 | Hagan |
| 8,090,616 B2 | 1/2012 | Proctor, Jr. et al. |
| 8,091,087 B2 | 1/2012 | Ali et al. |
| 8,094,551 B2 | 1/2012 | Huber et al. |
| 8,095,112 B2 | 1/2012 | Chow et al. |
| 8,095,124 B2 | 1/2012 | Balia |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,108,680 B2 | 1/2012 | Murray |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,145,194 B2 | 3/2012 | Yoshikawa et al. |
| 8,146,142 B2 | 3/2012 | Lortz et al. |
| 8,149,748 B2 | 4/2012 | Bata et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |
| 8,160,056 B2 | 4/2012 | Van der Merwe et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,087 B2 | 5/2012 | Fisher et al. |

(56) References Cited

U.S. PATENT DOCUMENTS

| | | |
|---|---|---|
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,204,794 B1 | 6/2012 | Peng et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,230,061 B2 | 7/2012 | Hassan et al. |
| 8,233,433 B2 | 7/2012 | Kalhan |
| 8,233,883 B2 | 7/2012 | De Froment |
| 8,233,895 B2 | 7/2012 | Tysowski |
| 8,234,583 B2 | 7/2012 | Sloo et al. |
| 8,238,287 B1 | 8/2012 | Gopi et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,249 B2 | 9/2012 | Hu |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,285,992 B2 | 10/2012 | Mathur et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,518 B1 | 11/2012 | Gailloux |
| 8,306,741 B2 | 11/2012 | Tu |
| 8,307,067 B2 | 11/2012 | Ryan |
| 8,307,095 B2 | 11/2012 | Clark et al. |
| 8,310,943 B2 | 11/2012 | Mehta et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,902 B2 | 11/2012 | Moring et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,359 B2 | 12/2012 | Kauffman |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,339,991 B2 | 12/2012 | Biswas et al. |
| 8,340,625 B1 | 12/2012 | Johnson et al. |
| 8,340,628 B2 | 12/2012 | Taylor et al. |
| 8,340,678 B1 | 12/2012 | Pandey |
| 8,340,718 B2 | 12/2012 | Colonna et al. |
| 8,346,210 B2 | 1/2013 | Balsan et al. |
| 8,346,923 B2 | 1/2013 | Rowles et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 * | 1/2013 | Raleigh .......... H04L 12/14 455/405 |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,355,570 B2 | 1/2013 | Karsanbhai et al. |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,380,247 B2 | 2/2013 | Engstrom |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,392,982 B2 | 3/2013 | Harris et al. |
| 8,396,458 B2 | 3/2013 | Raleigh |
| 8,396,929 B2 | 3/2013 | Helfman et al. |
| 8,401,968 B1 | 3/2013 | Schattauer et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,407,472 B2 | 3/2013 | Hao et al. |
| 8,407,763 B2 | 3/2013 | Weller et al. |
| 8,411,587 B2 | 4/2013 | Curtis et al. |
| 8,411,691 B2 | 4/2013 | Aggarwal |

(56) References Cited

U.S. PATENT DOCUMENTS

| | | |
|---|---|---|
| 8,412,798 B1 | 4/2013 | Wang |
| 8,413,245 B2 | 4/2013 | Kraemer et al. |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,461,958 B2 | 6/2013 | Saenz et al. |
| 8,463,194 B2 | 6/2013 | Erlenback et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,135 B2 | 7/2013 | Cai et al. |
| 8,483,694 B2 | 7/2013 | Lewis et al. |
| 8,484,327 B2 | 7/2013 | Werner et al. |
| 8,484,568 B2 | 7/2013 | Rados et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,495,743 B2 * | 7/2013 | Kraemer ............... G06F 21/554 726/22 |
| 8,499,087 B2 | 7/2013 | Hu |
| RE44,412 E | 8/2013 | Naqvi et al. |
| 8,500,533 B2 | 8/2013 | Lutnick et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,574 B2 | 8/2013 | Dvorak et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,526,350 B2 | 9/2013 | Xue et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,531,995 B2 | 9/2013 | Khan et al. |
| 8,532,610 B2 | 9/2013 | Manning Cassett et al. |
| 8,533,775 B2 | 9/2013 | Alcorn et al. |
| 8,535,160 B2 | 9/2013 | Lutnick et al. |
| 8,538,394 B2 | 9/2013 | Zimmerman et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,539,561 B2 | 9/2013 | Gupta et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,548,428 B2 | 10/2013 | Raleigh |
| 8,549,173 B1 | 10/2013 | Wu et al. |
| 8,554,876 B2 | 10/2013 | Winsor |
| 8,559,369 B2 | 10/2013 | Barkan |
| 8,561,138 B2 | 10/2013 | Rothman et al. |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,588,240 B2 | 11/2013 | Ramankutty et al. |
| 8,589,541 B2 | 11/2013 | Raleigh et al. |
| 8,589,955 B2 | 11/2013 | Roundtree et al. |
| 8,594,665 B2 | 11/2013 | Anschutz |
| 8,595,186 B1 | 11/2013 | Mandyam et al. |
| 8,600,895 B2 | 12/2013 | Felsher |
| 8,601,125 B2 | 12/2013 | Huang et al. |
| 8,605,691 B2 | 12/2013 | Soomro et al. |
| 8,615,507 B2 | 12/2013 | Varadarajulu et al. |
| 8,619,735 B2 | 12/2013 | Montemurro et al. |
| 8,620,257 B2 | 12/2013 | Qiu et al. |
| 8,621,056 B2 | 12/2013 | Coussemaeker et al. |
| 8,626,115 B2 | 1/2014 | Raleigh et al. |
| 8,630,314 B2 | 1/2014 | York |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,655,357 B1 | 2/2014 | Gazzard et al. |
| 8,656,472 B2 | 2/2014 | McMurtry et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,670,752 B2 | 3/2014 | Fan et al. |
| 8,675,852 B2 | 3/2014 | Maes |
| 8,676,682 B2 | 3/2014 | Kalliola |
| 8,676,925 B1 | 3/2014 | Liu et al. |
| 8,693,323 B1 | 4/2014 | McDysan |
| 8,694,772 B2 | 4/2014 | Kao et al. |
| 8,700,729 B2 | 4/2014 | Dua |
| 8,701,015 B2 | 4/2014 | Bonnat |
| 8,705,361 B2 | 4/2014 | Venkataraman et al. |
| 8,706,863 B2 | 4/2014 | Fadell |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,739,035 B2 | 5/2014 | Trethewey |
| 8,744,339 B2 | 6/2014 | Halfmann et al. |
| 8,761,711 B2 | 6/2014 | Grignani et al. |
| 8,780,857 B2 | 7/2014 | Balasubramanian et al. |
| 8,787,249 B2 | 7/2014 | Giaretta et al. |
| 8,793,304 B2 | 7/2014 | Lu et al. |
| 8,798,610 B2 | 8/2014 | Prakash et al. |
| 8,799,227 B2 | 8/2014 | Ferguson et al. |
| 8,804,517 B2 | 8/2014 | Oerton |
| 8,804,695 B2 | 8/2014 | Branam |
| 8,811,338 B2 | 8/2014 | Jin et al. |
| 8,811,991 B2 | 8/2014 | Jain et al. |
| 8,812,525 B1 | 8/2014 | Taylor, III |
| 8,818,394 B2 | 8/2014 | Bienas et al. |
| 8,819,253 B2 | 8/2014 | Simeloff et al. |
| 8,825,109 B2 | 9/2014 | Montemurro et al. |
| 8,826,411 B2 | 9/2014 | Moen et al. |
| 8,831,561 B2 | 9/2014 | Sutaria et al. |
| 8,837,322 B2 | 9/2014 | Venkataramanan et al. |

(56) References Cited

U.S. PATENT DOCUMENTS

| | | |
|---|---|---|
| 8,838,686 B2 | 9/2014 | Getchius |
| 8,838,752 B2 | 9/2014 | Lor et al. |
| 8,843,849 B2 | 9/2014 | Neil et al. |
| 8,845,415 B2 | 9/2014 | Lutnick et al. |
| 8,849,297 B2 | 9/2014 | Balasubramanian |
| 8,855,620 B2 | 10/2014 | Sievers et al. |
| 8,862,751 B2 | 10/2014 | Faccin et al. |
| 8,863,111 B2 | 10/2014 | Selitser et al. |
| 8,868,725 B2 | 10/2014 | Samba |
| 8,868,727 B2 | 10/2014 | Yumerefendi et al. |
| 8,875,042 B2 | 10/2014 | LeJeune et al. |
| 8,880,047 B2 | 11/2014 | Konicek et al. |
| 8,891,483 B2 | 11/2014 | Connelly et al. |
| 8,898,748 B2 | 11/2014 | Burks et al. |
| 8,908,516 B2 | 12/2014 | Tzamaloukas et al. |
| 8,929,374 B2 | 1/2015 | Tönsing et al. |
| 8,930,238 B2 | 1/2015 | Coffman et al. |
| 8,943,551 B2 | 1/2015 | Ganapathy et al. |
| 8,948,726 B2 | 2/2015 | Smith et al. |
| 8,949,382 B2 | 2/2015 | Cornett et al. |
| 8,949,597 B1 | 2/2015 | Reeves et al. |
| 8,955,038 B2 | 2/2015 | Nicodemus et al. |
| 8,966,018 B2 | 2/2015 | Bugwadia et al. |
| 8,971,841 B2 | 3/2015 | Menezes et al. |
| 8,971,912 B2 | 3/2015 | Chou et al. |
| 8,972,537 B2 | 3/2015 | Bastian et al. |
| 8,977,284 B2 | 3/2015 | Reed |
| 8,995,952 B1 | 3/2015 | Baker et al. |
| 9,002,322 B2 | 4/2015 | Cotterill |
| 9,002,342 B2 | 4/2015 | Tenhunen et al. |
| 9,014,973 B2 | 4/2015 | Ruckart |
| 9,015,331 B2 | 4/2015 | Lai et al. |
| 9,030,934 B2 | 5/2015 | Shah et al. |
| 9,032,427 B2 | 5/2015 | Gallant et al. |
| 9,049,010 B2 | 6/2015 | Jueneman et al. |
| 9,064,275 B1 | 6/2015 | Lu et al. |
| 9,105,031 B2 | 8/2015 | Shen et al. |
| 9,111,088 B2 | 8/2015 | Ghai et al. |
| 9,135,037 B1 | 9/2015 | Petrescu-Prahova et al. |
| 9,137,286 B1 | 9/2015 | Yuan |
| 9,137,389 B2 | 9/2015 | Neal et al. |
| 9,172,553 B2 | 10/2015 | Dawes et al. |
| 9,173,090 B2 | 10/2015 | Tuchman et al. |
| 9,176,913 B2 | 11/2015 | Millet et al. |
| 9,177,455 B2 | 11/2015 | Remer |
| 9,282,460 B2 | 3/2016 | Souissi |
| 9,286,469 B2 * | 3/2016 | Kraemer ............... G06F 21/552 |
| 9,286,604 B2 | 3/2016 | Aabye et al. |
| 9,313,708 B2 | 4/2016 | Nam et al. |
| 9,325,737 B2 | 4/2016 | Gutowski et al. |
| 9,326,173 B2 | 4/2016 | Luft |
| 9,344,557 B2 | 5/2016 | Gruchala et al. |
| 9,361,451 B2 | 6/2016 | Oberheide et al. |
| 9,363,285 B2 | 6/2016 | Kitamura |
| 9,367,680 B2 | 6/2016 | Mahaffey et al. |
| 9,369,959 B2 | 6/2016 | Ruutu et al. |
| 9,402,254 B2 | 7/2016 | Kneckt et al. |
| 9,413,546 B2 | 8/2016 | Meier et al. |
| 9,418,381 B2 | 8/2016 | Ahuja et al. |
| 9,459,767 B2 | 10/2016 | Cockcroft et al. |
| 9,501,803 B2 | 11/2016 | Bilac et al. |
| 9,589,117 B2 | 3/2017 | Ali et al. |
| 9,609,459 B2 | 3/2017 | Raleigh |
| 9,634,850 B2 | 4/2017 | Taft et al. |
| 9,766,873 B2 * | 9/2017 | Steigleder ............... G06F 16/00 |
| 2001/0048738 A1 | 12/2001 | Baniak et al. |
| 2001/0053694 A1 | 12/2001 | Igarashi et al. |
| 2002/0013844 A1 | 1/2002 | Garrett et al. |
| 2002/0022472 A1 | 2/2002 | Watler et al. |
| 2002/0022483 A1 | 2/2002 | Thompson et al. |
| 2002/0049074 A1 | 4/2002 | Eisinger et al. |
| 2002/0099848 A1 | 7/2002 | Lee |
| 2002/0116338 A1 | 8/2002 | Gonthier et al. |
| 2002/0120370 A1 | 8/2002 | Parupudi et al. |
| 2002/0120540 A1 | 8/2002 | Kende et al. |
| 2002/0131404 A1 | 9/2002 | Mehta et al. |
| 2002/0138599 A1 | 9/2002 | Dilman et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0028623 A1 | 2/2003 | Hennessey et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0084321 A1 | 5/2003 | Tarquini et al. |
| 2003/0088671 A1 | 5/2003 | Klinker et al. |
| 2003/0133408 A1 | 7/2003 | Cheng et al. |
| 2003/0134650 A1 | 7/2003 | Sundar et al. |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0184793 A1 | 10/2003 | Pineau |
| 2003/0188006 A1 | 10/2003 | Bard |
| 2003/0188117 A1 | 10/2003 | Yoshino et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0019564 A1 | 1/2004 | Goldthwaite et al. |
| 2004/0021697 A1 | 2/2004 | Beaton et al. |
| 2004/0024756 A1 | 2/2004 | Rickard |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0054779 A1 | 3/2004 | Takeshima et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0116140 A1 | 6/2004 | Babbar et al. |
| 2004/0123153 A1 * | 6/2004 | Wright .................. G06F 21/32 726/1 |
| 2004/0127200 A1 | 7/2004 | Shaw et al. |
| 2004/0127208 A1 | 7/2004 | Nair et al. |
| 2004/0127256 A1 | 7/2004 | Goldthwaite et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0165596 A1 | 8/2004 | Garcia et al. |
| 2004/0167958 A1 | 8/2004 | Stewart et al. |
| 2004/0168052 A1 | 8/2004 | Clisham et al. |
| 2004/0170191 A1 | 9/2004 | Guo et al. |
| 2004/0176104 A1 | 9/2004 | Arcens |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225561 A1 | 11/2004 | Hertzberg et al. |
| 2004/0225898 A1 | 11/2004 | Frost et al. |
| 2004/0236547 A1 | 11/2004 | Rappaport et al. |
| 2004/0243680 A1 | 12/2004 | Mayer |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0007993 A1 | 1/2005 | Chambers et al. |
| 2005/0009499 A1 | 1/2005 | Koster |

(56) References Cited

U.S. PATENT DOCUMENTS

| | | |
|---|---|---|
| 2005/0021995 A1 | 1/2005 | Lal et al. |
| 2005/0041617 A1 | 2/2005 | Huotari et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | Demello et al. |
| 2005/0060525 A1 | 3/2005 | Schwartz et al. |
| 2005/0075115 A1 | 4/2005 | Corneille et al. |
| 2005/0079863 A1 | 4/2005 | Macaluso |
| 2005/0091505 A1 | 4/2005 | Riley et al. |
| 2005/0096024 A1 | 5/2005 | Bicker et al. |
| 2005/0097516 A1 | 5/2005 | Donnelly et al. |
| 2005/0107091 A1 | 5/2005 | Vannithamby et al. |
| 2005/0108075 A1 | 5/2005 | Douglis et al. |
| 2005/0111463 A1 | 5/2005 | Leung et al. |
| 2005/0128967 A1 | 6/2005 | Scobbie |
| 2005/0135264 A1 | 6/2005 | Popoff et al. |
| 2005/0163320 A1 | 7/2005 | Brown et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0020787 A1 | 1/2006 | Choyi et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072550 A1 | 4/2006 | Davis et al. |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0182137 A1 | 8/2006 | Zhou et al. |
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0193280 A1 | 8/2006 | Lee et al. |
| 2006/0199608 A1 | 9/2006 | Dunn et al. |
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0277590 A1 | 12/2006 | Limont et al. |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0111740 A1 | 5/2007 | Wandel |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0165630 A1 | 7/2007 | Rasanen et al. |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0191006 A1 | 8/2007 | Carpenter |
| 2007/0192460 A1 | 8/2007 | Choi et al. |
| 2007/0198656 A1 | 8/2007 | Mazzaferri et al. |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0243862 A1 | 10/2007 | Coskun et al. |
| 2007/0248100 A1 | 10/2007 | Zuberi et al. |
| 2007/0254646 A1 | 11/2007 | Sokondar |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |

(56) References Cited

U.S. PATENT DOCUMENTS

| | | |
|---|---|---|
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0125079 A1 | 5/2008 | O'Neil et al. |
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168275 A1 | 7/2008 | DeAtley et al. |
| 2008/0168523 A1 | 7/2008 | Ansari et al. |
| 2008/0177998 A1 | 7/2008 | Apsangi et al. |
| 2008/0178300 A1 | 7/2008 | Brown et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg et al. |
| 2008/0259924 A1 | 10/2008 | Gooch et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0282319 A1 | 11/2008 | Fontijn et al. |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0065571 A1 | 3/2009 | Jain |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0157792 A1 | 6/2009 | Fiatal |
| 2009/0163173 A1 | 6/2009 | Williams |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0299857 A1 | 12/2009 | Brubaker |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0017506 A1 | 1/2010 | Fadell |
| 2010/0020822 A1 | 1/2010 | Zerillo et al. |
| 2010/0027469 A1 | 2/2010 | Guarajala et al. |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0042675 A1 | 2/2010 | Fujii |
| 2010/0043068 A1 | 2/2010 | Varadhan et al. |

(56) References Cited

U.S. PATENT DOCUMENTS

| | | |
|---|---|---|
| 2010/0069074 A1 | 3/2010 | Kodialam et al. |
| 2010/0071053 A1 | 3/2010 | Ansari et al. |
| 2010/0075666 A1 | 3/2010 | Garner |
| 2010/0077035 A1 | 3/2010 | Li et al. |
| 2010/0080202 A1 | 4/2010 | Hanson |
| 2010/0082431 A1 | 4/2010 | Ramer et al. |
| 2010/0088387 A1 | 4/2010 | Calamera |
| 2010/0103820 A1 | 4/2010 | Fuller et al. |
| 2010/0113020 A1 | 5/2010 | Subramanian et al. |
| 2010/0121744 A1 | 5/2010 | Belz et al. |
| 2010/0131584 A1 | 5/2010 | Johnson |
| 2010/0142478 A1 | 6/2010 | Forssell et al. |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0227632 A1 | 9/2010 | Bell et al. |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0284327 A1 | 11/2010 | Miklos |
| 2010/0284388 A1 | 11/2010 | Fantini et al. |
| 2010/0287599 A1 | 11/2010 | He et al. |
| 2010/0311402 A1 | 12/2010 | Srinivasan et al. |
| 2010/0318652 A1 | 12/2010 | Samba |
| 2010/0325420 A1 | 12/2010 | Kanekar |
| 2011/0004917 A1 | 1/2011 | Saisa et al. |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |
| 2011/0185202 A1 | 7/2011 | Black et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |
| 2011/0244837 A1 | 10/2011 | Murata et al. |
| 2011/0249668 A1 | 10/2011 | Milligan et al. |
| 2011/0252430 A1 | 10/2011 | Chapman et al. |
| 2011/0264923 A1 | 10/2011 | Kocher et al. |
| 2011/0277019 A1 | 11/2011 | Pritchard, Jr. |
| 2012/0020296 A1 | 1/2012 | Scherzer et al. |
| 2012/0029718 A1 | 2/2012 | Davis |
| 2012/0101952 A1 | 4/2012 | Raleigh et al. |
| 2012/0108225 A1 | 5/2012 | Luna et al. |
| 2012/0144025 A1 | 6/2012 | Melander et al. |
| 2012/0155296 A1 | 6/2012 | Kashanian |
| 2012/0166364 A1 | 6/2012 | Ahmad et al. |
| 2012/0166604 A1 | 6/2012 | Fortier et al. |
| 2012/0196644 A1 | 8/2012 | Scherzer et al. |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0072177 A1 | 3/2013 | Ross et al. |
| 2013/0084835 A1 | 4/2013 | Scherzer et al. |
| 2013/0095787 A1 | 4/2013 | Kashanian |
| 2013/0117140 A1 | 5/2013 | Kashanian |
| 2013/0144789 A1 | 6/2013 | Aaltonen et al. |
| 2013/0225151 A1 | 8/2013 | King et al. |
| 2013/0326356 A9 | 12/2013 | Zheng et al. |
| 2014/0073291 A1 | 3/2014 | Hildner et al. |
| 2014/0241342 A1 | 8/2014 | Constantinof |
| 2015/0181628 A1 | 6/2015 | Haverinen et al. |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 B | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1098490 A2 | 5/2001 |
| EP | 1289326 A1 | 3/2003 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 A1 | 10/2007 |
| EP | 1887732 A1 | 2/2008 |
| EP | 1942698 A1 | 7/2008 |
| EP | 1978772 | 10/2008 |
| EP | 2007065 A1 | 12/2008 |
| EP | 2026514 A1 | 2/2009 |
| EP | 2466831 A1 | 6/2012 |
| JP | 3148713 B2 | 3/2001 |
| JP | 2005339247 A | 12/2005 |
| JP | 2006041989 | 2/2006 |
| JP | 2006155263 A | 6/2006 |
| JP | 2006197137 | 7/2006 |
| JP | 2006344007 A | 12/2006 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| KR | 20040053858 A | 6/2004 |
| WO | 1998058505 | 12/1998 |
| WO | 1999027723 | 6/1999 |
| WO | 1999065185 | 12/1999 |
| WO | 0208863 | 1/2002 |
| WO | 2002045315 A2 | 6/2002 |
| WO | 2002067616 A1 | 8/2002 |
| WO | 2002093877 A1 | 11/2002 |
| WO | 2003014891 | 2/2003 |
| WO | 2003017063 A2 | 2/2003 |
| WO | 2003017065 A2 | 2/2003 |
| WO | 2003058880 | 7/2003 |
| WO | 2004028070 | 4/2004 |
| WO | 2004064306 A2 | 7/2004 |
| WO | 2004077797 | 9/2004 |
| WO | 2004095753 | 11/2004 |
| WO | 2005008995 | 1/2005 |
| WO | 2005053335 A1 | 6/2005 |
| WO | 2005083934 A1 | 9/2005 |

(56) References Cited

FOREIGN PATENT DOCUMENTS

| | | |
|---|---|---|
| WO | 2006004467 | 1/2006 |
| WO | 2006004784 A1 | 1/2006 |
| WO | 2006012610 A2 | 2/2006 |
| WO | 2006050758 | 5/2006 |
| WO | 2006073837 | 7/2006 |
| WO | 2006077481 | 7/2006 |
| WO | 2006093961 A1 | 9/2006 |
| WO | 2006120558 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 | 6/2007 |
| WO | 2007069245 | 6/2007 |
| WO | 2007097786 A | 8/2007 |
| WO | 2007107701 | 9/2007 |
| WO | 2007120310 | 10/2007 |
| WO | 2007124279 | 11/2007 |
| WO | 2007126352 | 11/2007 |
| WO | 2007129180 A2 | 11/2007 |
| WO | 2007133844 A | 11/2007 |
| WO | 2008017837 | 2/2008 |
| WO | 2008051379 | 5/2008 |
| WO | 2008066419 | 6/2008 |
| WO | 2008080139 | 7/2008 |
| WO | 2008080430 A1 | 7/2008 |
| WO | 2008099802 | 8/2008 |
| WO | 2009008817 A1 | 1/2009 |
| WO | 2009091295 A1 | 7/2009 |
| WO | 2010088413 | 8/2010 |
| WO | 2010128391 A2 | 11/2010 |
| WO | 2010128391 A3 | 1/2011 |
| WO | 2011002450 A1 | 1/2011 |
| WO | 2011149532 A1 | 12/2011 |
| WO | 2012047275 A | 4/2012 |

OTHER PUBLICATIONS

Rao et al., "Evolution of Mobile Location-Based Services," Communication of the ACM, Dec. 2003.
Richtel, "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Roy et al., "Energy Management in Mobile Devices with the Cinder Operating System", Stanford University, MIT CSAIL, Jun. 3, 2010.
Ruckus Wireless—White Paper; "Smarter Wi-Fi for Mobile Operator Infrastructures" 2010.
Sabat, "The evolving mobile wireless value chain and market structure," Nov. 2002.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Steglich, Stephan, "I-Centric User Interaction," Nov. 21, 2003.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Van Eijk, et al., "GigaMobile, Agent Technology for Designing Personalized Mobile Service Brokerage," Jul. 1, 2002.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
Windows7 Power Management, published Apr. 2009.
Wireless Broadband Alliance, "WISPr 2.0, Apr. 8, 2010"; Doc. Ref. No. WBA/RM/WISPr, Version 01.00.
Zhu et al., "A Survey of Quality of Service in IEEE 802.11 Networks," IEEE Wireless Communications, Aug. 2004.
"Ads and movies on the run," the Gold Coast Bulletin, Southport, Qld, Jan. 29, 2008.
"ASA/PIX: Allow Split Tunneling for VPN Clients on the ASA Configuration Example," Document ID 70917, Jan. 10, 2008.
"Communication Concepts for Mobile Agent Systems," by Joachim Baumann et al.; Inst. of Parallel and Distributed High-Performance Systems, Univ. of Stuttgart, Germany, pp. 123-135, 1997.
"End to End QoS Solution for Real-time Multimedia Application;" Computer Engineering and Applications, 2007, 43 (4): 155-159, by Tan Zu-guo, Wang Wen-juan; Information and Science School, Zhanjian Normal College, Zhan jiang, Guangdong 524048, China.
"Jentro Technologies launches Zenlet platform to accelerate location-based content delivery to mobile devices," The Mobile Internet, Boston, MA, Feb. 2008.
"Prevent iCloud Documents & Data from using your data plan," Oct. 26, 2011; CNET webarchive, by Jason Cipriani.
"The Construction of Intelligent Residential District in Use of Cable Television Network," Shandong Science, vol. 13, No. 2, Jun. 2000.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
3rd Generation Partnership Project, "Technical Specification Group Services and System Aspects; Policy and Charging Control Architecture," Release 8, Document No. 3GPP TS 23.203, V8.4.0, Dec. 2008.
3rd Generation Partnership Project; "Technical Specification Group Services and System Aspects; IP Flow Mobility and seamless WLAN offload; Stage 2," Release 10, Document No. 3GPP TS 23.261, V1.0.0, Mar. 2010.
Accuris Networks, "The Business Value of Mobile Data Offload—a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Ahmed et al., "Multi Access Data Network Connectivity and IP Flow Mobility in Evolved Packet System (EPS)," 2010 IEEE.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Android Cupcake excerpts, The Android Open Source Project, Feb. 10, 2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.
Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.

(56) References Cited

OTHER PUBLICATIONS

Ehnert, "Small application to monitor IP trafic on a Blackberry—1.01.03", Mar. 27, 2008; http://www.ehnert.net/MiniMoni/.

European Commission, "Data Roaming Tariffs—Transparency Measures," obtained from EUROPA—Europe's Information Society Thematic Portal website, Jun. 24, 2011: "http://ec.europa.eu/information_society/activities/roaming/data/measures/index_en.htm."

Farooq et al., "An IEEE 802.16 WiMax Module for the NS-3 Simulator," Mar. 2-6, 2009.

Fujitsu, "Server Push Technology Survey and Bidirectional Communication in HTTP Browser," Jan. 9, 2008 (JP).

Han et al., "Information Collection Services for Qos-Aware Mobile Applications," 2005.

Hartmann et al., "Agent-Based Banking Transactions & Information Retrieval—What About Performance Issues?" 1999.

Hewlett-Packard Development Company, LP, "IP Multimedia Services Charging," white paper, Jan. 2006.

Hossain et al., "Gain-Based Selection of Ambient Media Services in Pervasive Environments," Mobile Networks and Applications. Oct. 3, 2008.

Jing et al., "Client-Server Computing in Mobile Environments," GTE Labs. Inc., Purdue University, ACM Computing Surveys, vol. 31, No. 2, Jun. 1999.

Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.

Kassar et al., "An overview of vertical handover decision strategies in heterogeneous wireless networks," ScienceDirect, University Pierre & Marie Curie, Paris, France, Jun. 5, 2007.

Kim, "Free wireless a high-wire act; MetroFi needs to draw enough ads to make service add profits," San Francisco Chronicle, Aug. 21, 2006.

Knight et al., "Layer 2 and 3 Virtual Private Networks: Taxonomy, Technology, and Standarization Efforts," IEEE Communications Magazine, Jun. 2004.

Koutsopoulou et al., "Charging, Accounting and Billing Management Schemes in Mobile Telecommunication Networks and the Internet," IEEE Communications Surveys & Tutorials, First Quarter 2004, vol. 6, No. 1.

Koutsopoulou et al., "Middleware Platform for the Support of Charging Reconfiguration Actions," 2005.

Kuntze et al., "Trustworthy content push," Fraunhofer-Institute for Secure Information Technology SIT; Germany; WCNC 2007 proceedings, IEEE.

Kyriakakos et al., "Ubiquitous Service Provision in Next Generation Mobile Networks," Proceedings of the 13th IST Mobile and Wireless Communications Summit, Lyon, France, Jun. 2004.

Li, Yu, "Dedicated E-Reading Device: The State of the Art and the Challenges," Scroll, vol. 1, No. 1, 2008.

Loopt User Guide, metroPCS, Jul. 17, 2008.

Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.

NetLimiter Lite 4.0.19.0; http://www.heise.de/download/netlimiter-lite-3617703.html from vol. 14/2007.

Nilsson et al., "A Novel MAC Scheme for Solving the QoS Parameter Adjustment Problem in IEEE802.11e EDCA," Feb. 2006.

Nuzman et al., "A compund model for TCP connection arrivals for LAN and WAN applications," Oct. 22, 2002.

Open Mobile Alliance (OMA), Push Architecture, Candidate Version 2.2; Oct. 2, 2007; OMA-AD-Push-V2_2-20071002-C.

Oppliger, Rolf, "Internet Security: Firewalls and Bey," Communications of the ACM, May 1997, vol. 40. No. 5.

Byrd, "Open Secure Wireless," May 5, 2010.

Droid Wall 1.3.7 description Apr. 28, 2010 obtained from https://www.freewarelovers.com/android/apps/droid-wall.

Sharkey, "Coding for Life—Battery Life, That Is," May 27, 2009.

* cited by examiner

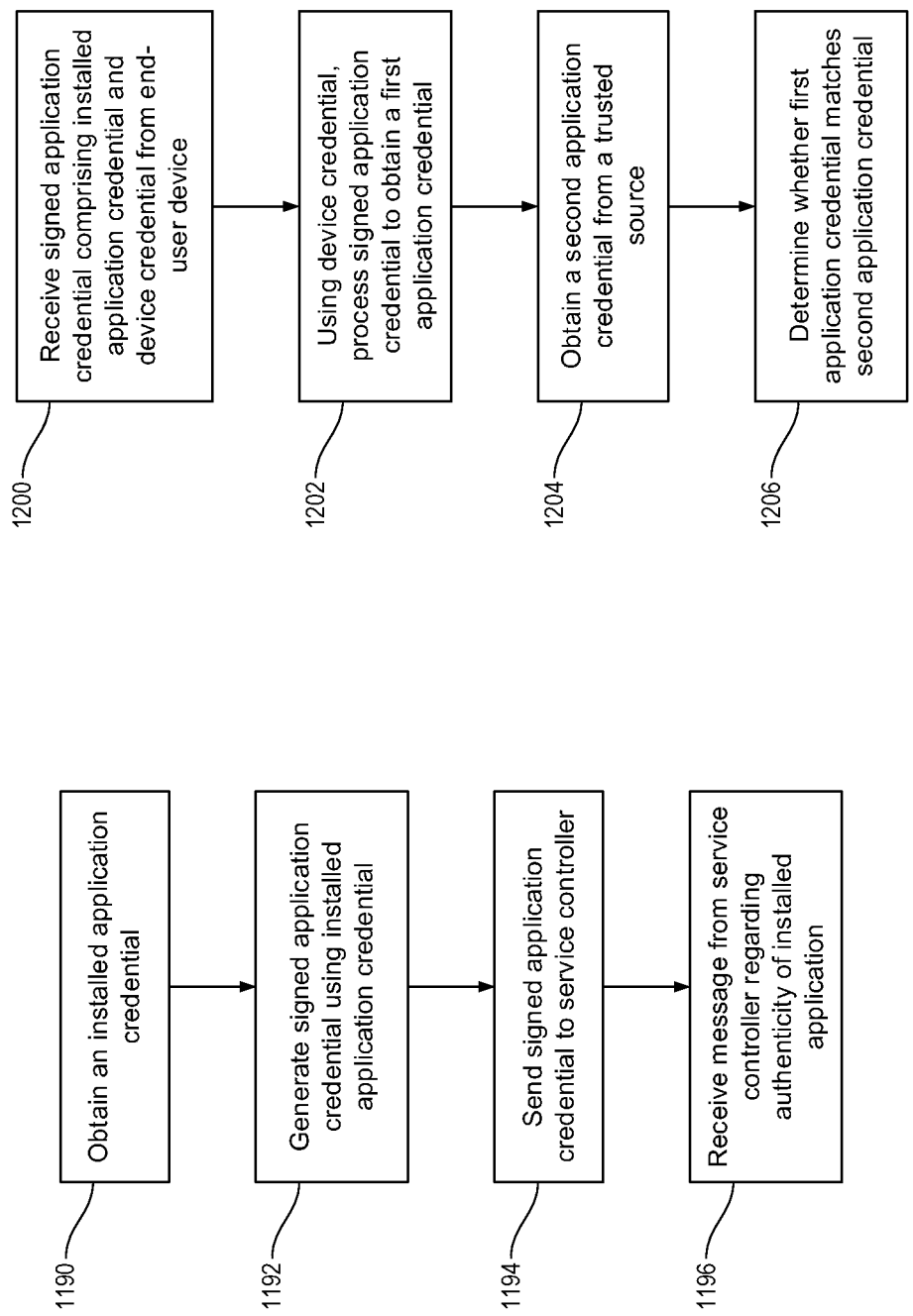

SECURITY, FRAUD DETECTION, AND FRAUD MITIGATION IN DEVICE-ASSISTED SERVICES SYSTEMS

BACKGROUND

As the computing power of mobile end-user devices has increased, mobile devices have become capable of sending and receiving increasing amounts of data. In addition to e-mail and text messages, many of today's mobile devices can support a variety of applications that send large quantities of information to and from end users. For example, in addition to sending e-mail and text messages, many of today's mobile devices can deliver news, weather, sports, maps, social networking information, music, videos, high-resolution photographs, documents, presentations, and other kinds of information.

The ability of mobile devices to send and receive such a wide variety and large quantity of data has stressed wireless access network bandwidth capabilities. As a result, network operators are either eliminating service plans with unlimited data usage, or they are increasing the price of unlimited service plans so that such plans are not attractive to most consumers. Consequently, many users of mobile end-user devices subscribe to service plans that include only a limited amount of data per fixed time period (e.g., per month). Because today's mobile end-user devices can access (e.g., send or receive) large amounts of information, there is a potential for a user of a mobile device to exceed his or her data plan allowance without realizing it. It is well known that such "overages" in data usage can be very expensive because the billing rate for data usage exceeding the contracted service plan amount is often significantly higher than the billing rate under the service plan.

Because of their computing capabilities, many of today's mobile end-user devices can also participate in the implementation and enforcement of service policies associated with access network service plans, such as charging, control, and notification policies. Device-assisted services (DAS) have been described in the many prior applications listed in the "Cross Reference to Related Applications" section of this document. When end-user devices participate in implementing and enforcing access network policies, there is a potential for device users to attempt to, or to successfully, spoof or hack end-user device components to fraudulently obtain access to data services at incorrect, lower service usage billing rates. Likewise, highly motivated users might try to gain access to network elements that perform functions related to service policy implementation or enforcement associated with the end-user device's data usage.

Thus, there is a need to secure software and hardware, in both end-user devices and in network elements, involved in the provision of device-assisted services. In addition, there is a need to detect and mitigate fraudulent or potentially fraudulent activities.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 34 illustrates an example embodiment of a procedure that an end-user device can use to validate that an application installed on the end-user device is authentic.

FIG. 35 illustrates an example embodiment of a procedure that a service controller can use to validate that an application installed on an end-user device is authentic.

SUMMARY

Figure 1:
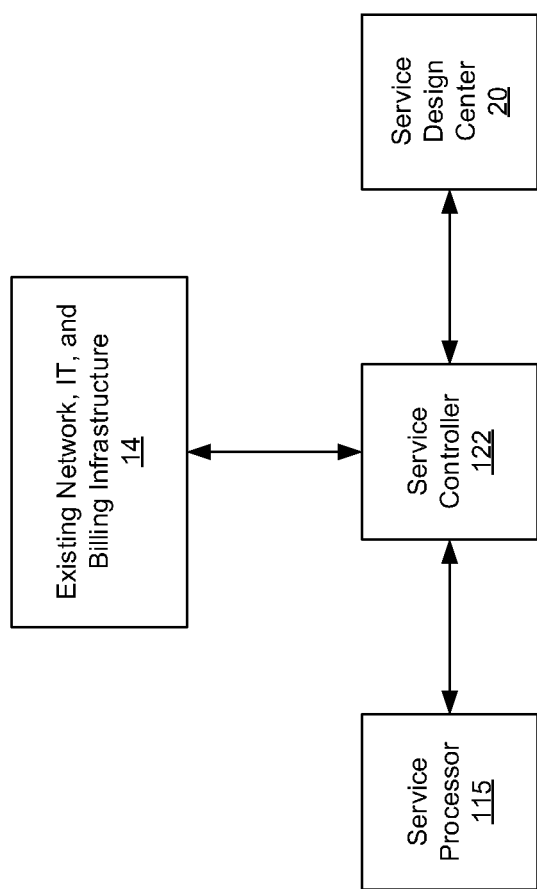
FIG. 1 illustrates the various components of a device-assisted services (DAS) implementation in accordance with some embodiments.

According to various embodiments, systems and methods are provided for securing device-assisted services (DAS) systems and for detecting and mitigating fraud in such systems.

In some embodiments, an end-user device comprises one or more modems to allow communications over a wireless access network, memory configured to store an application-specific network access policy to be applied when a particular application program attempts to communicate or successfully communicates over the wireless access network, and one or more device agents configured to detect attempted or successful activity by the particular application program and to apply the application-specific network access policy to the communication activity.

In some embodiments, the one or more device agents are configured to detect attempted or successful activity by the particular application program by flow-tagging a data flow associated with the particular application program, associating the flow tag with the application identifier, and applying the application-specific network access policy to the flow-tagged data flow.

In some embodiments, an end-user device comprises one or more modems to allow communications over a wireless access network, memory configured to store an application-specific network access policy to be applied when a particular application program attempts to communicate or successfully communicates over the wireless access network, and one or more device agents configured to use an application programming interface (API) to arrange an application setting to assist in implementing the application-specific network access policy.

In some embodiments, the application-specific network access policy comprises a control policy configured to assist in controlling transmissions or receptions over the wireless access network that are associated with the application program. In some embodiments, the application-specific network access policy comprises a charging policy configured to assist in accounting for transmissions or receptions over the wireless access network that are associated with the application program. In some embodiments, the end-user device has a user interface, and the application-specific network access policy comprises a notification policy configured to assist in presenting, through the user interface, a notification message, such as, for example: an offer or an advertisement, information about a network type (e.g., a home network, a roaming network, a cellular network, a wireless wide-area network (WWAN), a wireless local area network (WLAN), a wireless personal area network (WPAN), a 2G network, a 3G network, a 4G network, a WiMAX network, an Ethernet network, a DSL network, a DOCSIS network, a cable network, a WiFi network, etc.), an indication of an amount or cost of data usage associated with the application program, an indication of a projected amount or a projected cost of data usage associated with the application program (e.g., a projection based on a past or historical data usage associated with the application program), an indication of an amount or cost of data usage associated with the application program during a particular period of time (possibly user-configured or user-selected), an indication that an amount or cost of data usage associated with the application satisfies a condition relative to a limit setting (e.g., exceeds a threshold, meets a threshold, is less than a threshold, etc.), an indication of an amount or cost of background data usage by the application program, etc. In some embodiments, the policy is associated with an application identifier (e.g., a credential associated with the application, possibly stored on the end-user device). In some embodiments, the application program is secured by an application credential (which may be the application identifier). In some embodiments, the one or more device agents are further configured to prevent modifications, updates, or replacements of the application program unless software purporting to be a modification, update, or replacement of the application program is associated with a credential that is consistent with (e.g., matches) the application credential.

In some embodiments, at least one of the one or more device agents is secured by an agent credential, and one of the one or more device agents is configured to prevent modifications, updates, or replacements of the at least one of the one or more device agents unless software purporting to be a modification, update, or replacement of the at least one of the one or more device agents is associated with a credential that is consistent with (e.g., matches) the agent credential.

In some embodiments, the agent credential comprises one or more of agent kernel software present with a proper signature, certificate, or hash result; agent framework software present with a proper signature, certificate, or hash result; and agent application software present with a proper signature, certificate, or hash result.

In some embodiments, the end-user device is further secured by configuring the one or more device agents to perform one or more of the following checks: determining if a hosts file is present and properly configured; determining if a service processor on the end-user device successfully completed an authentication procedure with a service controller in the network; determining if the end-user device has been rooted.

In some embodiments, a network system is configured to provide access network services to an end-user device, and the end-user device is responsible for implementing an access network policy. In some embodiments, the network system is configured to obtain a trusted measure of access network usage by the end-user device and to use the trusted measure to confirm that the end-user device is properly implementing the access network policy, where the trusted measure is obtained from a network element, from a secure processor on the end-user device, or from a trusted third party.

In some embodiments, the network system is configured to apply a multi-tiered policy verification process comprising at least two of the following policy verification steps, performed in any order: (a) determining if the end-user device is failing to send service usage reports, even though the network system is receiving trusted reports of the end-user device's service usage; (b) comparing a trusted service usage measure to a limit or range of usage expected if the end-user device is properly implementing the access network policy; (c) comparing a trusted service usage measure to a non-secure (e.g., device-generated) usage measure to determine if the difference between the two usage measures is within a specified tolerance; (d) comparing a non-secure (e.g., device-based) service usage measure to a limit or range of usage expected if the end-user device is properly implementing the access network policy; (e) comparing a classification of the end-user device's usage to a limit or range of usage expected if the end-user device is properly implementing the access network policy; (f) comparing an aggregation of two or more classifications of the end-user device's usage to an aggregate limit on usage to determine if the difference between the two measures is within a specified tolerance; (g) comparing a trusted measure of usage of a class (e.g., an application, a group of applications, a network destination, a group of network destinations, etc.) to a limit or range of usage expected if the end-user device is properly implementing the access network policy; (h) comparing a trusted measure of usage of a class (e.g., an application, a group of applications, a network destination, a group of network destinations, etc.) to a non-secure (e.g., device-based) measure of usage of the same class to determine if the difference between the two measures is within a specified tolerance; (i) comparing a statistical characterization of usage by a population of end-user devices to a trusted measure of the end-user device's service usage to determine if the difference between the two measures is within a specified tolerance; (j) comparing a statistical characterization of usage of a particular class (e.g., an application, a group of applications, a network destination, a group of network destinations, etc.) by a population of end-user devices to a trusted measure of the end-user device's usage of that same class to determine if the difference between the two measures is within a specified tolerance; (k) comparing a statistical characterization of usage by a population of end-user devices to a non-secure measure of the end-user device's service usage to determine if the difference between the two measures is within a specified tolerance; (l) comparing a statistical characterization of usage of a class (e.g., an application, a group of applications, a network destination, a group of network destinations, etc.) to a non-secure (e.g., device-based) measure of usage of the same class to determine if the difference between the two measures is within a specified tolerance; (m) comparing detailed class (e.g., an application, a group of applications, a network destination, a group of network destinations, etc.) usage information in a usage report (trusted or non-secure) to determine whether the access network policy allows the classified activity; (n) determining whether a service processor on the end-user device successfully authenticated with a service controller in the network; (o) determining whether the end-user device is sending reports to a network element in an expected manner; (p) determining whether usage of one or more classes (e.g., an application, a group of applications, a network destination, a group of network destinations, etc.) is consistently slightly under particular limits that would indicate likely fraud on the part of the end-user device; (q) comparing an amount or percentage of unknown or unclassified data usage allocated by the end-user device to a particular class to an expected amount or percentage of unknown or unclassified data usage, where the expected amount or percentage is determined using information from a trusted source (e.g., a web crawler, domain object model, etc.).

In some embodiments, the result of one or more of the policy verification steps is a pass/fail criterion, and the overall pass criterion is a number of failures less than a limit on the number of failures. In some embodiments, the result of one or more of the policy verification steps is a quantized value associated with an error likelihood or non-error likelihood, and the overall fail/pass criterion is based on a combination of one or more quantized values. In some embodiments, a policy implementation error action is taken if an error occurs, where the error action comprises one or more of: flagging the end-user device or the user for further evaluation; charging for the end-user device's usage at a pre-defined rate associated with an error condition; notifying the user of the end-user device; notifying a network or system administrator; quarantining the end-user device or a user access to the access network; suspending the end-user device or user's access to the access network.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 illustrates, at a high level, the various components of a device-assisted services (DAS) implementation in accordance with some embodiments. Service processor 115 resides on an end-user device (not shown) and communicates with service controller 122, which, in the embodiment of Figure A, resides in the cloud. As will be described below, service processor 115 and service controller 122 communicate over an access network to facilitate providing device-assisted services.

As illustrated in the embodiment of Figure A, service controller 122 communicates with existing network, information technology (IT), and billing infrastructure 14 of the network operator in various ways that are described herein and in the applications listed in the section "Cross Reference to Related Applications." Service design center 20 provides an interface that allows operator personnel or other authorized persons to configure service plan information for end-user devices. Service design center 20 communicates with service controller 122, which in turn assists in provisioning service plans by communicating with existing network, IT, and billing infrastructure 14 and service processor 115.

Figure 2:
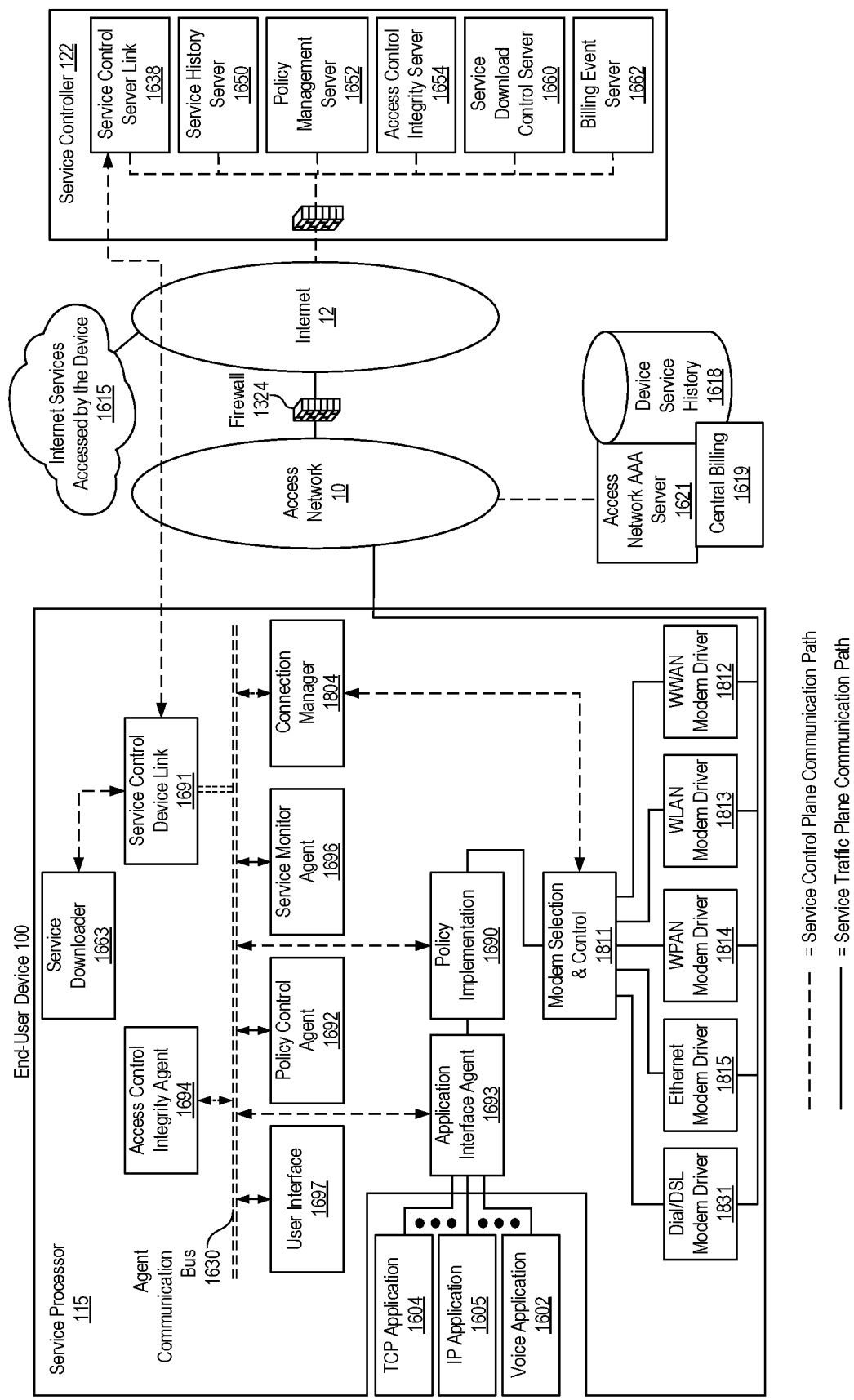
FIG. 2 illustrates an example embodiment of a device-based service processor system in communication with a network-based service controller system.

FIG. 2 illustrates an example embodiment of a device-based service processor system in communication with a network-based service controller system. End-user device 100 includes service processor 115. Service processor 115 is responsible for identifying access network communication activity by end-user device 100 and applying an access service policy to govern the communication activity. The communication activity in general comprises end-user device 100's use of or attempted use of access network 10 for data communications to or from, for example, Internet 12.

In some embodiments, service processor 115 assists in classifying service usage by end-user device 100 into sub-categories (e.g., classes) for the purpose of assisting in usage accounting policy enforcement, access control policy enforcement, applying service usage limits, or notification policy enforcement that differs according to the category (or class). In some embodiments, the classification can be for one or more device applications (e.g., a class comprises one or more application programs). In some embodiments the classification can be for one or more network destinations (e.g., a class comprises one or more network destinations). In some embodiments the classification can be for one or more network types (e.g., a class comprises one or more network types). In some embodiments a classification of service usage referred to as a sponsored service (or an ambient service) can be performed to facilitate allocating access network costs, in whole or in part, associated with the sponsored service to a service sponsor, the service sponsor being an entity other than the user or subscriber associated with end-user device 100.

In some embodiments, the communication activity is classified for purposes of access policy enforcement by service processor 115, or by a network element, based on one or more network destinations associated with the communication activity, such as, for example, a collection of one or more of: a network address, a domain, a URL, a website, a WAP site, a server configured to communicate with a device application, a content distribution site, a network tunnel or tunnel server (such as, for example, a VPN, APN, or other tunnel), a network gateway, or a proxy server. In some embodiments, the communications activity is classified for the purposes of network access policy enforcement by service processor 115 or by a network element based on a collection of one or more device application programs or device operating system (OS) components participating in the communications activity.

Service processor 115 comprises one or more software or firmware programs that execute on end-user device 100. To aid in disclosure of the invention, service processor 115 is explained using the functional elements or agents shown in FIG. 2. The specific allocation of functional elements within service processor 115 can take many forms, and the form presented in FIG. 2 is intended to illustrate basic elements but is not intended to be an exhaustive or limiting description of possible functional breakdowns of service processor 115.

FIG. 2 shows several device application programs. TCP application 1604, IP application 1605, and voice application 1602 are shown in FIG. 2, but other application programs may be present in addition or instead. Each of these applications is in general initiated by user interaction with end-user device 100, generally through user interface 1697. In the embodiment of FIG. 2, data path processing elements of service processor 115 include application interface agent 1693, policy implementation agent 1690, modem selection and control 1811, and several access network modem drivers (dial/DSL modem driver 1831, Ethernet modem driver 1815, WPAN modem driver 1814, WLAN modem driver 1813, and WWAN modem driver 1812).

In some embodiments, application interface agent 1693 monitors device application-layer communication activity to identify attempted or successful access network communication activity. In some embodiments, application interface agent 1693 monitors application layer access network communication activity to identify and classify the access network communication activity. In some embodiments, the monitoring of access network communication activity by application interface agent 1693 is reported to service monitor agent 1696. In some embodiments, the monitoring of access communications activity by application interface agent 1693 comprises classifying data traffic flows based on inspection and characterization of which application (e.g., TCP application 1604, IP application 1605, voice application 1602, or any other application on end-user device 100) each flow is associated with. In some embodiments, the monitoring of access communications activity by application interface agent 1693 comprises classifying data traffic flows based on inspection and characterization of which network destination each flow is associated with.

In some embodiments, service monitor agent 1696, application interface agent 1693, and/or other agents implement virtual traffic tagging by tracking or tracing packet flows through various communication stack formatting, processing and encryption steps, and providing the virtual tag information to the various agents that monitor, control, shape, throttle or otherwise observe, manipulate or modify the traffic. This tagging approach is referred to herein as virtual tagging, because there is not a literal data flow, traffic flow or packet tag that is attached to flows or packets, and the book-keeping to tag the packet is done through tracking or tracing the flow or packet through the stack instead.

In some embodiments, application interface agent 1693 and/or other agents identify a traffic flow, associate it with a service usage activity and cause a literal tag to be attached to the traffic or packets associated with the activity. This tagging approach is referred to herein as literal tagging. There are various advantages to both the virtual tagging and the literal tagging approaches. For example, it can be preferable in some embodiments to reduce the inter-agent communication required to track or trace a packet through the stack processing by assigning a literal tag so that each flow or packet has its own activity association embedded in the data. As another example, it can be preferable in some embodiments to re-use portions of standard communication stack software or components, enhancing the verifiable traffic control or service control capabilities of the standard stack by inserting additional processing steps associated with the various service agents and monitoring points rather than re-writing the entire stack to correctly process literal tagging information, and in such cases, a virtual tagging scheme may be desired. As yet another example, some standard communication stacks provide for unused, unspecified or otherwise available bit fields in a packet frame or flow, and these unused, unspecified or otherwise available bit fields can be used to literally tag traffic without the need to re-write all of the standard communication stack software, with only the portions of the stack that are added to enhance the verifiable traffic control or service control capabilities of the standard stack needing to decode and use the literal tagging information encapsulated in the available bit fields. In the case of literal tagging, in some embodiments, the tags are removed prior to passing the packets or flows to the network or to the applications utilizing the stack. In some embodiments, the manner in which the virtual or literal tagging is implemented can be developed into a communication standard specification so that various device or service product developers can independently develop the communication stack and/or service processor 115 hardware and/or software in a manner that is compatible with service controller 122 specifications and the products of other device or service product developers.

In some embodiments, an agent or combination of agents uses tags to assist in applying a policy (e.g., a notification, charging, or control policy) when an application program on end-user device 100 initiates communications or successfully communicates over an access network. In some such embodiments, the agent or combination of agents determines when an application program initiates or attempts to initiate a communication over the first wireless access network by: identifying a data flow comprising one or more related data transfers or attempted data transfers associated with the application program; assigning a flow tag to the data flow, where the flow tag is a traffic flow identifier; monitoring an access network service usage or attempted service usage associated with the flow tag; and, after identifying the data flow, applying the policy to the first wireless access network service usage or attempted service usage associated with the flow tag. As will be appreciated by a person having ordinary skill in the art, the steps of identifying, assigning, and monitoring can occur in any order.

In some embodiments, application interface agent 1693 applies, implements, or enforces service usage accounting or charging policy for application layer access network communication activity. In some embodiments, this policy implementation function is used to apply, implement, or enforce service usage accounting or charging policy that varies with the classification of the access communication activity as discussed above.

In some embodiments, application interface agent 1693 implements traffic control policy for application layer access network communication activity. In some embodiments, application interface agent 1693 implements application-level control policy to allow an application to execute on end-user device 100 or to prevent an application from executing. In some embodiments, application interface agent 1693 implements notification policy for application layer access network communication activity.

In some embodiments, application interface agent 1693 provides applications with an access network service application interface so that the application (e.g., TCP application 1604, IP application 1605, voice application 1602, etc.) can request or provision special access network service permissions such as, for example, an access network quality-of-service (QoS) channel class, a background service usage class, a service usage accounting particular to an application or application class, or a sponsored service usage particular to an application or application class, wherein a sponsor entity other than a user of the end-user device subsidizes an access network usage cost associated with the application or application class. In such embodiments, application interface agent 1693 can communicate with a counterpart in the access network to provide for provisioning of the special access network service permissions for a particular application or class of applications.

In some embodiments, application interface agent 1693 interacts with application programs (e.g., TCP application 1604, IP application 1605, voice application 1602, or another application on end-user device 100) to arrange application settings to aid in implementing application-level service policy implementation or billing. In some embodiments, application interface agent 1693 arranges an application setting by posting, sending, or otherwise communicating a message comprising a setting configuration. In some embodiments, the application setting assists in traffic control (e.g., allow, block, throttle, rate-limit, transmit on a particular network, background traffic control, etc.), notification (e.g., to a user of end-user device 100, to a network element such as service controller 122, etc.), or charging (e.g., to account for usage of access network resources by end-user device 100).

In some embodiments, application interface agent 1693 interacts with an application program stored on end-user device 100 and configured to access a data service over an access network. In some such embodiments, the application program has an associated policy (e.g., a notification [e.g., of an amount or cost of access network usage associated with the application program, an amount or cost of access network usage associated with the application program over a particular (possibly user-selected) period of time, background or foreground data usage information, etc.], charging, or control policy) to be applied when the application program initiates or attempts to initiate communications over the first access network, and application interface agent 1693 (or another agent on end-user device 100) assists in policy implementation by arranging a setting of the application program by posting, sending, or otherwise communicating the setting to the application program.

In some embodiments, one or more agents on end-user device 100 are configured to prevent unauthorized modifications, updates, or replacements of the application software by: detecting an attempted installation of update software on end-user device 100, where the update software purports to be a modification, update, or replacement of the application program; obtaining a credential associated with the application program; obtaining a credential associated with the update software; and allowing the update software to be installed on end-user device 100 if the credential associated with the purported modification, update, or replacement of the application program matches the credential associated with the application program.

In some embodiments, application interface agent 1693 is associated with or comprises a credential, and another agent on end-user device 100 (e.g., access control integrity agent 1694, policy control agent 1692, etc.) is configured to prevent unauthorized modifications, updates, or replacements of application interface agent 1693. In some embodiments, the other agent detects an attempted installation of software purporting to be a modification, update, or replacement of application interface agent 1693, obtains the credential associated with application interface agent 1693, obtains a credential associated with the software purporting to be a modification, update, or replacement of application interface agent 1693, and allows the software to be installed on end-user device 100 if the credential associated with the software matches the credential associated with application interface agent 1693.

In some embodiments, application interface agent 1693 intercepts certain application traffic to modify traffic application layer parameters, such as email file transfer options or browser headers. In some embodiments, application interface agent 1693 transmits or receives a service usage test element to aid in verifying service policy implementation, service monitoring or service billing. In some embodiments, application interface agent 1693 performs a transaction billing intercept function to aid the billing agent 1695 in transaction billing. In some embodiments, application interface agent 1693 transmits or receives a billing test element to aid in verifying transaction billing or service billing.

In some embodiments, policy implementation agent 1690 monitors device network traffic layer communication activity to identify attempted or successful access network communication activity. In some embodiments, policy implementation agent 1690 monitors network traffic layer communication activity to identify and classify the access communication activity. In some embodiments, the monitoring of access network communications activity by policy implementation agent 1690 is reported to service monitor agent 1696. Traffic layer communication monitoring can be conducted at one or more layers between the application layer (generally referred to as layer 7) and the access network media access control layer (generally referred to as layer 2). In some embodiments, traffic layer communication monitoring comprises classifying data traffic flows based on inspection and characterization of layer 7 communication traffic parameters (for example, one or more of application program identifier or credential, network destination classifiers, communication protocol parameters, communication content classifiers, or secure communication protocol parameters such as SSL or TLS connection parameters) and associating the classification with one or more resulting traffic flows, socket flows, or packet flows. In some embodiments, traffic layer communication monitoring comprises classifying data traffic flows based on inspection and characterization of layer 4 communication traffic parameters such as, for example, socket flow tuples. In some embodiments, traffic layer communication monitoring comprises classifying data traffic flows based on inspection and characterization of layer 3 communication traffic parameters (for example, IP addresses). In some embodiments, traffic layer communication monitoring comprises classifying data traffic flows based on inspection and characterization of VPN tunnel parameters, APN tunnel parameters, etc.

In some embodiments, policy implementation agent 1690 applies, implements, or enforces access network policy at one or more of the communications traffic layers of a device operating system. As discussed above, in some embodiments access network policy can be applied at one or more traffic layers. Traffic layer policy enforcement can be applied at any layer(s) between and including the application layer (generally referred to as layer 7) and the access network media access control layer (generally referred to as layer 2).

In some embodiments, communications traffic layer policy application comprises policy applied to a classification of data traffic flows based on inspection and characterization of layer 7 communication traffic parameters (for example, one or more of application program identifier or credential, network destination classifiers, communication protocol parameters, communication content classifiers, or secure communication protocol parameters such as SSL or TLS connection parameters) and associating the classification with one or more resulting traffic flows, socket flows, or packet flows. In some embodiments, communications traffic layer policy application comprises policy applied to a classification of data traffic flows based on inspection and characterization of layer 4 communication traffic parameters such as, for example, socket flow tuples. In some embodiments, communications traffic layer policy application comprises policy applied to a classification of data traffic flows based on inspection and characterization of layer 3 communication traffic parameters (e.g., IP addresses). In some embodiments, communications traffic layer policy application comprises policy applied to a classification of data traffic flows based on inspection and characterization of VPN tunnel parameters, APN tunnel parameters, etc.

Connection manager 1804 determines which access network the device is connected to and provides this information to other agents on end-user device 100. In some embodiments, connection manager 1804 also chooses a network connection based on available network connections and a network selection policy instruction from policy control agent 1692.

Service monitor agent 1696 is responsible for accounting and reporting the access network service usage for end-user device 100. In some embodiments, the service monitoring (e.g., a measure of the access network service usage) is reported to a user of end-user device 100. In some embodiments, the service monitoring is reported to a network element. In some embodiments, the access network service usage is classified by an application breakdown indicating the amount of service usage attributed to one or more applications. In some embodiments, the access network service usage is classified by a network destination or network service breakdown indicating the amount of service usage attributed to one or more network destinations or network services. In some embodiments, the access network service usage is classified by a network type breakdown indicating the amount of service usage attributed to one or more network types. In some embodiments, the network type breakdown includes a roaming network. In some embodiments, the network type breakdown includes a cellular network (e.g., 2G, 3G, 4G, etc.).

Policy control agent 1692 is responsible for monitoring application layer activity or traffic communication layer activity to identify conditions in which a network access policy should be implemented, and then causing a policy enforcement agent (for example application interface agent 1693 or policy implementation agent 1690) to apply the policy. In some embodiments, policy control agent 1692 receives information about an end-user device connection state from other device agents (e.g., connection manager 1804, one of modem drivers 1831, 1815, 1814, 1813, 1812, modem selection and control 1811, an operating system function, etc.) to aid in determining the access network policy settings that should be applied at a given time. For example, without limitation, device connection state information can comprise one or more of application classification information, network destination identifier information, network service identifier information, type of network information, time of day or day of week information, and geographic location information.

The access network policy instruction provided by policy control agent 1692 to a policy enforcement agent (for example, application interface agent 1693 or policy implementation agent 1690) can comprise a service usage accounting or charging policy in which the service usage is accounted and reported for the purpose of access network service usage accounting or billing. In some embodiments, the service usage is accounted to or billed to a device account or device user account. In some embodiments, the service usage accounting is accounted to or billed to a service sponsor account, where the service sponsor is an entity that is not the device user or a subscriber associated with end-user device 100. In some embodiments, the service usage accounting or charging policy includes modifications in accounting policy based on one or more classifications of service usage and one or more device connection states, with classifications of service usage and connection state including but not limited to those disclosed herein.

The access network policy instruction provided by policy control agent 1692 to a policy enforcement agent can comprise a service usage control policy wherein the service usage is governed, limited, or regulated according to a service plan policy. In some embodiments, the service usage control policy includes modifications in control policy based on one or more classifications of service usage and one or more device connection states, with classifications of service usage and connection state including but not limited to those disclosed herein.

The access network policy instruction provided by policy control agent 1692 to a policy enforcement agent can comprise a service notification policy in which a notification associated with the access network service is presented through a user interface of end-user device 100 (e.g., user interface 1697) when a pre-determined notification trigger condition is met. In some embodiments, the notification indicates an amount of service used. In some embodiments, the notification indicates an amount of service remaining. In some embodiments, the notification comprises an offer to acquire service. In some embodiments, the service notification policy includes modifications in control policy based on one or more classifications of service usage and one or more device connection states, with classifications of service usage and connection state including but not limited to those disclosed herein. In some embodiments, the notification includes an offer to acquire service based on the occurrence of a pre-determined attempted or successful device access to an application or combination of applications. In some embodiments, an offer to acquire service is based on the occurrence of a pre-determined attempted or successful device access to a network destination or combination of network destinations. In some embodiments, an offer to acquire service is based on detection of a condition in which a new service plan may be of interest to a device user who currently has an existing service plan or no service plan. In some embodiments, the notification comprises an offer to increase a service allowance. In some embodiments, the notification comprises an indication of potential or likely service usage. In some embodiments, the notification indicates a roaming service usage. In some embodiments, the notification comprises an offer to acquire roaming services. In some embodiments, the notification indicates that service authorization is about to expire under a current service plan.

In some embodiments, user interface 1697 provides a user of end-user device 100 with input capability to modify an access network service according to a user preference and/or to receive access network service notifications. In some embodiments, user interface 1697 accepts user inputs for modifying access network policy, such as limiting access by one or more applications or access to one or more network destinations. In some embodiments, user interface 1697 accepts user inputs for modifying end-user device 100's access to particular access networks (e.g., one or more roaming networks, one or more cellular networks, one or more WiFi networks, etc.). In some embodiments, user interface 1697 accepts user inputs for choosing or modifying a service plan.

Service control device link 1691 provides a secure communication link and heartbeat function between service processor 115 and service controller 122. In some embodiments, using the heartbeat function, agents on end-user device 100 provide certain reports to service controller 122 for the purpose of service policy implementation verification (e.g., verification-related reports on certain aspects of service processor 115) or for other purposes. Such agent heartbeat messages can be sent unencrypted or encrypted, signed, or otherwise secured. In some embodiments, these messages include one or more of an agent information message, an agent check-in message, and an agent cross check message.

In some embodiments, an agent information message is included in a agent heartbeat service policy implementation verification message, which includes, for example, any information the agent needs to communicate to service controller 122 as part of the operation of the service policy implementation system. For example, an agent response to a service controller challenge, as described below, can be included in the agent heartbeat service policy implementation verification message.

In some embodiments, an agent check-in message is included in an agent heartbeat service policy implementation verification message, which includes, for example, a transmission of a unique agent identifier, secure unique identifier, and/or hashed encrypted and signed message beginning with some shared secret or state variable for the hash. For example, an agent self-check can be included in the agent heartbeat service policy implementation verification message, which includes reporting on agent configuration, agent operation, agent code status, agent communication log, agent error flags, and/or other agent associated information potentially hashed, encrypted, signed or otherwise secured in the message (e.g., using a shared secret unique to that agent).

In some embodiments, an agent cross-check message is included in the agent heartbeat service policy implementation verification message, which includes, for example, reports on the status, configuration, operation observations, communication log or other aspects of another agent. For example, agent environment reports can be included in the agent heartbeat service policy implementation verification message, which includes, for example, reports on certain aspects of the service processor 115 operating environment, such as software presence (e.g., installation status of certain operating system and/or application software and/or components thereof), observed communication with agents or communication attempts, memory accesses or access attempts, network accesses or access attempts, software downloads or attempted downloads, software removal or download blocking, service policy implementation verification or compromise event error conditions with respect to the operating environment for service processor 115, and/or other messages regarding the verification or possibility of compromise associated with service processor 115 operating environment or agents.

In some embodiments, the agent heartbeat function also provides regular updates for information important to user service notification services. For example, the network-based elements can provide regular synchronization updates for the device based service usage or service activity counters in which service usage or service activity measures available from one or more network service history elements are transmitted to end-user device 100. This allows the service usage counter errors between the device service counter and the counters used for central billing to be minimized. A common service usage or service activity measure is total traffic usage associated with one or more applications or one or more network destinations measured to date within a time frame over which a service limit is applicable. Other service usage or service activity measures can also be tracked and reconciled in a similar manner.

In some embodiments of the heartbeat function, service controller 122 verifies that the scheduled agent reports are being received and that the reports are within expected parameters. In some embodiments, access control integrity server 1654 issues signed challenge/response sequences to policy implementation agent 1690. For example, the challenges can be asynchronous, issued when an event or error condition occurs, issued on a schedule, or issued when a certain amount of data has been used. This approach, for example, provides a second layer of service policy implementation verification that strengthens the service usage or service activity measurement verification. For example, a challenge/response can be sent over the heartbeat link for the purpose of verifying device agent integrity.

In some embodiments, the challenge/response heartbeat message can include sending any kind of command or query, transmitted securely or transmitted in the open, receiving a response from the agent and then evaluating the response to determine if the response is within a range of parameters expected for a correctly configured agent, an agent that is operating properly, an agent that is not partially compromised, or an agent that is not entirely compromised. In some embodiments, the agent is only required to respond with a simple acknowledgement of the challenge. In some embodiments, the agent is required to respond with a message or piece of information that is known by the agent. In some embodiments, the agent is required to respond with a message or piece of information that would be difficult for the agent to supply if it were to be partially or entirely compromised. In some embodiments, the agent is required to respond back with information regarding the operation or configuration of the agent that would be difficult for the agent to supply if the agent were not properly configured, not operating properly, partially compromised, or entirely compromised. In some embodiments, a first agent is required to respond back with information regarding the operation, configuration, status or behavior of a second agent, and this information is difficult for the first or second agent to supply if the first or second agent is not properly configured, not operating properly, is partially compromised or is entirely compromised. In some embodiments, the agent is required to respond with a response that includes a shared secret. In some embodiments, the agent is required to respond with information regarding the presence, configuration, operating characteristics or other information regarding other programs in the operating environment of the agent. In some embodiments, the agent is required to respond with hashed information of portions of code or a code sample (e.g., the code portion or code sample can be specified by service controller 122).

In some embodiments, the information the agent responds with is a response to a signed or encrypted message from service controller 122, and the agent must know how to decode the encrypted controller message in order to respond correctly, or it would be difficult for the agent to respond properly if the agent is not configured properly, is not operating within appropriate limits, is partially compromised, or is entirely compromised. In some embodiments, the agent signs or encrypts information in such a manner that it is difficult for the agent to respond correctly, and for service controller 122 to decode the message, unless the agent is configured properly, is operating within appropriate limits, is not partially compromised, and is not entirely compromised. In some embodiments, the agent is required to respond with a signed or encrypted hash of information that is difficult for the agent to generate unless the agent is configured properly, is operating within appropriate limits, is not partially compromised and is not entirely compromised. For example, the hashed information can be local device configuration information, portions of code, or all of the code, and/or the code portion to be used in the response can be specified by service controller 122. In another example, the hashed information the agent responds with can include a shared secret, and/or the hashed information can be information regarding the presence, configuration, operating characteristics or other information regarding other programs in the operating environment of the agent.

Accordingly, as described above, the agent heartbeat function provides an important and efficient system in some embodiments for verifying the service policy implementation or protecting against compromise events (e.g., fraud). There are many other functions the agent heartbeat service can perform; some are described herein, and others will be apparent to one of ordinary skill in the art given the principles, design background, and various embodiments provided herein.

In some embodiments, service downloader 1663 provides for one or more of: download of application programs that have an associated service policy; download of application credentials; and download of service processor 115 components or component updates. In some embodiments, service downloader 1663 requires a secure signed version of software before a download is accepted. For example, the download can require a unique key or credential. In some embodiments, service downloader 1663 is stored or executed in secure memory or executes in a secure memory partition in the CPU memory space. Those of ordinary skill in the art will appreciate that there are a variety of other security techniques that can be used to ensure the integrity of service downloader 1663.

Access control integrity agent 1694 monitors the operational integrity of one or more service processor 115 elements to determine if unauthorized user modification or unauthorized user software program modification of the service processor configuration or operation has occurred. In some embodiments, access control integrity agent 1694 collects device information on one or more of service policy, service usage, service activity, agent configuration, and agent behavior. In some embodiments, access control integrity agent 1694 also cross-checks this information to identify integrity breaches in the service policy implementation and control system. In some embodiments, access control integrity agent 1694 initiates action when a service policy violation or a system integrity breach is suspected. In some embodiments, access control integrity agent 1694 takes an action (e.g., generating a fraud alert, blocking end-user device 100 from accessing access network 10, blocking an application from accessing access network 10, directing the device to a quarantine network status in which end-user device 100 can, for example, only access functions generally controlled by the access network service provider or the central service provider, etc.) when unauthorized conditions are detected. In some embodiments, access control integrity agent 1694 also performs asynchronous or periodic agent checks to verify the presence, configuration, or proper operation of other agents. In some embodiments, access control integrity agent 1694 also performs challenge-response sequence verification of other agents.

In some embodiments, access control integrity agent 1694 monitors agent self-check reports to verify that agents are properly configured. In some embodiments, access control integrity agent 1694 reports the agent self check reports to service controller 122. In some embodiments, access control integrity agent 1694 performs a role in service usage test transmission, reception and/or monitoring, with the usage test being tailored to test monitoring or control aspects for any subset of service activities. In some embodiments, access control integrity agent 1694 performs a role in billing test event generation and/or monitoring. In some embodiments, access control integrity agent 1694 checks and reports the result of service usage monitoring verification tests, service usage billing verification tests and/or transaction billing verification tests.

In some embodiments, access control integrity agent 1694 receives agent access attempt reports to determine if unauthorized agent access attempts are occurring. In some embodiments, access control integrity agent 1694 acts as a central secure communications hub for agent-to-agent or service-controller-to-agent communication. For example, access control integrity agent 1694 can be used so that no other software or function can access agents or so that agents cannot access other agents except through a secure point-to-multipoint communications hub. In some embodiments, this approach further enhances compromise resistance for the agents. In some embodiments, some or all of the agent communications, including agent-to-agent or service-controller-to-agent communications, and possibly including unauthorized attempts to communicate with agents, are monitored and logged so that a trace log of some or all agent communications can be maintained. For example, the agent communication trace log can be summarized and/or compressed for transmission efficiency or regularly reported, such as through the heartbeat function, or the agent communication trace log can be reported only when service controller 122 requests the agent communication trace log or when there is a verification error event.

In some embodiments, access control integrity agent 1694 obtains service usage or service activity measures from service monitor agent 1696 and compares one or more first service usage measurement points against one or more second service usage measurement points to verify service policy implementation.

As illustrated in the embodiment of FIG. 2, service processor 115 is in communication with service controller 122 via access network 10 (and optionally including an additional connection path via Internet 12 in embodiments in which service controller 122 is not directly connected to access network 10, such as the embodiment of FIG. 2). Service controller 122 includes service control server link 1638, which provides a secure communication link and heartbeat function between service processor 115 and service controller 122.

In some embodiments, service history server 1650 records service usage reports for end-user device 100. In some embodiments, service history server 1650 collects and records service usage or service activity reports (e.g., accounting reports) from a network element (e.g., access network AAA server 1621) or end-user device 100 (e.g., service monitor agent 1696). In some embodiments, the service usage reports are generated by service processor 115. In some embodiments, the service usage reports include service usage classification information (e.g., usage per application, per group of applications, per network destination, per group of applications, per network type, etc.) as described herein.

Although service usage reports from the network elements can in certain embodiments be less detailed than service usage reports from end-user device 100, the reports from the network can provide a valuable source for verification of device service policy implementation, because, for example, it is unlikely that a device error or compromise event on end-user device 100 will compromise network-based equipment or software. In some embodiments, service history server 1650 provides the service history on request to other servers and/or one or more agents. In some embodiments, service history server 1650 provides the service usage history to device service history 1618.

In some embodiments, policy management server 1652 includes storage of access network service policies that are provided to service processor 115 from a network element. In some embodiments, policy management server 1652 provides known-application credentials to service processor 115. In some embodiments, policy management server 1652 evaluates run-time application credentials provided by service processor 115.

In some embodiments, policy management server 1652 transmits policies to service processor 115 via service control link 1653. In some embodiments, policy management server 1652 manages policy settings on end-user device 100 (e.g., various policy settings as described herein with respect to various embodiments) in accordance with a device service profile. In some embodiments, policy management server 1652 sets instantaneous policies on policy implementation agents (e.g., policy implementation agent 1690). For example, policy management server 1652 can issue policy settings, monitor service usage and, if necessary, modify policy settings.

In some embodiments, policy management server 1652 provides adaptive policy management on end-user device 100. For example, policy management server 1652 can issue policy settings and objectives and rely on the device-based policy management (e.g., by service processor 115) for some or all of the policy adaptation. This approach can require less interaction with end-user device 100, thereby reducing network chatter on service control link 1653 for purposes of device policy management. This approach can also provide robust user privacy embodiments by allowing the user to configure the device policy for user privacy preferences/settings so that, for example, sensitive information (e.g., geo-location data, website history) is not communicated to the network without the user's approval. In some embodiments, policy management server 1652 adjusts service policy based on time of day. In some embodiments, policy management server 1652 receives, requests or otherwise obtains a measure of network availability and adjusts traffic shaping policy and/or other policy settings based on available network capacity.

In some embodiments, policy management server 1652 performs a service control algorithm to assist in managing overall network capacity or application QoS. In some embodiments, policy management server 1652 performs an algorithm to determine which access network is best to connect to, such as based on network capacity or application QoS, service usage costs, and/or any other criteria.

In some embodiments, access control integrity server 1654 monitors the integrity of the access policy system to establish a trusted service policy implementation. In some embodiments, access control integrity server 1654 collects end-user device 100 information on service policy, service usage, agent configuration and/or agent behavior. In some embodiments, access control integrity server 1654 cross-checks this information to identify integrity breaches in the service policy implementation and control system.

In some embodiments, access control integrity server 1654 initiates action when a service policy violation or a system integrity breach or error is suspected or detected. In some embodiments, access control integrity server 1654 (and/or some other agent of service controller 122) acts on access control integrity agent reports and error conditions. In some embodiments, checks performed by access control integrity agent 1654 include one or more of the following: service usage measure against usage range consistent with policies (e.g., usage measure from the network and/or from the device); configuration of agents; operation of the agents; and/or dynamic agent download.

In some embodiments, access control integrity server 1654 (and/or some other agent of service controller 122) verifies device service policy implementations by comparing various service usage measures (e.g., based on network-monitored information and/or local service usage monitoring information) against expected service usage behavior given the policies that are intended to be in place. For example, device service policy implementations can include measuring total data passed, data passed that is associated with a particular application or group of applications, data passed that is associated with a particular network destination or group of network destinations, data passed in a period of time, IP addresses, data per IP address, data per network, data per network type, and/or other measures (such as location, downloads, email accessed, URLs, etc.), and comparing such measures to expected service usage behavior given the policies that are supposed to be in place.

In some embodiments, access control integrity server 1654 (and/or some other agent of service controller 122) verifies device service policy, and the verification error conditions that can indicate a mismatch in service measure and service policy include one or more of the following: unauthorized network access (e.g., access beyond sponsored service policy limits); unauthorized network speed (e.g., average speed beyond service policy limit); network data amount does not match policy limit (e.g., device not stopping at limit without re-up/revising service policy); unauthorized network address; unauthorized service usage (e.g., VOIP, email, and/or web browsing when not authorized); unauthorized application usage (e.g., email, VOIP, email, and/or web when not authorized); service usage rate too high for plan, and policy controller not controlling/throttling it down; and/or any other mismatch in service measure and service policy.

In some embodiments, access control integrity server 1654 (and/or some other agent of service controller 122) verifies device service policy based at least in part on, for example, various error conditions that indicate a mismatch in service measure and service policy. For example, various verification error conditions that can indicate a mismatch in service measure and service policy include one or more of the following: mismatch in one service measure and another service measure; agent failure to report in; agent failure to respond to queries (e.g., challenge-response sequence and/or expected periodic agent reporting); agent failure to respond correctly to challenge/response sequence; agent improperly configured; agent failure in self checks; agent failure in cross-checks; unauthorized agent communication or attempted unauthorized communication; failure in service policy implementation test; failure in service usage reporting test; failure in service usage billing test; failure in transaction billing test; failure in download sequence; environment compromise event, such as unauthorized software load or execution (or attempt), unauthorized memory access (or attempt), unauthorized agent access (or attempt), known harmful software, and/or known harmful communications signature; and/or failure to respond to various messages, such as send message and suspend and/or send message and quarantine.

In some embodiments, access control integrity server 1654 (and/or some other agent of service controller 122) verifies device service policy by performing automated queries and analysis, which are then reported (e.g., anomalous/suspicious report results can be reported for further analysis by a person responsible for determining whether such activities indicate out of policy activities or to provide information to the user to inform the user of such anomalous/suspicious report results that may indicate out-of-policy activities). For example, the user can review the report to authorize whether such activities were performed by the user (e.g., website access requests, specific transactions, and/or phone calls) and/or indicate that such activities were not authorized by the user (e.g., indicate a potential compromise of the device, such as by malware or other unauthorized software/user use of the device). As another example, the user can also be connected to communicate with service support of the service provider regarding such reported activities (e.g., by text/chat, voice/phone, and/or video conference to a service support). Accordingly, in some embodiments, access control integrity server 1654 (and/or some other agent of service controller 122) provides a policy/service control integrity service to verify (e.g., periodically and/or based on trigger events) that the service control of the device has not been compromised and/or is not behaving out of policy.

In some embodiments, upon detection of one or more service verification errors, such as the various service verification errors discussed above, end-user device 100 is directed to a quarantine network status in which end-user device 100 can, for example, only access network control plane functions, billing functions, and other functions generally controlled by the access network service provider or the central service provider. In some embodiments, end-user device 100 is completely suspended from the network. In some embodiments, end-user device 100's network access, service capabilities and/or traffic shaping are limited, partially restricted or completely restricted. For example, these limitations and/or restrictions can be implemented in the device and/or in the network. For example, implementing a device quarantine (e.g., using a RADIUS server to quarantine the device) can involve assigning the device to a different billing profile.

In some embodiments, service download control server 1660 provides for one or more of: download of application programs that have an associated service policy; download of application credentials; and download of service processor 115 components or component updates.

In some embodiments, billing event server 1662 provides for billing of access network service usage. In some embodiments, the billing is modified based on one or more of the classifications of access network service usage described herein. In some embodiments, the billing is modified based on one or more of the device connection state conditions described herein.

In some embodiments, device service history 1618 provides trusted (e.g., network-based, third-party-based, or certain device-based) service usage measures for billing purposes or for the purpose of verifying a trusted service policy implementation. In some embodiments, a trusted service policy implementation is verified by service controller 122 (e.g., access control integrity server 1654) by comparing the trusted service usage records with the usage limitations expected to be in place if the service policy is being properly implemented by end-user device 100. In some embodiments, these trusted service usage measures include a classification of service usage based on application. In some embodiments, these trusted service usage measures include a classification of service usage based on network destination or network service identifier. In some embodiments, these trusted service usage measures include a classification of service usage based on network type. In some embodiments, these trusted service usage measures include a classification of service usage based on time of day. In some embodiments, these trusted service usage measures include a classification of service usage based on QoS class. In some embodiments, these trusted service usage measures include a classification of service usage based on geography. In some embodiments, these trusted service usage measures include a classification of service usage based on a roaming network.

In some embodiments, central billing 1619 provides for billing of service usage. In some embodiments, central billing 1619 provides a mediation function for central provider billing events. For example, central billing 1619 can accept service plan changes. In some embodiments, central billing 1619 provides updates on device service usage, service plan limits and/or service policies. In some embodiments, central billing 1619 collects billing events, formulates bills, bills service users, provides certain billing event data and service plan information to the service controller 122 and/or end-user device 100.

In some embodiments, access network AAA server 1621 assists in authentication of service processor 115 by providing one or more of a device credential database, a user credential database, a service processor credential database, and an authentication service for the device. In some embodiments, access network AAA server 1621 provides the necessary access network AAA services (e.g., access control and authorization functions for the device access layer) to allow end-user devices 100 onto the central provider access network and the service provider network. In some embodiments, access network AAA server 1621 also provides the ability to suspend service for a device and resume service for a device based on communications received from service controller 122. In some embodiments, access network AAA server 1621 also provides the ability to direct routing for device traffic to a quarantine network or to restrict or limit network access when a device quarantine condition is invoked. In some embodiments, access network AAA server 1621 also records and reports device network service usage (e.g., to device service history 1618).

Although many of the embodiments disclosed herein include service controller 122, a service controller is not necessary in embodiments in which a user of end-user device 100 is in full control of access network policies via user interface 1697. For example, the user can determine access network service policies that limit service for end-user device 100 in general or for one or more of the access network service usage classifications described herein, including application limitations, network destination or network service limitations, network type limitations, etc. In some embodiments, based solely on user preferences input via user interface 1697 of end-user device 100, the service processor access network service policy limitations can specify blocking, allowing, or capping service usage according to, for example, application, application class, or destination. In some embodiments, these user-defined limitations can be modified based on the type of network the device is connected to. In some embodiments, these user defined limitations can be modified based on whether the user wishes to allow the access network communication activity for a given classification to occur in the background or not, or to cap such service usage when end-user device 100 is connected to a particular network type (e.g., a roaming network, a cellular network, a WiFi network, etc.). In some embodiments, these user-defined limitations can be modified based on whether the user wishes to allow the access network communication activity for a given classification to occur while end-user device 100 is connected to a roaming network, or to cap such service usage while end-user device 100 is roaming.

Figure 3:
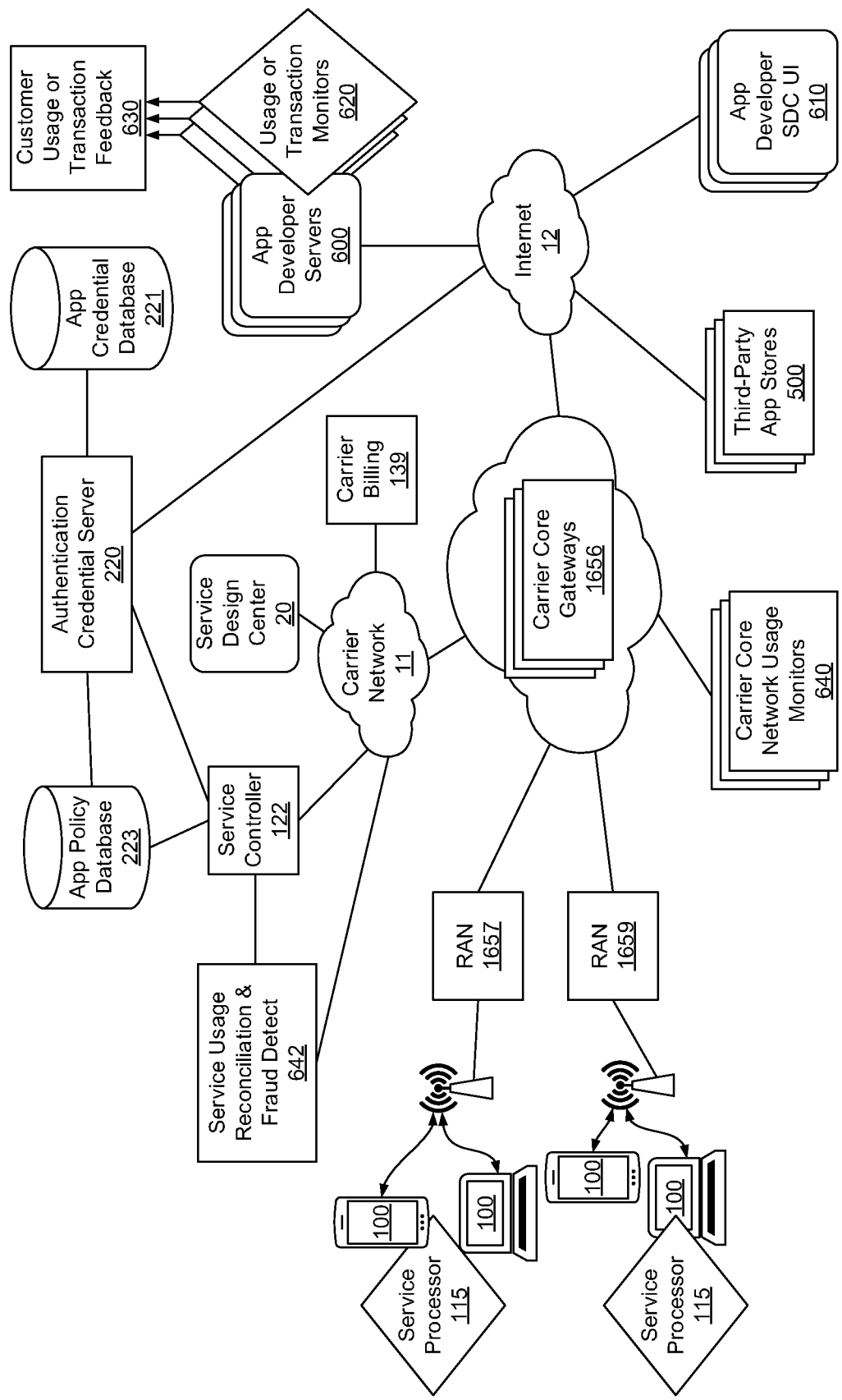
FIG. 3 illustrates an example embodiment of functional elements for a network access service policy implementation.

FIG. 3 illustrates an alternative embodiment of functional elements for a network access service policy implementation. In FIG. 3, the carrier network system is shown as having multiple radio access networks (RAN 1657 and RAN 1659 are shown, but additional networks may also be present), carrier core gateways 1656, carrier core network usage monitors 640, carrier network 11, and carrier billing 139. In this embodiment, the service controller function is augmented by authentication credential server 220, application credential data base 221, application policy database 223, service usage reconciliation and fraud detection 642, and service design center 20. In some embodiments, authentication credential server 220 is incorporated in service controller 122.

Internet 12 provides a connection to user device application program sources (e.g., third-party app stores 500) and user device application service destinations (e.g., app developer servers 600 and other websites, servers, or content sources connected to Internet 12). Application developer service design center (SDC) user interface (UI) 610 provides a user interface to allow application developers or website developers who choose to sponsor (e.g., partially or entirely subsidize) access network usage costs associated with particular applications and/or websites to define sponsored-service parameters. Usage or transaction monitors 620 track device usage of application developer servers 600 (e.g., by generating customer usage or transaction feedback 630) for the purpose of verifying access network service policy for sponsored services.

Authentication credential server 220 interfaces with application credential database 221, with application policy database 223, and with service controller 122. Authentication credential server 220 has at least three embodiments, each with a different mode of operation. In one embodiment or mode of operation, authentication credential server 220 provides application credentials and associated access network policies to end-user device 100 (e.g., to service processor 115) for the purpose of identifying a device application program and associating it with access network policies that are to be applied to attempted or successful access network communications associated with that application. A device application program credential can be a program identifier, a name, a signature, a certificate, a hash, or any other identifier that uniquely identifies the application. In another embodiment or mode of operation, authentication credential server 220 receives a device application credential from end-user device 100 (e.g., service processor 115), determines if the credential matches a known-application credential in application credential database 221, and, if so, provides the associated application access service policy from application policy database 223 to the device. In a variation of this embodiment, if authentication credential server 220 determines that the application credential does not match a known-application credential in application credential database 221, then, in some embodiments, authentication credential server 220 retrieves an access policy associated with unknown applications from application policy database 223 and provides it to end-user device 100. In some embodiments in which the application credential does not match a known-application credential, end-user device 100 is informed that no policy exists for the application associated with the credential. In some embodiments in which the application credential does not match a known-application credential, no action is taken.

Carrier core network usage monitors 640 monitor usage of access network resources by each end-user device 100. Carrier core network usage monitors 640 may include a deep packet inspection (DPI) element or any other network element capable of monitoring usage of access network resources by end-user devices.

Service design center 20 provides a means for specifying service plan policies for the access network service policy implementation system. Co-pending U.S. patent application Ser. No. 13/248,025, which is entitled "Service Design Center for Device Assisted Services" and is incorporated herein by reference, describes some of the information that may be configured via service design center 20. Example of information that can be configured using service design center 20 include but are not limited to: a list of available service plans; the priorities of listed service plans, where the priorities identify the order in which the classification function on the end-user device should apply filters associated with the available, selected, or purchased service plans, e.g., to determine under which plan a particular service activity by an end-user device falls; how available service plans will be displayed on an end-user device, such as end-user device 100; a categorization of service plans (e.g., whether a service plan is a temporary activation plan, a sponsored plan subsidized or paid for by an entity other than a user or subscriber associated with the end-user device, a user-paid plan, etc.); promotional messages to be displayed on one or more end-user devices, such as end-user device 100; upsell offers (e.g., conditions that trigger the display of an upsell offer, information characterizing the upsell offer, etc.); events that cause a "no capable plan" notification (e.g., a notification that is presented when a user of an end-user device that is not associated with or subscribed to an applicable data plan attempts to access a data service, etc.) on the end-user device; templates for notification messages (e.g., message foregrounds and backgrounds, colors, logos, etc.); subscriber groups (e.g., by importing a list, manually typing individual subscriber identifiers, etc.); requests for reports containing information about a group of end-user devices or a group of subscribers; information about an end-user device associated with a subscriber (e.g., data usage measures, service plan information, cost or account balance information, notification settings for the end-user device, etc.).

In some embodiments, service usage reconciliation and fraud detection 642 provides service usage comparisons for the purpose of service fraud detection and corrective action. As disclosed herein, service usage measures used by service usage reconciliation and fraud detection 642 can originate from end-user device service usage measures, trusted service usage measures (e.g., measures from carrier core network usage monitors 640 or another trusted source), or both. As also disclosed herein, the service usage measures can be associated with various classifications (e.g., by application, network destination, device network connection state, network type, etc.). In some embodiments, a trusted service policy implementation is verified by service controller 122 by performing one or more of the following operations: (a) comparing the trusted access network usage records with the usage limitations expected to be in place if the service policy is being properly implemented; (b) comparing a trusted service usage measure against a device service processor-based service usage measure; (c) comparing a first device service processor service usage measure against a second device service processor service usage measure; (d) comparing device service usage against a population statistic for the device-based service usage measure.

In some embodiments, service usage reconciliation and fraud detection 642 uses customer usage or transaction feedback 630 from usage or transaction monitors 620 integrated into application developer servers 600 to aid in detection of service policy error events. In some embodiments, the service usage information provided from customer usage or transaction feedback 630 is used to determine the service usage that should be accounted to an application classification service, a website classification service, a network content classification service, or a network classification service defined by a connection to a network gateway, proxy server, or tunnel server (e.g., an APN tunnel server, a VPN tunnel server, etc.). In some embodiments, the service usage provided from customer usage or transaction feedback 630 is compared to device-based service usage measures to determine if the two measures are accurate to within a tolerance.

In some embodiments, third-party app stores 500 provide end-user device 100 with an application program source for downloading device application programs associated with an access network policy. In some embodiments, when (as disclosed herein) a device user interface notification offers a user a service plan comprising an application program and an associated access network policy for the application program, and the application program is not pre-loaded on the device, when the user selects the service plan, service processor 115 automatically downloads the application from one of third-party app stores 500.

In some embodiments, application developer service design center UI 610 allows application developers, website developers, or other Internet content providers or service providers to log into a sponsored service definition server in order to sign up for sponsored payments to subsidize user accounting for access network service usage for a certain application, certain website, certain content site, certain shopping site, or another Internet based service associated with a network destination, a group of network destinations, an application, a group of applications, a network type, etc. In some embodiments, an application credential can be uploaded or specified via application developer service design center UI 610 and associated with a sponsored service plan policy. In some embodiments, a network destination identifier can be uploaded or specified via application developer service design center UI 610 and associated with a sponsored service plan policy.

In some embodiments carrier billing 139 provides for billing of service usage.

Secure Service Controller Hardware Architectures

Figure 4:
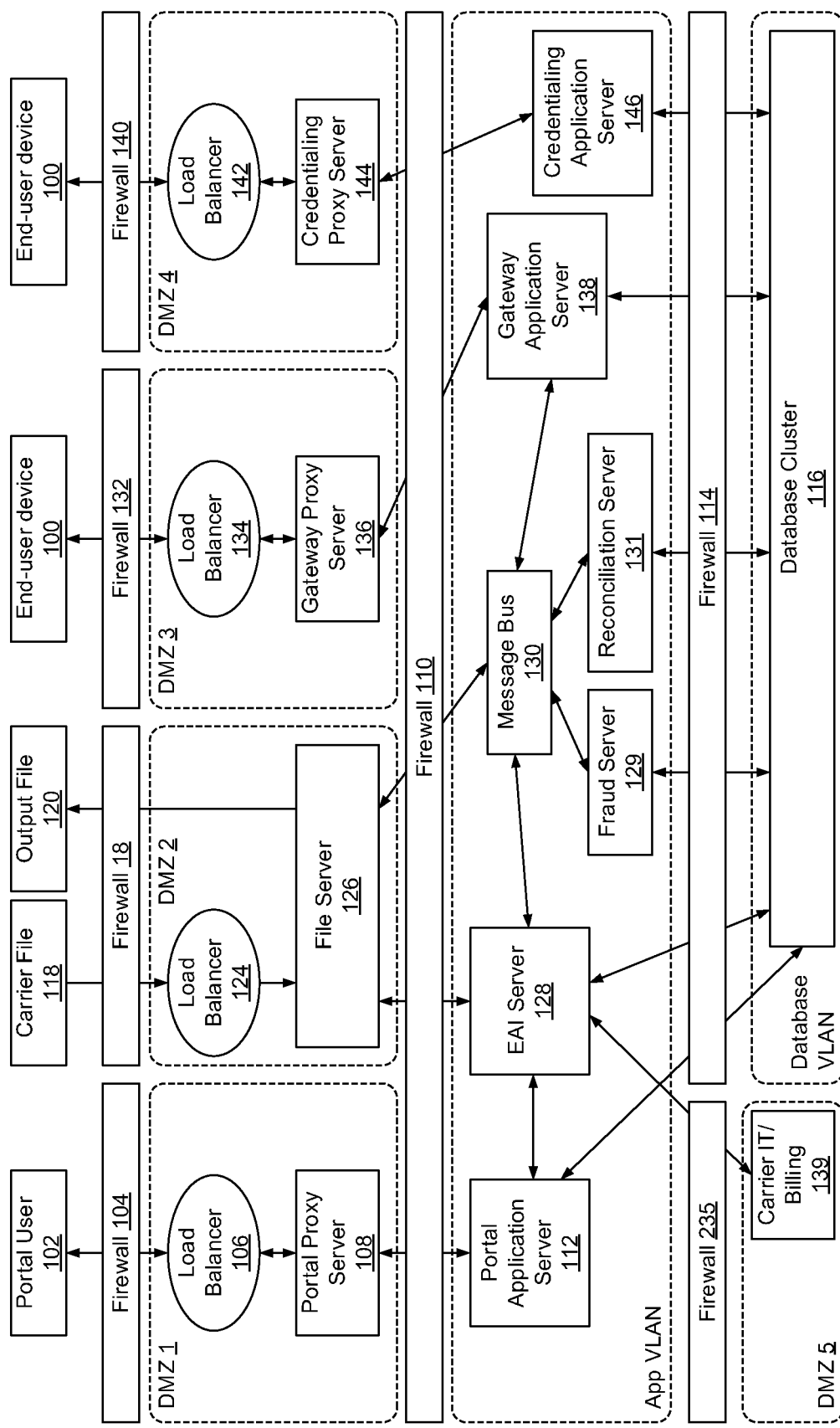
FIG. 4 illustrates an example embodiment of a secure service controller architecture for DAS systems.

The elements of service controller 122 described herein can be implemented in various advantageous architectural embodiments to assist in securing device-assisted services (DAS). FIG. 4 illustrates an example embodiment of a secure service controller architecture for DAS systems. FIG. 4 shows several of the functions that may be accomplished by a service controller (e.g., service controller 122) that communicates with one or more end-user devices over access network 10. In particular, FIG. 4 shows four service controller functions: a portal function, a file transfer function, a gateway function, and a credentialing function.

In the embodiment of FIG. 4, the portal function is accomplished by portal user 102, optional load balancer 106, optional portal proxy server 108, portal application server 112, and database cluster 116. In some embodiments, the portal function allows a user (e.g., carrier personnel, mobile virtual network operator (MVNO) personnel, virtual service provider (VSP) personnel, etc.) to enter information to configure or manage access network services or end-user devices, such as by using service design center 20 or application developer service design center UI 610. In some embodiments, the portal function allows a portal user to collect information about provisioned end-user devices (e.g., reports containing information about an end-user device's service plan activity, reports containing information about an end-user device's access network usage, etc.). An example embodiment of the portal function is described in more detail below using FIG. 9.

In some embodiments, the file transfer function allows secure file transfers between a carrier (e.g., a service provider, an MVNO, a VSP, etc.) and the service controller. As illustrated in FIG. 4, carrier file 118 is placed on file server 126 through optional load balancer 124. EAI server 128 retrieves carrier file 118. In some embodiments, EAI server 128 processes carrier file 118. EAI server 128 configures output file 120. In some embodiments, EAI server 128 configures output file 120 using information in database cluster 116. EAI server 128 places output file 120 on file server 126. An example embodiment of the file transfer function is described below using FIG. 10.

In the embodiment of FIG. 4, the credentialing function is accomplished by end-user device 100, optional load balancer 142, optional credentialing proxy server 144, credentialing application server 146, and database cluster 116. In some embodiments, the credentialing function authenticates end-user devices and provides those devices with the credentials they need in order to communicate with the service controller gateway and to use access network services. An example embodiment of the credentialing function is described below using the example embodiment of FIG. 6.

In the embodiment of FIG. 4, the gateway function is accomplished by end-user device 100, optional load balancer 134, optional gateway proxy server 136, gateway application server 138, and database cluster 116. In some embodiments, the gateway function supports an end-user device's DAS communications, including the sending of device-based usage reports from end-user device 100 (e.g., using service processor 115) to service controller 122, after the end-user device has completed the credentialing procedure. An example embodiment of the gateway function is described below using FIG. 11.

In some service controller 122 embodiments, security is provided by making data flowing through the service controller accessible only to the functions and elements that process it. For example, in the embodiment of FIG. 4, information flowing from end-user device 100 to credentialing application server 146 is not available to network elements supporting the portal, file server, or gateway functions. FIG. 4 also illustrates several different security zones. The security zones are protected (e.g., separated) by firewalls that limit the reach of an entity once that entity has gained access to a hardware element or function within a hardware element that performs a service controller function. As would be understood by a person of ordinary skill in the art, a firewall comprises one or more devices that permit or deny network traffic to pass through the firewall based on a set of rules. When interposed between two network elements, a firewall can prevent unauthorized access between elements while permitting legitimate communications to pass. In the embodiment shown in FIG. 4, once an entity has gained access to an element in one security zone, the entity must pass through a firewall to communicate with an entity in a different security zone. For example, firewall 104 protects optional load balancer 106 and portal proxy server 108 from unauthorized access by portal user 102; firewall 110 protects portal application server 112 from unauthorized access by optional portal proxy server 108; and firewall 114 protects database cluster 116 from unauthorized entry by portal application server 112. Thus, in order to gain access to database cluster 116, portal user 102 must successfully navigate through three firewalls.

FIG. 4 illustrates seven security zones, each indicated by a dashed line. The zone labeled "DMZ 1" includes optional load balancer 106 and optional portal proxy server 108. DMZ1 is separated from portal user 102 by firewall 104, and DMZ1 is separated from portal application server 112, which is in the "App VLAN" security zone, by firewall 110. The zone labeled "DMZ 2" includes optional load balancer 124 and file server 126. Incoming carrier file 118 must pass through firewall 18 to reach file server 126, and through firewall 110 to reach EAI server 128. Likewise, retrieving output file 120 from file server 126 requires navigation through firewall 18. The zone labeled "DMZ 3" includes optional load balancer 134 and optional gateway proxy server 136. Communications from end-user device 100 must pass through firewall 132 to reach optional gateway proxy server 136, and through firewall 110 to reach gateway application server 138. The zone labeled "DMZ 4" includes optional load balancer 142 and optional credentialing proxy server 144. Communications from end-user device 100 must pass through firewall 140 to reach credentialing proxy server 144 and through firewall 110 to reach credentialing application server 146. FIG. 4 also shows a security zone labeled "Database VLAN," which includes database cluster 116 and is protected from the elements in the App VLAN security zone by firewall 114. Database cluster 116 comprises one or more database elements. The information in and use of database cluster 116 is described below. The zone labeled "DMZ 5" contains carrier IT/billing element 139 and is separated from EAI server 128 and the other elements in the App VLAN zone by firewall 235.

The zone labeled "App VLAN" is the applications security zone. As illustrated in FIG. 4, App VLAN includes portal application server 112, EAI server 128, message bus 130, fraud server 129, reconciliation server 131, gateway application server 138, and credentialing application server 146. FIG. 4 illustrates direct communication paths between some of the elements within the App VLAN zone. For example, there are direct communication paths between EAI server 128 and portal application server 112; between EAI server 128 and message bus 130; between fraud server 129 and message bus 130; between reconciliation server 131 and message bus 130; and between gateway application server 138 and message bus 130. FIG. 4 also shows that several of the elements within the App VLAN security zone do not communicate directly, but rather use message bus 130. For example, there is no direct communication path between EAI server and reconciliation server 131, but both elements have communication paths with message bus 130. As would be appreciated by a person having ordinary skill in the art, elements with communication paths through message bus 130 could have direct communication paths, and elements with direct communication paths could instead communicate using message bus 130. The communication paths shown in FIG. 4 are merely exemplary.

Although FIG. 4 shows the various elements within App VLAN as being within a single security zone, a person of ordinary skill in the art would recognize that there may be multiple security zones, separated by firewalls, within the App VLAN zone to provide added security. For example, there could be a firewall between portal application server 112 and EAI server 128. Also, although FIG. 4 illustrates separate elements (e.g., portal application server 112, EAI server 128, etc.) within the App VLAN security zone, this representation is merely a functional representation. As would be appreciated by a person having ordinary skill in the art in light of the disclosures herein, some or all of the elements shown may be combined in a single element (e.g., two or more of the illustrated elements could be performed by a single processor, a single server, etc.).

Although FIG. 4 illustrates credentialing application server 146 as not communicating with any of the other elements within the App VLAN security zone, in some embodiments it may be advantageous for credentialing application server 146 to communicate with other elements in the App VLAN security zone, such as, for example, EAI server 128 or portal application server 112, to assist in tasks such as, for example, preventing a particular end-user device or a particular subscriber from being allocated a credential or revoking the credential of a particular end-user device or a particular subscriber. As another example, in some embodiments, credentialing application server 146 communicates directly with fraud server 129 to flag fraudulent uses of credentials.

Although FIG. 4 illustrates firewalls as separate elements, each physical machine implementing one or more functions or elements shown in FIG. 4 could contain its own firewall. Furthermore, each logical element in each layer could be further firewalled beyond what is shown in FIG. 4. As an example, the logical elements that only communicate with message bus 130 could be individually firewalled so they are only allowed to send traffic to and receive traffic from message bus 130.

As illustrated in FIG. 4, in addition to communicating with portal application server 112 and message bus 130, EAI server 128 communicates with carrier IT/billing 139 through firewall 235. In this embodiment, EAI server 128 has an interface that allows it to communicate with carrier IT/billing 139. The information flowing to and from EAI server 128 over the various communication paths shown in FIG. 4 is described below in more detail using the example embodiment of FIG. 7.

Figure 5:
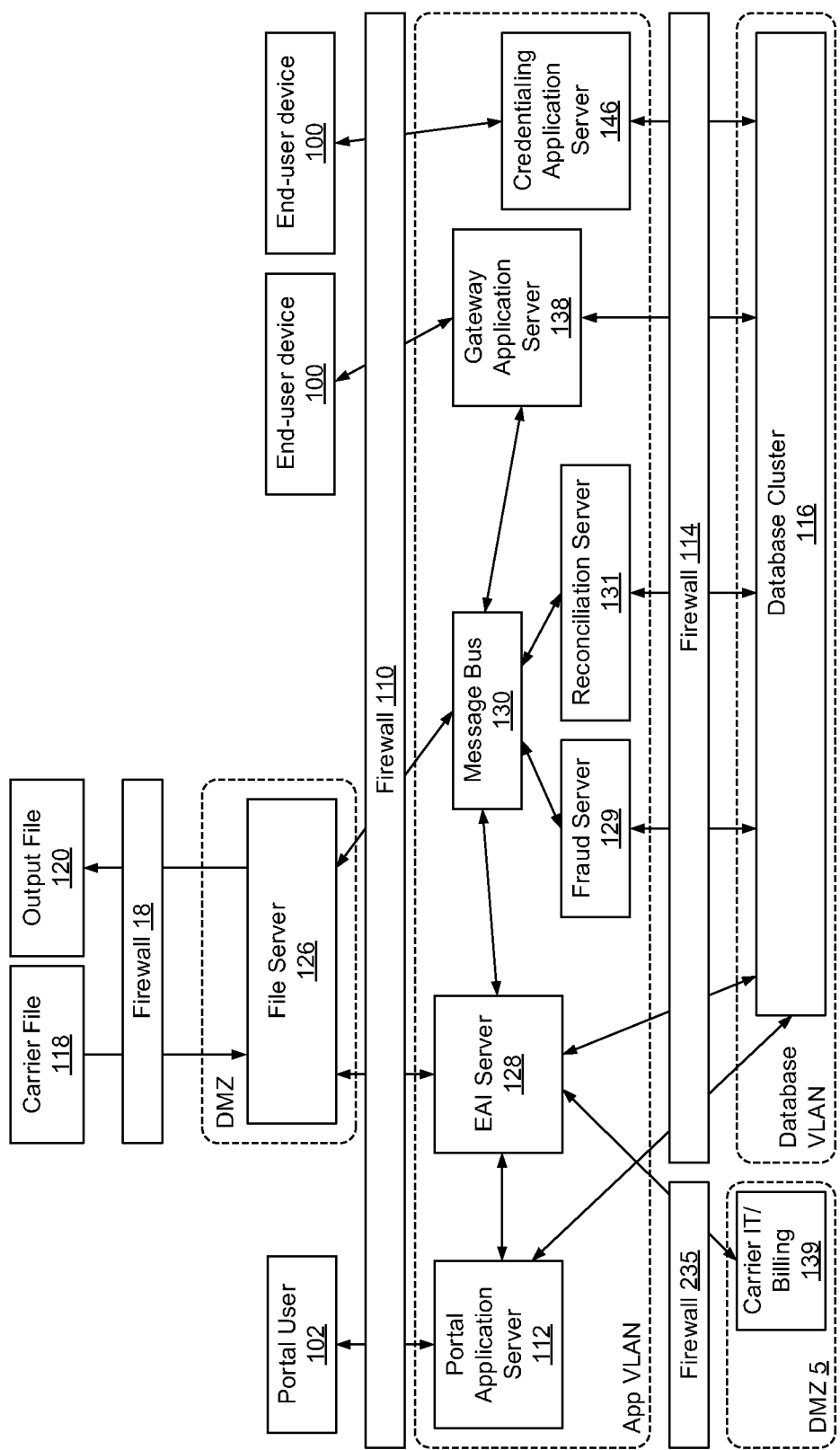
FIG. 5 illustrates an example embodiment of a secure service controller architecture for DAS systems.

FIG. 5 illustrates an example embodiment that is similar to the embodiment of FIG. 4, except without the optional load balancers and without the optional proxy servers. As shown in FIG. 5, communications from portal user 102 or from end-user device 100 must pass through two firewalls, firewall 110 and firewall 114, to reach database cluster 116. Three firewalls (122, 110, and 114) separate carrier file 118 and database cluster 116. Carrier IT/billing element 139 must pass through firewall 235, EAI server 128, and firewall 114 to reach database cluster 116.

Figure 6:
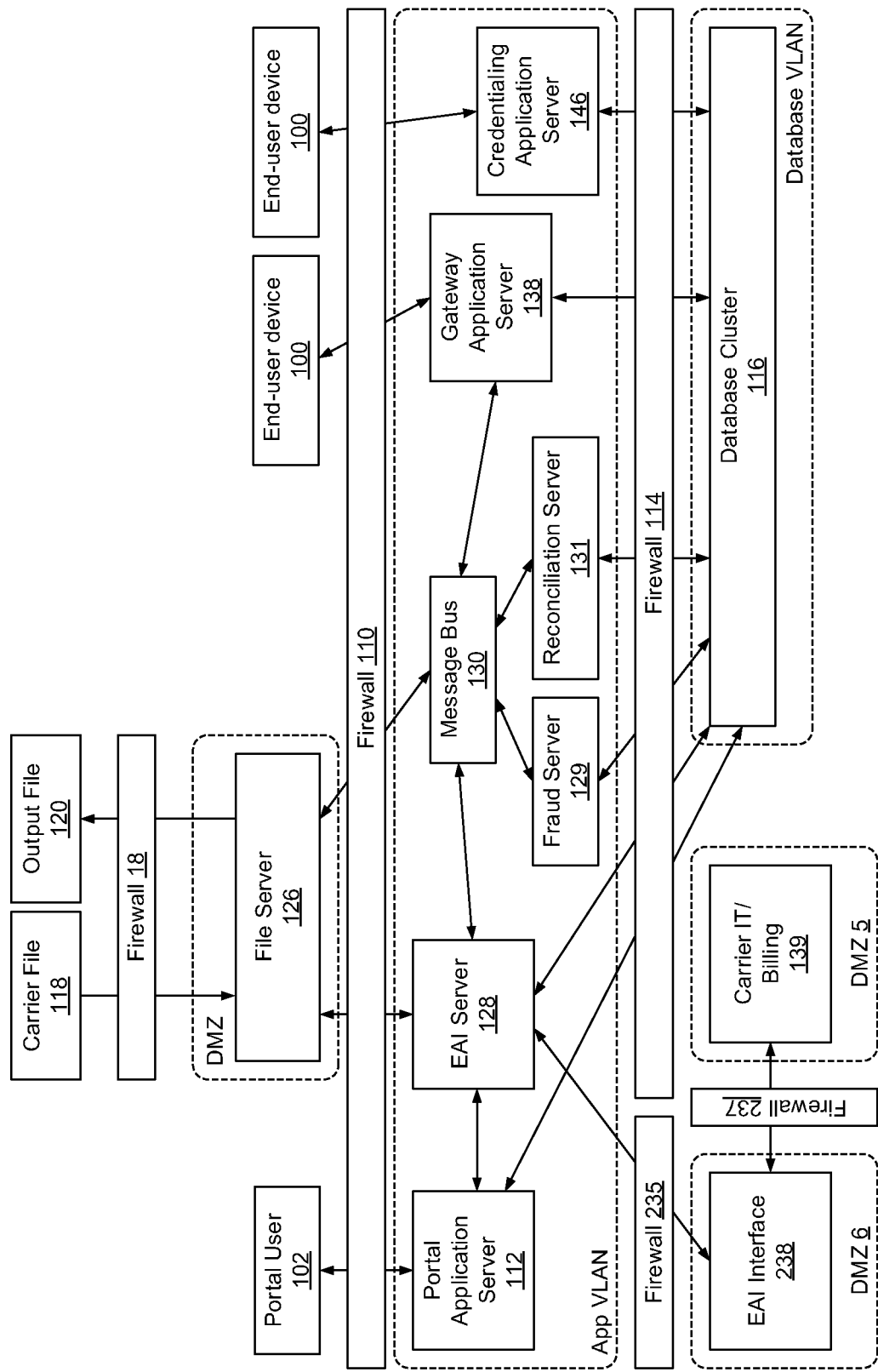
FIG. 6 illustrates an example embodiment of a secure service controller architecture for DAS systems.

FIG. 6 illustrates an example embodiment without the optional load balancers and without the optional proxy servers of FIG. 4, and with an external EAI interface between EAI server 128 and carrier IT/billing 139. As illustrated in FIG. 6, firewall 237 is interposed between EAI interface 238 and carrier IT/billing 139 to provide additional security, and EAI interface 238 resides in a security zone labeled "DMZ 6." In the embodiment of FIG. 6, communications from/to EAI server 128 to/from carrier IT/billing 139 must pass through two firewalls (235 and 237).

Figure 7:
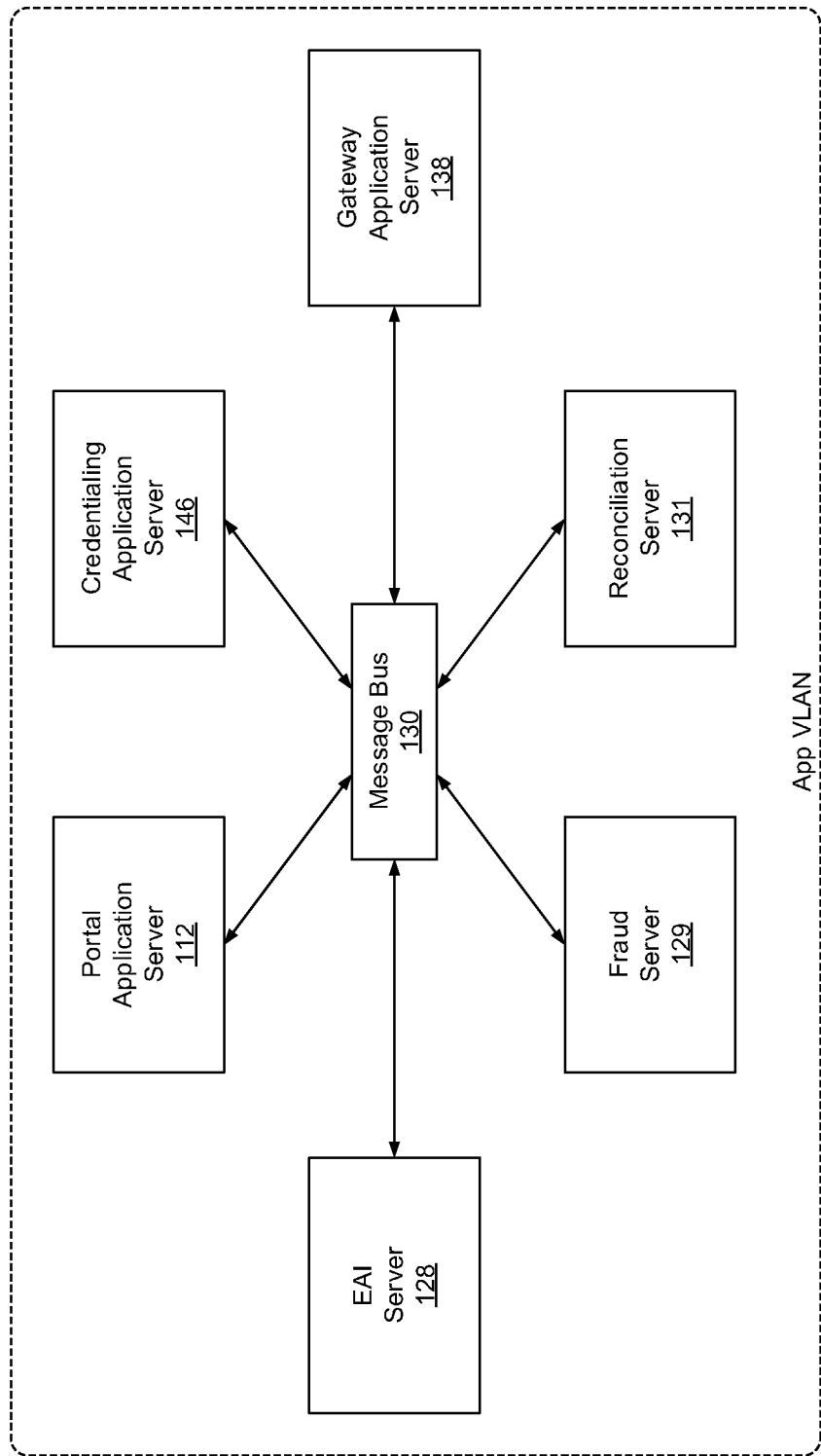
FIG. 7 illustrates communications within an applications security zone in accordance with some embodiments.

FIG. 7 illustrates a more general representation of the communications within the App VLAN security zone illustrated in FIGS. 1A through 1C. In FIG. 7, portal application server 112, credentialing application server 146, gateway application server 138, reconciliation server 131, fraud server 129, and EAI server 128 all communicate using message bus 130. Message bus 130 may be any kind of inter-process communication. Some examples of inter-process communication are: a named pipe, a shared memory, a message queue, a web service call, an IP socket, an remote procedure call (RPC), and a Java messaging services (JMS) queue. Message bus 130 may be multi-functional and simultaneously support multiple types of inter-process communication between the elements shown in FIG. 7. Specifically, message bus 130 may support one kind of inter-process communication between one pair of elements shown in FIG. 7 and a different kind of inter-process communication between a different pair of elements. For example, message bus 130 might support web service calls for communications between portal application server 112 and EAI server 128, and a message queue for communications between EAI server 128 and fraud server 129.

Figure 8:
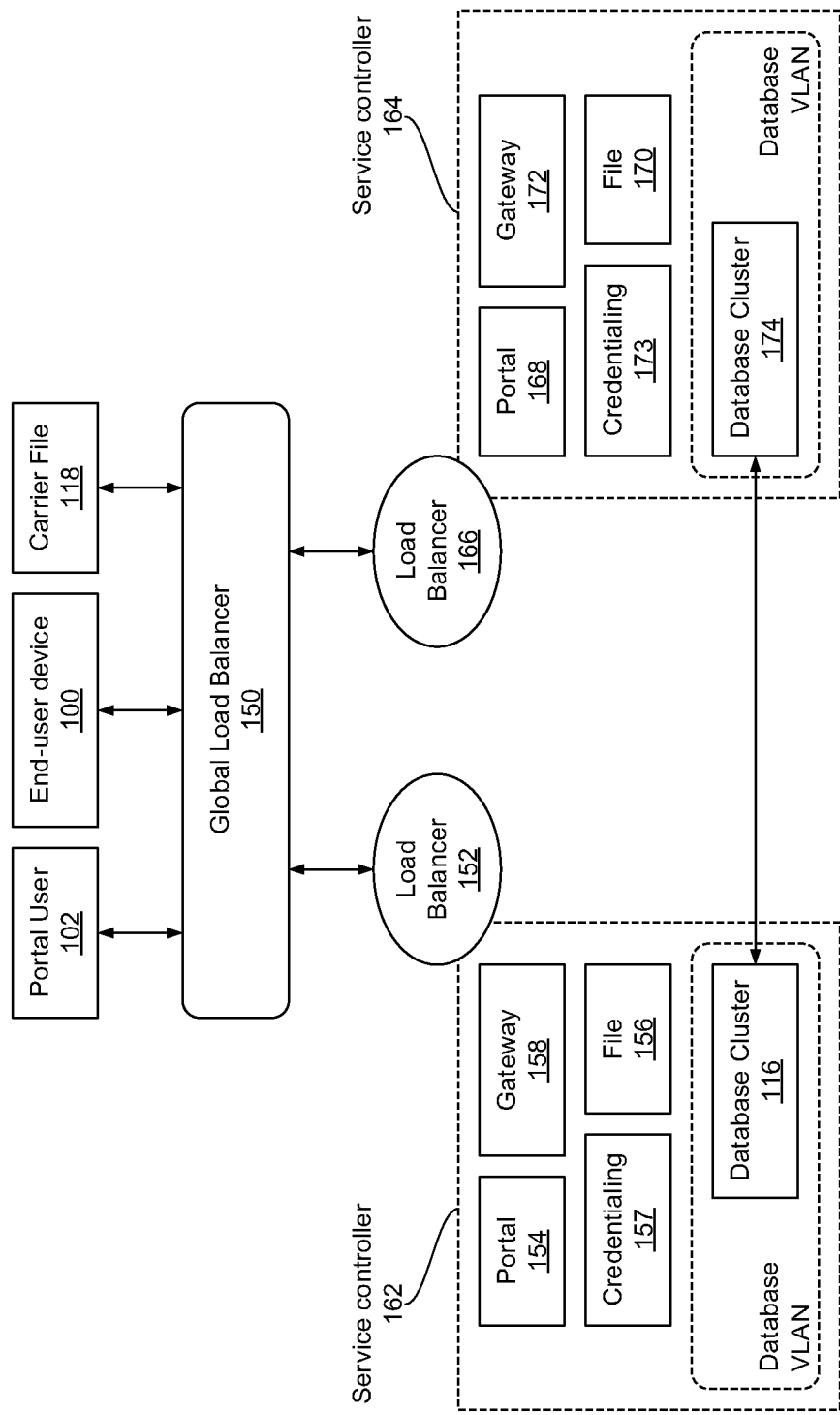
FIG. 8 illustrates an example embodiment that provides geo-redundancy.

FIG. 8 illustrates an example embodiment that provides geo-redundancy. For clarity, FIG. 8 omits several details present in FIGS. 1A through 1C, including firewalls. FIG. 8 shows service controller 162 and service controller 164. Service controller 162 includes portal function 154, gateway function 158, credentialing function 157, file server function 156, and database cluster 116. Service controller 164 has corresponding functions (portal 168, gateway 172, credentialing 173, and file 170) and database cluster 174. Service controller 162 and service controller 164 are functionally equivalent but physically distinct. In some embodiments, one of service controller 162 and service controller 164 is active (i.e., in use to service portal user 102 and end-user device 100, and able to process carrier file 118), and the other service controller is in a stand-by state (e.g., fully functional but not in active use). In some embodiments, both of service controller 162 and service controller 164 are active.

Portal user 102, end-user device 100, and carrier file 118 access one or both of service controllers 162 and 164 through global load balancer 150, which routes carrier file 118 and communications to and from portal user 102 and end-user device 100. In some embodiments in which both of service controller 162 and service controller 164 are active, global load balancer 150 determines (e.g., based on the level of busyness or outage state of elements within service controller 162 and service controller 164) whether to route a particular communication to service controller 162 (potentially through optional load balancer 152) or to service controller 164 (potentially through optional load balancer 166). In some embodiments in which one of service controller 162 and service controller 164 is active and the other is in a stand-by state, global load balancer 150 routes communications to and from the active service controller unless or until there is a need to use functions in the stand-by service controller (e.g., if one or more elements in the active service controller fail, if the active service controller's ability to service communications becomes compromised for some reason, etc.). The architecture shown in FIG. 8 provides reliability in that a failure within either service controller 162 or service controller 164 will not disable the network's ability to provide service controller services to portal user 102, end-user device 100, or carrier usage record 118. If, for example, one or more of the hardware elements responsible for credentialing function 157 in service controller 162 fails, global load balancer 150 can route credentialing requests from end-user device 100 to credentialing function 173 in service controller 164. As will now be understood by a person of ordinary skill in the art in light of this disclosure, additional service controllers may be deployed in a similar manner (e.g., connected to load balancer 150, load balancer 152, or load balancer 166) to provide redundancy and to help ensure service controller resources are available for DAS.

Figure 9:
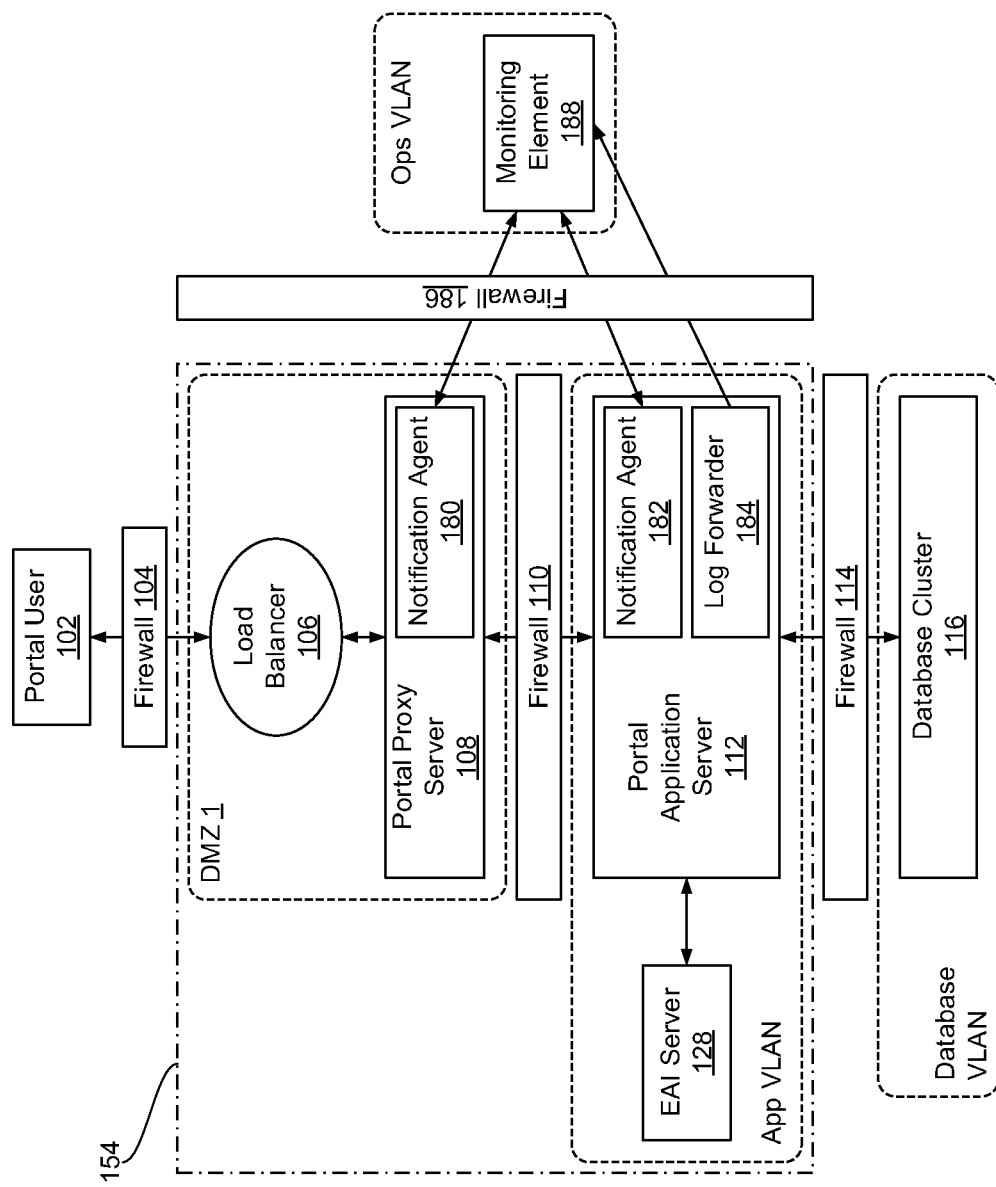
FIG. 9 illustrates an example embodiment of a service controller portal function.

FIG. 9 illustrates an example embodiment of the portal function, such as, for example, portal function 154 or portal function 168 illustrated in FIG. 8. FIG. 9 illustrates optional load balancer 106 and optional portal proxy server 108, but, as described previously, these elements and either firewall 104 or firewall 110 may be omitted. Co-pending U.S. patent application Ser. No. 13/248,025, which is entitled "Service Design Center for Device Assisted Services" and is incorporated herein by reference, describes some of the information that portal user 102 could configure for use by portal application server 112. In some embodiments, portal user 102 configures a list of available service plans. In some embodiments, portal user 102 configures the priorities of listed service plans, where the priorities identify the order in which the classification function on the end-user device should apply filters associated with the available, selected, or purchased service plans, e.g., to determine under which plan a particular service activity by an end-user device falls. In some embodiments, portal user 102 enters information pertaining to how available service plans will be displayed on an end-user device, such as end-user device 100. In some embodiments, portal user 102 enters information about a classification of service plans (e.g., whether a service plan is a temporary activation plan, a sponsored plan subsidized or paid for by an entity other than a user of the end-user device, a user-paid plan, etc.). In some embodiments, portal user 102 configures promotional messages to be displayed on one or more end-user devices, such as end-user device 100. In some embodiments, portal user 102 configures upsell offers (e.g., conditions that trigger the display of an upsell offer, information characterizing the upsell offer, etc.). In some embodiments, portal user 102 defines events that cause a "no capable plan" notification (e.g., a notification that is presented when a user of an end-user device that is not associated with or subscribed to a data plan attempts to access a data service, etc.) on the end-user device. In some embodiments, portal user 102 configures templates for notification messages (e.g., message foregrounds and backgrounds, colors, logos, etc.). In some embodiments, portal user 102 creates (e.g., imports a list, manually types individual subscriber identifiers, etc.) or manages (e.g., views, edits, etc.) subscriber groups. In some embodiments, portal user 102 requests reports containing information about a group of end-user devices or a group of subscribers. In some embodiments, portal user 102 is a subscriber (e.g., a person who uses the end-user device), and portal function 154 allows the subscriber to access information about an end-user device associated with the subscriber (e.g., data usage measures, service plan information, cost or account balance information, notification settings for the end-user device, etc.). In some embodiments, portal user 102 accesses optional portal proxy server 108 or portal application server 112 using a password. In some embodiments, the password is stored in local storage as a salted SHA-1 hash. In some embodiments, different portal users 102 are given different sets of privileges so that only authorized administrative users can view, enter, or modify particular information, such as, for example, subscriber lists, device lists, etc.

Portal user 102 accesses optional portal proxy server 108 (if present) through firewall 104 and (if present) optional load balancer 106. In some embodiments, portal user 102 establishes a virtual private network (VPN) connection over the Internet to communicate with optional portal proxy server 108. If present, optional portal proxy server 108 communicates with portal application server 112 through firewall 110.

As illustrated in FIG. 9, portal application server 112 also communicates with EAI server 128. In some embodiments, portal application server 112 sends instructions associated with the delivery of information to end-user device 100 to EAI server 128. In some embodiments, the instructions cause EAI server 128 to configure notification messages (e.g., promotional messages, offers, advertisements, etc.), which EAI server 128 then stores on database 116 for gateway application server 138 to retrieve and send to end-user device 100. In some embodiments, portal application server 112 sends instructions to reset a subscriber or an end-user device to EAI server 128. In some embodiments, portal application server 112 sends instructions to cancel an end-user device service plan to EAI server 128. In some embodiments, portal application server 112 receives messages from EAI server 128 that indicate EAI server 128 carried out a requested task or completed its portion of a requested task that requires action by another network element.

Portal application server 112 retrieves information from and stores information in database cluster 116 by establishing a connection through firewall 114. In some embodiments, portal application server 112 retrieves information requested by portal user 102 from database cluster 116. In some embodiments, portal application server 112 stores information entered by portal user 102 in database cluster 116.

FIG. 9 shows three agents that communicate with monitoring element 188. Monitoring element 188 is located in a security zone labeled "Ops VLAN," which is the operations security zone. In some embodiments, the Ops VLAN includes authentication, monitoring, and logging functions. In some embodiments, elements within the Ops VLAN have controlled connectivity to and from the servers shown in FIGS. 1A through 1C (e.g., portal application server 112, EAI server 128, fraud server 129, reconciliation server 131, gateway application server 138, credentialing application server 146) based on service controller application requirements. As illustrated in FIG. 9, portal proxy server 108 includes notification agent 180, which communicates through firewall 186 with monitoring element 188, and portal application server 112 includes notification agent 182 and log forwarder 184, both of which also communicate with monitoring element 188 through firewall 186.

Notification agent 180 and notification agent 182 provide information to monitoring element 188. In some embodiments, one or both of notification agents 180 and 182 are SNMP agents. In some embodiments, the information provided by one or both of notification agents 180 and 182 includes unsolicited notifications of events (e.g., disk full, memory error, SNMP traps, etc.). In some embodiments, information provided by one or both of notification agents 180 and 182 is in response to a request from monitoring element 188.

In some embodiments, monitoring element 188 responds to information sent by notification agent 180 or 182. For example, in some embodiments, monitoring element 188 sends notification agent 180 or 182 a message directing (respectively) portal proxy server 108 or portal application server 112 to perform an action (e.g., run a program, run a test query to validate that the system is functional, run a program to determine whether a connected system is functional, etc.). In some embodiments, monitoring element 188 directs portal proxy server to test the communication path to portal application server 112.

Log forwarder 184 also sends information to monitoring element 188. In some embodiments, log forwarder 184 sends logs of accesses by or activities of portal users, such as portal user 102, to monitoring element 188. In some embodiments, portal application server 112 tracks system level commands and login attempts. In some embodiments, log forwarder 184 sends information about system-level commands and login attempts to monitoring element 188. In some embodiments, log forwarder 184 sends information configured to assist in diagnosing problems with a system or service controller application. For example, in some embodiments, portal application server 112 generates log files, and log forwarder 184 sends the log files to monitoring element 188. In some embodiments, the log files are generated for individual service controller applications. In some embodiments, log forwarder 184 sends a system log, an information log, a debug log, an error log, information about a fatal event, etc. In some embodiments, monitoring element 188 includes a log file harvester. In some embodiments, portal application server 112 initiates the transfer of information from log forwarder 184 to monitoring element 188.

Figure 10:
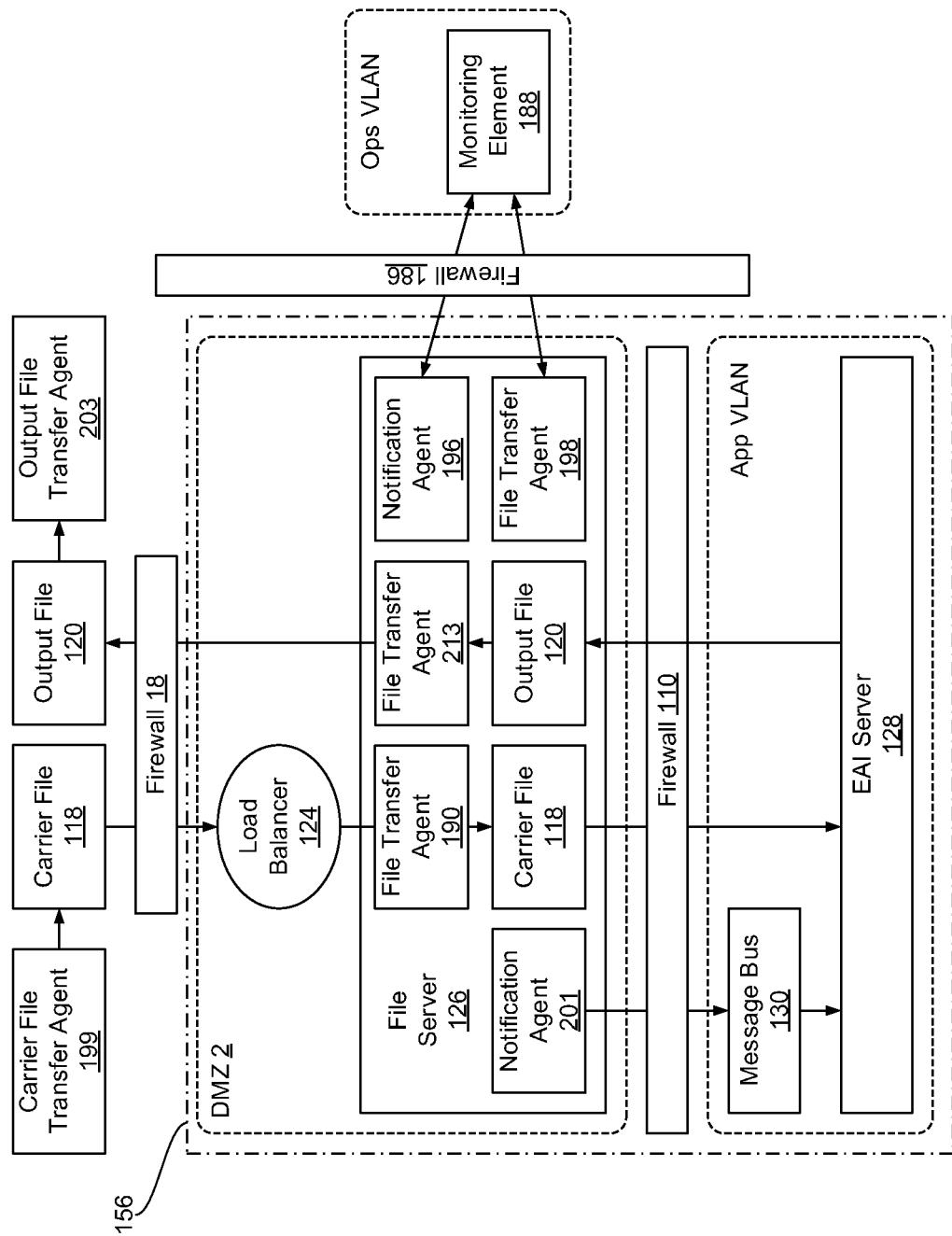
FIG. 10 illustrates an example embodiment of a service controller file transfer function.

FIG. 10 illustrates an example embodiment of file transfer function 156 (functionally equivalent to file transfer function 170 shown in FIG. 8). Carrier file transfer agent 199 establishes a connection with file transfer agent 190 on file server 126 through firewall 18 and optional load balancer 124. The connection enables the transfer of carrier file 118 to file server 126. In some embodiments, carrier file transfer agent 199 establishes a VPN connection over the Internet to communicate with transfer agent 190.

Carrier file 118 can contain various information, such as, for example: a measure of an access network usage by end-user device 100; information to provision an access network service for one or more end-user devices, such as end-user device 100; a list of end-user devices or subscribers authorized to use a particular service.

In some embodiments, carrier file 118 comprises a subscriber list. A subscriber list includes one or more subscriber identifiers, where a subscriber identifier is associated with a particular end user. As will be appreciated by a person having ordinary skill in the art, a subscriber identifier may also be associated with a particular end-user device or with a group of end-user devices, or the subscriber identifier may not be associated with any particular end-user device. Examples of subscriber identifiers are: an IMSI, an MSID, a MDN, an MSISDN, an MEID, an ESN, an IPv4/6 MAC or IP address, a key, a certificate, a globally unique identifier (GUID), a unique identifier (UID).

In some embodiments, carrier file 118 includes one or more flow data records (FDRs). A flow data record contains detailed information related to one or more network communications (e.g., source IP, source port, destination IP, destination port, bytes transmitted, bytes received, time flow started, time flow ended, traffic protocol (e.g., TCP/UDP), etc.).

In some embodiments, carrier file 118 includes a plan catalog that includes information about service plans for the access network that are available to one or more end-user devices. Examples of the information that may be included in a plan catalog are: a list of service plans and their characteristics (e.g., notification, charging, and control policies associated with each plan, access network activities qualifying for each plan, etc.); the priorities of the service plans, where the priorities identify the order in which the classification function on the end-user device should evaluate the filters associated with the available service plans; how the service plans are displayed on end-user devices (e.g., the order in which they are displayed, etc.); whether access network costs associated with a plan are paid by a sponsor entity or by a subscriber; whether a plan is an activation plan (e.g., a service plan that governs a device when a subscriber has not selected a plan); promotional messages; upsell offers; subscriber groups; notifications for which no service plan applies.

In some embodiments, carrier file 118 includes a list of end-user devices or subscribers authorized to use a particular service (e.g., a tethering service for sharing an access network connection with other devices through other input/output ports on the end-user device).

In some embodiments, carrier file 118 includes one or more classification rules. A classification rule is any rule that distinguishes between any characteristics of service plans, subscribers, end-user devices, network destinations, or network types. For example, a classification rule may distinguish between sponsor-paid and subscriber-paid service plans, between applications or groups of applications, between groups of subscribers, between end-user devices using valid profiles and those using fraudulent profiles, between authorized network destinations and unauthorized destinations, between network access types (e.g., home, roaming, 2G, 3G, WiFi, etc.), between time-of-day rules, etc.

In the embodiment shown in FIG. 10, after being transferred to file server 126, carrier file 118 is transferred to EAI server 128. In some embodiments, the transfer of carrier file 118 to EAI server 128 is initiated by EAI server 128. EAI server 128 processes carrier file 118 and generates output file 120. In some embodiments, EAI server 128 uses information from another source to generate output file 120. In some embodiments, EAI server 128 uses information from carrier file 118 and information from end-user device 100 (e.g., a data usage measure providing information about the end-user device's use of the access network or of a particular service, etc.) to generate output file 120. In some embodiments, EAI server 128 uses information stored in database 116 to generate output file 120. This information can include, for example, individualized or statistical information related to plan usage, popularity of plans, notification acknowledgements, time-of-day usage statistics, average use per plan, subscriber info, subscriber behavior, etc. In some embodiments, EAI server 128 uses information from fraud server 129 to generate output file 120. This information can include, for example, fraud alerts indicating that subscriber service plan usage activity has been detected as abnormal or fraudulent, as well as a confidence score (e.g., to indicate a level of confidence that the user is committing fraud); end-user device fraud events; authentication issues; etc. In some embodiments, EAI server 128 uses information from reconciliation server 131 to generate output file 120. This information can include, for example, detailed or high-level end-user device service usage records, including subscriber identifier, device identifier, service plan identifier, service plan usage (bytes), start time of report, end time of report, etc. In some embodiments, EAI server 128 uses information from gateway application server 138 to generate output file 120. This information can include, for example, information about users, roles, and permissions, or user directory synchronization. In some embodiments, EAI server 128 uses information from portal application server 112 to generate output file 120. This information can include, for example, usage reports requested by portal user 102, subscriber data (e.g., provisioning information) import requests from portal user 102, information about accesses by portal users, information about revoked portal user access, etc.

In some embodiments, output file 120 is a batch report. In some embodiments, output file 120 is a real-time report. In some embodiments, output file 120 includes a measure of an access network usage or cost by an end-user device, such as end-user device 100. In some embodiments, output file 120 is a charging data report (CDR). In some embodiments, output file 120 includes a promotional message or advertisement. In some embodiments, output file 120 includes a subscriber list or an end-user device list. In some embodiments, output file 120 includes information about a service plan purchase made by a user of an end-user device, such as end-user device 100. In some embodiments, output file 120 includes information profiling an end-user device's usage of the access network or of an access network service. In some embodiments, output file 120 includes a fraud alert. A fraud alert is any indication that the service controller or an end-user device has detected activity or an event that suggests that an end-user device may be being used in a manner that violates a policy (e.g., a notification, control, or charging policy) that should be in effect or that the end-user device or device client has been tampered with in a way that compromises the security of the end-user device or an element of the end-user device (e.g., a software application, an agent, an operating system, etc.). A fraud alert may be in any form, for example, a simple flag or a message containing detailed information about the activity or event that caused the fraud alert to issue. A fraud alert can also include information such as, for example, the time the event was detected, the associated subscriber identifier, device identifier, suggested remediation actions, an error code, a rule to be added in the network elements that perform policy charging and rules function (PCRF) or policy charging and enforcement function (PCEF) tasks or to the gateway GPRS support node (GGSN), or any other information that could be useful to understand or mitigate fraudulent activity.

In some embodiments, EAI server 128 initiates the transfer of output file 120 to file server 126. In some embodiments, the transfer of output file 120 to file server 126 is initiated by file server 126. In some embodiments, output file transfer agent 203 establishes a connection to file transfer agent 213 to retrieve output file 120. In some embodiments, output file transfer agent 203 establishes a secure connection over the Internet to communicate with file transfer agent 213 through firewall 18. In some embodiments, file server 126 pushes output file 120 to output file transfer agent 203.

As illustrated in FIG. 10, file server 126 also includes notification agent 201, notification agent 196, and file transfer agent 198. Notification agent 201 establishes a connection to message bus 130 through firewall 110. In some embodiments, notification agent 201 places a message for EAI server 128 on message bus 130 to inform EAI server 128 that carrier file 118 is available on file server 126. This notification may be advantageous to increase the speed at which EAI server 128 processes carrier file 118.

Notification agent 196 provides information to monitoring element 188, communicating through firewall 186. In some embodiments, notification agent 196 is an SNMP agent. In some embodiments, the information provided by notification agent 196 includes unsolicited notifications of events (e.g., disk full, memory error, SNMP traps, etc.). In some embodiments, information provided by notification agent 196 is in response to a request from monitoring element 188.

File transfer agent 198 provides information to monitoring element 188 through firewall 186. This information can include, for example, file transfer activity, CPU load, disk usage, successful transfers, failed transfers, failed logins, operating environment info (e.g., ambient temperature, humidity, nominal voltage, etc.), system errors, etc. In some embodiments, monitoring element 188 initiates the transfer of information from file transfer agent 198.

Figure 11:
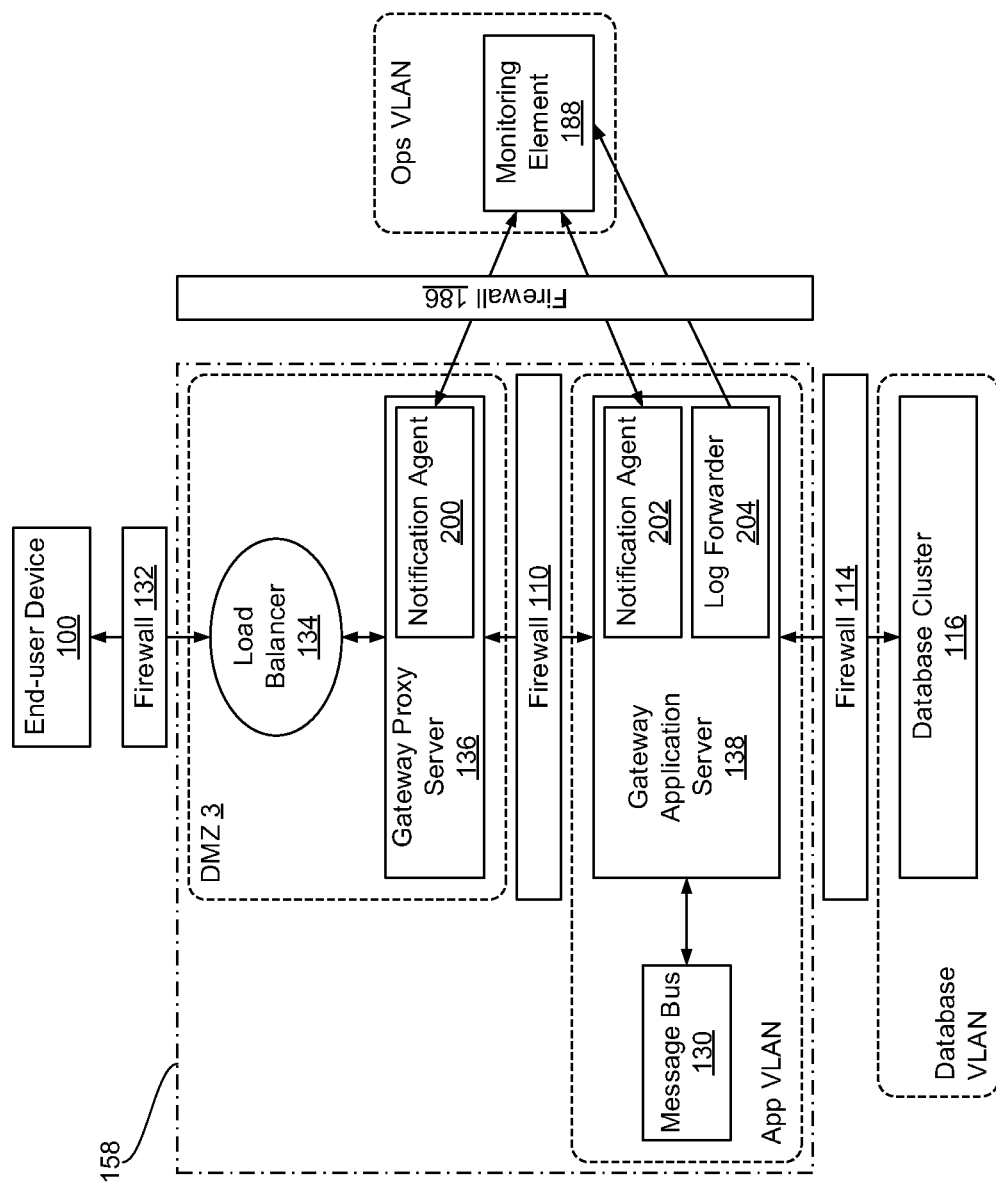
FIG. 11 illustrates an example embodiment of a service controller gateway function.

FIG. 11 illustrates an example embodiment of gateway function 158 (which is functionally equivalent to gateway function 172). End-user device 100 (e.g., using service processor 115) establishes a connection with optional gateway proxy server 136 through firewall 132 and optional load balancer 134. In some embodiments, optional gateway proxy server 136 includes an access control list used to allow access to one or more destination IP addresses only from IP addresses in the access control list (e.g., the list specifies IP addresses that may pass through), or to deny access from all IP addresses in the access control list and allow access from all other IP addresses (e.g., the list specifies IP addresses that will be blocked). Gateway proxy server 136 establishes a connection to gateway application server 138 through firewall 110.

In the embodiment shown in FIG. 11, end-user device 100 can receive a variety of information from gateway application server 138. For example, end-user device can receive information or instructions based on entries by portal user 102 (e.g., available service plans, how to present the available service plans on a user interface, service plan classifications (e.g., user-paid, sponsored, etc.), promotional messages, service offers, notification messages, etc.). As another example, end-user device 100 can receive information in response to a request from end-user device 100 (e.g., a request for an account balance, a request for a record of purchase history, etc.). As another example, end-user device 100 can receive administrative content, such as, for example, software updates.

In some embodiments, gateway application server 138 determines when to send information to end-user device 100. In some embodiments, gateway application server 138 sends information to end-user device 100 after completing an authentication protocol. In some embodiments, gateway application server 138 sends information to end-user device 100 in response to request or activity by another element or function in the service controller (e.g., EAI server 128, portal application server 112, fraud server 129, reconciliation server 131, or credentialing application server 146). In some embodiments, gateway application server 138 sends information to end-user device 100 in response to a communication from end-user device 100. In some embodiments, the communication from end-user device 100 is a message in an authentication protocol. In some embodiments, gateway application server 138 sends information to end-user device 100 over a secure communication link.

As illustrated in FIG. 11, end-user device 100 can also send information to gateway application server 138. For example, end-user device 100 may send reports containing measures of or costs associated with end-user device 100's access network usage, user acknowledgments or responses to notification messages, device-detected fraud events, authentication messages, heartbeats (e.g., communications sent at regular intervals to provide information about the status of end-user device 100, such as, for example, to indicate that end-user device 100 is functioning properly), or requests (e.g., to purchase a service plan, to retrieve a purchase history, to check an account balance, etc.). As will now be understood by a person having ordinary skill in the art in view of the disclosures herein, the communication link between end-user device 100 and gateway application server 138 can be used to support a wide variety of information exchanges between end-user device 100 and the service controller.

As illustrated in FIG. 11, gateway application server 138 is also capable of receiving information through message bus 130. In some embodiments, gateway application server 138 passes messages only within the same security zone. In some embodiments, gateway application server 138 receives information through message bus 130 from portal user 102 or from EAI server 128. As mentioned previously, message bus 130 may be any inter-process communication mechanism and may be different between different pairs of elements. In some embodiments, message bus 130 provides web services connectivity between EAI server 128 and gateway application server 138, and EAI server 128 uses web services to send information to gateway application server 138. In some embodiments, the web services calls occur only within the same security zone.

Gateway application server 138 retrieves information from and stores information in database cluster 116, communicating through firewall 114. In some embodiments, gateway application server 138 stores information from end-user device 100 in database cluster 116. In some embodiments, gateway application server 138 retrieves queued messages destined for end-user device 100 from database cluster 116. For example, gateway application server 138 may retrieve from database 116 and send to end-user device one or more of the following types of information: control, charging, or notification policies; promotional messages; service plan updates; end-user device configuration updates (e.g., related to the look and feel of a user interface on end-user device 100, etc.); a link to a software download.

In some embodiments, gateway application server 138 receives an authentication request from end-user device 100 and, based on the authentication request, retrieves a stored credential from database cluster 116 to assist in authenticating end-user device 100. In some embodiments, the authentication request from end-user device 100 comprises a credential associated with end-user device 100 or associated with a subscriber. In some embodiments, the credential is associated with a device identifier, or a subscriber identifier, or both a device identifier and a subscriber identifier. In some embodiments, the credential is one or more of a certificate, a key, a shared secret, a password, a hash, or a shared algorithm. In some embodiments, gateway application server 138 determines, based on the received credential and the stored credential, whether to proceed with communications with end-user device 100. In some embodiments, gateway application server 138 determines whether the credential sent by end-user device 100 is valid. In some embodiments, gateway application server 138 checks whether the credential sent by end-user device 100 has been revoked. In some embodiments, gateway application 138 determines whether the credential sent by end-user device 100 appears on a revocation list. In some embodiments, if the credential is a certificate, gateway application server 138 checks whether the certificate is on a certificate revocation list, where the certificate revocation list may be stored within or external to service controller 122 (e.g., in database cluster 116, in credentialing application server 146, in a separate certificate revocation list server, etc.).

In some embodiments, if the credential sent by end-user device 100 is valid, gateway application server 138 communicates with end-user device 100 using the credential for the purpose of exchanging service-related information or software. In some embodiments, the communication using the credential is over a secure communication link. In some embodiments, the secure communication link uses the SSL protocol. In some embodiments, the service-related information comprises a plan catalog. In some embodiments, the service-related information comprises a control, charging, or notification policy. In some embodiments, the service-related information comprises a promotional message or advertisement. In some embodiments, the service-related information comprises a usage measure or a cost measure. In some embodiments, the service-related information comprises an account balance. In some embodiments, the service-related information comprises a fraud alert. In some embodiments, the service-related information comprises a request from end-user device 100. In some embodiments, the service-related information comprises a response to a request from end-user device 100. In some embodiments, the service-related information comprises a request to end-user device 100. In some embodiments, the service-related information comprises a response to a request to end-user device 100. In some embodiments, the service-related information is configured to cause end-user device 100 to take a specific action. In some embodiments, the specific action is to be taken immediately. In other embodiments, the specific action is to be scheduled. In some embodiments, the specific action is to block, allow, rate-limit, or delay access to the access network by end-user device 100.

FIG. 11 shows three agents that communicate with monitoring element 188. As illustrated in FIG. 11, gateway proxy server 136 includes notification agent 200, which communicates through firewall 186 with monitoring element 188, and gateway application server 138 includes notification agent 202 and log forwarder 204, both of which also communicate with monitoring element 188 through firewall 186.

Notification agent 200 and notification agent 202 provide information to monitoring element 188. In some embodiments, one or both of notification agents 200 and 202 are SNMP agents. In some embodiments, the information provided by one or both of notification agents 200 and 202 includes unsolicited notifications of events (e.g., disk full, memory error, SNMP traps, etc.). In some embodiments, information provided by one or both of notification agents 200 and 202 is in response to a request from monitoring element 188.

In some embodiments, monitoring element 188 responds to information sent by notification agent 200 or 202. For example, in some embodiments, monitoring element 188 sends notification agent 200 or 202 a message directing (respectively) gateway proxy server 136 or gateway application server 138 to perform an action (e.g., run a program, run a test query to validate that the system is functional, run a program to determine whether a connected system is functional, etc.). In some embodiments, monitoring element 188 directs gateway proxy server 136 to test the communication path to gateway application server 138.

Log forwarder 204 also sends information to monitoring element 188. In some embodiments, log forwarder 204 sends information configured to assist in diagnosing problems with a system or service controller application. For example, in some embodiments, gateway application server 138 generates log files, and log forwarder 204 sends the log files to monitoring element 188. In some embodiments, the log files are generated for individual service controller applications. In some embodiments, log forwarder 204 sends a system log, an information log, a debug log, an error log, information about a fatal event, etc. In some embodiments, gateway application server 138 initiates the transfer of information from log forwarder 204 to monitoring element 188.

Figure 12:
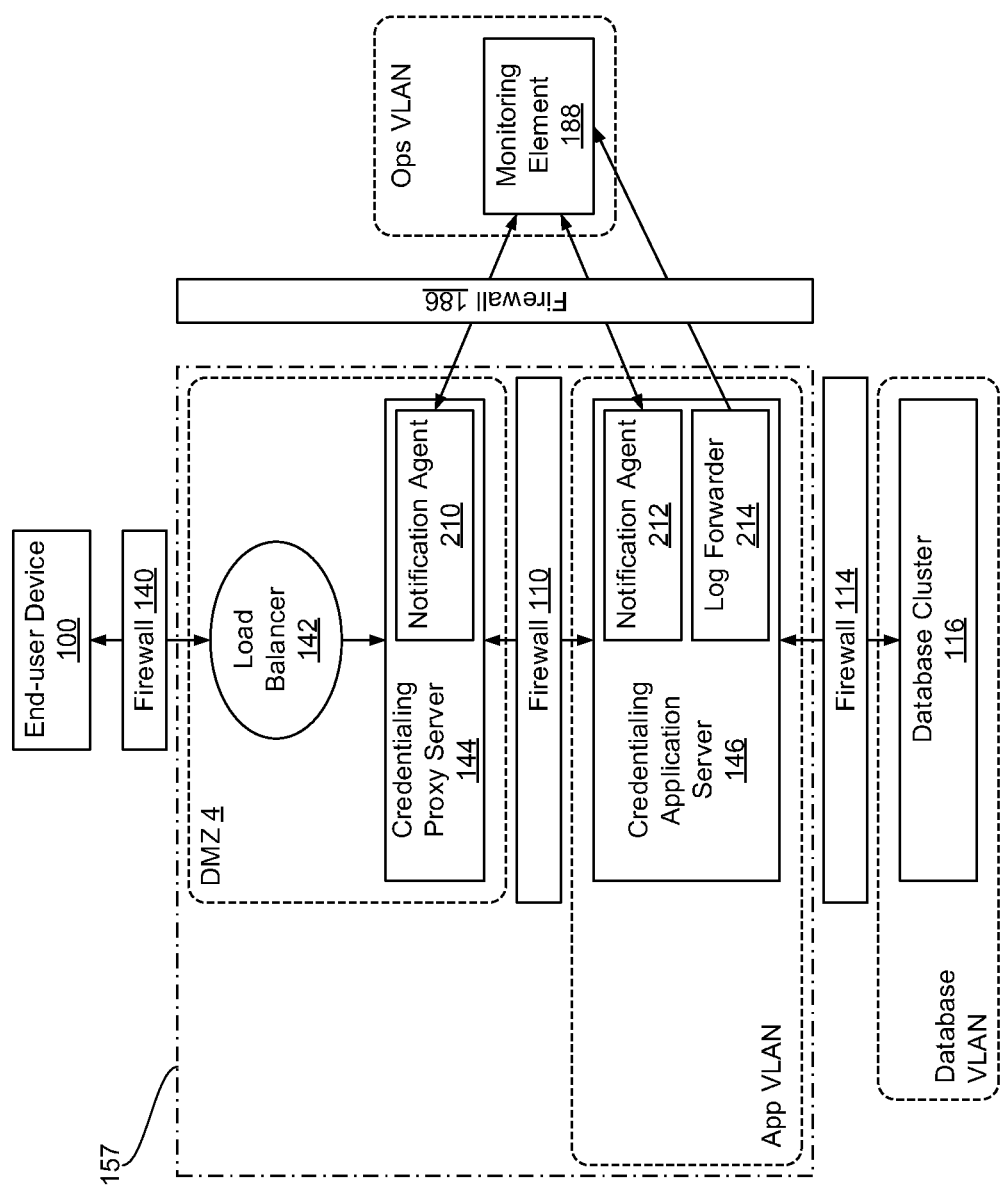
FIG. 12 illustrates an example embodiment of a service controller credentialing function.

FIG. 12 illustrates an example embodiment of credentialing function 157 (which is functionally equivalent to credentialing function 173 shown in FIG. 8). End-user device 100 communicates with optional credentialing proxy server 144 through firewall 140 and optional load balancer 142. In some embodiments, end-user device 100 establishes a secure connection over the Internet to communicate with credentialing proxy server 144. Credentialing proxy server 144 communicates through firewall 110 with credentialing application server 146. Credentialing application server 146 retrieves information from and stores information in database cluster 116, communicating through firewall 114.

As described herein, the credentialing function enhances the security of DAS systems. In some embodiments, credentialing application server 146 receives a request from end-user device 100 (e.g., using service processor 115) for a credential. In some embodiments, the credential request from end-user device 100 to credentialing application server 146 includes a device identifier (e.g., any identifier associated with the end-user device) and a subscriber identifier (e.g., any identifier associated with the subscriber who uses or authorizes the use of the end-user device). In some embodiments, the credential request comprises a hash of a device identifier and a subscriber identifier. In some embodiments, the hash is salted. In some embodiments, credentialing application server 146 generates a credential based on the credential request from end-user device 100, stores the credential in database cluster 116, and sends the credential to end-user device 100. In some embodiments, credentialing application server 146 stores the device identifier and the new credential separately in database cluster 116. In some embodiments, credentialing application server 146 stores the device identifier and new credential as a single entry comprising their combination (e.g., a hash). In some embodiments, end-user device 100 stores the credential in local memory and thereafter uses the credential for secure communications with the service controller (e.g., with gateway application server 138).

FIG. 12 shows three agents that communicate with monitoring element 188. As illustrated in FIG. 12, credentialing proxy server 144 includes notification agent 210, which communicates through firewall 186 with monitoring element 188, and credentialing application server 146 includes notification agent 212 and log forwarder 214, both of which also communicate with monitoring element 188 through firewall 186.

Notification agent 210 and notification agent 212 provide information to monitoring element 188. In some embodiments, one or both of notification agents 210 and 212 are SNMP agents. In some embodiments, the information provided by one or both of notification agents 210 and 212 includes unsolicited notifications of events (e.g., disk full, memory error, SNMP traps, etc.). In some embodiments, information provided by one or both of notification agents 210 and 212 is in response to a request from monitoring element 188.

In some embodiments, monitoring element 188 responds to information sent by notification agent 210 and 212. For example, in some embodiments, monitoring element 188 sends notification agent 210 and 212 a message directing (respectively) credentialing proxy server 144 or credentialing application server 146 to perform an action (e.g., run a program, run a test query to validate that the system is functional, run a program to determine whether a connected system is functional, etc.). In some embodiments, monitoring element 188 directs credentialing proxy server 144 to test the communication path to credentialing application server 146.

Log forwarder 214 also sends information to monitoring element 188. In some embodiments, log forwarder 214 sends information configured to assist in diagnosing problems with a system or service controller application. For example, in some embodiments, credentialing application server 146 generates log files, and log forwarder 214 sends the log files to monitoring element 188. In some embodiments, the log files are generated for individual service controller applications. In some embodiments, log forwarder 214 sends a system log, an information log, a debug log, an error log, information about a fatal event, etc. In some embodiments, credentialing application server 146 initiates the transfer of information from log forwarder 214 to monitoring element 188.

Figure 13:
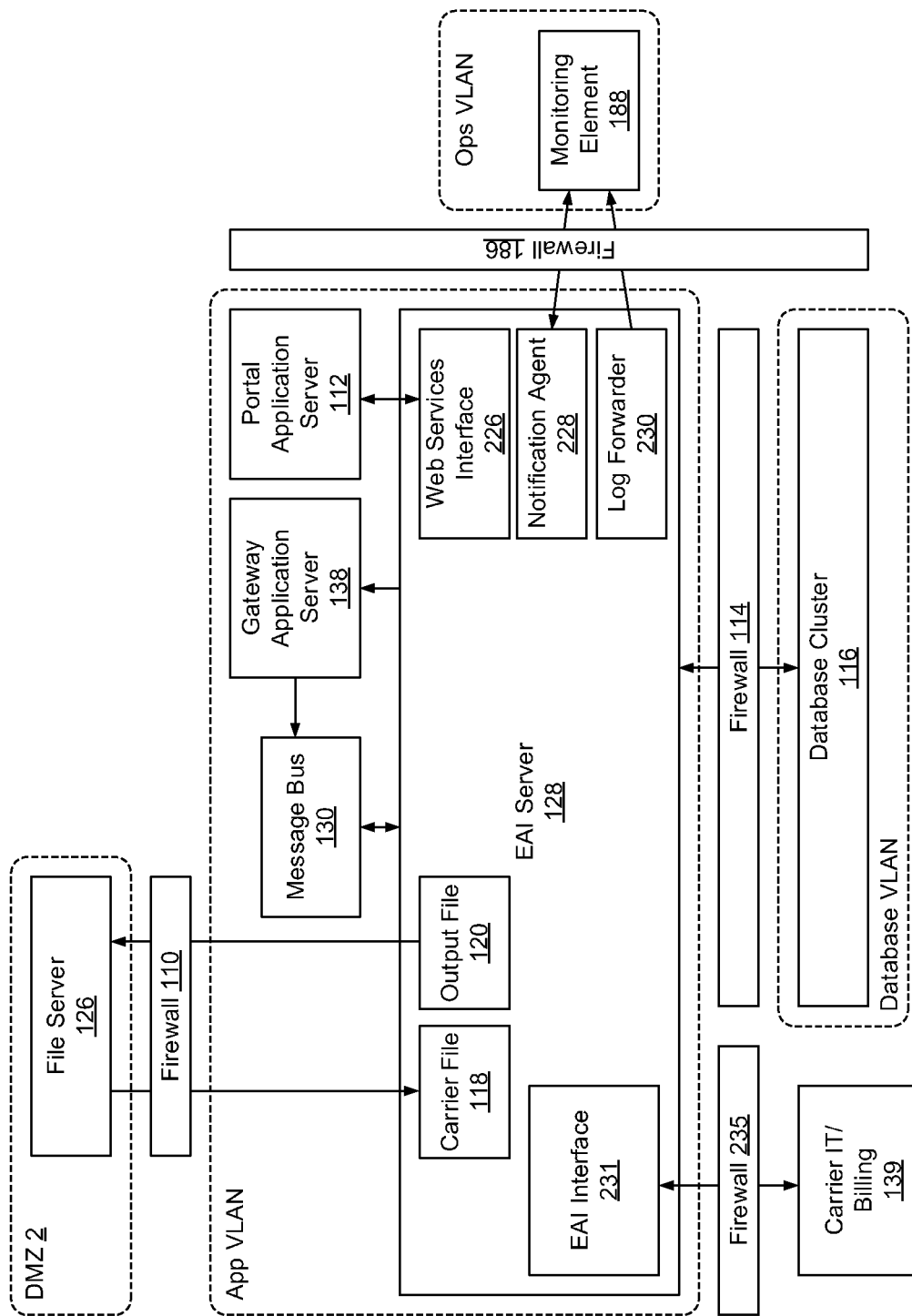
FIG. 13 illustrates an example embodiment of a service controller EAI server that supports various communication paths.

FIG. 13 illustrates an example embodiment of EAI server 128 when it supports the communication paths shown in FIGS. 1A, 1B, and 1C. As illustrated in FIG. 13, EAI server 128 retrieves carrier file 118 from file server 126 and places output file 120 on file server 126. In some embodiments, EAI server 128 initiates the transfer of carrier file 118 from file server 126 and the transfer of output file 120 to file server 126. As shown in FIG. 13, transfers of information between EAI server 128 and file server 126 are through firewall 110. As shown in FIG. 13, there is no message queue to allow file server 126 to inform EAI server 128 that there is a file available for EAI server 128.

FIG. 13 also illustrates one embodiment of a communication path between EAI server 128 and gateway application server 138. Information flows directly from EAI server 128 to gateway application server 138. Information from gateway application server 138 to EAI server 128 flows through message bus 130.

EAI server 128 also communicates directly with portal application server 122 through web services interface 226. EAI server 128 communicates with carrier IT/billing 139 using EAI interface 231, with information passing through firewall 235.

EAI server 128 communicates through firewall 114 with database cluster 116. In some embodiments, EAI server 128 retrieves service-related information from database cluster 116 (e.g., information entered by or derived from information entered by portal user 102) and provides the information to gateway application server 138 for sending to end-user device 100.

FIG. 13 shows that EAI server 128 includes two agents that communicate with monitoring element 188 through firewall 186. Notification agent 228 provides information to monitoring element 188. In some embodiments, notification agent 228 is an SNMP agent. In some embodiments, the information provided by notification agent 228 includes unsolicited notifications of events (e.g., disk full, memory error, SNMP traps, etc.). In some embodiments, information provided by notification agent 228 is in response to a request from monitoring element 188.

In some embodiments, monitoring element 188 responds to information sent by notification agent 228. For example, in some embodiments, monitoring element 188 sends notification agent 228 a message directing EAI server 128 to perform an action (e.g., run a program, run a test query to validate that the system is functional, run a program to determine whether a connected system is functional, etc.).

Log forwarder 230 also sends information to monitoring element 188. In some embodiments, log forwarder 230 sends information configured to assist in diagnosing problems with a system or service controller application. For example, in some embodiments, EAI server 128 generates log files, and log forwarder 230 sends the log files to monitoring element 188. In some embodiments, the log files are generated for individual service controller applications. In some embodiments, log forwarder 230 sends a system log, an information log, a debug log, an error log, information about a fatal event, etc. In some embodiments, EAI server 128 initiates the transfer of information from log forwarder 230 to monitoring element 188.

Figure 14:
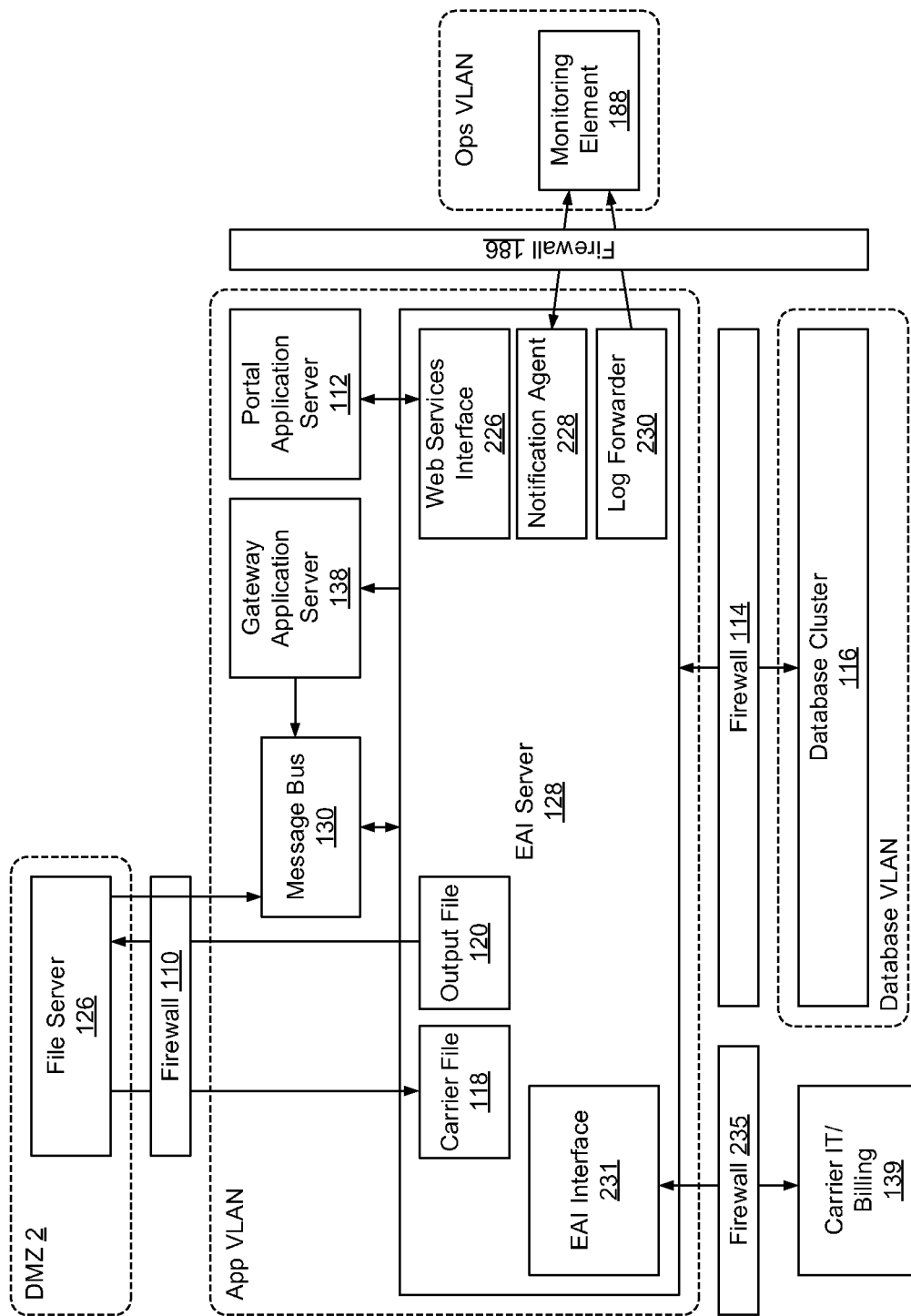
FIG. 14 illustrates an example embodiment of a service controller EAI server that supports various communication paths.

FIG. 14 illustrates an example embodiment that is similar to the embodiment shown in FIG. 13. In FIG. 14, file server 126 accesses message bus 130 through firewall 110. In some embodiments, file server 126 places information for EAI server 128 on message bus 130. The embodiment of FIG. 14 allows file server 126 to notify EAI server 128 that there is a file available on file server 126, thus potentially reducing the time before EAI server 128 retrieves the file.

Figure 15:
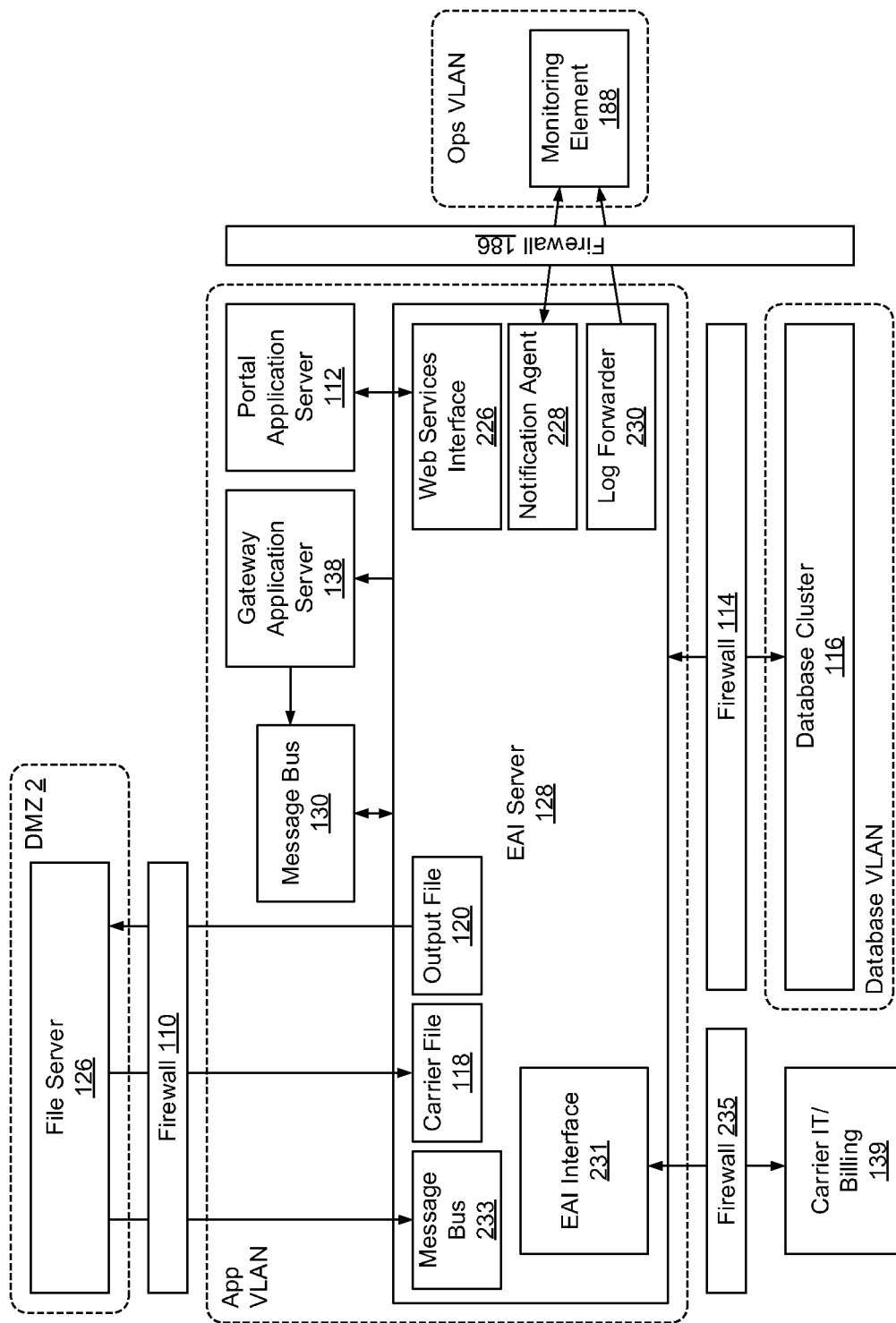
FIG. 15 illustrates an example embodiment of a service controller EAI server that supports various communication paths.

FIG. 15 illustrates an example embodiment with an alternate mechanism to allow file server 126 to notify EAI server that there is a file available on file server 126. In the embodiment of FIG. 15, EAI server 128 includes dedicated message bus 233, and file server 126 places information on message bus 233, communicating through firewall 110. EAI server 128 consumes message bus 233 and then initiates a procedure to retrieve the file from file server 126.

Figure 16:
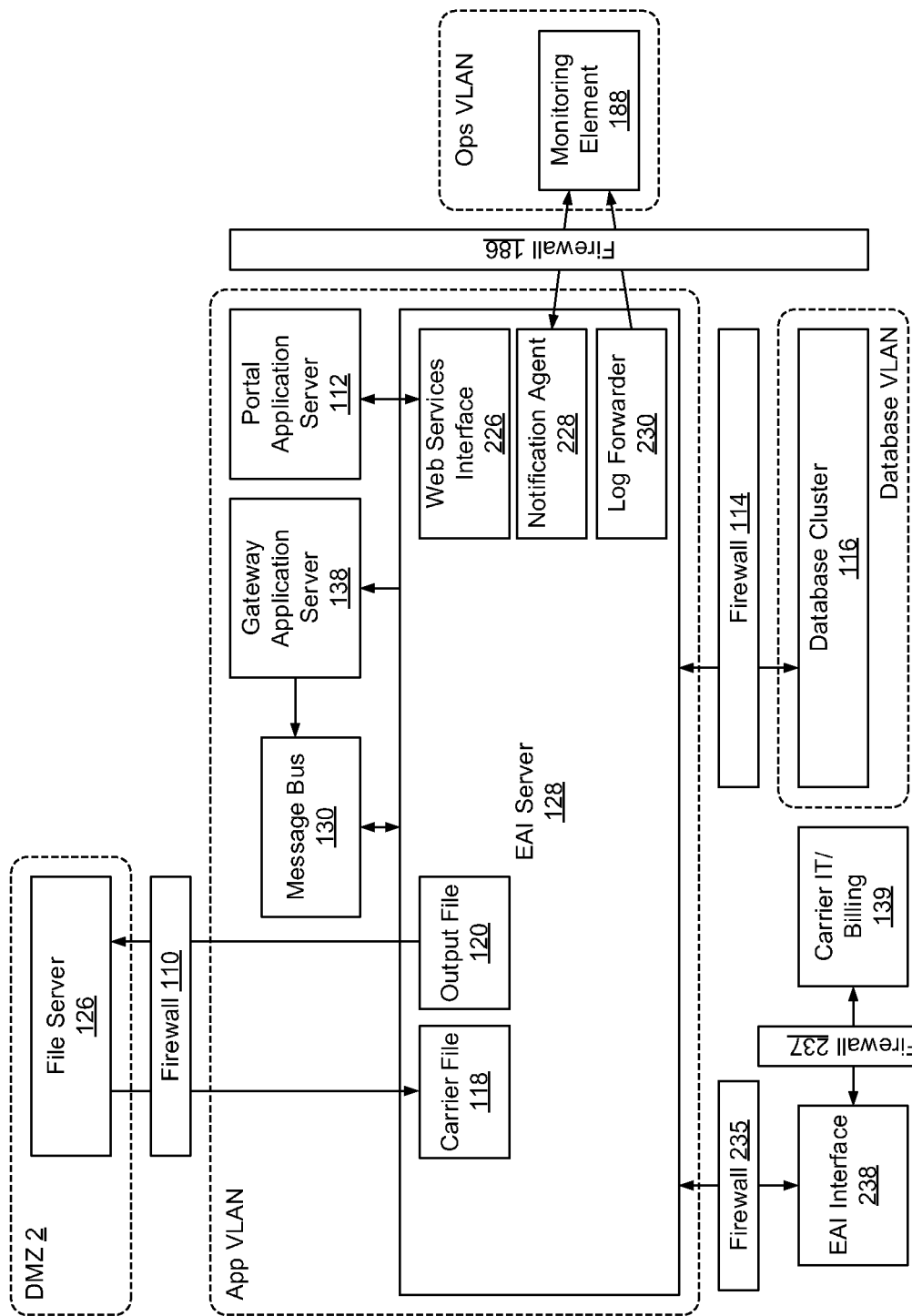
FIG. 16 illustrates an example embodiment of a service controller EAI server that supports various communication paths.

FIG. 16 illustrates an example embodiment that is similar to the embodiment of FIG. 13, except that EAI server 128 communicates with carrier IT/billing element 139 through external EAI interface 238, which it reaches through firewall 235. As would be understood by a person of ordinary skill in the art in view of the disclosures herein, external EAI interface 238 may be used in the embodiments of FIGS. 7A, 7B, and 7C, as well.

Figure 17:
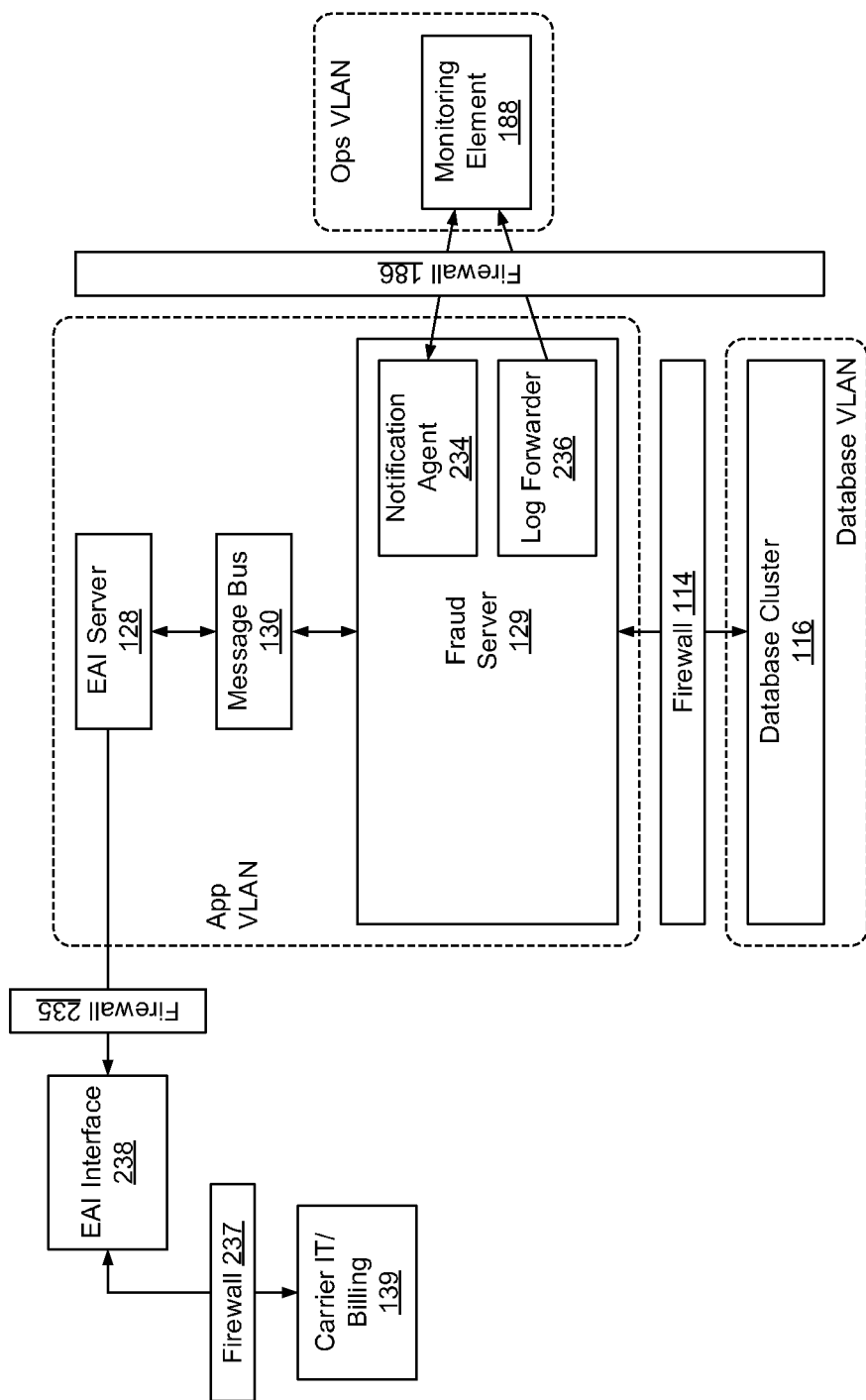
FIG. 17 illustrates an example embodiment of a service controller fraud server.

FIG. 17 illustrates an example embodiment of fraud server 129. As illustrated in FIG. 17, fraud server 129 communicates with EAI server 128 through message bus 130. EAI server 128 communicates with carrier IT/billing element 139 through firewall 235, external EAI interface 238, and firewall 237. Although EAI interface 238 is illustrated as external to EAI server 128, one of ordinary skill in the art will understand in light of the disclosures herein that the EAI interface may be part of EAI server 128, and, in such a case, either firewall 235 or firewall 237 may be eliminated. Fraud server 129 retrieves information from and stores information on database cluster 116 through firewall 114. In some embodiments, fraud server 129 stores fraud events on database cluster 116. In some embodiments, fraud server 129 retrieves information to meet a request from EAI server 128 or gateway application server 138 (e.g., carrier data usage records, device-assisted usage records, etc.). In some embodiments, fraud server 129 places a message on message bus 130 to tell EAI server 128 that fraud server 129 has completed a task.

As illustrated in FIG. 17, fraud server 129 includes notification agent 234 and log forwarder 236. Notification agent 234 provides information to monitoring element 188.

In some embodiments, notification agent 234 is an SNMP agent. In some embodiments, the information provided by notification agent 234 includes unsolicited notifications of events (e.g., disk full, memory error, SNMP traps, etc.). In some embodiments, information provided by notification agent 234 is in response to a request from monitoring element 188.

In some embodiments, monitoring element 188 responds to information sent by notification agent 234. For example, in some embodiments, monitoring element 188 sends notification agent 234 a message directing fraud server 129 to perform an action (e.g., run a program, run a test query to validate that the system is functional, run a program to determine whether a connected system is functional, etc.).

Log forwarder 236 also sends information to monitoring element 188. In some embodiments, log forwarder 236 sends information configured to assist in diagnosing problems with a system or service controller application. For example, in some embodiments, fraud server 129 generates log files, and log forwarder 236 sends the log files to monitoring element 188. In some embodiments, the log files are generated for individual service controller applications. In some embodiments, log forwarder 236 sends a system log, an information log, a debug log, an error log, information about a fatal event, etc. In some embodiments, fraud server 129 initiates the transfer of information from log forwarder 236 to monitoring element 188.

Figure 18:
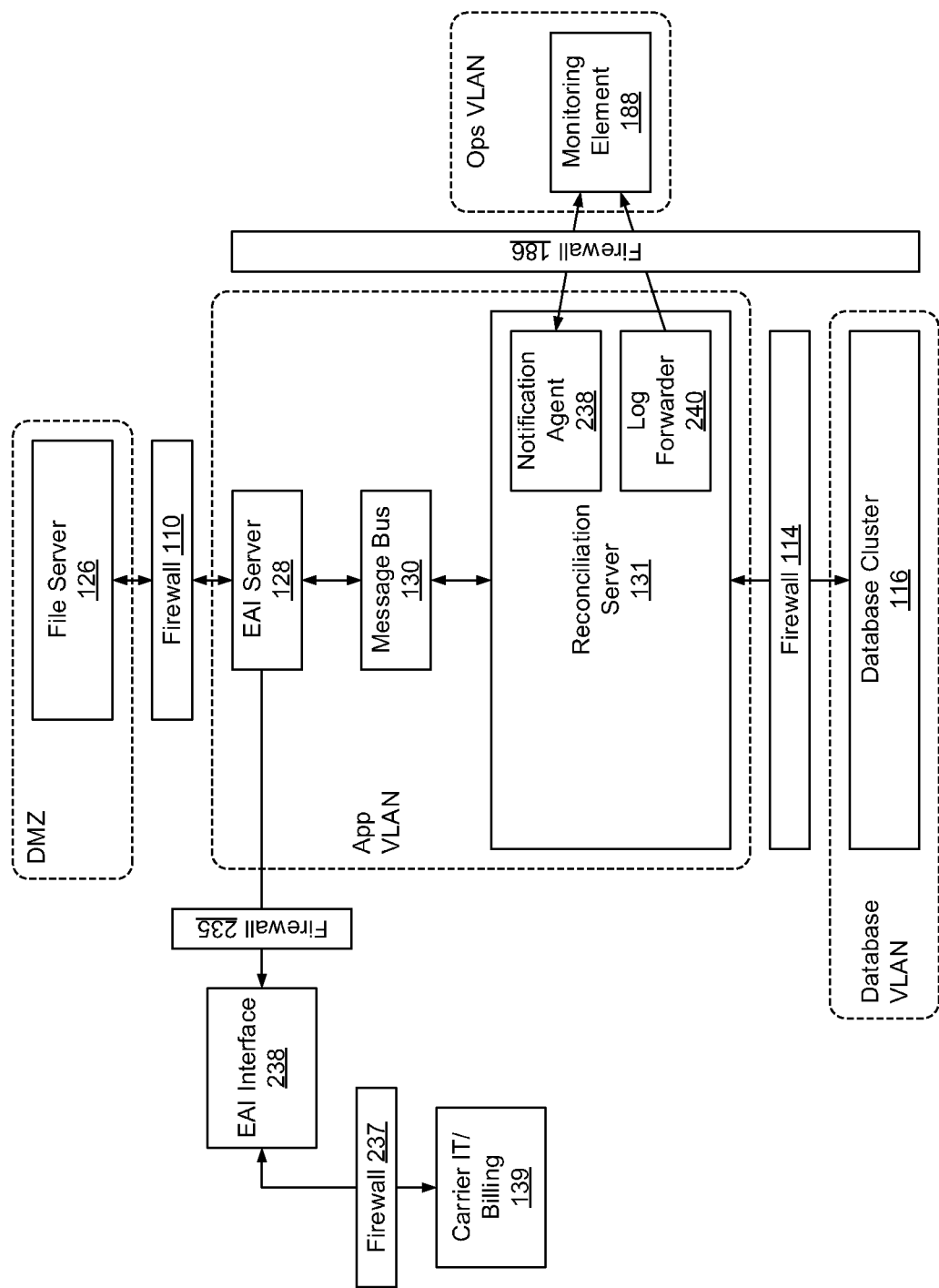
FIG. 18 illustrates an example embodiment of a service controller reconciliation server.

FIG. 18 illustrates an example embodiment of reconciliation server 131. As illustrated in FIG. 18, reconciliation server 131 communicates with EAI server 128 through message bus 130. EAI server 128 communicates with carrier IT/billing element 139 through firewall 235, external EAI interface 238, and firewall 237. Although EAI interface 238 is illustrated as external to EAI server 128, one of ordinary skill in the art will understand in light of the disclosures herein that the EAI interface may be part of EAI server 128, and, in such a case, either firewall 235 or firewall 237 may be eliminated. EAI server 128 also communicates with file server 126 through firewall 110, as described in the context of FIGS. 7A through 7D. Reconciliation server 131 retrieves information from and stores information on database cluster 116 through firewall 114. In some embodiments, reconciliation server 131 stores outbound usage records to be sent to the carrier on database cluster 116. In some embodiments, the outbound usage records comprise device-assisted measures of access network usage by an end-user device, such as end-user device 100. In some embodiments, reconciliation server 131 places a message on message bus 130 to tell EAI server 128 or file server 126 that reconciliation server 131 has completed a task. In some embodiments, reconciliation server 131 retrieves information from database cluster 116 to meet a request from EAI server 128 or gateway application server 138 (e.g., carrier data usage records, device-assisted usage records, etc.).

As illustrated in FIG. 18, reconciliation server 131 includes notification agent 238 and log forwarder 240. Notification agent 238 provides information to monitoring element 188. In some embodiments, notification agent 238 is an SNMP agent. In some embodiments, the information provided by notification agent 238 includes unsolicited notifications of events (e.g., disk full, memory error, SNMP traps, etc.). In some embodiments, information provided by notification agent 238 is in response to a request from monitoring element 188.

In some embodiments, monitoring element 188 responds to information sent by notification agent 238. For example, in some embodiments, monitoring element 188 sends notification agent 238 a message directing reconciliation server 131 to perform an action (e.g., run a program, run a test query to validate that the system is functional, run a program to determine whether a connected system is functional, etc.).

Log forwarder 240 also sends information to monitoring element 188. In some embodiments, log forwarder 240 sends information configured to assist in diagnosing problems with a system or service controller application. For example, in some embodiments, reconciliation server 131 generates log files, and log forwarder 240 sends the log files to monitoring element 188. In some embodiments, the log files are generated for individual service controller applications. In some embodiments, log forwarder 240 sends a system log, an information log, a debug log, an error log, information about a fatal event, etc. In some embodiments, reconciliation server 131 initiates the transfer of information from log forwarder 240 to monitoring element 188.

Figure 19:
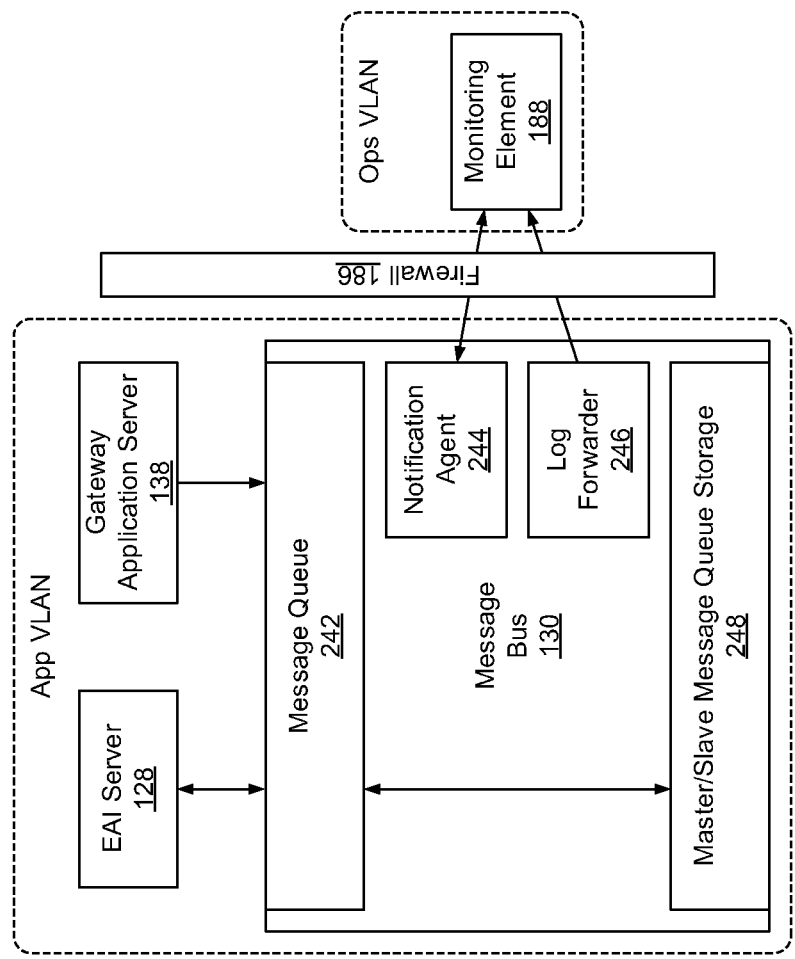
FIG. 19 illustrates an example embodiment of a service controller message bus.

FIG. 19 illustrates an example embodiment of message bus 130 as depicted in FIGS. 1A through 1C. EAI server 128 both places information on and retrieves information from message bus 130 through message queue 242. Gateway application server 138 places information on message bus through message queue 242. As needed to manage the message bus, message queue 242 moves entries in message queue 242 to or from master/slave message queue storage 248.

As illustrated in FIG. 19, message bus 130 includes notification agent 244 and log forwarder 246. Notification agent 244 provides information to monitoring element 188. In some embodiments, notification agent 244 is an SNMP agent. In some embodiments, the information provided by notification agent 244 includes unsolicited notifications of events (e.g., disk full, memory error, SNMP traps, etc.). In some embodiments, information provided by notification agent 244 is in response to a request from monitoring element 188.

In some embodiments, monitoring element 188 responds to information sent by notification agent 244. For example, in some embodiments, monitoring element 188 sends notification agent 244 a message directing message bus 130 to perform an action (e.g., run a program, run a test query to validate that the system is functional, run a program to determine whether a connected system is functional, etc.).

Figure 20:
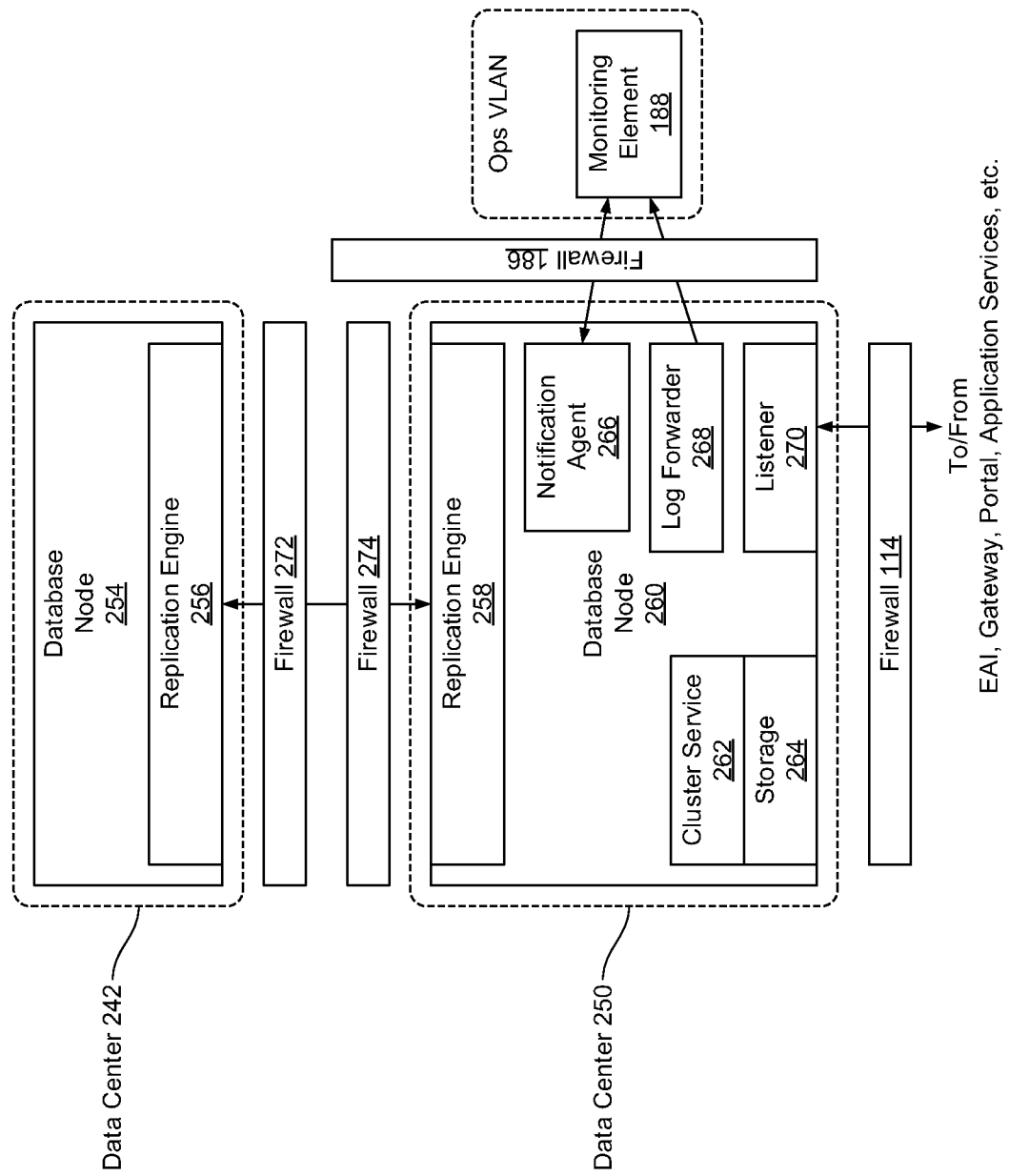
FIG. 20 illustrates an example embodiment that includes two data centers.

Log forwarder 246 also sends information to monitoring element 188. In some embodiments, log forwarder 246 sends information configured to assist in diagnosing problems with a system or service controller application. For example, in some embodiments, message bus 130 generates log files, and log forwarder 246 sends the log files to monitoring element 188. In some embodiments, the log files are generated for individual service controller applications. In some embodiments, log forwarder 246 sends a system log, an information log, a debug log, an error log, information about a fatal event, etc. In some embodiments, message bus 130 initiates the transfer of information from log forwarder 246 to monitoring element 188. FIG. 20 illustrates an example embodiment incorporating two data centers, data center 242 and data center 250, to assist in providing geo-redundancy in the network. Data centers 242 and 250 are functionally equivalent but physically distinct. Database node 260 illustrates the functionalities that are also present in database node 254. Database node 260 is part of database cluster 116, and database node 254 is part of database cluster 174 (both shown in FIG. 8). Database node 260 includes cluster service 262, which is responsible for managing the cluster of database nodes (e.g., verifying the node operating environment, verifying consistency of data stored in storage 264, performing failover to secondary database node, receiving and processing messages from listener 270, etc.), and storage 264, which is the database used for storing all of the data provided by portal application server 112, gateway application server 138, EAI server 128, fraud server 129, reconciliation server 131, credentialing application server 146, etc., for persistence and retrieval at a later time. Database node 260 also includes listener 270, which detects database access requests made by portal application server 112, EAI server 128, fraud server 129, reconciliation server 131, gateway application server 138, and credentialing application server 146 through firewall 114.

As illustrated in FIG. 20, database node 260 also includes notification agent 266 and log forwarder 268, which communicate with monitoring element 188 through firewall 186. Notification agent 266 provides information to monitoring element 188. In some embodiments, notification agent 266 is an SNMP agent. In some embodiments, the information provided by notification agent 266 includes unsolicited notifications of events (e.g., disk full, memory error, SNMP traps, etc.). In some embodiments, information provided by notification agent 266 is in response to a request from monitoring element 188.

In some embodiments, monitoring element 188 responds to information sent by notification agent 266. For example, in some embodiments, monitoring element 188 sends notification agent 266 a message directing database node 260 to perform an action (e.g., run a program, run a test query to validate that the system is functional, run a program to determine whether a connected system is functional, etc.).

Log forwarder 268 also sends information to monitoring element 188. In some embodiments, log forwarder 268 sends information configured to assist in diagnosing problems with a system or service controller application. For example, in some embodiments, database node 260 generates log files, and log forwarder 268 sends the log files to monitoring element 188. In some embodiments, the log files are generated for individual service controller applications. In some embodiments, log forwarder 268 sends a system log, an information log, a debug log, an error log, information about a fatal event, etc. In some embodiments, database node 260 initiates the transfer of information from log forwarder 268 to monitoring element 188.

Secure Service Processor Operating Environments

In some embodiments, it is advantageous to store or implement certain portions or all of service processor 115 (e.g., agents, etc.) in protected or secure memory so that other undesired programs (and/or unauthorized users) have difficulty accessing the functions or software in service processor 115. In some embodiments, service processor 115, at least in part, is placed in a secure area of the operating system (e.g., in a kernel) so that it cannot be removed or, if it is removed, it must be replaced for proper device operation to resume. In some embodiments, service processor 115, at least in part, is implemented in and/or stored on secure non-volatile memory (e.g., non volatile memory can be secure non-volatile memory) that is not accessible without pass keys and/or other security mechanisms. In some embodiments, the ability to load at least a portion of service processor 115 software into protected non-volatile memory also requires a secure key and/or signature and/or requires that the service processor 115 software components being loaded into non-volatile memory are also securely encrypted and appropriately signed by an authority that is trusted by a secure software downloader function, such as service downloader 1663 shown in FIG. 2. In some embodiments, a secure software download embodiment also uses a secure non-volatile memory. Those of ordinary skill in the art will also appreciate that all memory can be on-chip, off-chip, on-board and/or off-board.

Agent communication bus 1630 represents a functional description for providing communication for the various service processor 115 agents and functions. In some embodiments, such as the embodiment shown in FIG. 2, the architecture of agent communication bus 1630 is generally multipoint-to-multipoint so that any agent can communicate with any other agent, service controller 122, or in some cases other components of end-user device 100, such as user interface 1697 and/or modem components. The architecture can also be point-to-point for certain agents or communication transactions, or point-to-multipoint within the agent framework so that all agent communication can be concentrated, or secured, or controlled, or restricted, or logged, or reported. In some embodiments, agent communication bus 1630 is secured, signed, encrypted, hidden, partitioned and/or otherwise protected from unauthorized monitoring or usage.

In some embodiments, there are multiple layers of security applied to agent communication bus 1630 communication protocols, such as including one or more of the following: point-to-point message exchange encryption using one or more keys that are partially shared or shared within the service processor 115 agent group and/or service controller 122, point-to-point message exchange that using one or more keys that are private to the two endpoints of the communication, a bus-level message exchange encryption that can be in place of or in addition to other encryption or security, or using one or more keys that are partially shared or shared within the service processor 115 agent group and/or service controller 122, a set of secure messages that can only be decoded or observed by the agents they are intended for, a set of secure messages that allow communication between certain agents or service processor functions and entities outside of the service processor operating environment. In some embodiments, and as described herein, service control device link 1691 is assumed to be equivalent to an agent for communication purposes, and, in the case of service control device link 1691, the communication is not restricted to agent communication bus 1630 but also extends to service control communications link 1653. In some embodiments, the system has the capability to replace keys or signatures on occasion or on a regular basis to further secure against monitoring, eavesdropping or compromise of the agent communication system.

Various forms of message encryption and security framework techniques can be applied to encrypt and/or secure agent communication bus 1630, including one or more of the following: agent bus encryption using shared key for all agents provided and updated by the secure server; agent bus encryption using point to point keys in which the secure server informs the bus and agents of keys and updates as appropriate; agent level encryption using agent to agent shared keys in which the secure server informs agents of the key and updates the key as appropriate; agent level encryption using agent to agent point to point key in which the secure server informs agent of the point to point keys that are required and updates the keys as appropriate; agent level access authorization, which only allows access to the agents that are on the secure authorization list and in which the list is provided by the secure server and signatures are provided by the secure server; user interface (UI) messages are only analyzed and passed, in which user interface 1697 cannot have access to configuration information and cannot issue challenges; agent level heartbeat encryption, which can be point to point or shared key for that agent; control link level heartbeat encryption; TLS (Transport Layer Security) communication protocols; server level heartbeat encryption, which can be point to point or shared key for that secure server; and/or access control integrity agent 1694 or heartbeat function can become point to multipoint secure communications hubs.

In some embodiments, the design of agent communication bus 1630 depends on the nature of the design embodiments for the agents and/or other functions. For example, if the agents are implemented largely or entirely in software, then agent communication bus 1630 can be implemented as an inter-process software communication bus. In some embodiments, such an inter-process software communication bus is a variant of D-bus (e.g., a message bus system for inter-process software communication that, for example, helps applications/agents to talk to one another), or another inter-process communication protocol or system, running a session bus in which all communications over the session bus can be secured, signed, encrypted or otherwise protected. For example, the session bus can be further protected by storing all software (e.g., software components, applications and/or agents) in secure memory, storing all software in encrypted form in secure memory, and/or executing all software and communications within a secure execution environment, hardware environment and/or protected memory space. In some embodiments, if the agents and other functions are designed with a mixture of software and hardware, or primarily with hardware, then the implementation of the bus design will vary, and the principles and embodiments described herein will enable one of ordinary skill in the art to design the specifics of agent communication bus 1630 to meet a particular set of product and desired functional requirements.

In some embodiments, service processor 115 includes a DDR processor located in a secure execution environment, and this DDR processor can be used advantageously to improve security of device-assisted services systems. Co-pending U.S. patent application Ser. No. 13/247,998, entitled "Secured Device Data Records" and incorporated by reference herein, describes embodiments of a DDR processor. In some embodiments, the DDR processor sends a sequence of secure device data records (DDRs) to a network element (e.g., via a secure channel). In some embodiments, the DDR processor is configured with an access controller that restricts end-user device 100's network access to a predetermined set of network destinations or functions if any of the DDR processor, service processor 115, or service controller 122 detects an error or potential fraud in one or more reports in the sequence of secure DDRs.

Service Processor Enrollment

In some embodiments, before service processor 115 of end-user device 100 participates in device-assisted services, it enrolls with service controller 122. In the enrollment process, service controller 122 (using, e.g., credentialing application server 146, a network element such as authentication credential server 220, etc.) allocates a device credential to service processor 115. In some embodiments, the credential is one or more of a certificate, a key, a shared secret, a password, a hash, a shared algorithm, or any other item of information that allows service controller 122 to confirm the identity of service processor 115. After service controller 122 has allocated the device credential, service controller 122 can use the device credential when it needs to authenticate service processor 115, such as, for example, before end-user device 100 sends device-based usage reports to gateway application server 138.

Figure 21:
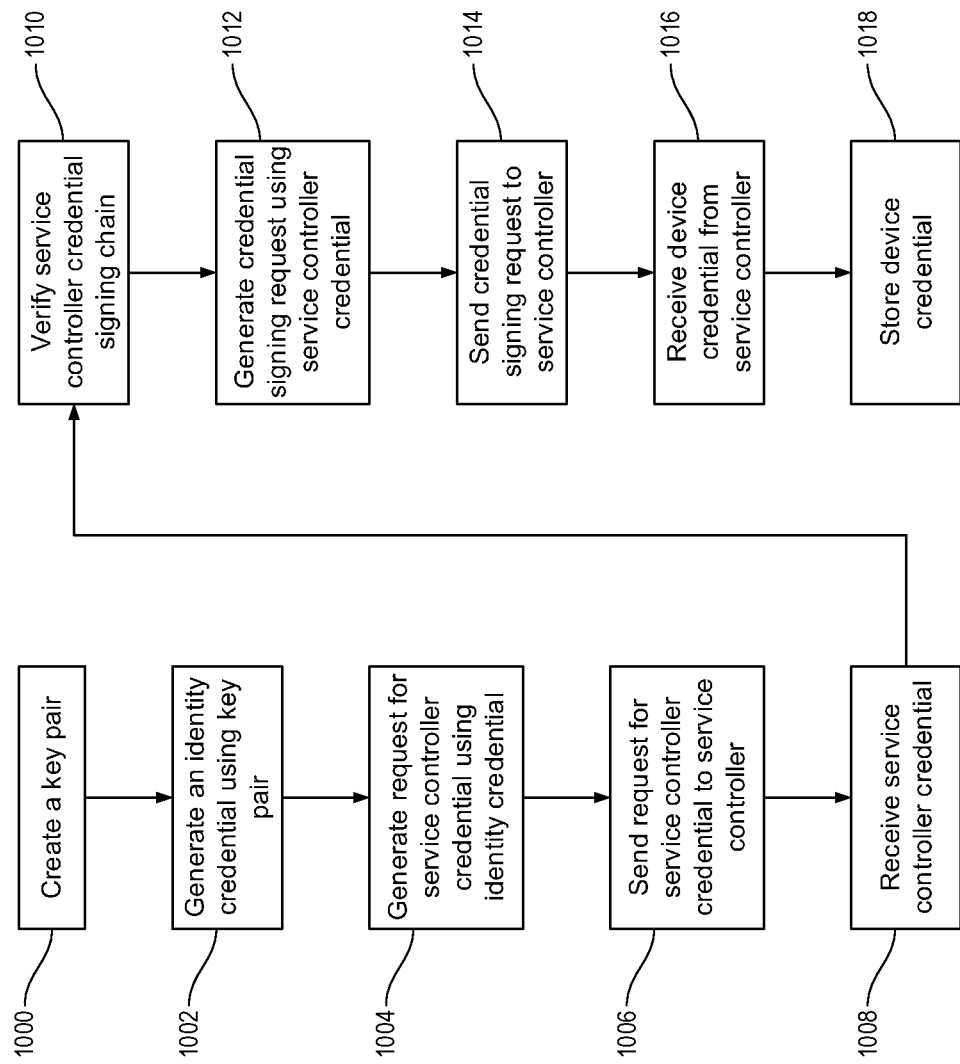
FIG. 21 illustrates a set of steps an end-user device performs to obtain a credential with a service controller in accordance with some embodiments.

FIG. 21 illustrates a set of steps end-user device 100 takes to obtain a credential from service controller 122 in accordance with some embodiments. At step 1000, end-user device 100 creates a key pair. At step 1002, end-user device 100 generates an identity credential using the key pair. In some embodiments, the identity credential comprises a device identifier and a subscriber identifier. At step 1004, using the identity credential generated in step 1002, end-user device 100 generates a request for the service controller credential. At step 1006, end-user device 100 sends the request for the service controller credential to the service controller. At step 1008, end-user device 100 receives a credential from service controller 122. In some embodiments, the service controller credential is a public key credential. At step 1010, end-user device 100 verifies the service controller credential signing chain. As will be appreciated by a person having ordinary skill in the art, the process of verifying the authenticity and validity of a newly received credential involves checking all of the credentials in the chain of credentials from the original, universally trusted certificate authority, through any intermediate certificate authorities, down to the credential just received, which may be referred to as the end credential. The end credential is trusted if each credential in that credential's chain is properly issued and valid.

If end-user device 100 successfully verifies the service controller credential signing chain in step 1010, at step 1012 end-user device 100 generates a credential signing request using the service controller credential received in step 1008. In some embodiments, the credential signing request comprises a subscriber identifier and a device identifier. At step 1014, end-user device 100 sends the credential signing request to the service controller. In some embodiments, the credential signing request comprises a challenge password. At step 1016, end-user device 100 receives a device credential from service controller 122. At step 1018, end-user device 100 stores the device credential in local memory. In some embodiments, service controller 122 (e.g., credentialing application server 146) comprises a simple certificate enrollment protocol (SCEP) server, and the credential is a certificate. In some embodiments, messages sent and received by end-user device 100 are encrypted. In some embodiments, the service controller credential and device credential are 2048-bit RSA public key credentials. In some embodiments, service controller 122 and end-user device 100 communicate using a session key.

Figure 22:
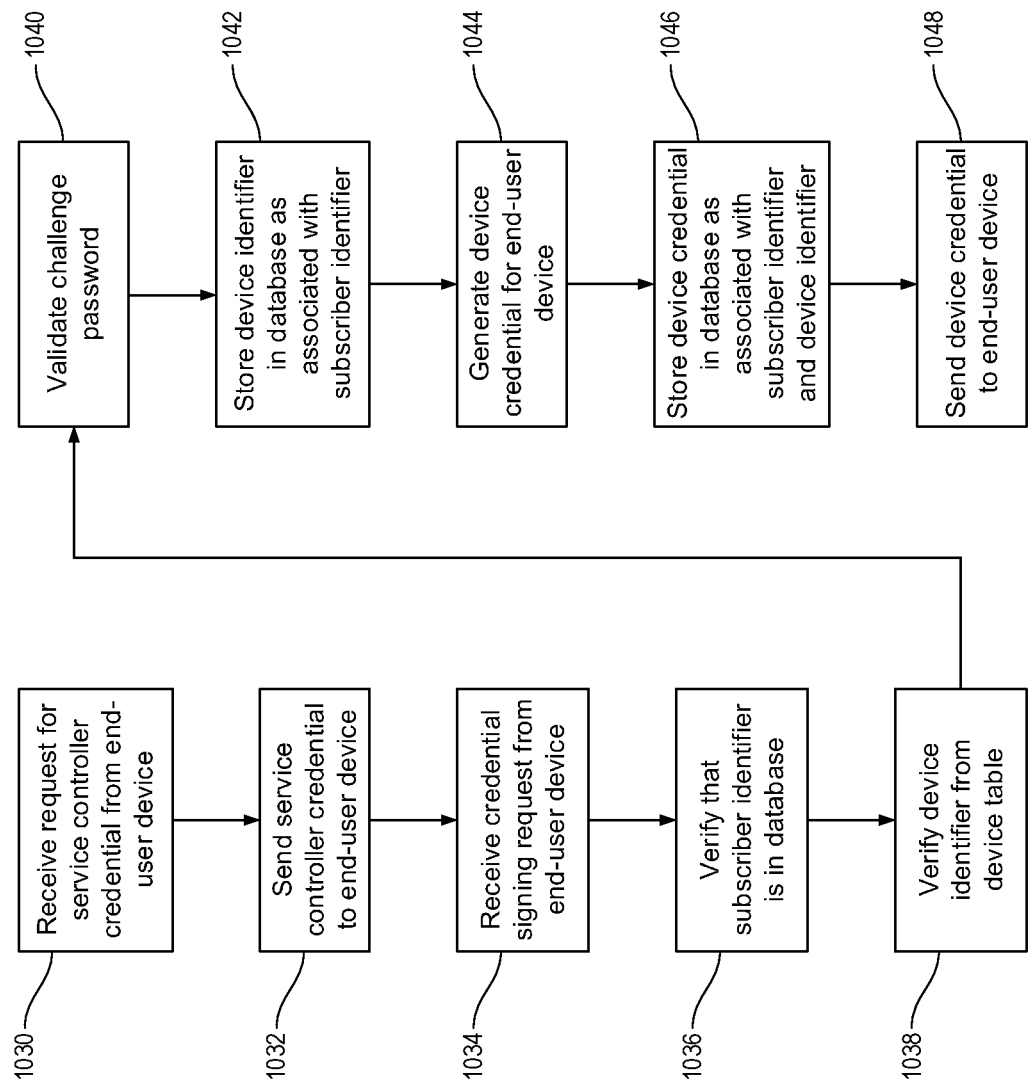
FIG. 22 illustrates a set of steps a service controller performs to provide a credential to a service processor in accordance with some embodiments.

FIG. 22 illustrates the steps service controller 122 (e.g., using credentialing application server 146) performs to provide a device credential to end-user device 100 in some embodiments. At step 1030, service controller 122 receives a request for a service controller credential from end-user device 100. In some embodiments, the request comprises a device identifier and a subscriber identifier. At step 1032, service controller 122 sends the service controller credential to end-user device 100. At step 1034, service controller 122 receives a credential signing request comprising a challenge password from end-user device 100. In some embodiments, the request comprises a device identifier and a subscriber identifier. At step 1036, service controller 122 verifies that the subscriber identifier is listed in database cluster 116. At optional step 1038, service controller 122 verifies the device identifier from a device table. In some embodiments, the device table resides in database cluster 116 and contains a list of valid devices that are allowed to connect to service controller 122. At step 1040, service controller 122 validates the challenge password using the device identifier. At step 1042, service controller 122 stores the device identifier in database cluster 116 as associated with the subscriber identifier associated with end-user device 100. At step 1044, service controller 122 generates a device credential for end-user device 100 by obtaining a primary key from database cluster 116. At step 1046, service controller 122 stores the device credential in database cluster 116 as associated with the subscriber identifier and the device identifier associated with end-user device 100. At step 1048, service controller 122 sends the device credential to end-user device 100. In some embodiments, service controller 122 (e.g., using credentialing application server 146) comprises a simple certificate enrollment protocol (SCEP) server, and the credential is a certificate. In some embodiments, messages sent and received by service controller 122 are encrypted. In some embodiments, the service controller credential and device credential are 2048-bit RSA public key credentials. In some embodiments, service controller 122 and end-user device 100 communicate using a session key.

Although the steps are presented in FIGS. 6B and 6C in a particular order, as will be appreciated by a person having ordinary skill in the art in light of the disclosures herein, the ordering of some steps can be modified. As simple examples, steps 1010 and 1012 of FIG. 21 can be interchanged, and in FIG. 22, step 1048 can be performed before 1046, step 1038 can be performed before step 1036, etc.

Figure 23:
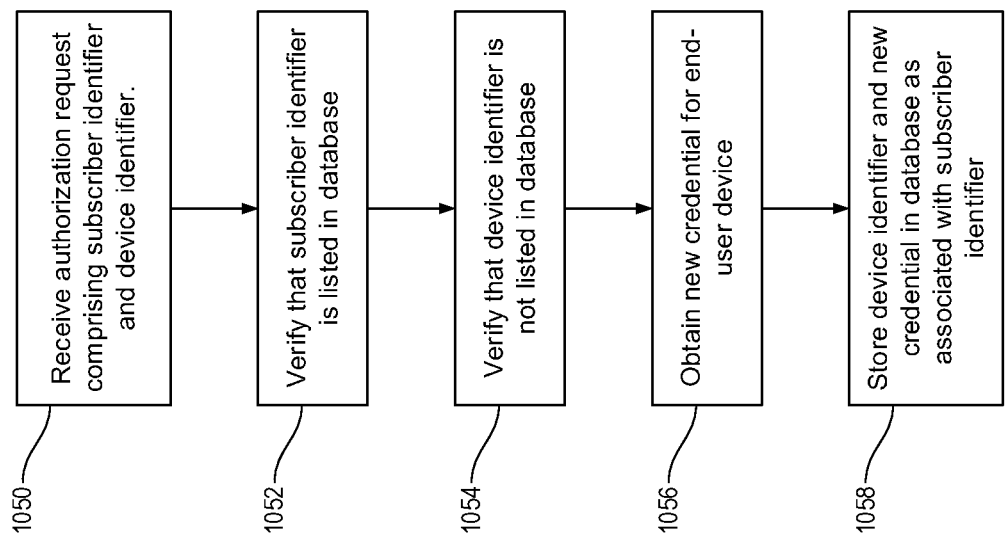
FIG. 23 illustrates an procedure a service controller performs to allocate credentials to multiple end-user devices in accordance with some embodiments.

In some embodiments, service controller 122 is configured to allocate multiple credentials to different end-user devices associated with a single subscriber identifier. FIG. 23 illustrates an example of such an embodiment. As shown in FIG. 23, at step 1050, service controller 122 (e.g., using credentialing application server 146) receives an authentication request comprising a device identifier and a subscriber identifier from end-user device 100. At step 1052, service controller 122 verifies that the subscriber identifier is listed in database cluster 116. If the subscriber identifier is listed in database cluster 116, at step 1054, service controller 122 verifies that the device identifier sent by end-user device 100 is not already in database cluster 116. If the device identifier sent by end-user device 100 is not already in database cluster 116, at step 1056, service controller 122 obtains (e.g., by generating or allocating) a new credential for end-user device 100. At step 1058, service controller 122 stores both the device identifier and the new credential in database 116 as associated with the subscriber identifier. In some embodiments, the device identifier and the new credential are stored in separate fields of database cluster 116. In some embodiments, the device identifier and new credential are stored as a single entry comprising their combination (e.g., a hash). In some embodiments, service controller 122 monitors or tracks end-user device enrollment attempts. In some embodiments, credentialing application server 146 or another element of the service controller (e.g., a fraud element such as fraud server 129) notifies the carrier about credentialing enrollment attempts, successful enrollments, or unsuccessful enrollments.

Service Processor Authentication; Starting and Stopping a Data Session

To achieve an overall network service policy, the network portion of the access network service policy may be configured to work in conjunction with the device-based portion of the access network service policy to achieve an overall combined network service policy. If the device agents required to implement the device portion of the access network service policy are not present on the device or are not properly configured because of tampering or other undesirable activities, then the overall combined network service policy can be in error or may not be possible to achieve, potentially resulting in an undesired network service policy implementation. In such cases, it is desirable for a network system to be employed to detect this condition and modify the network portion of an access network service policy enforced by the network-based elements so that a desired network service policy enforcement may be achieved.

Examples of when it may be advantageous to adapt the network portion of an access network service policy in order to account for a missing or improperly configured service processor include but are not limited to: (i) a device credential has been moved to a device that does not have a service processor, (ii) a device credential has been moved to a device with a service processor with a different configuration than the service processor originally associated with the device credential, (iii) a device service processor has been tampered with or has an improper configuration.

In some embodiments, service controller 122 detects the presence and proper configuration of a service processor, or lack thereof, in the end-user device. If the service processor is present and properly configured, service controller 122 causes a first network portion of an access network service policy to be enforced in the network, the first network portion of an access network service policy being configured to provide counterpart policy enforcement to a device portion of an access network service policy to achieve a first desired overall access network service policy. If, on the other hand, the service processor is not both present and properly configured, service controller 122 causes a second network portion of an access network service policy to be enforced in the network, wherein the second network portion of the access network service policy is configured to operate without a device counterpart policy to achieve a second desired overall access network service policy.

In some embodiments, a trusted service policy implementation comprises service controller 122 authenticating and authorizing service processor 115. In some embodiments, the authentication comprises receiving and confirming a service processor certificate. In some embodiments, the authentication comprises receiving and confirming a service processor certificate that is based on a shared secret between service processor 115 and service controller 122. In some embodiments, the shared secret is unique for a given service processor 115.

In some embodiments, the process to establish a trusted service policy implementation comprises service processor 115 sharing two or more types of credentials with service controller 118, wherein the credentials include two or more of a service processor credential, a device credential, and a user or subscriber credential. In some embodiments, a portion of the process to establish a trusted service policy implementation includes end-user device 100 (e.g., service processor 115) sharing a service processor credential, a device credential, and a user or subscriber credential with service controller 122.

In some embodiments, establishing a trusted service policy implementation comprises service controller 122 receiving a certificate or hash result from a service processor element or agent acting on a portion of service processor 115 (for example, access control integrity agent 1694 performing a hash or certificate check on another service processor agent).

Figure 24:
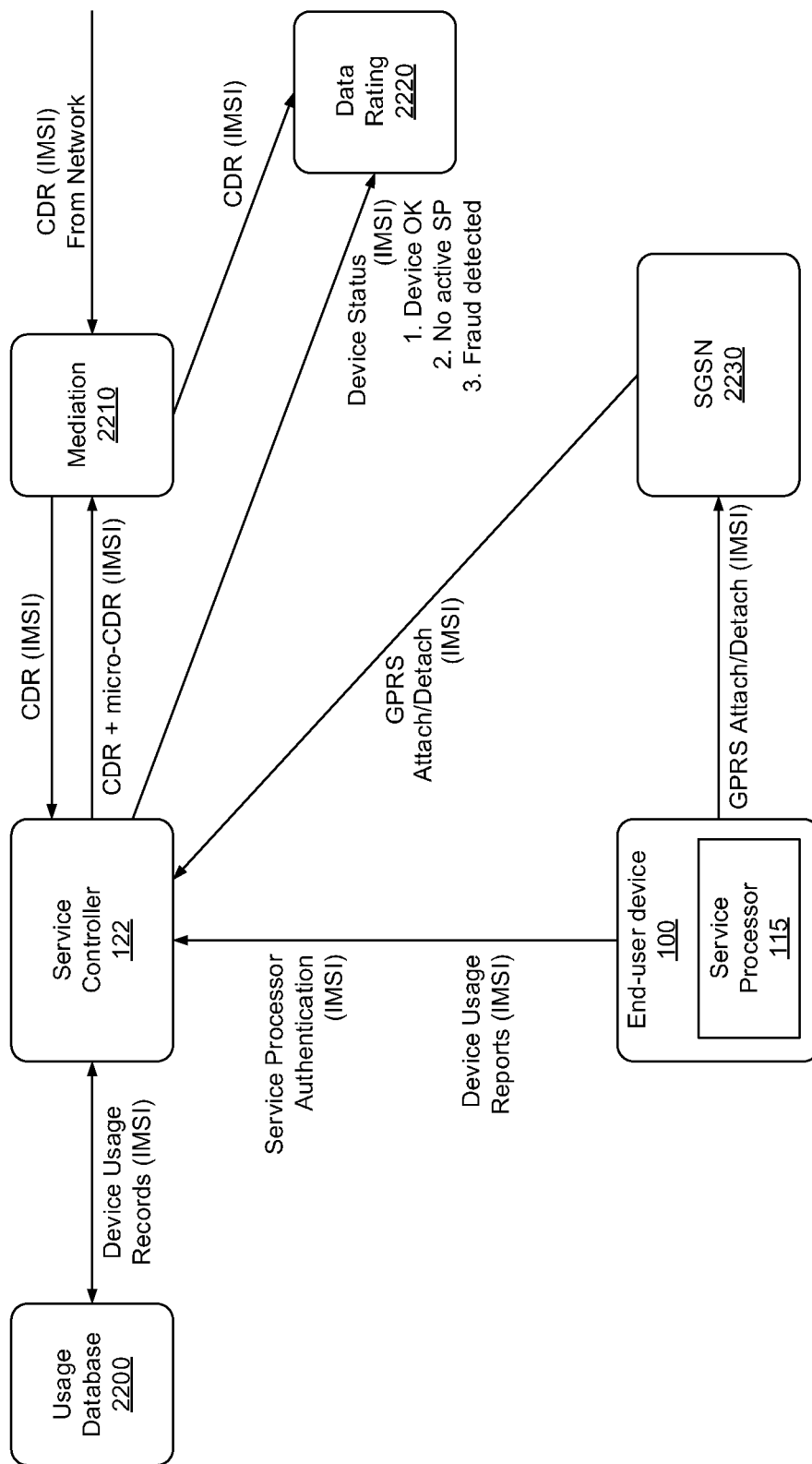
FIG. 24 illustrates an example embodiment of a process to start or stop a data session with SGSN notification.

FIG. 24 illustrates an example embodiment of a process to start or stop a data session with SGSN notification. End-user device 100 attempts to start a data session by sending a "GPRS Attach" message to SGSN 2230. SGSN 2230 notifies service controller 122 that end-user device 100 has started a data session. Service controller 122 waits for a pre-determined time, for example, one minute, to receive a login or authentication request from service processor 115. In some embodiments, service controller 122 sets a login timer. If service controller 122 receives the login or authentication request before the timer expires, it attempts to authenticate service processor 115.

One or more authentication errors may occur when service controller 122 attempts to authenticate service processor 115. For example, service processor 115 may have invalid credentials. As another example, service processor 115 may send invalid application or kernel signatures. As another example, service processor 115 may report end-user device "root" detection errors. As another example, service processor 115 may contact service controller 122 using an identifier that is already in use by a different end-user device.

If service controller 122 does not receive the request from service processor 115 within the pre-determined time, or if service controller 122 is unable to authenticate service processor 115 for some reason, service controller 122 assumes that either (1) end-user device 100 does not contain a service processor, and is therefore unable to participate in device-assisted services, or (2) although end-user device 100 has a service processor, service processor 115 has been disabled. Service controller 122 sends a notification ("No active SP" message) to data rating element 2220 to indicate that end-user device 100 does not have the ability to provide the information necessary for data mediation element 2210 to generate detailed data usage reports (referred to herein as "micro-CDRs"). In some embodiments, service controller 122 sends a trigger to data mediation element 2210 to indicate that end-user device 100 should be charged for usage at "standard" bulk rates. In some embodiments, service controller 122 specifies a "standard" bulk rate charging code in the charging data records (CDRs) it sends to data mediation element 2210. In some embodiments, data rating element 2220 determines data usage by end-user device 100 based on carrier-based records (e.g., records of end-user device 100's usage of data over access network 10).

If service controller 122 receives the login or authentication request from service processor 115 within the pre-determined time and successfully authenticates service processor 115, service controller 122 sends a notification ("Device OK" message) to data rating element 2220 to indicate that end-user device 100 has a service processor and is capable of supporting device-assisted services. In some embodiments, data rating element 2220 expects to receive "micro-CDR" reports from data mediation element 2210 when service controller 122 has determined that end-user device 100 has an active service processor. In some embodiments, data rating element 2220 determines usage based on the micro-CDRs, which contain more granular information than ordinary CDRs. For example, whereas an ordinary CDR might simply report that an end-user device used 100 Megabytes (MB) of data, a set of micro-CDRs might report that the end-user device used 15 MB of e-mail, 35 MB of social networking, and 50 MB of streaming video.

In some embodiments, data mediation element 2210 sends carrier-based usage reports (e.g., CDRs) to service controller 122. Service controller 122 queries usage database 2200 for device-based usage reports (e.g., micro-CDRs) for end-user device 100. Service controller 122 determines the data usage of end-user device 100 from the carrier-based usage reports. Service controller 122 also determines the data usage of end-user device 100 from the device-based usage reports. In some embodiments, described in more detail below, service controller 122 compares the usage determined from the carrier-based usage reports to the usage determined from the device-based usage reports. If service controller 122 determines that the two usage measures do not match (e.g., are not identical or are not within a threshold of each other), service controller 122 sends a notification (e.g., a fraud alert) to data rating element 2220 to indicate that the end-user device is in a potential fraud state, and data rating element 2220 should bill usage for end-user device 100 based on carrier-based usage reports. Service controller 122 sends the carrier-based usage reports and device-based usage reports to data mediation element 2210.

When the "GPRS detach" message is received by SGSN 2230, SGSN 2230 sends a notification to service controller 122 that the data session for end-user device 100 is closed.

Figure 25:
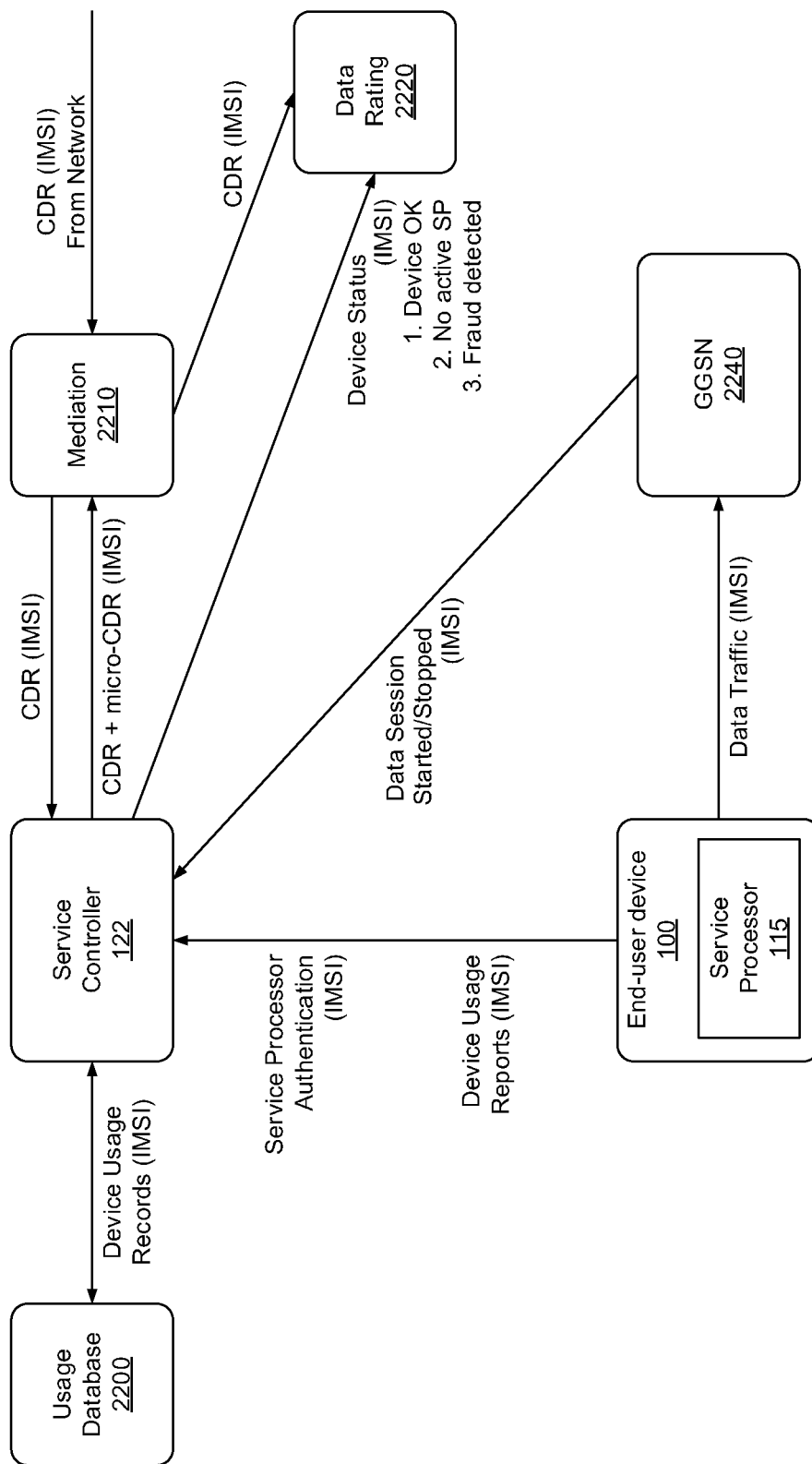
FIG. 25 illustrates an example embodiment of a process to start or stop a data session with GGSN notification.

FIG. 25 illustrates an example embodiment of a process to start or stop a data session with GGSN notification. The process is similar to that described with reference to FIG. 24, except in how the data session starts and ends. End-user device 100 starts a data session by sending data traffic to GGSN 2240. GGSN 2240 recognizes the start of a new data session and notifies service controller 122 that end-user device 100 has started a data session. When GGSN 2240 determines that the data session has closed, it sends a notification to service controller 122 that the data session for end-user device 100 is closed.

Figure 26:
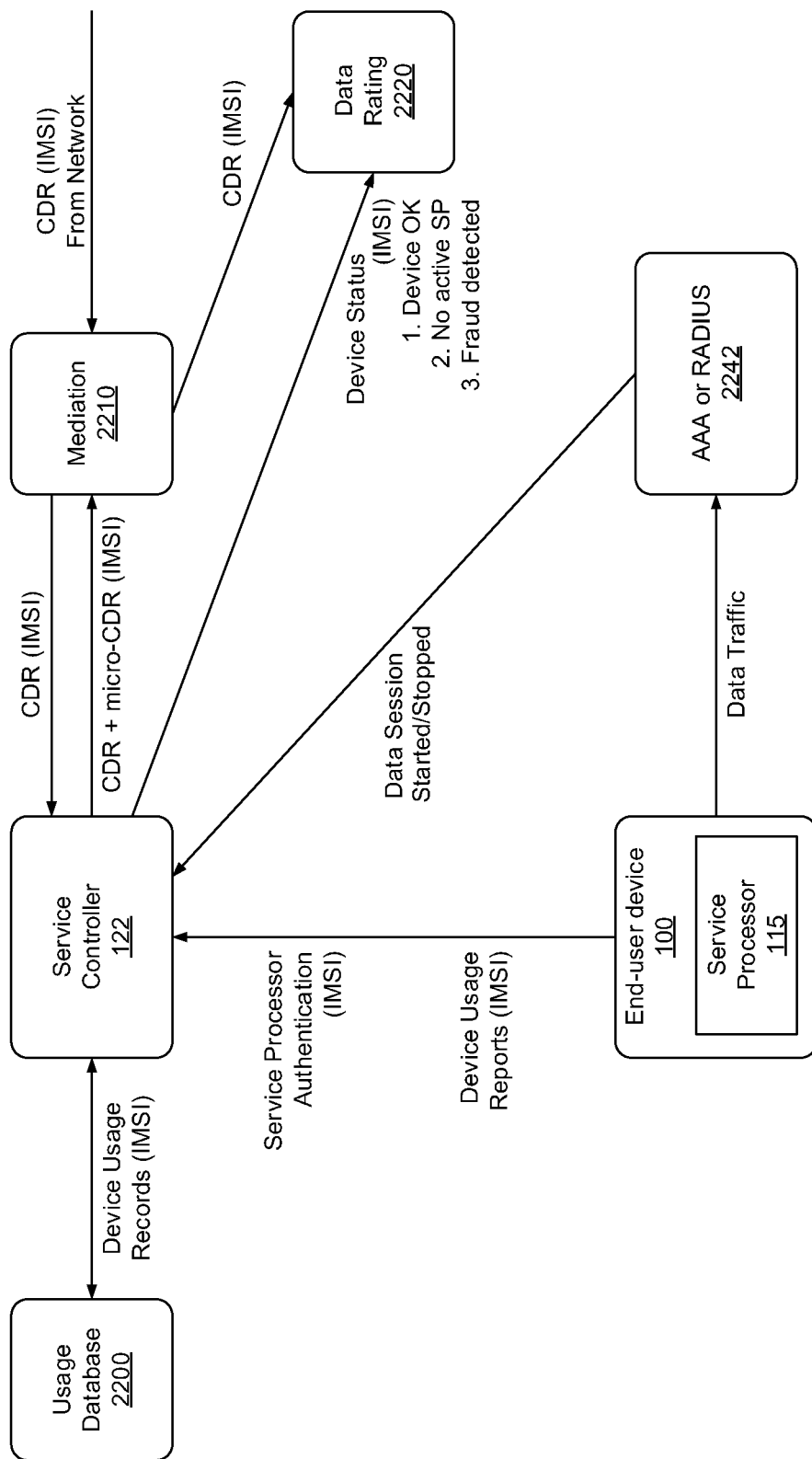
FIG. 26 illustrates an example embodiment of a process to start or stop a data session when a AAA or RADIUS server provides start/stop accounting in a GSM/GPRS core data network.

FIG. 26 illustrates an example embodiment of a process to start or stop a data session when a AAA or RADIUS server (e.g., access network AAA server 1621) provides start/stop accounting in a GSM/GPRS core data network. The process is similar to that described with reference to FIG. 24, except that AAA or RADIUS 2242 authorizes the start of a new data session and notifies service controller 122 that end-user device 100 has started a data session. When AAA or RADIUS 2242 determines that the data session has closed, it sends a notification to service controller 122 that the data session is closed.

Figure 27:
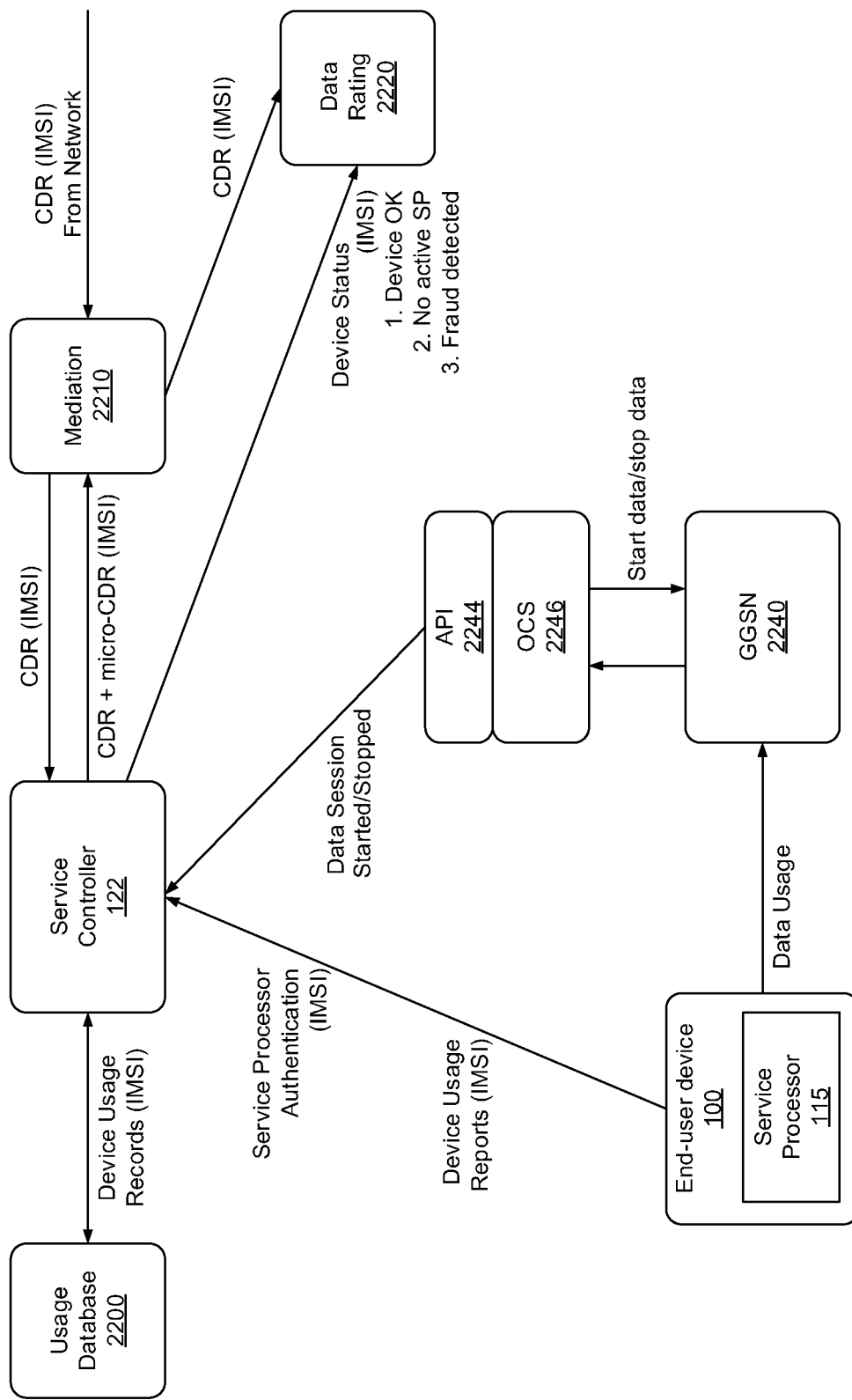
FIG. 27 illustrates an example embodiment of a process to start or stop a data session when an OCS provides start/stop accounting in a GSM/GPRS core data network.

FIG. 27 illustrates an example embodiment of a process to start or stop a data session when an OCS provides start/stop accounting in a GSM/GPRS core data network. The process is similar to that described with reference to FIG. 24, except that after GGSN 2240 recognizes the start of a new data session with end-user device 100, GGSN 2240 queries OCS 2246 for a data lease. OCS 2246 authorizes the data session by returning a value representing an amount of data to GGSN 2240 (e.g., OCS 2246 sends a value of X bytes to GGSN 2240). OCS 2246 uses API 2244 to notify service controller 122 that end-user device 100 has started a data session. When GGSN 2240 determines that the data session has closed, it sends a notification to OCS 2246 indicating the amount of data left in the amount of data authorized by OCS 2246. OCS 2246 uses API 2244 to notify service controller 122 that the data session is closed.

Service processor 115 may successfully authenticate with service controller 122 but then subsequently send one or more fraud notifications. Examples of device fraud notifications that service processor 115 might send are: invalid service processor kernel signature, invalid service processor framework signature, invalid service processor application signature, service processor application unable to connect to service processor kernel, service processor application not receiving heartbeat messages from service processor kernel, service processor kernel missing, service processor framework missing, service processor application missing, hosts file tampered with or missing, service processor to service controller encryption failure, or device "root" detected. In some embodiments, in response to receiving a device fraud notification from service processor 115, service controller 122 generates a fraud alert.

End-User Device Kernel/Software Component Verification

Figure 28:
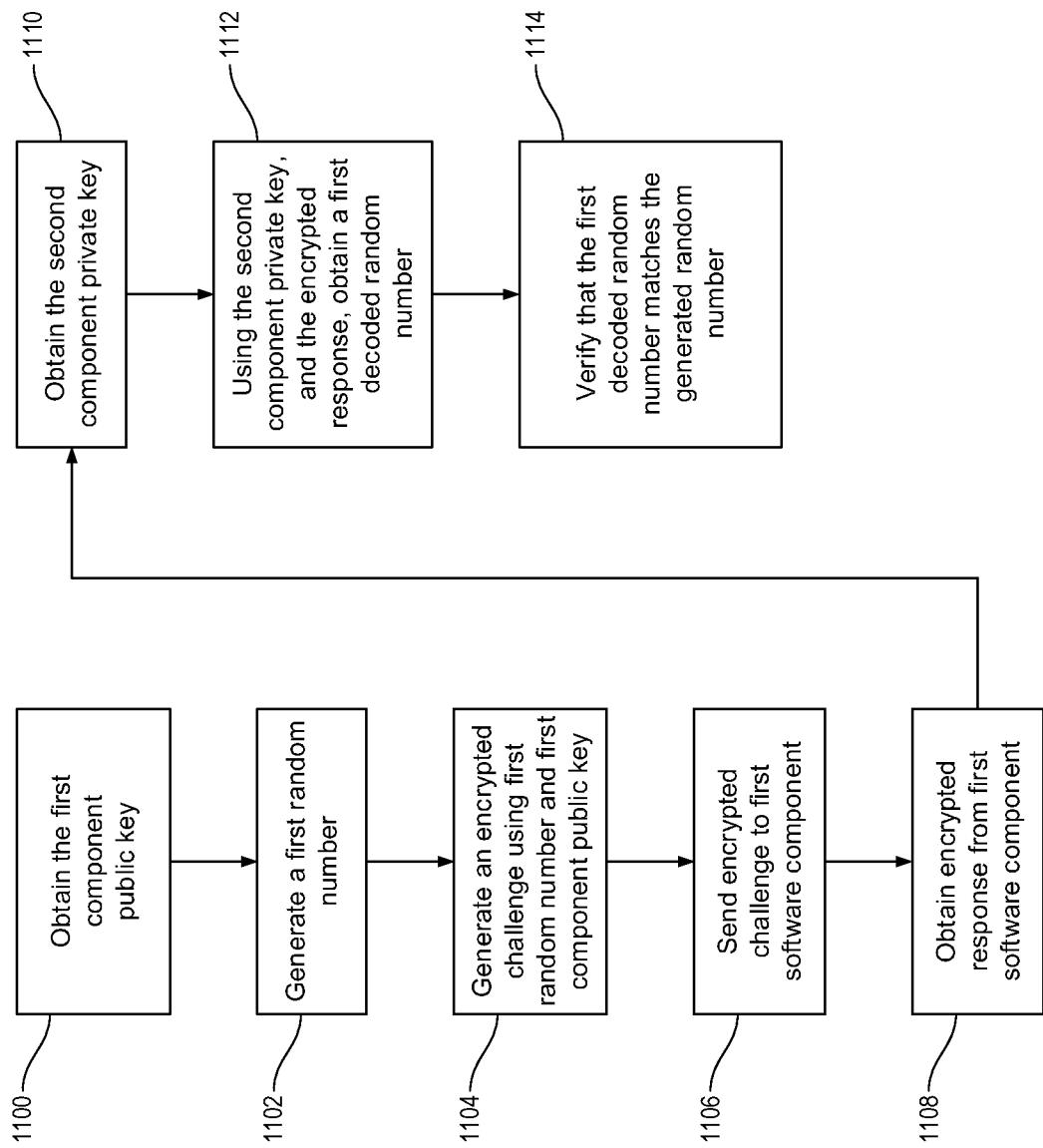
FIG. 28 illustrates an example embodiment of a procedure that a verifying software component on an end-user device may perform to verify the integrity of another software component on the end-user device.

In some embodiments, establishing a trusted service policy implementation comprises two service processor 115 elements performing a mutual authentication of one another and then acting on an error result if one occurs. FIG. 28 illustrates an example embodiment of a procedure that a verifying software component on end-user device 100 may perform to verify the integrity of another software component on end-user device 100. Each of the software components can be, for example, a kernel, a library, an executable file, one or more interpreted, machine-readable instructions, a script, a service processor, or any other software component.

At step 1100, a verifying software component obtains the public key of a to-be-verified software component. At step 1102, the verifying software component generates a random number. At step 1104, the verifying software component generates an encrypted challenge using the random number and the to-be-verified software component's public key. At step 1106, the verifying software component sends the encrypted challenge to the to-be-verified software component. At step 1108, the verifying software component obtains an encrypted response from the to-be-verified software component. At step 1110, the verifying software component obtains its own private key. At step 1112, the verifying software component uses its own private key and the encrypted response to obtain a first decoded random number. At step 1114, the verifying software component verifies that the first decoded random number matches the generated random number. In some embodiments, if the first decoded random number does not match the generated random number, the verifying software component takes an action. In some embodiments, if the to-be-verified software component is an application, the action comprises restricting the application's ability to communicate over an access network. In some embodiments, the action comprises notifying a user of end-user device 100. In some embodiments, the action comprises notifying a network administrator. In some embodiments, if the to-be-verified software component is an application, the action is to apply a policy to attempted or successful communications associated with the application. In some embodiments, the action is to take a countermeasure, such as, for example, preventing a user from accessing the to-be-verified software component, preventing the to-be-verified software component from executing, or terminating the to-be-verified software component (if it is running).

In some embodiments, if, in step 1114, the first decoded random number matches the generated random number, the verifying software component sends a message to service controller 122 (or another network element) indicating that the to-be-verified software component passed the test.

Figure 29:
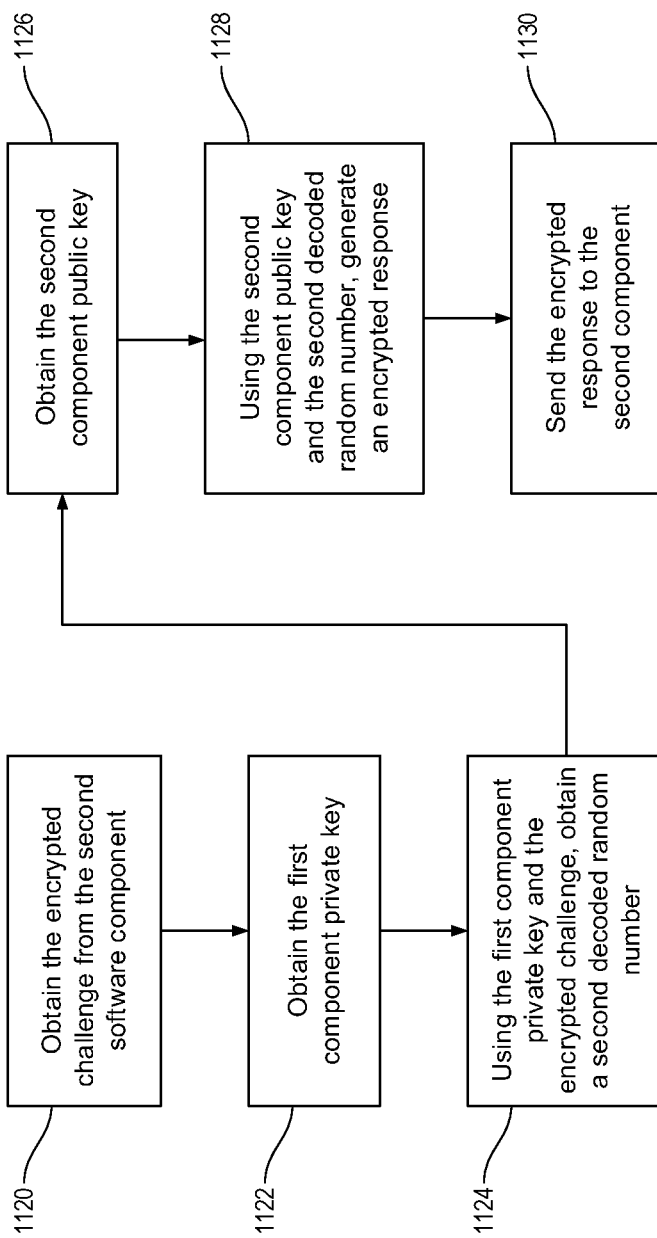
FIG. 29 illustrates an example embodiment of a procedure that a to-be-verified software component can perform in response to the procedure illustrated in FIG. 28.

FIG. 29 illustrates an example embodiment of a procedure that the to-be-verified software component can perform in response to the procedure of FIG. 28. At step 1120, the to-be-verified software component obtains the encrypted challenge from the verifying software component. At step 1122, the to-be-verified software component obtains its own private key. At step 1124, the to-be-verified software component uses its own private key and the encrypted challenge to obtain a second decoded random number. At step 1126, the to-be-verified software component obtains the verifying component's public key. At step 1128, the to-be-verified software component uses the verifying component's public key and the second decoded random number to generate an encrypted challenge response. At step 1130, the to-be-verified component sends the encrypted challenge response to the verifying component.

End-User Device Application Authentication

In some embodiments, an installed software application on end-user device 100 cannot be modified, updated, or replaced unless the software purporting to be a modification, update, or replacement includes a credential that matches a credential associated with the installed application. In some embodiments, the installed-application credential is a name identifier. In some embodiments, the installed-application credential is a secure signature, certificate, or hash of the installed software application. In some embodiments, the installed-application credential is stored on end-user device 100. In some embodiments, the installed-application credential is accessible to service processor 115 (for example, via policy control agent 1692). In some embodiments, when an attempt is made to modify, update, or replace the installed software application, service processor 115 and/or a device operating system (OS) obtains both the installed-application credential and a credential associated with the purported modification, update, or replacement. If the credential associated with the purported modification, update, or replacement matches the installed-application credential, service processor 115 allows the installed application to be modified, updated, or replaced.

Figure 30:
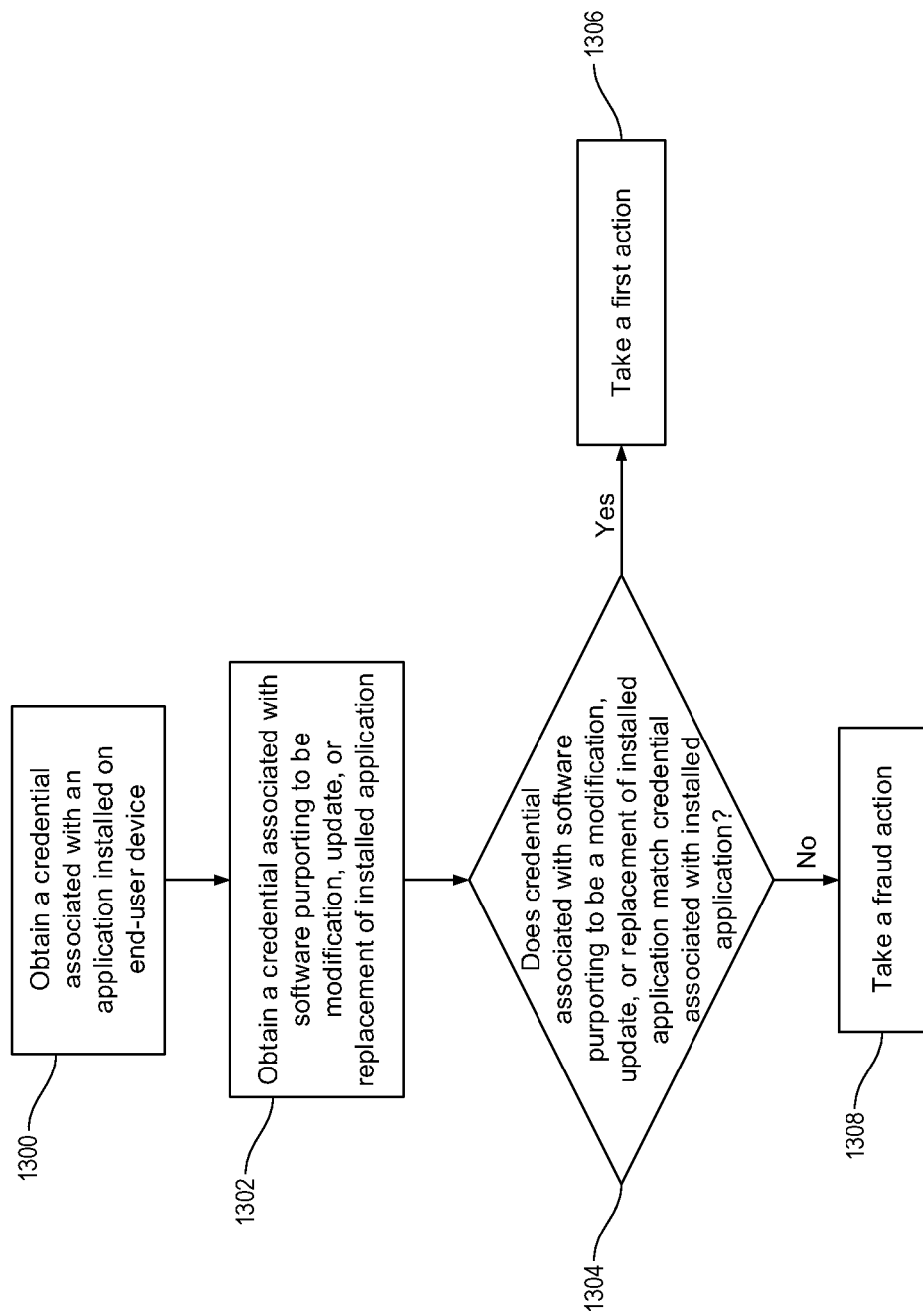
FIG. 30 illustrates an example embodiment of a procedure to determine whether to allow a modification, update, or replacement of an software program installed on an end-user device.

FIG. 30 illustrates a procedure to determine whether to allow a modification, update, or replacement of an installed software program. At step 1300, a component of end-user device 100 (e.g., service processor 115 or an operating system) obtains a credential associated with a software application installed on end-user device 100. At step 1302, a component of end-user device 100 (e.g., service processor 115 or an operating system) obtains a credential associated with software purporting to be a modification, update, or replacement of the installed software application. At step 1304, a component of end user-device 100 (e.g., service processor 115 or an operating system) determines whether the credential associated with the software purporting to be a modification, update, or replacement of the installed software application matches the credential associated with the installed software application. If there is a match, then at step 1306, a component of end-user device 100 (e.g., service processor 115 or an operating system) takes a first action. In some embodiments, the first action comprises allowing the software purporting to be a modification, update, or replacement of the installed application software to be installed on end-user device. In some embodiments, the first action further comprises notifying the service controller or a user of end-user device 100 of the modification, update, or replacement of the installed application software.

If, at step 1304, the credential associated with the software purporting to be a modification, update, or replacement of the installed software application does not match the credential associated with the installed software application, then at step 1308, a component of end-user device 100 (e.g., service processor 115 or an operating system) takes a fraud action. In some embodiments, the fraud action comprises restricting end-user device 100's access to an access network. In some embodiments, the fraud action comprises restricting an application's (e.g., the installed software application's) ability to communicate over an access network. In some embodiments, the fraud action comprises notifying a user of end-user device 100. In some embodiments, the fraud action comprises notifying a network administrator or a network element of the credential mismatch. In some embodiments, the fraud action comprises applying a predetermined billing rate for service usage by end-user device 100. In some embodiments, the fraud action comprises applying a pre-determined billing rate to service usage associated with the installed software application.

In some embodiments, end-user device 100 stores in memory (e.g., application program store 830 of FIG. 38) an application program configured to execute on end-user device 100 to access one or more data services over an access network. The application program is associated with a credential that is also stored on end-user device 100 (e.g., in application program store 830, in application credential and policy store 810, etc.). End-user device 100 also stores (e.g., in application credential and policy store 810) a network access policy comprising one or more first instructions to be applied when the application program initiates or attempts to initiate communications over the first wireless access network. A device agent or a combination of device agents (e.g., application interface agent 1693, policy implementation agent 1690, modem selection and control 1811, etc.) determines when the application program initiates or attempts to initiate a communication over the access network (e.g., by monitoring end-user device 100 traffic flows, etc.) and applies the network access policy to the communication over the access network.

In some embodiments, end-user device 100 further comprises one or more device agents (e.g., service downloader 1663, access control integrity agent 1694, service monitor agent 1696, etc.) that detect when an entity (e.g., a user of end-user device 100, service controller 122, etc.) wishes or attempts to install update software on end-user device 100, where the update software purports to be a modification, update, or replacement of the application program. To improve security, the one or more device agents prevent modifications, updates, and replacements of the application software unless a credential associated with the purported update matches a credential of the installed application. For example, the one or more device agents obtain a credential associated with the application program that is already installed on end-user device 100, and a credential associated with a purported update to the installed application program. If the one or more device agents determine that the credentials match, they allow the update software to be installed or to execute on end-user device 100.

In some embodiments, security of end-user device 100 is enhanced using agents on end-user device 100. In some embodiments, an agent on end-user device 100 (e.g., policy implementation agent 1690, policy control agent 1692, access control integrity agent 1694, or any other agent that can perform verification functions) determines if a hosts file is present on the end-user device and configured in an expected manner. If the hosts file is not present or is not configured in an expected manner, in some embodiments, the agent takes an action. In some embodiments, the action is to generate a fraud alert. In some embodiments, the action is to take a countermeasure, such as, for example, to block, delay, rate-limit, or quarantine access to the access network by end-user device 100. In some embodiments, the action is to provide a notification to a user of end-user device 100. In some embodiments, the action is to send a message to service controller 122.

In some embodiments, an agent on end-user device 100 (e.g., policy implementation agent 1690, policy control agent 1692, access control integrity agent 1694, or any other agent that can perform verification functions) determines if service processor 115 successfully completed the authentication procedure with service controller 122. In some embodiments, if the agent determines that service processor 115 has failed to complete the authentication procedure, the agent takes an action. In some embodiments, the action is to generate a fraud alert. In some embodiments, the action is to take a countermeasure, such as, for example, to block, delay, rate-limit, or quarantine access to the access network by end-user device 100. In some embodiments, the action is to provide a notification to a user of end-user device 100. In some embodiments, the action is to send a message to service controller 122.

In some embodiments, an agent on end-user device 100 (e.g., policy implementation agent 1690, policy control agent 1692, access control integrity agent 1694, or any other agent that can perform verification functions) determines whether the end-user device has been "rooted" or "jailbroken." As will be appreciated by a person having ordinary skill in the art, rooting (or "jailbreaking") is a process that allows a user of a mobile device to attain privileged access (known as "root access") to the device's operating system, thereby potentially circumventing various limitations that might otherwise govern operation of the device. In some embodiments, if the agent determines that end-user device 100 has been rooted or jailbroken, the agent takes an action. In some embodiments, the action is to generate a fraud alert. In some embodiments, the action is to take a countermeasure, such as, for example, to block, delay, rate-limit, or quarantine access to the access network by end-user device 100. In some embodiments, the action is to provide a notification to a user of end-user device 100. In some embodiments, the action is to send a message to service controller 122.

In embodiments in which service processor 115 applies an access network policy that includes classification of attempted or successful service usage attributed to a device software application program, the identification of the software application program and association of the access network policy to the software application program comprises associating the access network policy with a known-application credential. In some embodiments, the credential is a name identifier. In some embodiments, the credential is a secure signature, certificate, or hash of the software application program. In some embodiments, the credential is stored on end-user device 100 by service processor 115 (for example, by policy control agent 1692), and service processor 115 and/or a device operating system (OS) obtains a run-time application credential for an application that intends to initiate execution and obtain access network service or has successfully initiated execution and obtained access network service usage. Policy control agent 1692 compares the run-time credential to the stored known-application credential, and if there is a credential match the access network policy associated with the known-application credential is applied to the application access network service usage.

In some embodiments, the known-application credential is stored on end-user device 100 and used for the comparison with the run-time application credential. In some embodiments, the run-time application credential is provided to an element of service controller 122 (for example, policy management server 1652) that in turn determines if it matches a known-application credential and, if so, the element of service controller 122 provides the appropriate policy to service processor 115 (e.g., using gateway application server 138). In some embodiments, service processor 115 performs an application identity check on the run-time software program (for example, a secure hash, a secure hash based on a key provided by an element of service controller 122, or a signature check), and the result of this identity check is provided to the element of service controller 122, which in turn determines if it matches a known-application credential; if so, the element of service controller 122 provides the appropriate policy to service processor 115.

In some embodiments, if service processor 115 determines that a run-time application credential is intended, or may indicate an attempt, to spoof a known-application credential, a fraud action is taken. In some embodiments, if service controller 122 determines that a run-time application credential is intended, or may indicate an attempt, to spoof a known-application credential, a fraud action is taken. In some embodiments, the fraud action comprises restricting access to an access network for end-user device 100. In some embodiments, the fraud action comprises restricting an application's ability to communicate over an access network. In some embodiments, the fraud action comprises notifying a user of end-user device 100. In some embodiments, the fraud action comprises notifying a network administrator. In some embodiments, the fraud action comprises applying a pre-determined billing rate for service usage by end-user device 100. In some embodiments, the fraud action comprises applying a pre-determined billing rate for run-time application service usage by end-user device 100.

Figure 31:
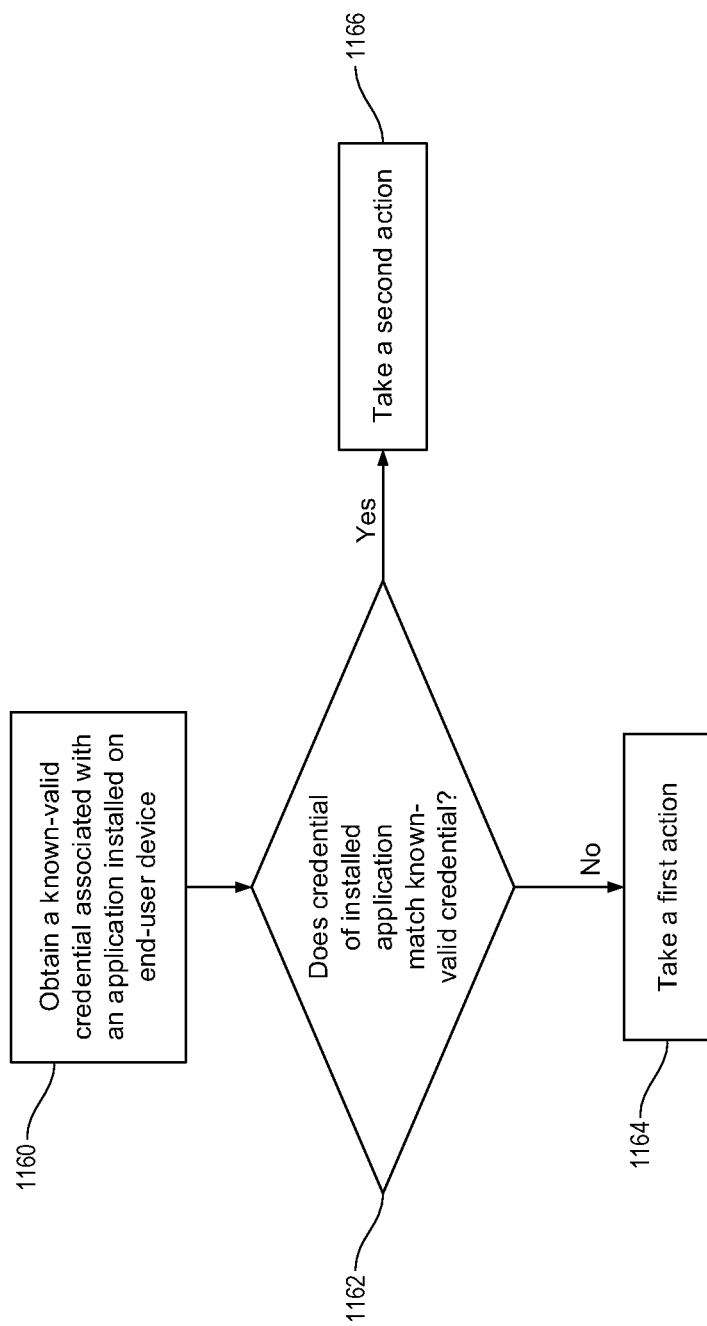
FIG. 31 illustrates an example embodiment of a procedure that an end-user device can use to validate that an application installed on the end-user device is authentic.

FIG. 31 illustrates an example embodiment of a procedure that an end-user device, such as end-user device 100, can use to validate that an application installed on the end-user device is authentic. The application installed on the end-user device is associated with a credential that is stored in memory on the end-user device (e.g., application credential and policy store 810 of FIG. 38). The credential may be any type of credential, such as, for example, a certificate, a key, a shared secret, a password, a hash, or a shared algorithm. At step 1160, the end-user device obtains a known-valid credential associated with the application that is installed on the end-user device. The known-valid credential may be any type of credential, such as, for example, a certificate, a key, a shared secret, a password, a hash, or a shared algorithm. In some embodiments, the end-user device obtains the known-valid credential from a trusted source. In some embodiments, the trusted source is the service controller. In some embodiments, the trusted source is a marketplace, an app store, an application author, a distributor, or a reseller. At step 1162, the end-user device determines whether the known-valid credential matches the credential of the installed application. If the credentials do not match, then in some embodiments the end-user device takes a first action at step 1164. In some embodiments, the first action is to generate a fraud alert. In some embodiments, the first action is to apply an unknown-application policy. In some embodiments, the first action is to notify a user of the end-user device. In some embodiments, the first action is to take a countermeasure, such as, for example, preventing a user from accessing the installed application, preventing the installed application from executing, or terminating the installed application (if it is running). In some embodiments, the first action is to send a notification to a network element.

If, in step 1162, the credentials match, the end-user device takes a second action at step 1166. In some embodiments, the second action is to apply a policy associated with the installed application. In some embodiments, the second action is to send a message to a server indicating that the end-user device is in a healthy state.

Figures 32, 33:
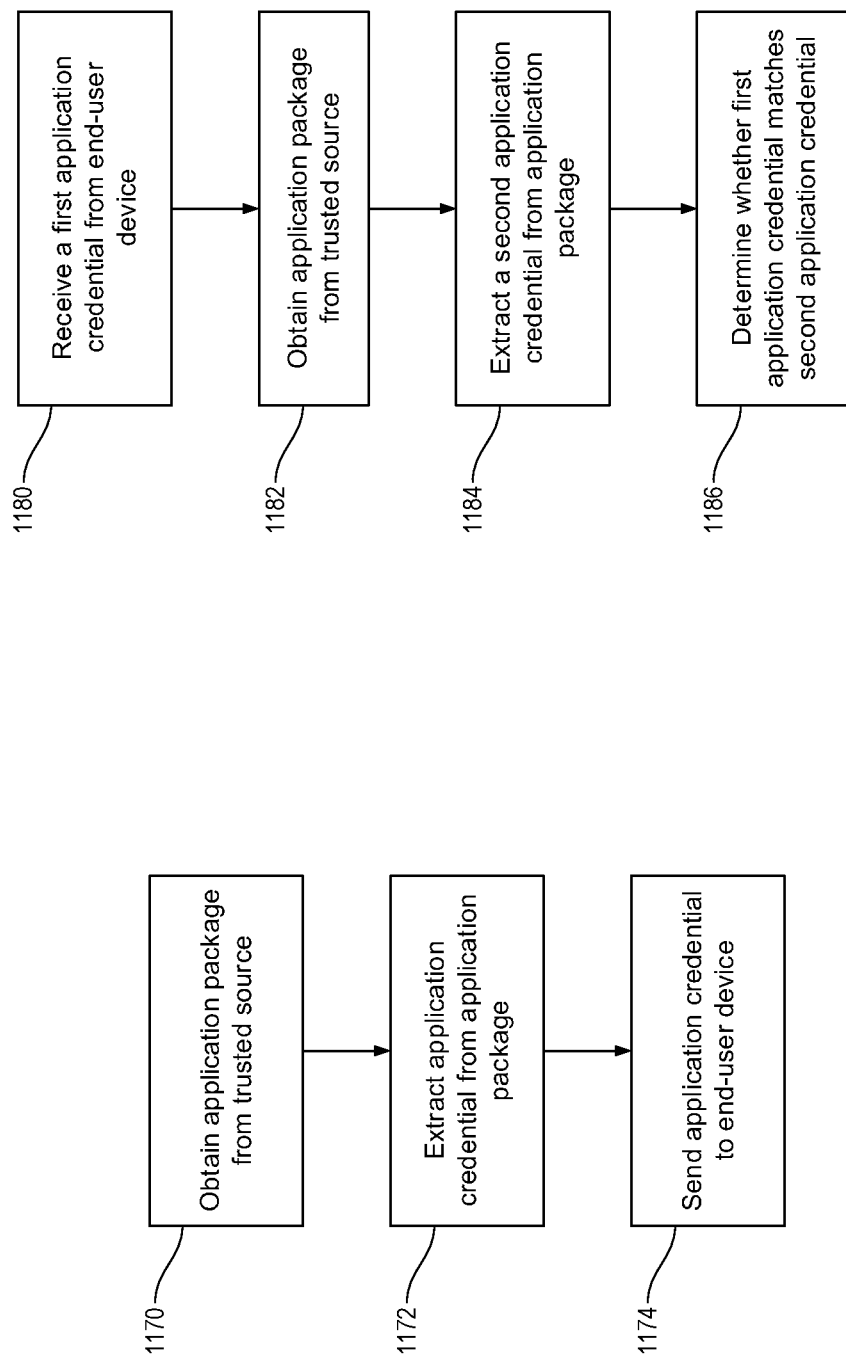
FIG. 32 illustrates an example embodiment of a procedure that a service controller can use to validate that an application installed on an end-user device is authentic.
FIG. 33 illustrates an example embodiment of a procedure that a service controller can use to validate that an application installed on an end-user device is authentic.

FIG. 32 illustrates an example embodiment of a procedure that a service controller can use to validate that an application installed on an end-user device is authentic. At step 1170, the service controller obtains an application package from a trusted source. In some embodiments, the trusted source is a marketplace, an app store, an application author, a distributor, or a reseller. In some embodiments, the service controller obtains the application package in response to a request from the end-user device. At step 1172, the service controller extracts an application credential from the application package. The credential may be any type of credential, such as, for example, a certificate, a key, a shared secret, a password, a hash, or a shared algorithm. At step 1174, the service controller sends the application credential to the end-user device. In some embodiments, the service controller later receives a status message from the end-user device after sending the application credential to the end-user device.

FIG. 33 illustrates an example embodiment of another procedure that a service controller may use to validate that an application installed on an end-user device is authentic. At step 1180, the service controller receives a first application credential from the end-user device. The credential may be any type of credential, such as, for example, a certificate, a key, a shared secret, a password, a hash, or a shared algorithm. At step 1182, the service controller obtains an application package from a trusted source. In some embodiments, the trusted source is a marketplace, an app store, an application author, a distributor, or a reseller. At step 1184, the service controller extracts a second application credential from the application package. At step 1186, the service controller determines whether the first application credential matches the second application credential. In some embodiments, if the credentials do not match, the service controller is configured to take an action (e.g., send a message to the end-user device, generate a fraud alert, send a message to the carrier, etc.).

FIG. 34 illustrates an example embodiment of another procedure that an end-user device may use to validate that an application installed on the end-user device is authentic. At step 1190, the end-user device obtains a credential associated with an installed application. The credential may be any type of credential, such as, for example, a certificate, a key, a shared secret, a password, a hash, or a shared algorithm. At step 1192, the end-user device generates a signed application credential using the installed-application credential and a device credential stored in local memory. The device credential may be any type of credential, such as, for example, a certificate, a key, a shared secret, a password, a hash, or a shared algorithm. At step 1194, the end-user device sends the signed application credential to the service controller. At step 1196, the end-user device receives a message from the service controller regarding the authenticity of the installed application. In some embodiments, the message comprises, or is followed by a message with, instructions to take an action, such as, for example, to block the installed application from accessing the access network.

FIG. 35 illustrates an example embodiment of another procedure that a service controller may use to validate that an application installed on an end-user device is authentic. At step 1200, the service controller receives a signed application credential comprising an installed-application credential and a device credential from the end-user device. The device credential may be any type of credential, such as, for example, a certificate, a key, a shared secret, a password, a hash, or a shared algorithm. In some embodiments, the signed application credential comprises a combination of the installed-application credential and the device credential (e.g., a hash). At step 1202, the service controller uses the device credential to process the signed application credential to obtain a first application credential. At step 1204, the service controller obtains a second application credential from a trusted source. In some embodiments, the service controller obtains an application package from the trusted source and extracts the second credential from the application package. In some embodiments, the trusted source is a marketplace, an app store, an application author, a distributor, or a reseller. At step 1206, the service controller determines whether the first application credential matches the second application credential. In some embodiments, if the first application credential does not match the second application credential, the service controller takes an action (e.g., sends a message to the end-user device, generates a fraud alert, sends a message to the carrier, etc.).

Figures 36, 37:
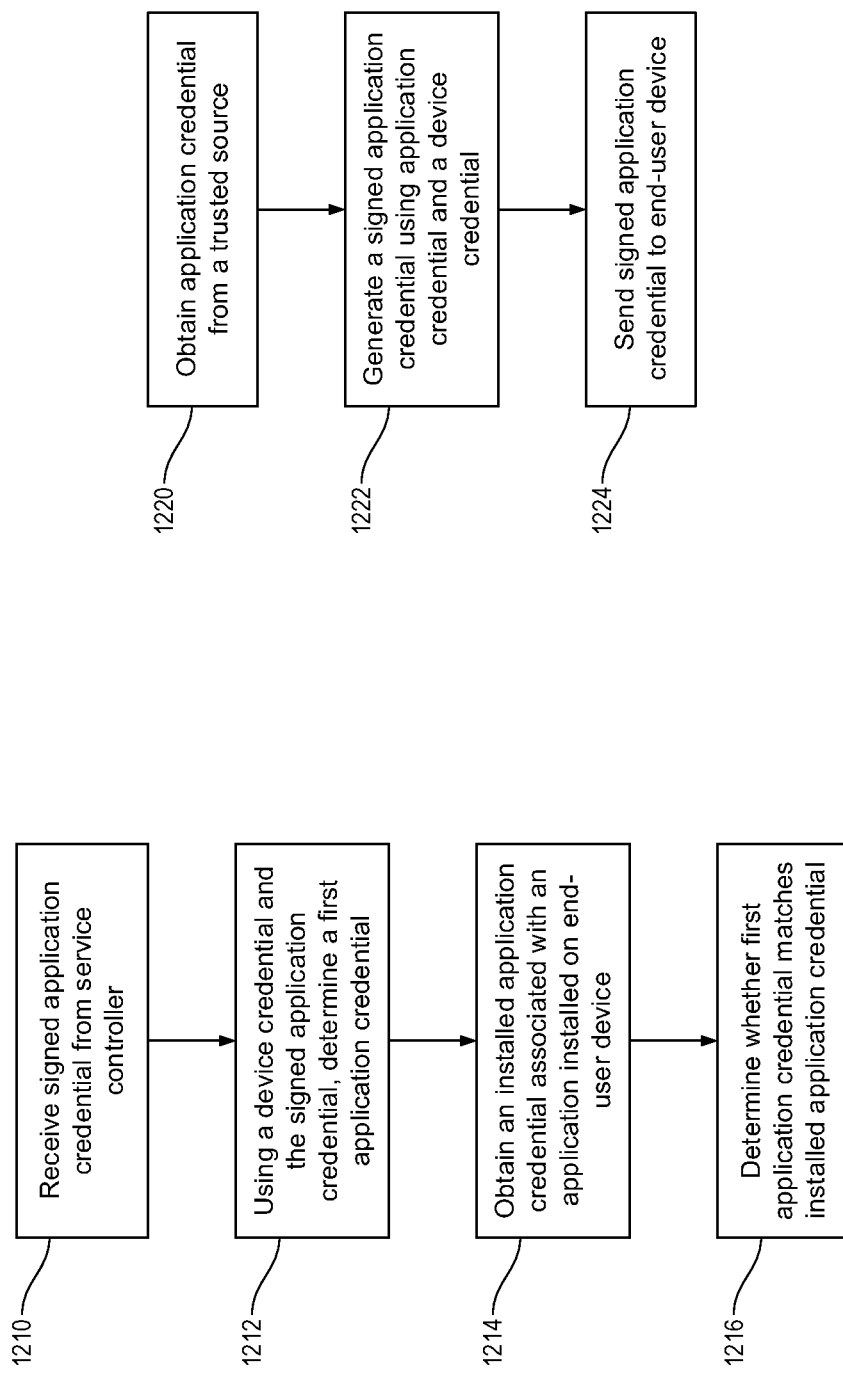
FIG. 36 illustrates an example embodiment of a procedure that an end-user device can use to validate that an application installed on the end-user device is authentic.
FIG. 37 illustrates an example embodiment of a procedure that a service controller can use to validate that an application installed on an end-user device is authentic.

FIG. 36 illustrates an example embodiment of another procedure that an end-user device may use to validate that an application installed on the end-user device is authentic. At step 1210, the end-user device receives a signed application credential from the service controller. The credential may be any type of credential, such as, for example, a certificate, a key, a shared secret, a password, a hash, or a shared algorithm. At step 1212, the end-user device uses a device credential, stored in local memory, and the signed application credential to determine a first application credential. At step 1214, the end-user device obtains an installed-application credential that is associated with an application installed on the end-user device. The credential may be any type of credential, such as, for example, a certificate, a key, a shared secret, a password, a hash, or a shared algorithm. At step 1216, the end-user device determines whether the first application credential matches the installed-application credential. In some embodiments, if the first application credential does not match the installed-application credential, the end-user device takes an action (e.g., sends a message to the service controller, blocks the application from accessing the access network, executes instructions set by a control, charging, or notification policy, etc.). In some embodiments, the end-user device sends a message to the service controller to provide information about the authenticity of the application installed on the end-user device.

FIG. 37 illustrates an example embodiment of another procedure that a service controller may use to validate that an application installed on an end-user device is authentic. At step 1220, the service controller obtains an application credential from a trusted source, wherein the application credential is associated with the installed application. The application credential may be any type of credential, such as, for example, a certificate, a key, a shared secret, a password, a hash, or a shared algorithm. In some embodiments, the trusted source is a marketplace, an app store, an application author, a distributor, or a reseller. At step 1222, the service controller generates a signed application credential using the application credential and a device credential stored in local memory. In some embodiments, local memory is database cluster 116. In some embodiments, the device credential is a certificate, a key, a shared secret, a password, a hash, or a shared algorithm. At step 1224, the service controller sends the signed application credential to the end-user device. In some embodiments, after sending the signed application credential to the end-user device, the service controller receives a message from the end-user device providing information about the authenticity of the application installed on the end-user device.

Figure 38:
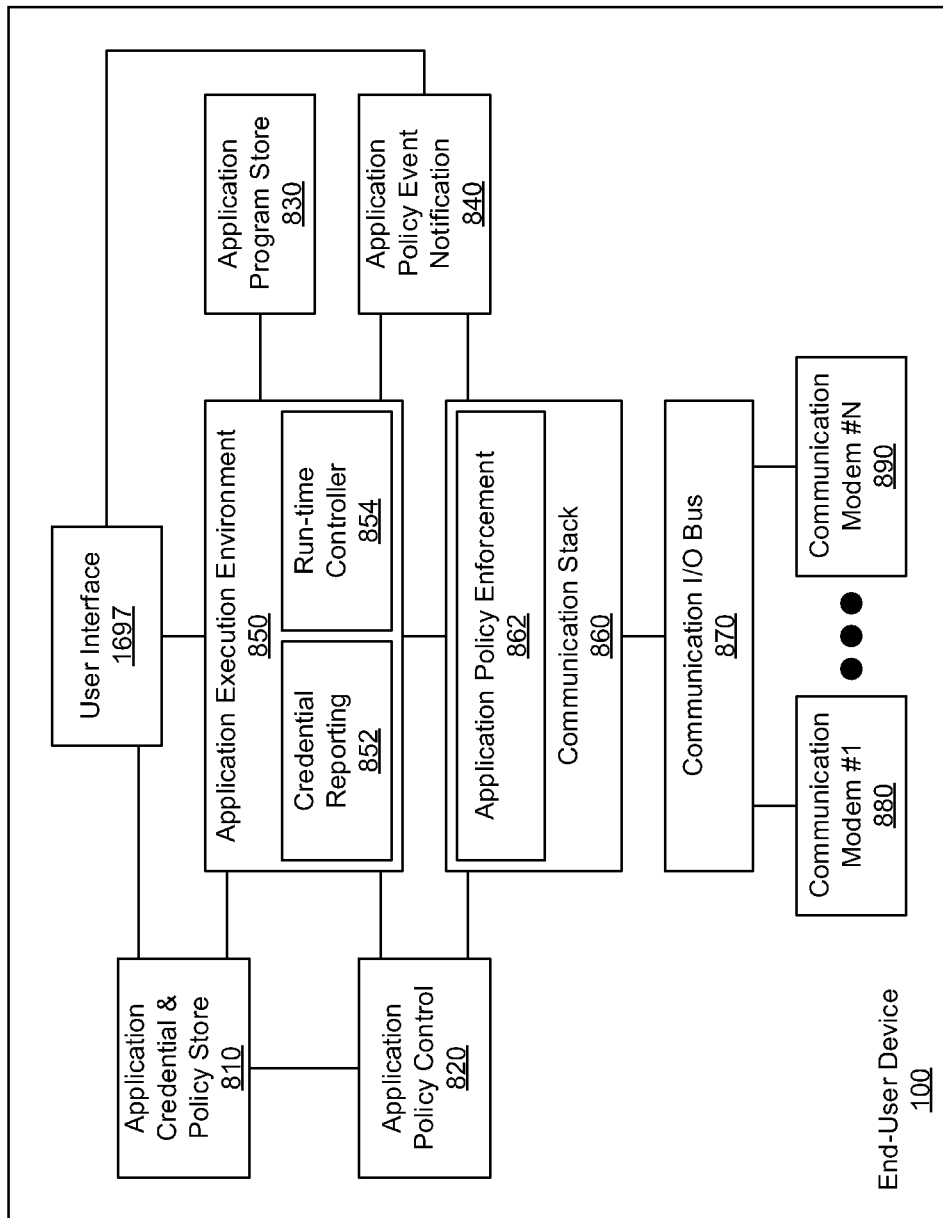
FIG. 38 illustrates an example embodiment of an end-user device for implementing access network policy specific to a device application program.

FIG. 38 illustrates an example embodiment of end-user device 100 for implementing access network policy specific to a device application program. In the embodiment of FIG. 38, end-user device 100 includes communication modem 880, memory that includes application program store 830 and application credential and policy store 810, application execution environment 850, and application policy control 820. Communication modem 880 enables end-user device 100 to communicate over at least a first access network. Application program store 830 stores a run-time application program. Application credential and policy store 810 stores a known-application credential associated with a known application program and a known application access network policy associated with the known-application credential. In some embodiments, the run-time application credential is stored with the run-time application program. In some embodiments, the known-application credential is a security certificate, signature, or hash for the known application program. In some embodiments, end-user device 100 is further configured to obtain the known-application credential from a network element by way of a secure data connection between end-user device 100 and the network element.

Application execution environment 850 retrieves the run-time application program from memory and executes it, determines a run-time application credential associated with the run-time application program, and associates the run-time application credential with a run-time communication activity comprising a run-time application program's use of or intended use of the first access network. Application policy control 820 receives the run-time application credential, receives information associated with the run-time application communication activity, and determines whether the run-time application credential matches the known-application credential. If so, application policy control 820 causes the known application access network policy to be applied to the run-time application communication activity.

In some embodiments, end-user device 100 is further configured to provide the run-time application credential to a network element by way of a secure data connection between end-user device 100 and the network element. In some embodiments, end-user device 100 is further configured to receive information from the network element indicating the validity of the run-time application credential. In some embodiments, end-user device 100 is further configured to receive the information about the application policy from the network element by way of a secure data connection between end-user device 100 and the network element.

In some embodiments, end-user device 100 protects particular elements (e.g., software) from unauthorized user modification or unauthorized application program modification. For example, in some embodiments, end-user device 100 stores the known-application credential and the known application access network policy in a secure location. In some embodiments, end-user device 100 performs various functions, such as: determining the run-time application credential associated with the run-time application program (e.g., the credential-reporting element in the application execution environment); associating the run-time application credential with the run-time application communication activity (e.g., the credential-reporting element in the application execution environment); receiving the run-time application credential (e.g., application policy control 820); receiving information indicating the run-time application communication activity (e.g., the application policy control 820); determining if the run-time application credential matches the known-application credential (e.g., the application policy control 820); causing the known application access network policy to be applied to the run-time application communication activity (e.g., application policy control 820 instructing either the run-time controller element of the application execution environment 850 or the application policy enforcement element in the communications stack 860).

In some embodiments, the run-time application communication activity is an attempted access or successful access to access network 10 by the run-time application program, and the known application access network policy specifies allowing the access, blocking the access, limiting the access, or accounting for the access.

In some embodiments, the run-time application communication activity is an attempted access or successful access to an access network by the run-time application program, and the known application access network policy specifies a usage notification policy for notifying the user of the attempted or successful access. In some embodiments, the usage notification policy is configured to present to a user through user interface 1697 an access network service usage breakdown showing the service usage for the run-time application program. In some embodiments, the usage breakdown includes a breakdown by application. In some embodiments, the usage breakdown includes a breakdown by network type. In some embodiments, the usage breakdown includes a breakdown by both application and network type. In some embodiments, the usage breakdown includes a breakdown by network type. In some embodiments, the usage breakdown includes a roaming network breakdown. In some embodiments, the usage breakdown includes a breakdown by roaming network usage and by application.

In some embodiments, the usage notification policy is configured to present to a user through user interface 1697 a warning of the potential rate of service usage for the known application program. In some embodiments, the usage notification policy is configured to present to a user through user interface 1697 an offer to purchase service for the run-time application program. In some embodiments, the usage notification policy is configured to present to a user through user interface 1697 an indication of how much of a service allowance allocated to the known application program has been used or is remaining to be used.

In some embodiments, the run-time application communication activity is an attempt to execute or successful execution of the run-time application program, and the known application access network policy specifies allowing execution of the run-time application program, blocking execution of the run-time application program, or notifying the user of the attempted or successful execution.

In some embodiments, end-user device 100 is further configured with second access modem 890 to communicate with a second access network, and the run-time application communication activity comprises a run-time application program's use of or attempted use of the first access network or the second access network. In some embodiments, the known application access network policy settings or instructions differ based on whether end-user device 100 is connected to the first access network or to the second access network.

In some embodiments, user interface 1697 provides a user of end-user device 100 with input capability to modify access network service according to user preference and to receive access network service notifications. In some embodiments, user interface 1697 accepts user inputs for modifying access network policy, such as limiting access by one or more applications or access to one or more network destinations. In some embodiments, user interface 1697 accepts user inputs for choosing or modifying a service plan.

In some embodiments, at least an aspect of the known application access network policy is entered by a device user through user interface 1697. In some embodiments, at least an aspect of the known application access network policy is obtained from a network element.

In some embodiments, the memory is further configured to store an unknown application access network policy to be applied to the run-time application communication activity when the run-time application credential does not match the known-application credential. In some such embodiments, the application policy decision agent is further configured to determine if the run-time application credential does not match the known-application credential, and, if the run-time application credential does not match the known-application credential, cause the unknown application access network policy to be applied to the run-time application communication activity.

In some embodiments, end-user device 100 further comprises a policy enforcement agent (e.g., either a run-time controller element of application execution environment 850 or application policy enforcement element 862 in communications stack 860) configured to apply the known application access network policy to the run-time application communication activity and to cause the known application access network policy to be applied to the run-time application communication activity. In some embodiments, the known application access network policy is applied to the run-time application communication activity by providing an instruction to the policy enforcement agent. In some embodiments, the policy enforcement agent (e.g., the run-time controller element of application execution environment 850 or application policy enforcement element 862 in communications stack 860) applies the known application access network policy at the application layer of a device operating system. In some embodiments, the policy enforcement agent applies the known application access network policy at the library or framework layer of a device operating system. In some embodiments, the policy enforcement agent applies the known application access network policy by interacting with communications stack 860 or modifying communications stack traffic flows. In some embodiments, the policy enforcement agent applies the known application access network policy at the kernel or low level OS layer of an operating system of end-user device 100.

Figure 39:
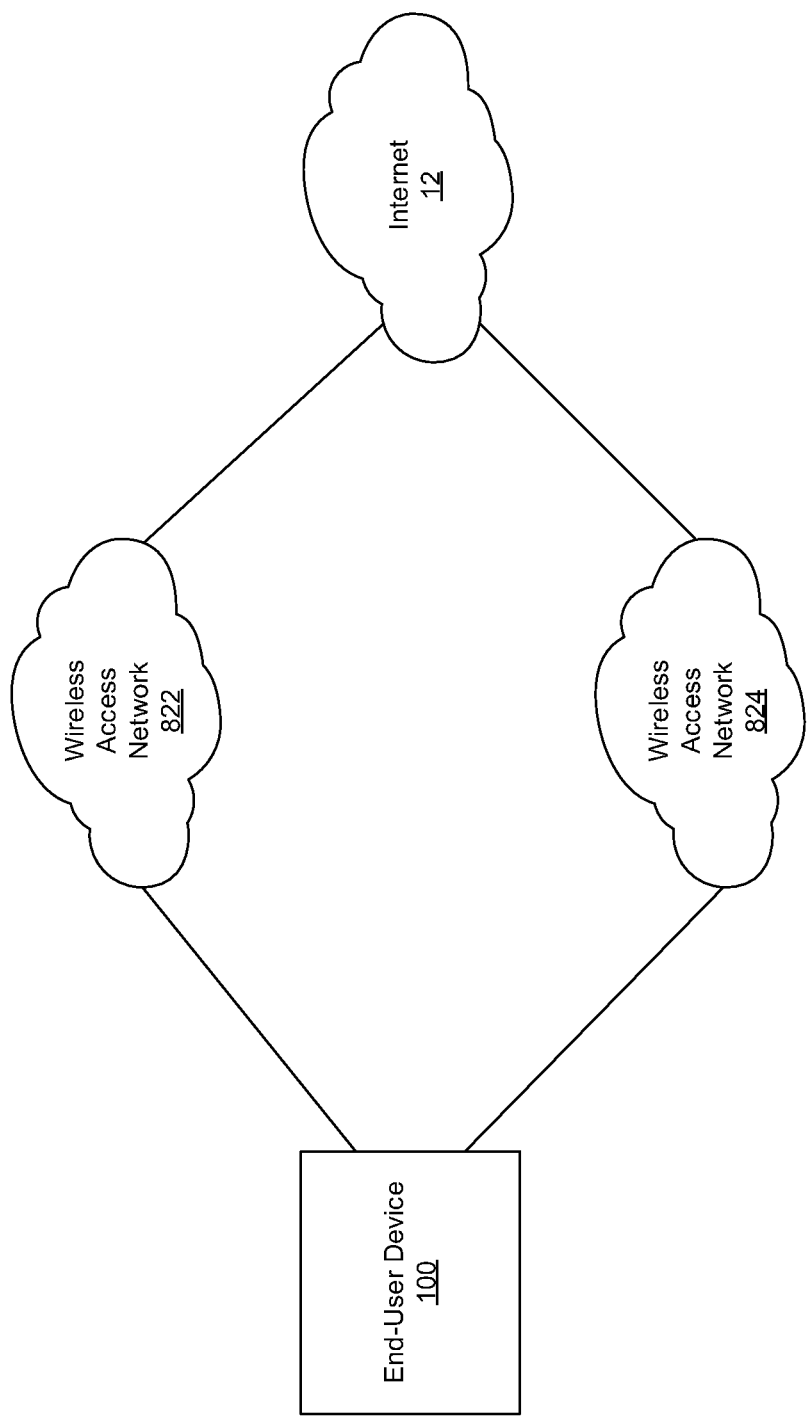
FIG. 39 illustrates an example embodiment wherein an end-user device is capable of connecting to the Internet through more than one access network.

FIG. 39 illustrates an example embodiment wherein end-user device 100 is capable of connecting to Internet 12 through more than one access network (e.g., wireless access network 822 and wireless access network 824). In some embodiments, end-user device 100 is further configured with a second access modem to enable end-user device 100 to communicate over a second access network, and the run-time application communication activity includes a run-time application program's use of or intended use of the first access network or the second access network, and the usage notification policy is configured to provide a user notification that is dependent on which network end-user device 100 is connected to.

End-User Device Agent Verification

It may be advantageous in some embodiments to validate particular agents on the end-user device that assist in the provisioning and/or management of device-assisted services. In some embodiments, end-user device 100 includes one or more verification agents that may be used to validate one or more device-assisted services agents. There are many possible device-assisted agents that may be verified, such as, for example: a usage reporting agent (e.g., an agent that reports aggregate or finer (e.g., per-service or classification) measures of access network usage by the end-user device), a usage counting agent (e.g., an agent that reports counts of access network usage by the end-user device), a policy enforcement agent, a notification agent, a policy decision agent, a network state agent, a kernel communication agent, a user interface agent, a persistence agent (e.g., an agent that reads or writes from a data store, such as a local memory), a plan catalog agent, a service controller communication agent, a tethering detection agent, a time-of-day agent (e.g., an agent that manages a policy based on time of day), a kernel agent, or an analytics agent. Examples of agents are shown in FIG. 2 and other figures and are described herein.

There are a number of ways in which the verification agent can validate a device-assisted services agent, including, for example: by performing a hash operation, by performing a checksum operation, by determining whether a digital signature is valid, by performing a fingerprint, by generating a random challenge and checking a response by the device-assisted services agent to the challenge, by extracting features from the agent for analysis by an artificial intelligence element (e.g., a support vector machine, a hidden Markov model, a decision tree, or a decision forest), etc. In some embodiments, the verification agent sends a verification message to the service controller with information about the results of the verification operation. In some embodiments, the verification message contains information about the integrity status of one or more of the device-assisted services agents. In some embodiments, the verification message comprises a hash, where the hash is the result of one or more of: a hash operation on a kernel component, a hash operation on a system component, a hash operation on an application. In some embodiments, the verification message comprises a hash that is a combination of two or more hashes. In some embodiments, the verification message comprises a salted hash. In some embodiments, the end-user device receives a verification result from the service controller. In some embodiments, the end-user device takes an action based on the verification result (e.g., blocks, allows, rate-limits, or delays an access to the access network by the end-user device; quarantines the end-user device; provides a notification to a user of the end-user device; heals a device-assisted services agent; etc.).

Figure 40:
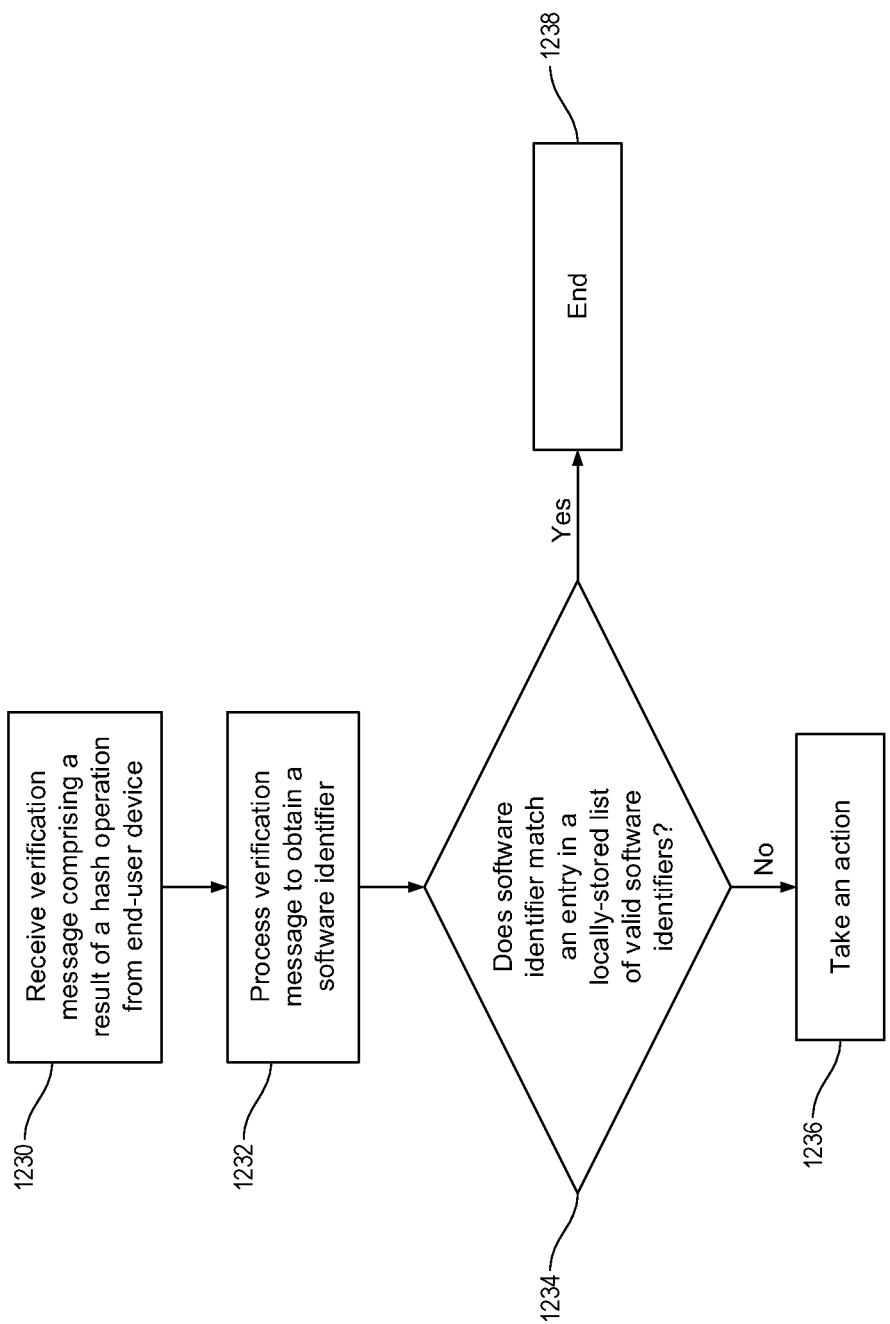
FIG. 40 illustrates an example embodiment of a procedure that a service controller may use to verify a software component on an end-user device based on a verification message from the end-user device.

FIG. 40 illustrates an example embodiment of a procedure that a service controller may use to verify a software component on an end-user device based on a verification message from the end-user device. At step 1230, the service controller receives a verification message from the end-user device. In some embodiments, the verification message comprises the result of a hash operation performed by the end-user device. At step 1232, the service controller processes the verification message to obtain a software identifier. In some embodiments, the software identifier is a credential, such as a program identifier, a name, a signature, a certificate, a hash, or any other identifier that uniquely identifies the software. At step 1234, the service controller determines whether the software identifier matches an entry in a locally-stored list of valid software identifiers. If the software identifier matches an entry in the locally-stored list of valid software identifiers, the process ends at step 1238, or, in some embodiments, the service controller takes an action (e.g., sends a message to the carrier, sends a message to the end-user device, initiates a notification to a user of the end-user device, etc.). If the software identifier does not match an entry in a locally-stored list of valid software identifiers, then at step 1236 the service controller takes an action (e.g., generates a fraud event, takes a countermeasure such as, for example, blocking the end-user device from the access network, notifies the carrier, sends a message to the end-user device, etc.).

In some embodiments, one or more agents on end-user device 100 comprise software components that are associated with installed-agent credentials. In some such embodiments, an agent associated with an installed-agent credential cannot be modified, updated, or replaced unless the software purporting to be a modification, update, or replacement is associated with a credential that matches the installed-agent credential. An installed-agent credential may comprise an agent kernel software being present with a proper signature, certificate, or hash result; an agent framework software being present with a proper signature, certificate, or hash result; or an agent application software being present with a proper signature, certificate, or hash result.

Fraud Detection and Mitigation

In some embodiments, service controller 122 (using, e.g., fraud server 129) is configured to detect fraudulent, or potentially fraudulent, activities by end-user device 100. There are several ways service controller 122 can detect fraud, including, for example, by observing whether service processor 115 exhibits expected behavior; by determining whether device-generated usage reports indicate fraudulent use of the access network resources; by examining the contents of trusted reports (e.g., reports from a trusted or secure source) of end-user device 100's data usage; by comparing contents of non-secure device-based usage reports to contents of trusted usage reports; by comparing end-user device 100's usage to expected usage based on population statistics; by detecting SIM card irregularities that may indicate attempts to steal sponsored services. In some embodiments, service controller 122 obtains a trusted measure of end-user device 100's service usage and uses the trusted measure, alone or in combination with another measure, to determine whether end-user device is properly implementing a policy that should be in place.

In some embodiments, service controller 122 applies a policy error detection procedure to generate a fraud score, wherein the fraud score indicates a level of confidence or a likelihood that the analyzed activity or set of activities is fraudulent. In some embodiments, service controller 122 (using, e.g., fraud server 129) determines whether data usage by end-user device 100 is fraudulent by using what may be called a "layered" or "tiered" approach. In some such embodiments, service controller applies at least two tests to determine whether end-user device 100 is behaving fraudulently. In some such embodiments, a trusted service policy implementation is verified by service controller 122 by performing at least two of the following operations in conjunction with a multi-step service usage analysis procedure: (a) comparing a trusted access network usage records with the usage limitations expected to be in place if the service policy is being properly implemented, (b) comparing a trusted service usage measure to a non-secure (e.g., device-generated) service processor-based service usage measure, (c) comparing a first device service processor service usage measure against a second device service processor service usage measure, and (d) comparing a device service usage measure against a population statistic for the device-based service usage measure.

Figure 41:
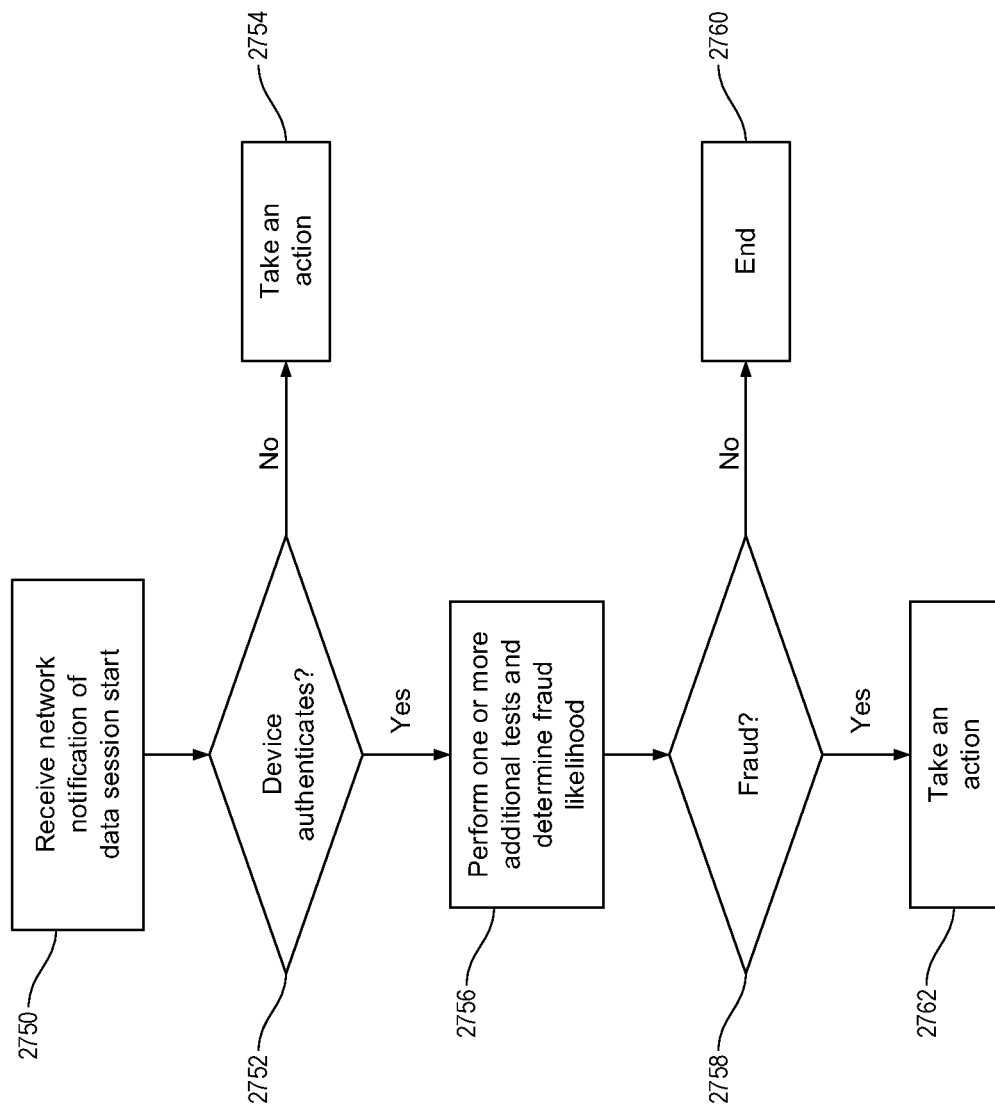
FIG. 41 illustrates an example embodiment of a layered approach that a service controller can use to assess the likelihood that an end-user device is behaving fraudulently.

FIG. 41 illustrates an example embodiment of a layered approach that service controller 122 (or another suitable network element) can use to assess the likelihood that end-user device 100 (e.g., service processor 115) is behaving fraudulently. At step 2750, service controller 122 receives a notification from a network element that a data session has started. The notification may be, for example, a "GPRS attach" message from SGSN 2230, or a "data session started" message from GGSN 2240, AAA or RADIUS 2242, or API 2244 (or OCS 2246), etc. Service controller 122 sets a timer or waits for some amount of time for service processor 115 to authenticate. If service processor 115 fails to start or complete the authentication procedure at step 2752, then at step 2754, service controller 122 takes an action. The action may be, for example, one or more of the following: generate a fraud alert, notify a user of end-user device 100, notify a network element, notify a network administrator, block end-user device 100 from accessing access network 10, block an application on end-user device 100 from accessing access network 10, direct the device to a quarantine network status in which end-user device 100 can, for example, only access functions generally controlled by the access network service provider or the central service provider, etc. If service processor 115 successfully completes the authentication procedure at step 2752, then at step 2756, service controller 122 performs one or more additional fraud tests. At step 2758, service controller determines whether the results of the tests indicate that end-user device 100 is behaving fraudulently. If the results do not indicate that end-user device 100 is behaving fraudulently, then the process ends at step 2760. If the results do indicate that end-user device 100 is behaving fraudulently, then at step 2762, service controller 122 takes an action, such as generating a fraud alert, notifying a user of end-user device 100, notifying a network element, notifying a network administrator, blocking end-user device 100 from accessing access network 10, blocking an application from accessing access network 10, directing the device to a quarantine network status in which end-user device 100 can, for example, only access functions generally controlled by the access network service provider or the central service provider, etc.

Figure 42:
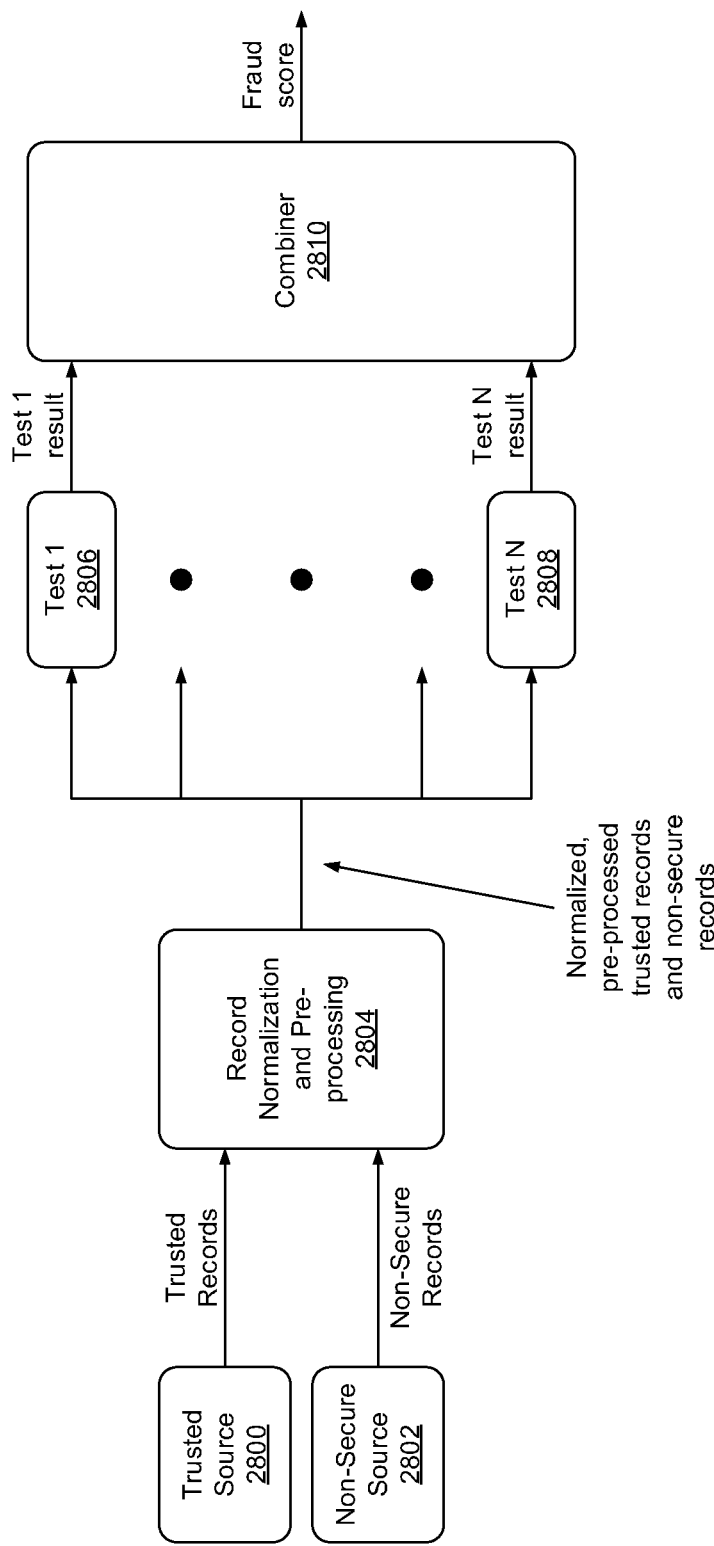
FIG. 42 illustrates a layered approach to fraud detection in accordance with some embodiments.

FIG. 42 illustrates a layered approach to fraud detection in accordance with some embodiments. Trusted source 2800 (e.g., a network element, a secure DDR processor on end-user device 100, a third-party, etc.) generates trusted records. In some embodiments, the trusted records include service usage records. In some embodiments, the trusted records also (or instead) include information from trusted source 2800 about the behavior of end-user device 100 (e.g., whether service processor 115 successfully authenticated with service controller 122, whether service processor 115 is sending reports or other communications to service controller 122 in an expected manner, whether end-user device 100's usage of one or more classes (e.g., an application, a group of applications, a network destination, a group of network destinations, etc.) is consistently slightly under particular limits that would indicate likely fraud on the part of end-user device 100, etc.). Non-secure source 2802 (e.g., service processor 115 on end-user device 100) generates non-secure records. Trusted source 2800 and non-secure source 2802 send records to record normalization and pre-processing 2804. In some embodiments, trusted source 2800 and non-secure source 2802 send records to record normalization and pre-processing 2804 at regular intervals. In some embodiments, record normalization and pre-processing 2804 or another element of service controller 122 requests records from trusted source 2800 and non-secure source 2802. Record normalization and pre-processing 2804 time-normalizes and pre-processes the trusted and non-secure records, putting the records into a uniform format. The normalized, pre-processed trusted records and the normalized, pre-processed non-secure records then serve as inputs to a set of N tests, where N is greater than or equal to two. Test 1 2806 and Test N 2808 are illustrated in FIG. 42. Each of the N tests outputs a test result that provides an indication of fraud likelihood. The results are inputs to combiner 2810, which processes the test results to generate a fraud score.

In some embodiments, service controller 122 applies at least two tests, and combiner 2810 generates a fraud score based on the results of the at least two tests. In some embodiments, service controller 122 applies one or more of the following tests to determine the fraud score: (a) determining if service processor 115 is failing to send non-trusted (e.g., device-based) service usage reports even though service controller 122 is receiving trusted reports of end-user device 100's service usage (b) comparing a trusted service usage measure to a limit or range of usage expected if end-user device 100 is properly implementing a service policy that should be in place; (c) comparing a trusted service usage measure to a non-secure (e.g., device-based) usage measure to determine if the difference between the two usage measures is within a specified tolerance; (d) comparing a non-secure (e.g., device-based) service usage measure to a limit or range of usage expected if end-user device 100 is properly implementing a service policy that should be in place; (e) comparing a classification of end-user device 100 usage to a limit or range of usage expected if end-user device 100 is properly implementing a service policy that should be in place; (f) comparing an aggregation of two or more classifications of end-user device 100 usage to an aggregate limit on usage to determine if the difference between the two measures is within a specified tolerance; (g) comparing a trusted measure of usage of a class (e.g., an application, a group of applications, a network destination, a group of network destinations, etc.) to a limit or range of usage expected if end-user device 100 is properly implementing a service policy that should be in place; (h) comparing a trusted measure of usage of a class (e.g., an application, a group of applications, a network destination, a group of network destinations, etc.) to a non-secure (e.g., device-based) measure of usage of the same class to determine if the difference between the two measures is within a specified tolerance; (i) comparing a statistical characterization of usage by a population of end-user devices to a trusted measure of end-user device 100's service usage to determine if the difference between the two measures is within a specified tolerance; (j) comparing a statistical characterization of usage of a particular class (e.g., an application, a group of applications, a network destination, a group of network destinations, etc.) by a population of end-user devices to a trusted measure of end-user device 100's usage of that same class to determine if the difference between the two measures is within a specified tolerance; (k) comparing a statistical characterization of usage by a population of end-user devices to a non-secure measure of end-user device 100's service usage to determine if the difference between the two measures is within a specified tolerance; (l) comparing a statistical characterization of usage of a class (e.g., an application, a group of applications, a network destination, a group of network destinations, etc.) to a non-secure (e.g., device-based) measure of usage of the same class to determine if the difference between the two measures is within a specified tolerance; (m) comparing detailed class (e.g., an application, a group of applications, a network destination, a group of network destinations, etc.) usage information in a usage report (trusted or non-secure) to determine whether a policy that should be in place allows the classified activity; (n) determining whether service processor 115 successfully authenticated with service controller 122; (o) determining whether service processor 115 is reporting (e.g., sending heartbeat messages, device reports, etc.) to service controller 122 in an expected manner; (p)

determining whether usage of one or more classes (e.g., an application, a group of applications, a network destination, a group of network destinations, etc.) is consistently slightly under particular limits that would indicate likely fraud on the part of end-user device 100; (q) comparing an amount or percentage of unknown or unclassified data usage allocated by service processor 115 to a particular class to an expected amount or percentage of unknown or unclassified data usage, where the expected amount or percentage is determined using information from a trusted source (e.g., a web crawler, domain object model, etc.).

The outputs of the N tests may be pass/fail indicators or values (e.g., integer, binary, real numbers, etc.). In some embodiments in which the outputs of the N tests are pass/fail indicators, combiner 2810 determines a fraud score of "pass" or "fail" (e.g., combiner 2810 generates one fraud score (e.g., a discrete value such as 0) if the result is "pass" and a different fraud score (e.g., a different discrete value such as 1) if the result is "fail"). In some embodiments, the fraud score is "pass" if each of the N individual test results indicates the associated test was passed. In some embodiments, the fraud score is "fail" if at least one of the N individual test results indicates that the associated test was failed. In some embodiments, the fraud score is "pass" if at least M individual test results indicate the associated tests were passed, where M is less than N. In some embodiments, the fraud score is "fail" if M or more individual test results indicate the associated tests were failed. As will be appreciated by a person having ordinary skill in the art in view of the disclosures herein, there are many other ways to combine the individual test results and determine the fraud score, and the examples above are not meant to be limiting.

In some embodiments, the output of each of the N tests is a value. In some embodiments, combiner 2810 performs a linear combination of the N individual test results. In some embodiments, combiner 2810 scales one or more of the N test results before performing a combination (linear or otherwise).

In some embodiments, each output value is between a minimum value and a maximum value (e.g., between 0 and 1, or between values A and B, inclusive, etc.), and the maximum value is associated with a high likelihood of fraudulent behavior by end-user device 100. In some embodiments, each output value is between 0 and 1, and each output value represents a probability of fraudulent behavior on the part of end-user device 100. In some such embodiments, combiner 2810 multiplies the individual test result values to generate the fraud score. In some embodiments, combiner 2810 applies a weighting factor to one or more of the N test results before multiplying them. As will be appreciated by a person having ordinary skill in the art in view of the disclosures herein, there are many other ways to combine the individual test results and determine the fraud score, and the examples above are not meant to be limiting.

In some embodiments, a high fraud score is associated with a high likelihood of fraudulent behavior on the part of end-user device 100. In some such embodiments, if the fraud score generated by combiner 2810 based on the results of N initial tests is greater than (or greater than or equal to) a threshold, service controller 122 generates a fraud alert. In some embodiments, if the fraud score generated by combiner 2810 based on the results of N initial tests, where N is less than the maximum number of tests available, is greater than (or greater than or equal to) a threshold, additional tests are run. In some embodiments, one or more additional tests are added to the set of tests selected initially (e.g., the value of N is increased, and additional tests are selected and included). In some embodiments, at least one of the one or more additional tests is more computationally-expensive than one or more of the tests in the initial set of N tests.

In some embodiments in which a high fraud score is associated with a high likelihood of fraudulent behavior on the part of end-user device 100, if the fraud score generated by combiner 2810 based on the results of N initial tests, where N is less than the maximum number of tests available, is greater than (or greater than or equal to) a threshold, a different set of N tests is selected and run. In some embodiments, the different set of N tests includes one or more of the tests run in the initial set of N tests. In some embodiments, at least one of the tests in the different set of N tests is more computationally-expensive than one or more of the tests in the initial set of N tests.

In some embodiments, a low fraud score is associated with a high likelihood of fraudulent behavior on the part of end-user device 100. In some such embodiments, if the fraud score generated by combiner 2810 based on the results of N initial tests is less than (or less than or equal to) a threshold, service controller 122 generates a fraud alert. In some embodiments, if the fraud score generated by combiner 2810 based on the results of N initial tests, where N is less than the maximum number of tests available, is less than (or less than or equal to) a threshold, additional tests are run. In some embodiments, one or more additional tests are added to the set of tests selected initially (e.g., the value of N is increased, and additional tests are selected and included). In some embodiments, at least one of the one or more additional tests is more computationally-expensive than one or more of the tests in the initial set of N tests.

In some embodiments in which a low fraud score is associated with a high likelihood of fraudulent behavior on the part of end-user device 100, if the fraud score generated by combiner 2810 based on the results of N initial tests, where N is less than the maximum number of tests available, is less than (or less than or equal to) a threshold, a different set of N tests is selected and run. In some embodiments, the different set of N tests includes one or more of the tests run in the initial set of N tests. In some embodiments, at least one of the tests in the different set of N tests is more computationally-expensive than one or more of the tests in the initial set of N tests.

In some embodiments, one of the N tests indicates whether service processor 115 successfully completed the authentication procedure with service controller 122. In some embodiments, a failure of service processor 115 to complete the authentication procedure with service controller 122 results in a fraud score that indicates end-user device 100 is likely behaving fraudulently (e.g., an automatic "fail" or a fraud score that indicates a high likelihood of fraud). In some embodiments, the result of one or more tests is a quantized value associated with a likelihood of error (e.g., fraud) or a likelihood of non-error (e.g., no fraud), and the overall pass/fail criterion is based on a combination of one or more of the quantized values.

In some embodiments, service controller 122 applies different sets of N tests at different times. For example, in some embodiments, service controller 122 applies a set of N tests including more computationally expensive tests on occasion or periodically. In some embodiments, service controller 122 varies the value of N at various times. In some embodiments, service controller 122 regularly applies a small or modest set of tests, and then occasionally or periodically applies a larger set of tests. In some such embodiments, the larger set of tests includes one or more tests that are more computationally expensive than tests in the smaller set (e.g., tests that require processing of flow data records, discussed below).

In some embodiments, if the fraud score indicates a policy implementation error (e.g., likely fraudulent behavior by end-user device 100), service controller 122 takes an action comprising one or more of: generating a fraud alert; flagging end-user device 100 or a user associated with end-user device 100 for further evaluation; charging for end-user device 100's usage at a pre-determined rate associated with end-user device 100 being in a fraudulent state; notifying a user of end-user device 100; notifying a network administrator; quarantining end-user device 100 or a user's access to the access network; suspending end-user device 100 or a user of end-user device 100 from the access network.

Fraud Detection Based on Service Processor Behavior

Fraudulent or potentially fraudulent activity by end-user device 100 can be detected by service controller 122 by observing the behavior of end-user device 100 after service processor 115 has been authenticated. In some embodiments, detecting fraud comprises ensuring that service control device link 1691 and service control server link 1638 are operating correctly, and there is no break in a continuous heartbeat authentication sequence.

In some embodiments, service processor 115 sends periodic or occasional device-based usage data reports (UDRs) to service controller 122. The UDRs contain information about end-user device 100's data usage. For example, the UDRs may indicate how many bytes of data associated with a particular application, such as a map application, or service, such as a music streaming service, end-user device used since the last report, or during a particular time period. In some embodiments, service processor 115 sends the UDRs in response to a request from service controller 122. In some embodiments, service controller 122 generates a fraud alert if, after having been authenticated, service processor 115 fails to send device-based usage reports when expected or requested by service controller 122, or when service processor 115 sends device-based usage reports at unexpected or improper times. In some embodiments, service controller 122 generates a fraud alert if it receives UDRs from service processor 115 after receiving a "data session stopped" trigger from a network element.

In some embodiments, service controller 122 generates a fraud alert if service processor 115 fails to respond as expected to commands issued by service controller 122. In some embodiments, service controller 122 sends a command to service processor 115 and observes a response from service processor 115. In some embodiments, when fraud is suspected, service controller 122 instructs service processor 115 to apply and enforce policy modifications. Service controller 122 then observes the response of service processor 115 and performs an analysis on information sent by service processor 115 to service controller 122 to determine whether the behavior of end-user device 100 is indicative of fraud.

In some embodiments, service controller 122 directs service processor 115 to change a setting of end-user device 100. If the setting change ordinarily would cause a deterministic behavior change in the operation of an end-user device that is operating according to an established policy, service controller 122 may determine that end-user device 100 is operating fraudulently if service controller 122 does not observe that end-user device 100's behavior has changed in the expected manner. As an example, service controller 122 might suspend end-user device 100's use of a sponsored service (i.e., a service for which a sponsor entity subsidizes an end-user device's access to that service). If end-user device 100 continues to use the sponsored service after service controller 122 suspended end-user device 100's use of the sponsored service, service controller 122 may conclude that the access is fraudulent.

In some embodiments, service controller 122 changes a parameter to cause end-user device 100 to modify its behavior and potentially also to change particular settings of end-user device 100. For example, service controller 122 might communicate to service processor 115 a lower maximum data rate at which end-user device 100 is allowed to send data over the access network. If end-user device 100 continues to send data at a rate above the newly-imposed maximum data rate, service controller 122 may conclude that end-user device 100 is operating fraudulently. In some embodiments, parameter changes are constructed, for example, from rules or by building a reaction model for a user population, where the reaction model learns to distinguish legitimate activity from fraudulent behavior.

Fraud Detection Using Trusted Usage Measures/Records

Fraudulent or potentially fraudulent activity by end-user device 100 can be detected by examining trusted measures or records of data usage by end-user device 100. In some embodiments, a network element (e.g., service usage reconciliation and fraud detect 642 or fraud server 129) examines the content of usage reports from a trusted source to determine whether end-user device 100 is operating within the policies that should be in place. The usage reports may indicate a variety of information, including, for example, one or more of: a "bulk" measure of aggregate data usage, destinations accessed, network state (e.g., time of day, network busy state, network congestion state, etc.), type of network (e.g., 2G, 3G, 4G, WiFi, home, roaming, etc.), etc. In some embodiments, the trusted records contain information about end-user device 100's data use associated with a class of service activities, where the class is a particular application, a group of applications, a particular network destination, a group of network destinations, a network type, etc. For example, the trusted records may contain one or more of: record start time, record end time, information identifying the class, the amount of data use associated with the class, etc.

There are several possible sources of trusted records, including network elements, end-user device 100, and third-party sources. Records from network elements are generally trusted because it is difficult for unauthorized parties to obtain access to the records themselves or the network elements that generate the records, particularly if some or all of the security measures disclosed herein are in place. Examples of network elements that can produce trusted records are: gateways (e.g., GGSN 2240, SGSN 2230, PDSN, routers, switches, etc.), a home agent, proxy servers, a charging gateway system, a mediation element (e.g., mediation 22210), a reconciliation element (e.g., reconciliation server 131), a billing element (e.g., central billing 1619, carrier billing 139), a AAA element (e.g., access network AAA server 1621), and other network elements.

End-user device 100 can also generate trusted records if it includes a secure device data record (DDR) processor and a secure protocol for the sending of reports from the secure DDR processor to service controller 122. The use of secure DDRs is described in detail in U.S. patent application Ser. No. 13/247,998, which is entitled "Secured Device Data Records" and is incorporated herein by reference.

Third-party sources can also provide trusted records if measures are in place to verify the reports. Examples of third-party sources that can provide trusted records are:

partner service destination servers (e.g., search sites, advertisement sites, application service sites, shopping sites, content sites, gaming sites, e-mail sites, etc.), enterprise customer networks, etc. Third-party sources may provide such information as usage reports, site visits, transaction reports, ad view reports, economic benefit reports, usage credit increase instructions, etc.

In some embodiments, using data usage reports from a trusted source, a network element determines whether end-user device 100's usage, as given by a trusted usage measure is within a limit or range of usage behavior expected if an applicable policy is in place. For example, in some embodiments, the network element determines whether the bulk usage by end-user device 100 is no higher than a maximum amount specified by a policy that should be in place. In some embodiments, the network element determines whether end-user device 100's use of a particular class (e.g., an application, a group of applications, a network destination, a group of network destinations, network type, etc.) is within data usage limits specified in the control policy that should be in place. In some embodiments, the network element determines whether end-user device 100's use of a particular class is allowed under the control policy that should be in place. As will be now be appreciated by one of ordinary skill in the art in view of the disclosures herein, there are many ways that a network element can use information in reports from a trusted source to verify that end-user device 100 is operating in compliance with policies that should be in place, and the examples given above are not meant to be limiting.

Fraud Detection Using Non-Secure Device-Based Usage Measures/Records

In some embodiments, service processor 115 is not capable of generating and sending secure DDRs. Instead, service processor 115 is capable only of generating and sending non-secure records (e.g., UDRs) of end-user device 100's data usage. In such cases, an unscrupulous user might attempt to hack end-user device 100 so that the reports it sends contain information that is more favorable to the user than it should be, e.g., by reporting less data usage (either aggregate or of a class) than end-user device 100 actually used or by reporting data usage that should be accounted as usage under a subscriber-paid service plan as usage of a sponsored service. In some embodiments, service controller 122 uses device-based usage measures to detect when a user attempts to tamper with service processor 115 in order to have usage of one service reported incorrectly (e.g., as usage of a different class, as usage of a sponsored service when it is actually part of a subscriber-paid plan, etc.). In some embodiments, service controller 122 compares usage measures in device-based (e.g., non-secure) reports to corresponding usage measures in a report from a trusted source.

In some embodiments, service controller 122 generates a fraud alert if it receives UDRs from end-user device 100, but the UDRs indicate end-user device 100's usage is beyond a charging policy limit. In some embodiments, if service controller 122 receives UDRs from end-user device 100, but the charging codes in those UDRs do not correspond to charging codes for the currently-allowed active services (e.g., the charging codes indicate that end-user device 100 is using data or a class for which it is not authorized, etc.), service controller 122 generates a fraud alert.

In some embodiments, service controller 122 examines the content of device-based usage reports (e.g., reports generated by service processor 115 and sent to service controller 122) to verify that service processor 115 is properly classifying services. In some embodiments, service controller 122 determines whether applications being used or destinations being accessed by end-user device 100 are authorized under a service plan associated with end-user device 100. In some embodiments, service controller 122 examines the content of device-based usage reports to determine whether end-user device 100 imposed a service control that was supposed to be in place (e.g., a cap on usage; a speed of usage (such as a maximum rate); an amount of usage of background or foreground data; state modifiers such as time-of-day, network busy state, network type (e.g., home, roaming, WiFi, cellular, etc.); quality-of-service limits, etc.).

In some embodiments, service controller 122 examines the content of device-based usage reports to verify that the service usage measures being reported by end-user device 100 are compliant with the access network policy or policies that should be in place. In some embodiments, service controller 122 determines whether one or more of the following measures are within limits imposed by a policy that should be in place: bulk (e.g., aggregate) usage; usage of a class (e.g., an application, a group of applications, a network destination (e.g., IP address, domain address, etc.), a group of network destinations, etc.); application-specific usage that includes transaction-based single-application service or multi-application service; background usage; foreground usage; usage that is identified by a time-of-day, network-busy-state, quality-of-service, or network-type state modifier; roaming usage; usage associated with specific content (e.g., streaming video, streaming audio, etc.); usage based on a specific layer 3/4 protocol (e.g., TCP, UDP, and/or a Layer 7 protocol (e.g., IGMP, RTMP, RSTP, etc.)).

In some embodiments in which service processor 115 tracks end-user device 100's use of a class (e.g., an application, a group of applications, a network destination, a group of network destinations, network type, etc.), service controller 122 examines the content of device-based usage reports to determine whether end-user device 100 is properly identifying and allocating data usage associated with the class. As is described in detail in several previous applications listed in the "Cross Reference to Related Applications" section (including U.S. patent publication 2010/0198698, filed Jan. 27, 2010 and entitled "Adaptive Ambient Services"), classifying data usage in the dynamic (e.g., non-static) environment of the Internet can be challenging. For example, a class may include access to a particular web site. Service processor 115 should count, as usage of the class, end-user device 100's access to the collection of URLs associated with the web site, but not access to other network destinations and/or applications not associated with the web site. Although it is possible to create, at any point in time, a comprehensive list of all content associated with the web site, a problem arises whenever the web site changes (e.g., links or URLs are changed, content from other web sites is included or removed, etc.), because the list of associated addresses/domains and access list policies will be inaccurate if it is not updated immediately after the change.

Several of the patent applications listed in the "Cross Reference to Related Applications" section of this document, including U.S. patent application Ser. No. 13/253,013, entitled "System and Method for Providing User Notifications" and incorporated by reference herein, disclose ways to track changes in the Internet to facilitate providing, for example, service plans with different classes, sponsored services, etc. One way to track changes is to use search engine/web crawler techniques to create and update a catalog of content sources, destinations (e.g., advertisement servers, network domains, etc.) etc. that are associated with a class. As would be understood by a person of ordinary skill in the art, a web crawler is a computer program that browses the web in a methodical, automated way. Web crawlers are also known as ants, automatic indexers, bots, web spiders, web robots, or web scutters. Web crawlers may be used to copy, check, or validate links on web sites. A web crawler may start with a list of URLs to visit. As the crawler visits these URLs, it identifies all the hyperlinks in the page and adds them to the list of URLs to visit. The new list is sometimes called the crawl frontier. URLs from the crawl frontier are then recursively visited according to a set of policies that specify which pages to visit, how often to re-visit those pages, etc.

The immediate identification and propagation to all service processors of all changes in every web site associated with every sponsored service or every class within all service plans can be difficult. Therefore, in some embodiments, when end-user device 100 engages in service activities associated with a class (e.g., sends or receives data using a particular application that is itself a class, or using an application from a defined set of applications comprising a class; or accesses a particular network destination that is itself a class, or accesses a particular network destination that is in a class comprising a set of network destinations; or uses a particular network type, etc.), and in the course of using data within the class end-user device 100 is directed to a destination that service processor 115 does not know or is unclassified, service processor 115 grants a temporary access "lease." Under the lease, access to, for example, certain unknown or unclassified destinations is allowed (e.g., for a particular amount of data, for a particular amount of time, etc.) but monitored until the unclassified or unknown application or destination can be reclassified as allowed or disallowed. A lease temporarily allows unknown or unclassified activities to take place within the class under the theory that such activities may be the legitimate result of a change in an Internet destination included in the class, and, therefore, it would be undesirable to block these activities or to allocate data access costs associated with them to a "bulk" usage category or to a different class when they should be allocated to the class.

Service controller 122 can use information from a web crawler/search engine (e.g., the crawl frontier) to assess whether service processor 115 is likely correctly allocating data usage to particular classes. In some embodiments, service controller 122 determines whether service processor 115 is allocating a reasonable amount of unknown or unclassified data usage to the class based on web crawler results. For example, if the web crawler results indicate that, at a particular point in time or on average, approximately 80 percent of content available at or through a particular web site is known (e.g., has a URL that alone indicates it is part of the class, has a URL that indicates it is from an ad server or another so-called known, benign domain, the content of which is unlikely to be accessed fraudulently by a user, etc.), and 20 percent of the content is unknown (e.g., not known to be part of the class, not a known, benign domain, etc.), service controller 122 may determine that end-user device 100 is likely operating fraudulently if only 50 percent of the data usage allocated by service processor 115 is known to be associated with the web site, and the other 50 percent of the data usage allocated by service processor 115 to the class is associated with unknown or unclassified content or destinations. Such a result may indicate that service processor 115 has been hacked and is improperly allocating data usage to the class.

In some embodiments, service controller 122 determines whether device-based usage reports indicate that service processor 115 is likely fraudulently allocating data usage to a sponsored service. For example, in some embodiments, service controller 122 determines how much of the data usage service processor 115 is allocating to a sponsored service is known to be associated with the sponsored service and how much is not known to be associated with the sponsored service. In some embodiments, service controller 122 determines (e.g., based on web crawler or similar data) whether service processor 115 is allocating too much unknown or unclassified data usage to a sponsored service. In some embodiments, service controller 122 assesses whether service processor 115 is properly granting leases (e.g., by determining whether the leases are of an appropriate duration, are terminated properly, etc.). In some embodiments, service controller generates a fraud alert if the UDRs indicate that end-user device is improperly classifying disallowed destinations (e.g., web sites, URLs, etc.) as part of a sponsored service.

In some embodiments, service controller 122 compares usage counts in carrier-based usage reports, or usage reports from another trusted source, to usage counts in UDRs from end-user device 100. In some embodiments, if difference between the usage counts in the two reports is not within a tolerance (e.g., an amount of data, a percentage, etc.), service controller 122 generates a fraud alert. In some embodiments, if the counts in the reports agree, and the charging codes in the UDRs are correct, but the UDRs indicate that service processor 115 has incorrectly categorized (e.g., classified) the data usage, service controller 122 generates a fraud alert. In some embodiments, if the counts in the reports are in agreement, but the usage rate (e.g., units of data per unit of time) within a service component (e.g., a class) or within a service activity is greater than a rate limit set by the control policy, service controller 122 generates a fraud alert.

In some embodiments, service controller 122 generates a fraud alert if a comparison between the device-based UDRs and carrier-based (or other trusted) usage reports indicates that end-user device 100 consistently under-reports its usage of data in a particular class (e.g., an application, a group of applications, a destination, a group of destinations, etc.). Such underreporting may indicate that service processor 115 is substituting usage counts from a higher-priced service for the counts associated with a lower-priced or sponsored service (e.g., service processor 115 is reporting more usage of the lower-priced service and less usage of the higher-priced service). Such "skimming" can occur, for example, within a single service, across multiple services, across multiple time periods, or in other ways or combinations of these ways.

In some embodiments, service controller 122 generates a fraud alert if the UDRs from service processor 115 indicate that end-user device 100's usage of a service, component, or activity is abnormal when compared to a hard rate limit, such as an allowed usage per hour, day, or week, or an expected rate limit, such as a rate limit imposed on streaming services.

In some embodiments, service controller 122 compares a usage rate of end-user device 100 to the "average" end-user device usage rate, which it determines using a statistical model of usage data associated with a specific service plan or component of a service plan (e.g., a class) by a population or sub-population of devices. In some such embodiments, service controller 122 performs what is known in the art as a k-nearest neighbor classification, using the usage rate to identify whether end-user device 100 is potentially behaving fraudulently. As would be understood by a person having ordinary skill in the art, the k-nearest neighbor classification may be trained by learning vector quantization (LVQ) using tunable training parameters such as, for example, the time window of data usage, usage rate, etc.

In some embodiments, service controller 122 may or may not generate a fraud alert upon detecting a particular condition. For example, if the usage counts contained in trusted reports and UDRs from service processor 115 are in agreement, but end-user device 100's usage rate, in terms of units of data per unit of time, deviates significantly from the usage rate of the "average" user, it could mean that service processor 115 has been tampered with or otherwise compromised. Alternatively, however, it could mean simply that the usage patterns for that service activity or service component are changing, or that end-user device 100 is being used legitimately, but in an unusual manner as compared to how most end-user devices are used. A change in usage patterns could result, for example, if the service plan to which end-user device 100 is subscribed adds streaming content, such as video or audio, and a user is among the first to take advantage of the new content. In some embodiments, service controller 122 may simply flag the activity as potentially fraudulent, or it may wait until it has performed additional analysis to make a decision regarding whether service processor 115's behavior is likely fraudulent.

In some embodiments, service controller 122 determines a second measure of a network state to confirm that end-user device is reporting the correct network state in its charging reports. In some embodiments, service controller 122 (or another suitable network function) obtains the network state as determined using a group of devices. In some embodiments, service controller 122 (or another suitable network function) characterizes sub-network portions (e.g., base stations, base station sectors, geographic areas, RANs, etc.) based on a population of end-user devices connected to that sub-network portion.

In some embodiments, service controller 122 determines a second measure of device access behavior for a given network state to ensure end-user device 100 is implementing the correct controls. In some embodiments, the second measure is from a network element. In some embodiments, the second measure is from a secure DDR processor on end-user device 100. In some embodiments, the second measure is from a second monitor point within end-user device 100. In some embodiments, the second measure is "good customer feedback" from a third party source.

In some embodiments, service controller 122 compares a trusted (e.g., network-based, secure DDR, or third-party) measure of the device's service usage to a device-based (e.g., service-processor-based) measure of the device's service usage. In some embodiments, one or both of the trusted service usage measures and the device-based service usage measures include a classification of service usage based on application. In some embodiments, one or both of the service usage measures include a classification of service usage based on network destination or network service identifier. In some embodiments, one or both of the service usage measures include a classification of service usage based on network type (e.g., roaming, home, cellular, WiFi, etc.). In some embodiments, one or both of the service usage measures include a classification of service usage based on time of day. In some embodiments, one or both of the service usage measures include a classification of service usage based on QoS class. In some embodiments, one or both of the service usage measures include a classification of service usage based on geography. In some embodiments, one or both of the service usage measures include a classification of service usage based on a roaming network.

In some embodiments, a trusted service policy implementation is verified by comparing a first device-based service processor service usage measure against a second device-based service processor service usage measure. In some embodiments, one or both service processor usage measures include a classification of service usage based on application. In some embodiments, one or both service processor usage measures include a classification of service usage based on network destination or network service identifier. In some embodiments, one or both service processor usage measures include a classification of service usage based on network type. In some embodiments, one or both service processor usage measures include a classification of service usage based on time of day. In some embodiments, one or both service processor usage measures include a classification of service usage based on QoS class. In some embodiments, one or both service processor usage measures include a classification of service usage based on geography. In some embodiments, one or both service processor usage measures include a classification of service usage based on a roaming network.

Figure 43:
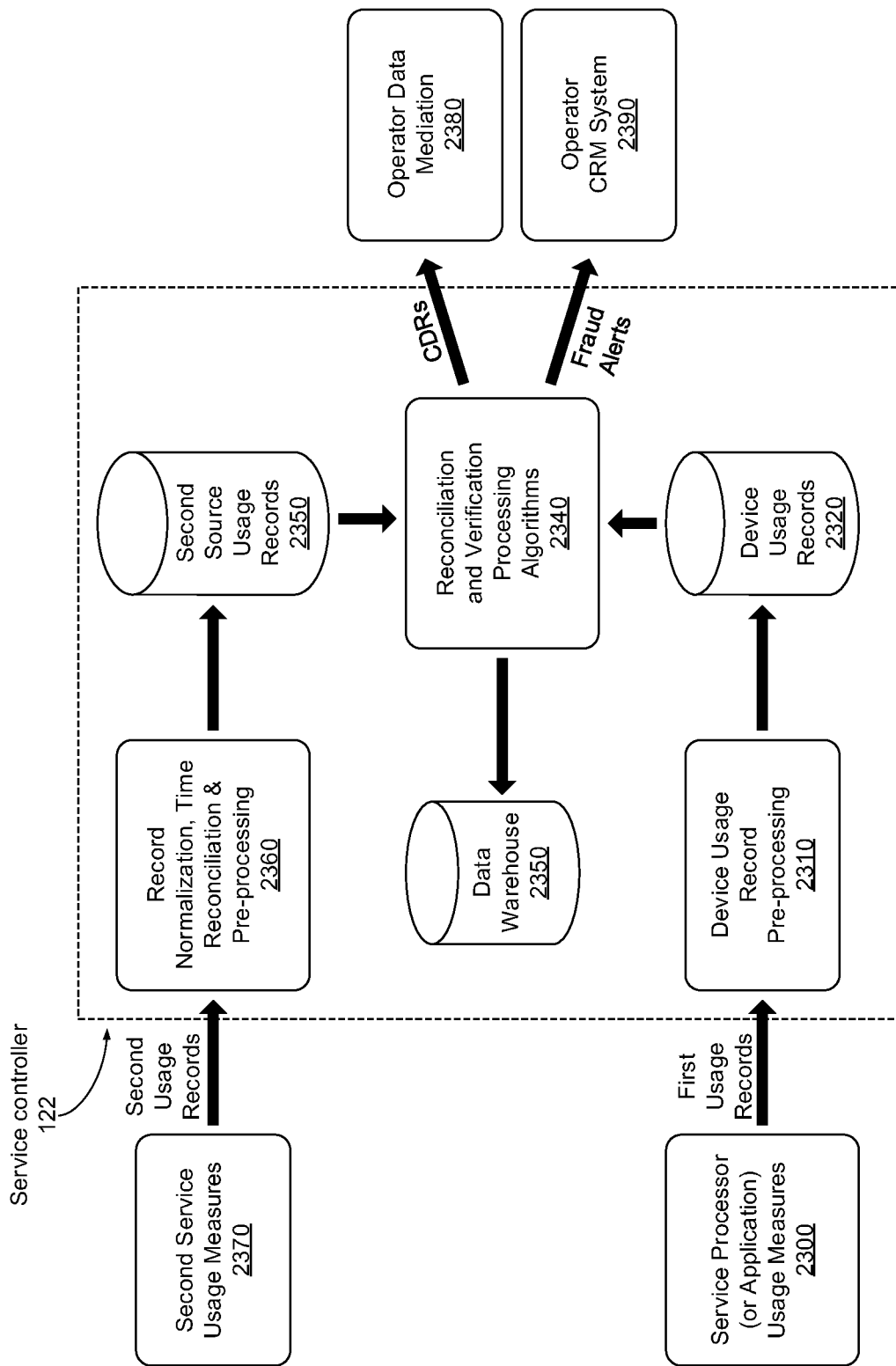
FIG. 43 illustrates an example embodiment of a service controller reconciliation processing procedure that may be used to detect fraud using information from and end-user device and information from a second source.

FIG. 43 illustrates an example embodiment of a service controller reconciliation processing procedure that may be used to detect fraud using information from an end-user device 100 and information from a second source. Service processor 115 (not shown) or an application on end-user device 100 (not shown) generates usage measures 2300. Based on usage measures 2300, end-user device 100 sends first usage records to service controller 122, or service controller 122 requests first usage records from end-user device 100. Service controller 122 processes the first usage records in device usage record pre-processing 2310. In some embodiments, device usage record pre-processing 2310 modifies the format of the first usage records to facilitate one or more of service usage processing, reporting, analysis, comparison, mediation and reconciliation operations performed within the service controller system. In some embodiments, device usage record pre-processing 2310 observes the first usage records and time stamps and time synchronizes, time aligns, or time aggregates multiple first usage records so that a more consistent measure of usage with a common time reference can be achieved within the service controller system for one or more of service usage processing, reporting, analysis, comparison, mediation and reconciliation purposes. Service controller 122 stores the first usage records in device usage records 2320.

A second source (not shown) generates or provides second service usage measures 2370. In some embodiments, the second source is a network element, such as a mediation element, a gateway, a real-time reporting element, a charging element, a billing element, or the like. In some embodiments, the second source is a database. In some embodiments, the second source is a roaming partner network element. In some embodiments, the second source is an element on end-user device 100 that generates secure device data records. In some embodiments, the second source is a partner network destination that provides information about customer usage of or transactions with that destination. In some embodiments, the second source is an application on end-user device 100.

Based on the second service usage measures, the second source sends second usage records to service controller 122, or service controller 122 obtains the second usage records from the second source. Service controller 122 processes the second usage records in record normalization, time reconciliation and pre-preprocessing 2360. In some embodiments, record normalization, time reconciliation and pre-preprocessing 2360 modifies the format of the second usage records to facilitate one or more of service usage processing, reporting, analysis, comparison, mediation and reconciliation operations performed within the service controller system. In some embodiments, record normalization, time reconciliation and pre-preprocessing 2360 observes the second usage records and time stamps and time synchronizes, time aligns, or time aggregates multiple second usage records so that a more consistent measure of usage with a common time reference can be achieved within the service controller system for one or more of service usage processing, reporting, analysis, comparison, mediation and reconciliation purposes. Service controller 122 stores the second usage records in second source usage records 2350.

Service controller 122 applies reconciliation and verification processing algorithms 2340 to reconcile records in device usage records 2320 with records in second source usage records 2350 and to validate records in device usage records 2320. Service controller 122 stores information based on the results of reconciliation and verification processing algorithms 2340 in data warehouse 2330.

In some embodiments, reconciliation and verification processing algorithms 2340 reconcile detailed classifications of service usage off of a bulk service usage accounting and onto a finer classification of service usage accounting. For ease of explanation, the finer classifications of service usage accounting are referred to herein as "micro charging data records" or "micro-CDRs." In some embodiments, reconciliation and verification processing algorithms 2340 accomplish charging for detailed classifications of service usage by providing a detailed micro-CDR charging code identifier in the micro-CDR usage record communicated to the carrier network mediation or billing system (e.g., operator data mediation 2380). In some embodiments, reconciliation and verification processing algorithms 2340 accomplish charging for a detailed classification of service usage by mediating out (or subtracting) the amount of service usage reported in the micro-CDR from the amount of service usage accounted to bulk service usage. In some embodiments, reconciliation and verification processing algorithms 2340 sends charging data records (e.g., CDRs, micro-CDRs, etc.) to operator data mediation 2380.

In some embodiments, reconciliation and verification processing algorithms 2340 perform a fraud analysis using information from one or both of second source usage records 2350 and device usage records 2320. In some embodiments, reconciliation and verification processing algorithms 2340 compares usage records associated with a specific device or user credential from one or both of second source usage records 2350 and device usage records 2320 to determine if service usage is outside of pre-defined service usage policy behavior limits. In some embodiments, reconciliation and verification processing algorithms 2340 compares service usage information associated with a specific device or user credential from one or both of second source usage records 2350 and device usage records 2320 to determine if a pre-defined service usage limit has been reached or exceeded. In some embodiments, reconciliation and verification processing algorithms 2340 compares service usage information associated with a specific device or user credential from one or both of second usage records 2350 and device usage records 2320 to determine if the specific device or user is exhibiting a service usage behavior that is outside of pre-defined statistical limits as compared to the service usage behavior of a device or user population. In some embodiments, reconciliation and verification processing algorithms 2340 stores the results of its fraud analysis in data warehouse 2330. In some embodiments, reconciliation and verification processing algorithms 2340 sends fraud alerts to operator CRM system 2390 (e.g., a carrier fraud processing system, carrier personnel, a device user, a system administrator, etc.).

In some embodiments, the second usage records comprise information from multiple other measures or reports. In some embodiments, the second usage records are based on information, measures, or reports from end-user device 100. In some embodiments, the second usage records are based on information, measures, or reports from other end-user devices. In some embodiments, the second usage records are determined based on information, measures, or reports from one or more network elements (e.g., a base station, the RAN, the core, or using device-assisted means, etc.).

In some embodiments, the second usage records comprise a measure of bulk (e.g., aggregate or unclassified) data usage by end-user device 100. For example, in some embodiments, the second usage records comprise a bulk usage report, specific to end-user device 100, generated by the network, by an application service provider, or by a server. In some embodiments, the second usage records are based on information in one or more previous reports sent by end-user device 100.

In some embodiments, the second usage records comprise information associated with the access network state. In some embodiments, the second usage records are determined from network state tagged information. In some embodiments, the second usage records comprise information from a device data record (DDR), which may indicate the network busy state and the network type. In some embodiments, the second usage records are determined from DDR network state tagged information.

In some embodiments, the second usage records comprise information from flow data record. In some embodiments, the flow data record (FDR) reports a detailed level of service usage classification that indicates service usage broken down by network source or destination (e.g., domain, URL, IP address, etc.) and possibly one or more ports and protocols. In some embodiments, the FDR reports a detailed level of service usage classification that indicates usage broken down by device user application or OS application. In some embodiments, the FDR reports a detailed level of service usage classification that indicates service usage broken down by time of day, network congestion state or service QoS level. In some embodiments, the FDR reports a detailed level of service usage broken down by network type (e.g., 2G, 3G, 4G, WiFi, home, roaming, etc.). In some embodiments, the FDR reports a detailed level of service usage broken down by home or roaming network.

In some embodiments, the FDRs are sourced from a network element capable of classifying traffic (e.g., a deep packet inspection [DPI] gateway, a proxy server, a gateway or server dedicated to a given service classification, a good customer feedback source described elsewhere herein, etc.). In some embodiments, the second usage records are derived from a device service monitor. In some embodiments, the second usage records are derived from a trusted device service monitor. In some embodiments, the trusted device service monitor is located in a secure execution environment on the device that cannot be accessed by a user or user installed application software.

In some embodiments, the second usage records allow service controller 122 to determine whether the access behavior of end-user device 100, given the network state, indicates that end-user device 100 is implementing the correct policy controls. In some embodiments, service controller 122 confirms that service processor 115 is reporting the correct network state in its data usage reports. In some embodiments, a network element determines the correct network state based on a group of devices. The information is reported to service controller 122 or another suitable network function. Service controller 122 (or other suitable network function) characterizes portions of the sub-network (e.g., base stations, base station sectors, geographic areas, radio access network (RAN), etc.) based on the population of end-user devices connected to that sub-network portion. The network element can also gather network busy-state measures from network equipment, such as from base stations or by sampling the RAN, to determine the second measure.

In some embodiments, the second usage records provide information about a cap on the aggregate amount of data usage by end-user device 100. Service controller 122 verifies that the total data usage by end-user device 100, as reported in the first usage records, does not exceed the cap. If the first usage records provide data usage amounts for individual services used by end-user device 100, service controller 122 verifies that the sum of the usage amounts for the individual services does not exceed the cap.

In some embodiments, the network classifies FDRs to known service components, determines credits of classified usage for each service component, ensures that the service component usage does not exceed specified limits (or matches end-user device reports for the component), and checks whether the sum of the components matches the bulk measure.

There are several potentially fraudulent circumstances that may be detected by service controller 122 using one or more of the embodiments disclosed herein, such as the example embodiment illustrated in FIG. 43. In some embodiments, service controller 122 generates a fraud alert if it receives carrier-based usage reports from a network element and UDRs from service processor 115, but the usage counts contained in the reports are not in agreement within a specified tolerance. In order to generate a fraud alert under these circumstances, in some embodiments service controller 122 accounts for unsent usage reports that may still be on end-user device 100.

Figure 44:
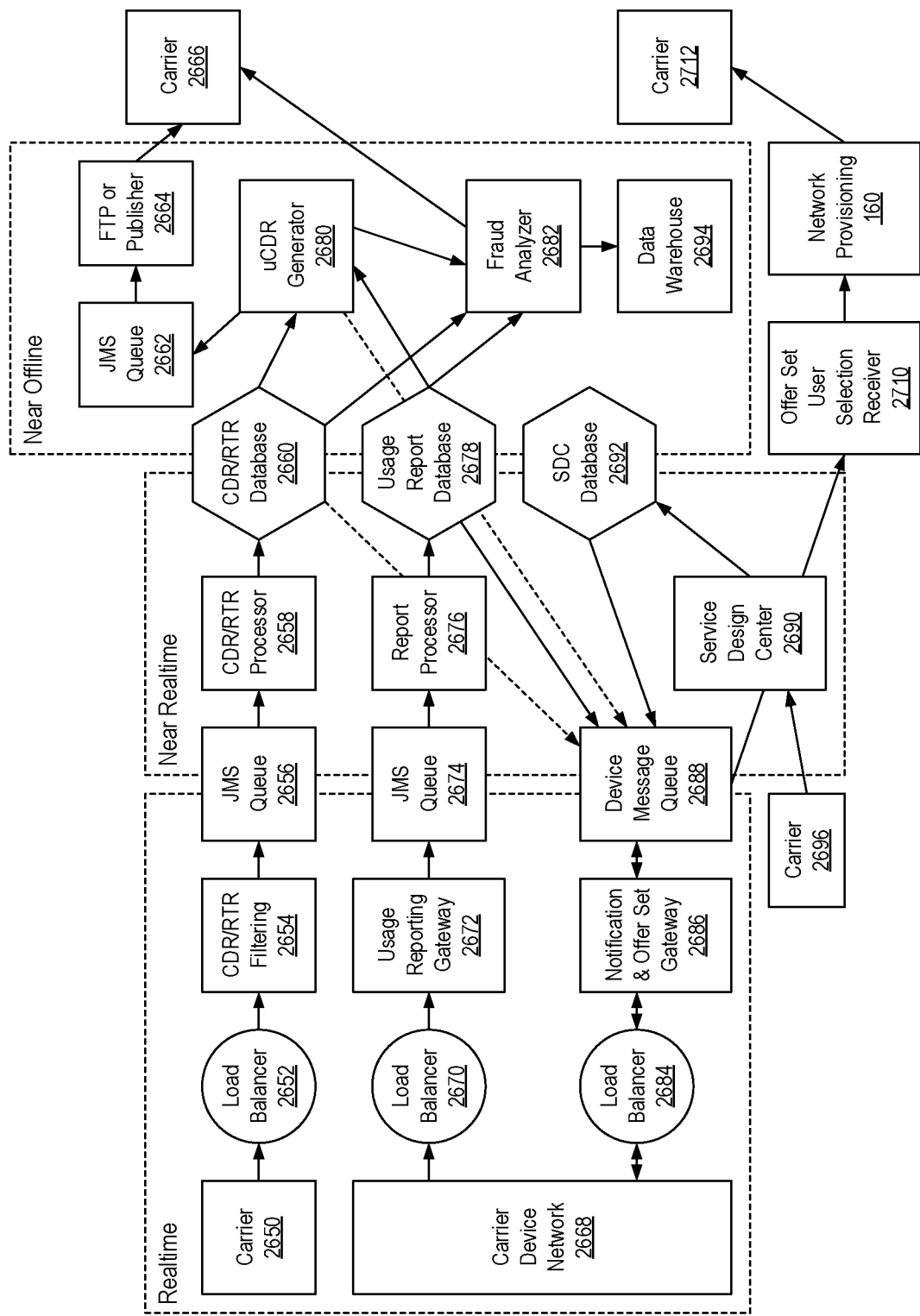
FIG. 44 illustrates an example embodiment with network system elements that can be included in a service controller system to facilitate a DAS implementation and the flow of information between those elements.

FIG. 44 illustrates an exemplary embodiment with network system elements that can be included in a service controller system (e.g., service controller 122) to facilitate a device-assisted services (DAS) implementation and the flow of information between those elements. FIG. 44 shows the flow of information to facilitate reconciliation of device-generated data usage records with network-generated (e.g., wireless network carrier-generated) data usage records associated with an end-user device, such as end-user device 100.

Carrier-generated charging data records (CDRs) or real-time reporting records (RTRs) (or other real-time or near-real-time usage record formats such as, e.g., flow data records (FDRs), batch processed usage records, continuous usage record event feeds or SMS formatted usage record messages) flow from carrier 2650 (which can be, e.g., a real time reporting system, a network gateway, a network usage charging system element, a AAA, an HLR, a billing element, etc.) to load balancer 2652 to CDR/RTR filtering element 2654.

In some embodiments, load balancer 2652 selects one of many CDR/RTR processing threads that are available in the service controller information processing system. In some embodiments, the processing thread is an asynchronous software or firmware program running on a gateway or server CPU. In some embodiments, the processing thread is a virtual machine processing thread that exists in a resource pool of gateway or server CPUs or virtual machines, which may include geographically separated or redundant resource pools. As illustrated in FIG. 44, each processing thread includes the functional steps of CDR/RTR filtering 2654, JMS queue 2656, CDR/RTR processor 2658 and the interface to CDR/RTR database 2660. In some embodiments, processing threads are asynchronous in that they are initiated when load balancer 2652 directs one or more CDR/RTR data transfers to the thread and terminated when the processed CDR/RTR information has been processed and deposited into CDR/RTR database 2660. Note that FIG. 44 shows only one of potentially many available CDR/RTR processing threads.

CDR/RTR filtering element 2654 selects the records that are associated with devices that include a device client that communicates with the service controller (e.g., the device client can be a service processor configured to provide service usage notification updates, on-device service plan purchase or activation with UI options display and user selection actions, device-assisted access control policy enforcement, device-assisted service usage charging policy enforcement, device-assisted service notification messages, etc.). In some embodiments, devices supporting DAS are identified by device credentials or user credentials that are communicated to the service controller as described herein, where the device credential or user credential are members of a device group or user group that is managed by the service controller.

In some embodiments, CDR/RTR filtering element 2654 may be used advantageously to quickly receive and acknowledge a CDR/RTR record to provide asynchronous functionality because of real-time processing requirements, server processing thread scalability and maintainability requirements, or server processing thread geographic redundancy requirements. In some embodiments, filtering eliminates unnecessary load on JMS queue 2656 and/or CDR/RTR database 2660. CDR/RTR filtering element 2654 places the records from end-user devices known to be configured with a device client (e.g., a service processor configured to provide service usage notification updates, on-device service plan purchase or activation with UI options display and user selection actions, device-assisted access control policy enforcement, device-assisted service usage charging policy enforcement, device-assisted service notification messages, etc.) that communicates with the service controller through Java messaging service (JMS) queue 2656. In some embodiments, CDR/RTR filtering element 2654 filters out device records for devices that may have a form of service processor 115, but service processor 115 has not properly authenticated with the service controller 122. In some embodiments, the device clients that are known to be configured with a device client that communicates with service controller 122 are determined by looking up a device credential or user credential associated with CDRs or RTRs in a device group or user group management database.

JMS queue 2656 buffers the CDR/RTR information remaining after CDR/RTR filtering 2654 and allocates one or more CDRs/RTRs to a service usage processing thread in CDR/RTR processor 2658. In some embodiments, JMS queue 2656 is a persistent queue. In some embodiments, JMS queue 2656 is a primary messaging system between service controller applications.

CDR/RTR processor 2658 retrieves the records from JMS queue 2656, transforms the records, and stores them in CDR/RTR database 2660. In some embodiments, CDR/RTR processor 2658 is an application or a process thread. In some embodiments, CDR/RTR processor 2658 pulls a CDR/RTR record from JMS queue 2656, transforms the record, and stores the transformed record in CDR/RTR database 2660 in one transaction in order to provide fault tolerance in the case of system failure. In some embodiments, CDR/RTR processor 2658 formats the CDR/RTR information to provide a common service usage information format to facilitate one or more of service usage processing, reporting, analysis, comparison, mediation and reconciliation operations performed within the service controller system. In some embodiments, CDR/RTR processor 2658 observes CDR/RTR time stamps and time synchronizes, time aligns, or time aggregates multiple CDR/RTR reports so that a more consistent measure of usage with a common time reference can be achieved within the service controller system for one or more of service usage processing, reporting, analysis, comparison, mediation and reconciliation purposes.

In some embodiments, end-user devices capable of DAS reporting (e.g., devices configured with a device client that communicates with the service controller, such as service processor 115 described herein) connect periodically or on occasion to usage reporting gateway 2672 to report their data usages. In some embodiments, DAS reporting information includes but is not limited to one or more of user service plan purchase or activation selection choices, device user service policy configuration preference selections (e.g., user-generated service policy assignments for applications, websites, network types, or home/roaming policies), DAS service usage reports, DAS device policy state reports, DAS software environment integrity reports, and other reports.

In some embodiments, DAS device usage reports and analytics flow from carrier device network 2668 (e.g., devices configured with service processors 115 that are in communication with the service controller) to load balancer 2670 to usage reporting gateway 2672. In some embodiments, load balancer 2670 selects one of many usage reporting processing threads that are available in the service controller information processing system. In some embodiments, the usage reporting processing thread is an asynchronous software or firmware program running on a gateway or server CPU. In some embodiments, the usage reporting processing thread is a virtual machine processing thread that exists in a resource pool of gateway or server CPUs or virtual machines, which may include geographically separated or redundant resource pools. As illustrated in FIG. 44, each usage reporting processing thread consists of the functional steps of usage reporting gateway 2672, JMS queue 2674, report processor 2676, and the interface to usage report database 2678. In some embodiments, usage reporting processing threads are asynchronous in that they are initiated when load balancer 2670 directs one or more usage reporting data transfers to a thread and terminated when the processed usage reporting information has been processed and deposited into usage report database 2678. Note that FIG. 44 shows only one of potentially many available usage reporting processing threads.

Usage reporting gateway 2672 accepts reports from devices configured with a device client (e.g., service processor 115 configured to provide service usage notification updates, on-device service plan purchase or activation with UI options display and user selection actions, device assisted access control policy enforcement, device assisted service usage charging policy enforcement, device assisted service notification messages, etc.) that communicates with service controller 122 and places the reports on JMS queue 2674. In some embodiments, usage reporting gateway 2672 only accepts device reports from device service processors 115 that have authenticated with the service controller system (e.g. service controller 122). In some embodiments, usage reporting gateway 2672 only accepts device reports from device service processors 115 configured with device credentials or user credentials that are members of a device group or user group that is managed by service controller 122. In some embodiments, usage reporting gateway 2672 rejects reports from end-user devices without authenticated service processors. In some embodiments, usage reporting gateway 2672 is an application or a process thread. In some embodiments, usage reporting gateway 2672 quickly receives and acknowledges end-user device reports. In some embodiments, usage reporting gateway 2672 provides asynchronous functionality that is advantageous to support real-time processing requirements.

In some embodiments, end-user device 100 is authenticated before reports are put onto JMS queue 2674. In some embodiments, JMS queue 2674 is a persistent queue. In some embodiments, JMS queue 2674 is a primary messaging system between service controller applications.

Report processor 2676 retrieves reports from JMS queue 2674, transforms the reports, and stores the transformed reports in usage report database 2678. In some embodiments, report processor 2676 is an EAI. In some embodiments, report processor 2676 retrieves reports from JMS queue 2674, transforms the reports, and stores the transformed reports in usage report database 2678 in a single transaction in order to provide fault tolerance in case of system failure. In some embodiments, report processor 2676 formats the device usage report information to provide a common service usage information format to facilitate one or more of service usage processing, reporting, analysis, comparison mediation and reconciliation purposes internal processing and comparison within the service controller system. In some embodiments, report processor 2676 observes device usage report time stamps and time synchronizes, time aligns or time aggregates multiple device usage reports so that a more consistent measure of usage with a common time reference can be achieved within the service controller system for one or more of service usage processing, reporting, analysis, comparison mediation and reconciliation purposes.

In some embodiments, CDR/RTR filtering 2654, CDR/RTR processor 2658, report processor 2676, and usage reporting gateway 2672 share a host.

In some embodiments, micro-CDR generator 2680 retrieves records from CDR/RTR database 2660 and retrieves reports from usage report database 2678. In some embodiments, micro-CDR generator 2680 determines a service usage amount for a micro-CDR service usage classification, assigns a usage accounting identifier to the micro-CDR report that identifies the usage as being accounted to a device user for the device associated with a device credential or user credential, and reports this amount of service usage to the carrier network 2666 (in the exemplary embodiment of FIG. 44, through JMS queue 2662 and FTP or publisher 2664). In some embodiments, micro-CDR generator 2680 determines a service usage amount for a micro-CDR service usage classification, assigns a usage accounting identifier to the micro-CDR report that identifies the usage as being accounted to a service sponsor, and reports this amount of service usage to carrier network 2666. In some embodiments the micro-CDR for the sponsored service usage report also includes an identifier for a device credential or user credential. In some embodiments, the amount of service usage accounted for in the micro-CDR is mediated or reconciled off of a device or user bulk service usage accounting. In some embodiments, micro-CDR generator 2680 sends micro-CDRs to JMS queue 2662. In some embodiments, FTP or publisher 2664 retrieves micro-CDRs from JMS queue 2662 and pushes the micro-CDRs to carrier 2666.

In some embodiments, fraud analyzer 2682 retrieves records from CDR/RTR database 2660. In some embodiments, fraud analyzer 2682 retrieves reports form usage report database 2678. In some embodiments, fraud analyzer 2682 retrieves micro-CDRs from micro-CDR generator 2680. In some embodiments, fraud analyzer 2682 performs a fraud analysis using information from one or more of CDR/RTR database 2660, usage report database 2678, and micro-CDR generator 2680. In some embodiments, fraud analyzer 2682 compares usage records associated with a specific device or user credential from one or more of CDR/RTR database 2660, usage report database 2678, and micro-CDR generator 2680 to determine if service usage by that device is outside of pre-defined service usage policy behavior limits. In some embodiments, fraud analyzer 2682 compares service usage information associated with a specific device or user credential from one or more of CDR/RTR database 2660, usage report database 2678, and micro-CDR generator 2680 to determine if a pre-defined service usage limit has been reached or exceeded by that device. In some embodiments, fraud analyzer 2682 compares service usage information associated with a specific device or user credential from one or more of CDR/RTR database 2660, usage report database 2678 and micro-CDR generator 2680 to determine if the specific device or user is exhibiting a service usage behavior that is outside of pre-defined statistical limits as compared to the service usage behavior of a device or user population. In some embodiments, fraud analyzer 2682 stores the results of its fraud analysis in data warehouse 2694. In some embodiments, fraud analyzer 2682 sends fraud alerts to carrier network 2666.

Fraud Detection for Time-Based Service Plans

Figure 45:
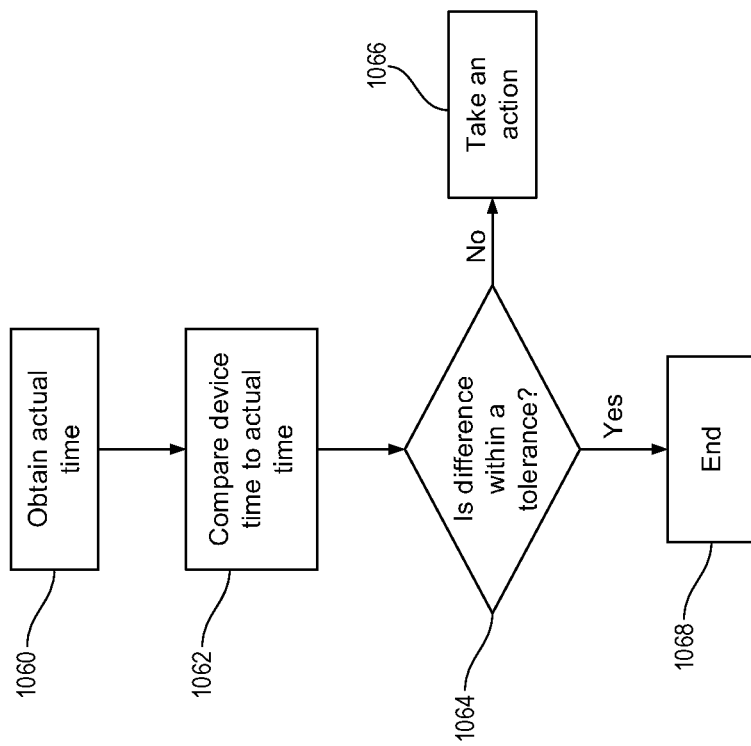
FIG. 45 illustrates an example embodiment of a procedure to detect when a user of an end-user device attempts to alter the end-user device's use of a time-based service plan by modifying the time setting on end-user device.

In some embodiments, a service plan in effect for end-user device 100 is a time-based service plan (e.g., access network costs associated with a particular service or application are not charged to the user, or are charged to the user at a reduced rate during a particular time period). In some such embodiments, an agent on end-user device 100 detects fraudulent or potentially fraudulent activities by determining whether the time or time zone setting on end-user device 100 is correct or within a tolerance. FIG. 45 illustrates an example procedure to detect when a user of end-user device 100 attempts to alter end-user device 100's use of a time-based service plan by modifying the time setting on end-user device 100.

At step 1060, an agent (e.g., policy control agent 1692, service monitor agent 1696, policy implementation agent 1690, etc.) on end-user device 100 obtains the actual time. In some embodiments, the agent obtains the actual time from a trusted source. In some embodiments, the trusted source is an NTP server. In some embodiments, the trusted source is a cell tower. In some embodiments, the agent obtains the actual time based on information about a cell tower location. In some embodiments, the agent obtains the actual time based on information from a GPS receiver. In some embodiments, the agent obtains the actual time based on a geo-located IP address. At step 1062, the agent compares the time setting on the device (the device time) to the actual time. At step 1064, the agent determines if the difference between the actual time and the device time is within a tolerance. In some embodiments, the tolerance is set by portal user 102. If the difference is within the tolerance, the process ends at step 1068. If the difference is not within the tolerance, the agent takes an action at step 1066. In some embodiments, the action is to generate a fraud alert. In some embodiments, the action is to adjust the time setting on end-user device 100. In some embodiments, the action is to use the actual time to enforce a policy (e.g., a control policy, a charging policy, or a notification policy). In some embodiments, the action is to take a countermeasure, such as, for example, to block, delay, rate-limit, or quarantine access to the access network by end-user device 100. In some embodiments, the action is to provide a notification to a user of end-user device 100. In some embodiments, the action is to send a message to service controller 122.

Figure 46:
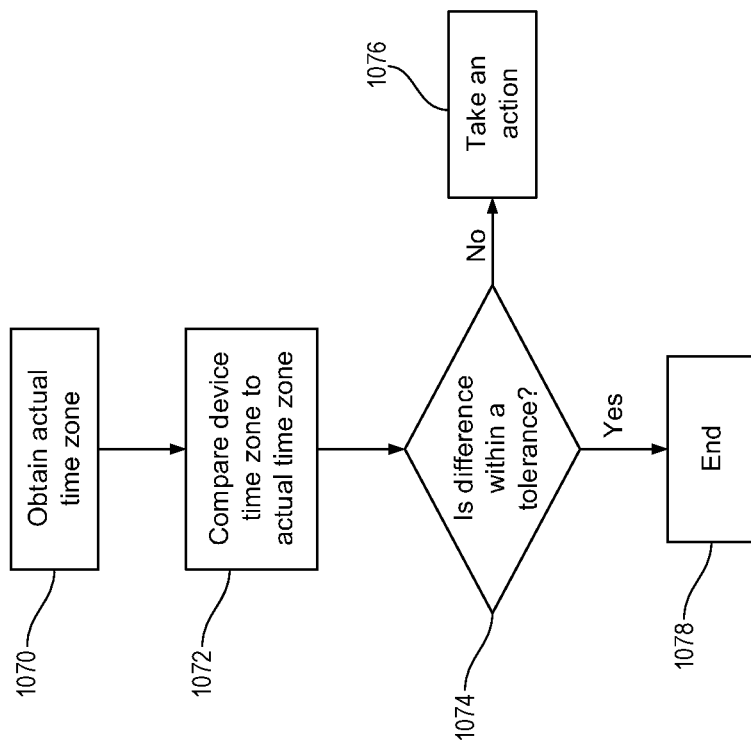
FIG. 46 illustrates an example embodiment of a procedure to detect when a user of an end-user device attempts to alter the end-user device's use of a time-based service plan by modifying the time zone setting on end-user device.

FIG. 46 illustrates an example embodiment of a procedure to detect when a user of end-user device 100 attempts to alter end-user device 100's use of a time-based service plan by modifying the time zone setting of end-user device 100. At step 1070, an agent (e.g., policy control agent 1692, service monitor agent 1696, policy implementation agent 1690, etc.) on end-user device 100 obtains the actual time zone. In some embodiments, the agent obtains the actual time zone from a trusted source. In some embodiments, the trusted source is an NTP server. In some embodiments, the trusted source is a cell tower. In some embodiments, the agent obtains the actual time zone based on information about a cell tower location. In some embodiments, the agent obtains the actual time zone based on information from a GPS receiver. In some embodiments, the agent obtains the actual time zone based on a geo-located IP address. At step 1072, the agent compares the time zone setting on the device to the actual time zone. At step 1074, the agent determines if the difference between the actual time zone and the device time zone is within a tolerance. In some embodiments, the tolerance is set by portal user 102. If the difference is within the tolerance, the process ends at step 1078. If the difference is not within the tolerance, the agent takes an action at step 1076. In some embodiments, the action is to generate a fraud alert. In some embodiments, the action is to adjust the time zone setting on end-user device 100. In some embodiments, the action is to use the actual time zone to enforce a policy (e.g., a control policy, a charging policy, or a notification policy). In some embodiments, the action is to take a countermeasure, such as, for example, to block, delay, rate-limit, or quarantine access to the access network by end-user device 100. In some embodiments, the action is to provide a notification to a user of end-user device 100. In some embodiments, the action is to send a message to service controller 122.

Additional Fraud Detection Techniques

Figure 47:
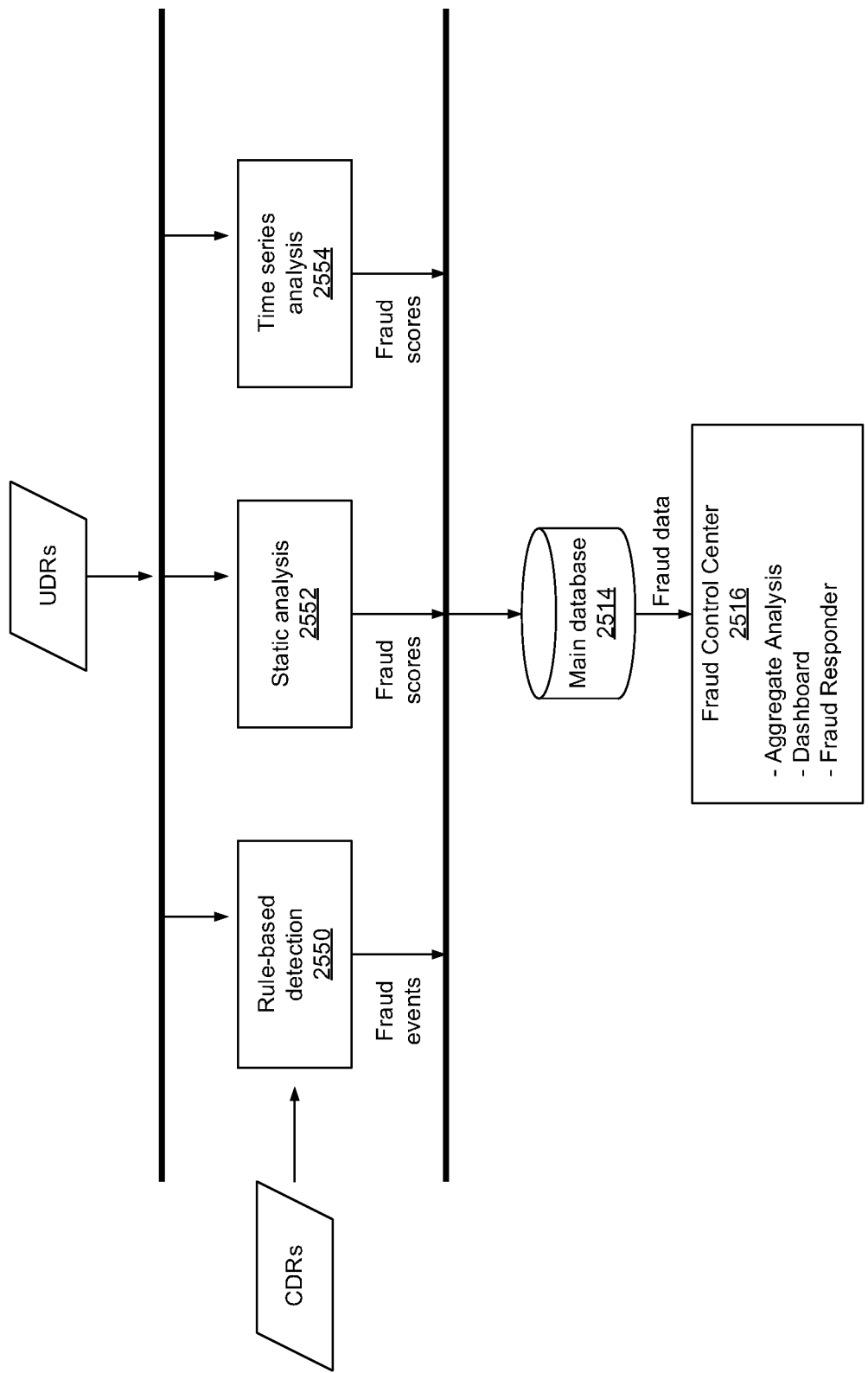
FIG. 47 illustrates a fraud detection approach in accordance with some embodiments.

FIG. 47 illustrates a fraud detection approach in accordance with some embodiments. UDRs (e.g., device-based usage records) are provided to rule-based detection element 2550. In some embodiments, rule-based detection element 2550 includes rules that can be applied to detect fraud scenarios that can be described deterministically. As will now be appreciated by a person having ordinary skill in the art, many of the detection approaches disclosed herein are amenable to being implemented as rules for use by rule-based detection element 2550. For example, a comparison between a policy that is supposed to be in place and information in a usage report associated with end-user device 100, whether the report is device-based or network-based, trusted or non-secure, etc., can easily be expressed as a rule. Examples of potential rules include, but are not limited to: whether end-user device 100's bulk usage is below a service plan cap; whether end-user device 100's usage of a particular class (e.g., an application, a group of applications, a network destination, a group of network destinations, etc.) is below a service plan limit; whether end-user device 100's usage of a sponsored service is compliant with the sponsored service policy that should be in place; whether end-user device 100's usage of a particular network, network type, quality-of-service class, etc. is compliant with a control policy that should be in place; whether end-user device 100 failed the authentication procedure; etc.

In the embodiment of FIG. 47, rule-based detection element 2550 also obtains CDRs. In some embodiments, rules in fraud rules 2510 are event driven and are applied to incoming events (e.g., CDRs from the carrier network or UDRs from end-user device) in real time or near-real time. As will be appreciated by a person having ordinary skill in the art in light of the disclosures herein, rule-based detection element 2550 may use only UDRs, only CDRs, or both UDRs and CDRs.

Figure 48:
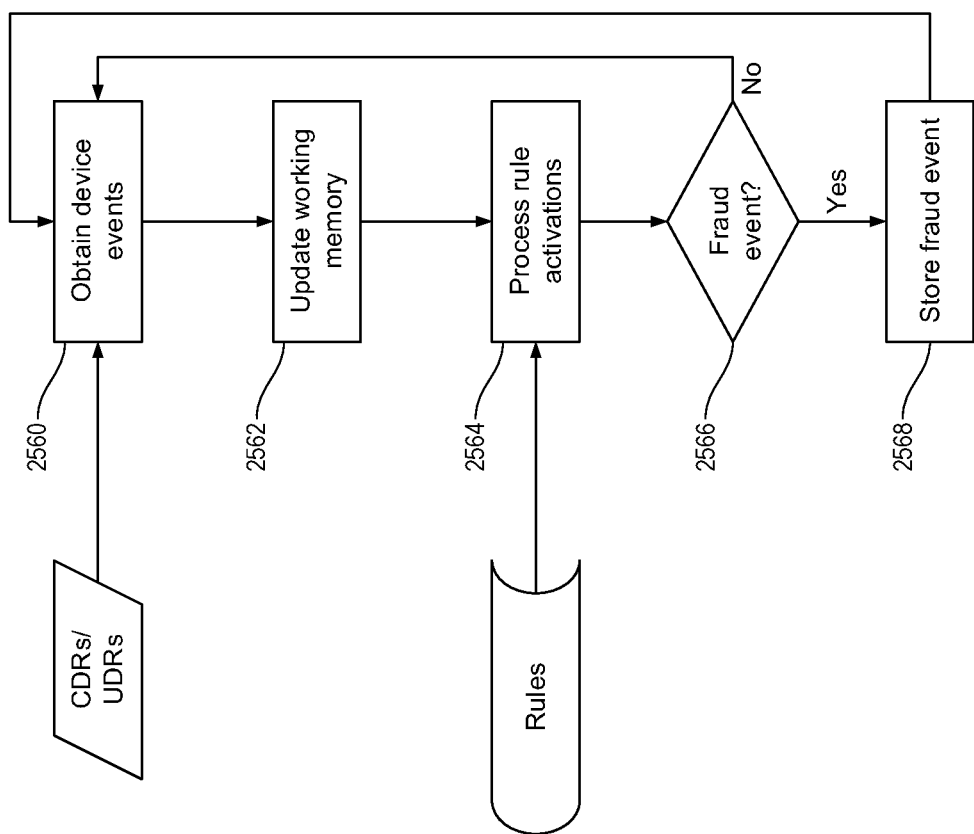
FIG. 48 illustrates an example embodiment of a procedure that a rule-based detection element may use to apply rules to detect fraud.

FIG. 48 illustrates a procedure that rule-based detection element 2550 may use to apply rules to detect fraud. At step 2560, rule-based detection element 2550 obtains device events or reports, e.g., UDRs and/or CDRs. At step 2562, rule-based detection element 2550 places the obtained device events in working memory. At step 2564, rule-based detection element 2550 obtains one or more rules and processes the device events using those rules. At step 2566, rule-based detection element 2550 determines whether the results of the processing indicate a fraud event. If so, then at step 2568, rule-based detection element 2550 stores the fraud event in main database 2514. If not, rule-based detection element 2550 returns to step 2560 to begin the procedure again with additional or different records.

As illustrated in FIG. 47, UDRs are also supplied to static analysis element 2552, which generates a fraud score upon detecting potentially fraudulent behavior by end-user device 100. In some embodiments, static analysis element 2552 determines a fraud score using one or more models obtained from a statistical modeling element. In some embodiments, static analysis element 2552 compares end-user device 100's service usage against a corresponding population statistic for the device-based service usage measure. In some embodiments, these population statistics for the device-based service usage measures include a classification of service usage based on application. In some embodiments, these population statistics for the device-based service usage measures include a classification of service usage based on network destination or network service identifier. In some embodiments, these population statistics for the device-based service usage measures include a classification of service usage based on network type. In some embodiments, these population statistics for the device-based service usage measures include a classification of service usage based on time of day. In some embodiments, these population statistics for the device-based service usage measures include a classification of service usage based on QoS class. In some embodiments, these population statistics for the device-based service usage measures include a classification of service usage based on geography. In some embodiments, these population statistics for the device-based service usage measures include a classification of service usage based on a roaming network.

Figure 49:
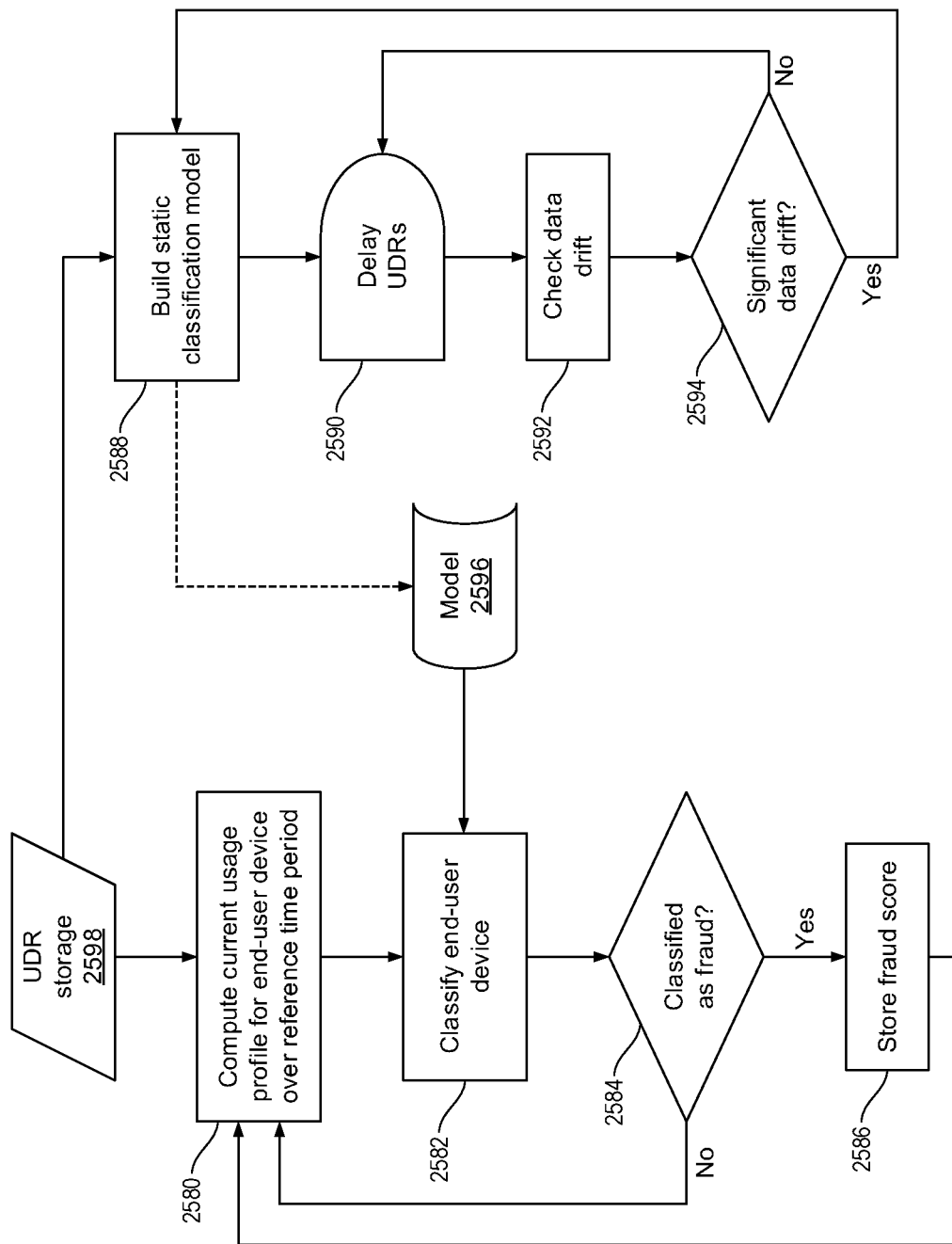
FIG. 49 illustrates an example embodiment of a procedure that a static analysis element may use to determine fraud based on a statistical model.

FIG. 49 illustrates a procedure static analysis element 2552 uses to determine fraud based on a statistical model in accordance with some embodiments. At step 2588, static analysis element 2552 retrieves UDRs from UDR storage 2598 and builds a static classification model. At step 2590, static analysis element 2552 delays the UDRs. At step 2592, static analysis element 2552 checks the data drift. At step 2594, static analysis element 2552 determines whether the data drift is significant. If the drift is not significant, then static analysis element 2552 returns to step 2590, and the UDRs are further delayed. If the drift is significant, then static analysis element 2552 returns to step 2588 and builds a new static classification model. At step 2580, static analysis element 2552 computes the current usage profile for end-user device 100 over the reference time period in the UDRs obtained from UDR storage 2598. At step 2582, static analysis element 2552 classifies end-user device 100's behavior using model 2596. At step 2584, static analysis element 2552 determines whether end-user device 100's behavior should be classified as fraudulent. If so, then at step 2586, static analysis element 2552 stores a fraud score in main database 2514. If, at step 2584, static analysis element 2552 determines that end-user device 100's behavior should not be classified as fraudulent, then static analysis element 2552 returns to step 2580 to analyze the next UDRs.

As illustrated in FIG. 47, UDRs are also supplied to time-series analysis element 2554, which generates a fraud score upon detecting potentially fraudulent behavior by end-user device 100. As will be appreciated by a person having ordinary skill in the art, a time series is a sequence of data points, typically measured at successive times spaced at uniform time intervals. Time-series analysis comprises methods of analyzing time series data to extract meaningful statistics and other characteristics of the data. A time-series model generally reflects the fact that observations close together in time are more closely related (e.g., correlated) than observations that are further apart. In addition, time-series models often make use of the natural one-way ordering of time so that values for a given period are expressed as deriving in some way from past values and not from future values. In some embodiments, time-series models are used to detect significant changes in an individual subscriber's usage behavior that might indicate fraud. In some embodiments, a time-series model is used to compare current data usage against a past usage trend or to predict future potential fraud based on past usage. A time-series model may model an individual device's data usage, or it may leverage population or subpopulation data.

Figure 50:
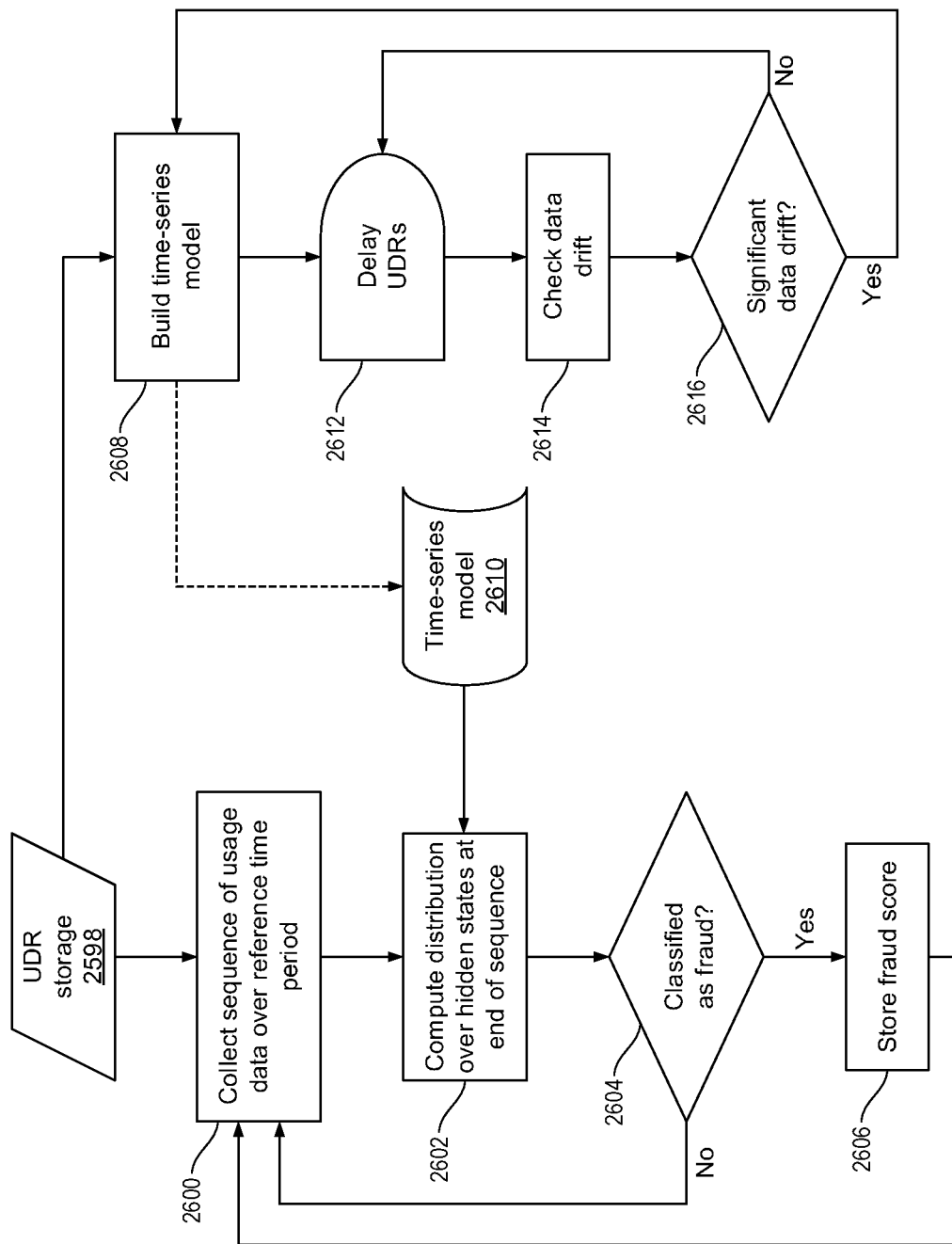
FIG. 50 illustrates an example embodiment of a procedure that a time-series analysis element may use to determine fraud based on a time-series model.

FIG. 50 illustrates a procedure time-series analysis element 2554 uses to determine fraud based on a time-series model in accordance with some embodiments. At step 2608, time-series analysis element 2554 retrieves UDRs from UDR storage 2598 and builds a time-series model (e.g., a hidden Markov model). At step 2612, time-series analysis element 2554 delays the UDRs. At step 2614, time-series analysis element 2554 checks the data drift. At step 2616, time-series analysis element 2554 determines whether the data drift is significant. If the drift is not significant, then time-series analysis element 2554 returns to step 2612, and the UDRs are further delayed. If the drift is significant, then time-series analysis element 2554 returns to step 2608 and builds a new time-series model. At step 2600, time-series analysis element 2554 collects a sequence of usage data over a reference time period using UDRs obtained from UDR storage 2598. At step 2602, time-series analysis element 2552 computes a distribution of hidden states at the end of the sequence using time-series model 2610. At step 2604, time-series analysis element 2554 determines whether end-user device 100's behavior should be classified as fraudulent. If so, then at step 2606, time-series analysis element 2554 stores a fraud score in main database 2514. If, at step 2604, time-series analysis element 2554 determines that end-user device 100's behavior should not be classified as fraudulent, then time-series analysis element 2554 returns to step 2600 to analyze the next UDRs.

Fraud control center 2516 retrieves fraud data from main database 2514 and performs one or more of the following functions: an aggregate analysis of various fraud metrics (events and/or scores) to determine whether end-user device 100 is likely operating fraudulently; presentation of fraud-related information through a dashboard (e.g., a user interface); and taking an action to mitigate the fraud (e.g., notify a network administrator of a network resource so that further evaluation can take place, increase a billing rate for end-user device 100, notify a user of or subscriber associated with end-user device 100 of the service agreement violation and, if applicable, increased billing rate, via one or more communication media [e.g., service processor 115, device notification client user interface, text message, e-mail message, voicemail, phone call], throttle or suspend end-user device 100's access to the access network, throttle or suspend an application's access to the access network.

Figure 51:
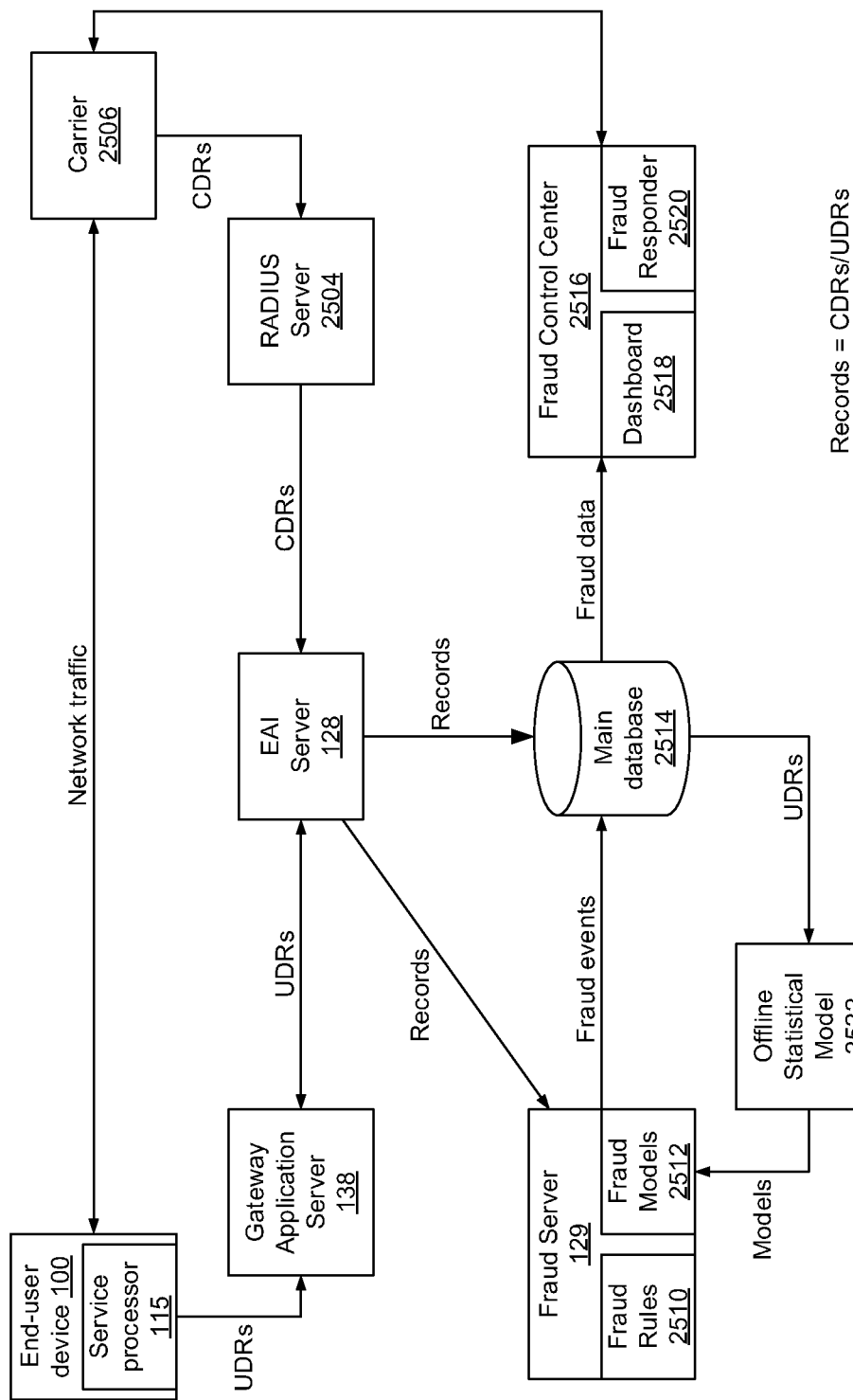
FIG. 51 illustrates an example embodiment of a fraud-detection system that supports rule-based fraud detection and the application of statistical or time-series models in accordance with some embodiments.

FIG. 51 illustrates a fraud detection system that supports rule-based fraud detection and the application of statistical or time-series models in accordance with some embodiments. End-user device 100, equipped with service processor 115, exchanges network traffic with carrier element 2506 (e.g., a AAA server such as access network AAA server 1620, GGSN such as GGSN 2240, etc.). Service processor 115 also sends UDRs to gateway application server 138. Gateway application server 138 sends the UDRs to EAI server 128. In addition to device-based UDRs, EAI server 128 also receives network-based CDRs from RADIUS server 2504. EAI server 128 processes the UDRs and/or the CDRs and stores the processed records in main database 2514 (which may be within database cluster 116). EAI server 128 also sends some or all of the records to fraud server 129. Fraud server 129 includes fraud rules 2510 and fraud models 2512. Fraud rules 2510 includes one or more rules that fraud server 129 may apply to determine whether to generate a fraud event, as, for example, described in the context of FIG. 48. Fraud models 2512 includes one or more models that fraud server 129 may apply to determine whether to generate a fraud score, as, for example, described in the context of Figures SS and TT, As illustrated in the embodiment of FIG. 51, offline statistical model 2522 retrieves UDRs from main database 2514 and generates models for use by fraud server 129 in determining whether end-user device 100 is operating fraudulently. In some embodiments, offline statistical model 2522 uses population data (e.g., UDRs, CDRs, etc.) to construct group profiles for legitimate subpopulations and for fraudulent subpopulations of end-user devices within the control of service controller 122. In some embodiments, offline statistical model 2522 identifies sudden or long-term trends or global behavior shifts and adapts one or more data models based on those trends or shifts. In some embodiments, offline statistical model 2522 uses on-line learning to refine and train one or more models.

Fraud server 129 generates fraud events (e.g., fraud alerts) and stores them in main database 2514. Fraud control center 2516 retrieves fraud data from main database 2514. Depending on the content of the fraud data, fraud control center 2516 may display information about the fraud data on dashboard 2518, which, in some embodiments, includes a user interface such as a display. In some embodiments, fraud responder 2520 takes an action based on the fraud data, such as notifying carrier 2506 of fraudulent or potentially fraudulent activity by end-user device 100.

Detection of Fraudulent Use of SIM Cards

End-user device 100 may contain a "sponsored SIM" card or another credential that allows the device to use a fixed amount of data, possibly associated with a particular service, at a reduced charge or at no charge to the user. Unscrupulous users may attempt to find ways to increase their quantity of free or subsidized data usage with sponsored SIM cards. In some embodiments, service controller 122 detects fraud associated with SIM cards and takes actions to address the fraud.

Without loss of generality, in the following related embodiments the terms "SIM card" and "SIM" are used to represent a device credential source. As would be appreciated by one of ordinary skill in the art, other device credential sources (e.g., a soft-SIM, a universal SIM, an IMSI source, a wireless modem, a phone number source, an IMEI source, an MEID source, a MAC address source, an IP address source, a secure device identifier source, a device secure communication encryption key source, etc.) can be interchanged with SIM card in many of the embodiments. For example, in embodiments in which a SIM card is moved from one device to another, another type of device credential could be moved instead (e.g., soft SIM, universal SIM, an IMSI source, a wireless modem, a phone number source, an IMEI source, an MEID source, a MAC address source, an IP address source, a secure device identifier source, a device secure communication encryption key source, etc.). As another example, when a user tampers with a service processor associated with a SIM, the user could be tampering with a service processor associated with another type of device credential (e.g., soft SIM, universal SIM, an IMSI source, a wireless modem, a phone number source, an IMEI source, an MEID source, a MAC address source, an IP address source, a secure device identifier source, a device secure communication encryption key source, etc.). There are many other examples where the term "SIM" can be exchanged for another source of device credentials, with the examples being too numerous to list and yet evident to one of ordinary skill in the art in the context of the teachings herein.

In some embodiments, the one or more device credential sources include a SIM card. In some embodiments, service controller 122 can be configured to recognize which end-user device 100 or service processor 115 the SIM is associated with, use the SIM and device association to look up a desired device portion of a wireless access network service policy, and communicate the policy to the appropriate device service processor. In some embodiments, the two different device portions of a wireless access network policy are determined according to a device group or user group service policy definition that includes one or more SIM credentials and/or one or more service processor credentials, and these policy definitions are entered in a virtual service provider work station that manages the service controller and/or service processor policies.

In some embodiments, service controller 122 is configured to recognize when the SIM card from a first device with a first service processor has been moved to a second device with a second service processor. In some such embodiments, service controller 122 is configured to recognize which device or service processor the SIM is associated with, use the SIM and device association to look up a desired network portion of a wireless access network service policy, and cause the network portion of a wireless access network service policy to be implemented or enforced in one or more network service policy enforcement elements. In some embodiments, the two different network portions of a wireless access network policy are determined according to a device group or user group service policy definition that includes one or more SIM credentials and/or one or more service processor credentials, and these policy definitions are entered in a virtual service provider work station that manages the service controller and/or network service policy enforcement element policies.

In some embodiments, the one or more device credential sources include a SIM card. In some embodiments, service controller 122 is configured to detect when a device user has moved the SIM card from a first device configured with a properly configured service processor to a second device that is not configured with a properly configured service processor. In some embodiments, service controller 122 is configured to determine that the first device is configured with a properly configured service processor and communicate a device portion of a wireless access network service policy to the appropriate device service processor. In some embodiments, the device portion of a wireless access network policy is determined according to a device group or user group service policy definition that includes a SIM credential and/or a service processor credential, and these policy definitions are entered in a virtual service provider work station that manages the service controller and/or device service processor policies. In some embodiments, service controller 122 is configured to determine that the first device is configured with a properly configured service processor and cause a first network portion of a wireless access network service policy to be implemented or enforced in one or more network service policy enforcement elements. In some embodiments, service controller 122 is configured to determine that the second device is not configured with a properly configured service processor and cause a second network portion of a wireless access network service policy to be implemented or enforced in one or more network service policy enforcement elements. In some embodiments, the device portion of a wireless access network policy is determined according to a device group or user group service policy definition that includes a SIM credential, and these policy definitions are entered in a virtual service provider work station that manages the service controller and/or network service policy enforcement element policies.

In some of these embodiments, the differences between the first network portion of a wireless access network service policy and the second network portion of a wireless access network service policy can include a difference in network access privileges, a difference in allowable network destinations, a difference in service usage accounting or billing for "bulk" access, a difference in service usage accounting or billing for a classification of access, a difference in service usage accounting rates or billing rates for "bulk" access, a difference in service usage accounting rates or billing rates for a classification of access, a difference in sponsored (ambient) service accounting or billing, a difference in service speed or quality, a difference in which networks the device or user has access to, a difference in the service usage notification that is provided to the end user, a difference in roaming service policies or permissions or accounting/billing rates, a quarantining of the device or user access capabilities, differences between (e.g., disabling or otherwise modifying) one or more features of device operation, or suspending the device from access to the network.

In some embodiments, a SIM and service processor 115 are associated with a classification of service usage and a corresponding device portion of access network service policy enforcement. Service controller 122 is then responsible for properly authenticating the proper configuration of service processor 115 in association with the SIM in order to determine the appropriate network portion of network access service policy that should be enforced.

In some embodiments, a SIM and service processor 115 are associated with one or more application-specific services wherein the device network access service has policy elements that are specific to a device software or firmware application. A software or firmware application-specific service can include but is not limited to a service with specific policy elements associated with a user application program; an operating system program, library or function; a background application service such as an application update, content caching, software update or other background application service.

In some embodiments, a SIM and service processor 115 are associated with one or more network-destination-specific services wherein the device network access service has policy elements that are specific to a network destination or resource. A network destination or resource can include but is not limited to a server, gateway, destination address, domain, website or URL.

In some embodiments, a SIM and service processor 115 are associated with any combination of a device application, network destination or resource; a type of network; a roaming condition (e.g., a home or roaming network); a time period; a level of network congestion; a level of network quality-of-service (QoS); and a background or foreground communication.

In some embodiments, a SIM and service processor 115 are associated with one or more sponsored services (also referred to herein as ambient services), wherein a portion or all of the service usage accounting for one or more classifications of service usage are accounted to, charged to, or billed to a service sponsor rather than the device user or party who pays for the user service plan. The portion of service that is sponsored can be all of the device access or a portion or classification of the device access. In some embodiments, the classification of the sponsored portion of service (e.g., the identification of the portion of the device's use of the access network that should be allocated to the service sponsor) is accomplished on the device with service processor 115. In some embodiments, the classification of the sponsored portion of service is accomplished in the network using DPI elements, gateway elements, server elements, proxy elements, website elements or web service elements. In some embodiments, the classification of the sponsored portion of service is accomplished with a classification policy implemented by a combination of a service processor on the device (e.g., steering a classification of service to a given network element via a re-direction, re-route, or tunnel [e.g. secure SSL, VPN, APN or other tunnel protocol]) and one or more network elements (e.g., DPI elements, gateway elements, server elements, proxy elements, website elements or web service elements). In some embodiments, the portion of service that is sponsored includes service for one device application or a group of device applications. In some embodiments, the portion of service that is sponsored includes service for a network destination or resource, a server or website, or a group of network destinations, servers or websites. In some embodiments, the portion of service that is sponsored includes service on a specific type of network. In some embodiments, the portion of service that is sponsored includes service on a home network or a roaming network. In some embodiments, the portion of service that is sponsored includes service during a time period. In some embodiments, the portion of service that is sponsored includes service for a certain range of network congestion. In some embodiments, the portion of service that is sponsored can include service for a certain range of network QoS. In some embodiments, the portion of service that is sponsored includes service for a network background or foreground data communication. In some embodiments, the portion of service that is sponsored includes any combination of device application, network destination or resource, a type of network, a roaming condition (e.g., home or roaming network), a time period, a level of network congestion, a level of network QoS, and a background or foreground communication.

In some embodiments, a SIM (or other source of user credential or device credential, as explained previously) is installed in or present in association with a device configured with a device service processor configuration that provides access network policy enforcement. In such embodiments, one or more network elements can implement or enforce a network-based portion of access network policy enforcement, and service processor 115 can be configured to implement or enforce a device-based portion of access network policy enforcement. In some embodiments, one or more SIM credentials can be used at least in part to identify the network-based portion of access network policy. In some embodiments, one or more SIM credentials can be used at least in part to identify the device-based portion of access network policy.

In some embodiments that include a SIM module policy association, the policy enforcement includes one or more of access control policy enforcement, service usage limit, access accounting policy enforcement, and access service user notification policy enforcement. In some embodiments, the access control policy enforcement includes one or more of allowing, limiting, blocking, deferring, delaying or traffic shaping device network access for "bulk" access (e.g., "not classified" access), or one or more specific classifications of access network service activities. In some embodiments, the access accounting policy enforcement includes one or more of counting an amount of "bulk" (e.g., "unclassified") access network service usage, or counting an amount of access network service usage for one or more specific classifications of access network service activities. In some embodiments, the access service notification policy enforcement includes one or more of notifying an end user when a pre-defined service usage condition occurs for "bulk" (e.g. "unclassified") access network service usage or notifying an end user when a pre-defined service usage condition occurs for one or more specific classifications of access network service activities. Examples of specific classifications of access network service activities include access by an application or OS function, access to one or more network destinations or network resources (such as a web site, domain, IP address or other address identifier, URL, socket tuple, network server, network route or APN, network gateway or proxy, network content source or sub-network). Additional examples of specific classifications of access network service activities include device access to network services with different QoS service levels. In some embodiments, a portion of the policies associated with specific classifications of access network service are implemented or enforced with a device-based service processor, and other portions of access network service policy are enforced in one or more network-based elements.

In some embodiments in which one or more network elements implement or enforce a network-based portion of access network policy enforcement and a device service processor is configured to implement or enforce a device-based portion of access network policy enforcement, one or more device SIM credentials are identified and used at least in part to determine the policies enforced by the network. In such embodiments, service processor 115 can be relied upon to implement or enforce certain aspects of access network service policy that are not implemented or enforced in the network.

In some embodiments, a first portion of access network service policy is determined at least in part by one or more SIM credentials and is implemented by one or more network elements, and a second portion of access network service policy is intended to be implemented by a device-based service processor, but the SIM is installed in a device that is not configured with a service processor capable of implementing the second portion of access network service policy. In some such embodiments, a network element identifies whether the SIM is installed in a device that is configured with a service processor capable of implementing the second portion of access network service policy intended to be implemented on the device. In some embodiments, the identification is accomplished by a network system that implements one or more of the following device configuration detection and network policy selection functions: (1) Identify when a SIM whose credentials are used at least in part to identify a network-based portion of access network policy is installed in a device configured to include a service processor capable of implementing or enforcing a device-based portion of access network service policy, and provision a first network-based service policy in one or more network-based policy enforcement elements that implement or enforce access network service policy; (2) Identify when a SIM whose credentials are used at least in part to identify the network-based portion of access network policy is installed in a device that is not configured to include a service processor capable of implementing or enforcing a device-based portion of access network service policy and implement a second network-based service policy in one or more network-based policy enforcement elements that implement or enforce access network service policy.

In some embodiments, when it is determined that a SIM whose credentials are used at least in part to identify the network-based portion of access network policy is installed in a device configured to include a service processor capable of implementing or enforcing a device-based portion of access network service policy, a network-based service policy provisioning system provisions a first network-based service policy into one or more network elements (e.g., programs or sends the policy to one or more network elements) and also provisions a device-based service policy into a device service processor. In some embodiments, when it is determined that a SIM whose credentials are used at least in part to identify the network-based portion of access network policy is installed in a device that is not configured to include a service processor capable of implementing or enforcing a device-based portion of access network service policy, a network-based service policy provisioning system provisions a second network-based service policy into one or more network elements, and there is no policy provisioning for a device-based service processor.

Such embodiments are advantageous, for example, when a device-based service processor is capable of implementing or enforcing a network access service policy that has fine grain classification aspects that are not otherwise implemented or enforced in the network. For example, in some embodiments a SIM is installed in a first device configuration that includes a device-based service processor (e.g., service processor 115) capable of classifying access network service usage associated with one or more device software applications and enforce a policy for access control, service limit, access accounting or access service notification for that classification. In this case a first set of network-based access network service policies may be provisioned into the network elements that implement or enforce access network service policy. If the same SIM is installed in a second device configuration that does not include the described service processor capability, a second set of network-based access network service policies may be provisioned into the network elements that implement or enforce access network service policy. In such embodiments, the first device configuration can include a trusted access control or service limit policies in service processor 115 that determine the network access allowances for one or more applications, and the first network service policies are configured to facilitate this device-based application access control or service limitation. In contrast, the second device configuration, having no service processor, has no trusted access control or service limitation policies, and therefore the second network service policies may be configured in a manner that allows access only if the service plan or service account associated with the SIM (or second device or SIM user) includes permissions for "bulk" access, "unclassified" access, or access that is classified by the network and not by the device.

In some embodiments, the second network service policies are configured to modify the classification of network access services in accordance with capabilities that exist only in the network without the assistance of a device-assisted classification component.

In some embodiments, the second network service policies include a second access service accounting or charging rate that is different than the access service accounting or charging rate of the first network service policies. For example, the method of service accounting or service charging to the end user in the case where the SIM is installed in a device configuration that includes a service processor capability (e.g., the device is capable of performing service classification, accounting, control or notification functions) can be different than the method of service accounting or service charging to the end user in the case where the SIM is installed in a device configuration that does not include the service processor capability. For example, if the SIM is installed in a device configuration that includes a service processor capability, a given application (e.g., social networking application, email application, search application, voice application, news application, etc.) might have a first service accounting or charging policy defining a first charging measure (e.g., time-based usage for an application, website, content type, service type QoS class; or e.g., megabyte-based usage for an application, website, content type, service type QoS class, etc.) and/or first charging rate (e.g., $X per minute; or e.g., $Y per megabyte, etc.) when the device configuration includes a service processor capability, whereas when the SIM is not installed in a device configuration that includes a service processor capability, all traffic may be rated in the same manner (e.g., time-based or megabyte-based), potentially with a higher price. In some embodiments, when the SIM is not installed in a device configuration that includes a service processor capability, the device network access permissions are altered, or the device's communications may be quarantined or blocked.

In some embodiments, when a SIM is installed in a device with a first device configuration, service processor 115 is configured to differentially treat one or more classifications of access network service activities based on network congestion level, time of day, QoS level or background/foreground access (e.g., background content caching or background upload of device/user analytics, background software or OS updates, background application/server communications, etc.), but the same SIM can alternatively be installed in a device without such service processor capabilities (e.g., a device with a second device configuration). In such an embodiment, one or more of the network-based portions of access control or service limitation policy, network-based portion of accounting or charging policy, or network-based portion of user notification policy can be varied depending on whether the SIM is installed in a device with the first device configuration or the second device configuration. For example, if the SIM is recognized by the network in association with the first device configuration, a lower accounting rating or service usage price can be applied to traffic that is (i) allocated to background status, (ii) is controlled based on network congestion level, (iii) is controlled based on time of day, (iv) is controlled based on a lower QoS classification allowance, etc., whereas if the SIM is recognized by the network in association with the second device configuration, a single, potentially higher accounting rating or service usage price can be applied. In some embodiments, if the SIM is recognized by the network in association with the second device configuration the device network access permissions can be altered, or the device's communications can be quarantined or blocked.

In some embodiments, when a SIM is determined by a network element to be installed in a device configuration that includes a service processor service usage charging capability, one or more network elements are configured to zero-rate the device access (i.e., the one or more network elements will not apply the service usage accounting recorded by one or more network elements to the user's bill), and user service accounting or charging is turned over to a service controller that receives service usage accounting or charging information from the service processor.

In some embodiments, when a SIM is determined by a network element to be installed in a device configuration that includes a service processor capability to route, re-direct or otherwise steer traffic for one or more service activity classifications to one or more proxy gateway/servers, one or more network elements are configured to zero-rate the device access (i.e., the one or more network elements will not apply the service usage accounting recorded by one or more network elements to the user's bill), and user service accounting or charging is turned over to one or more proxy gateway/servers configured to account or charge for device service usage.

In some embodiments, when a SIM is determined by a network element to be installed in a device configuration that includes a service processor capability to route, re-direct or otherwise steer traffic for one or more service activity classifications to one or more proxy gateway/servers, the one or more proxy gateway/servers perform additional traffic access control or service limitation policy implementation or enforcement for the one or more classifications of service usage.

In some embodiments, when a SIM is determined by a network element to be installed in a device configuration that includes a service processor capability to route, re-direct or otherwise steer traffic for one or more service activity classifications to one or more proxy gateway/servers, the one or more proxy gateway/servers perform additional service usage classification for the purpose of service usage accounting, access control, service limiting or user notification.

In some embodiments, when a SIM is determined by a network element to be installed in a device configuration that does not include a service processor capability to route, re-direct or otherwise steer traffic for one or more service activity classifications to one or more proxy gateway/servers, network elements other than the proxy gateway/servers account for service usage, potentially at a different rate than when a SIM is determined by a network element to be installed in a device configuration that includes a service processor capability to route, re-direct or otherwise steer traffic for one or more service activity classifications.

In some embodiments in which the device configuration includes a service processor capability to route, re-direct or otherwise steer traffic for one or more service activity classifications to one or more proxy gateway/servers, the device routing, re-directing, or steering is accomplished by routing, re-directing, or steering the device traffic for one or more service usage classifications to a specific network destination or resource associated with the proxy gateway/server. In some embodiments, the routing, re-directing, or steering is accomplished using a secure tunnel through the network. In some embodiments the routing, re-directing, or steering is accomplished with a VPN or APN tunnel.

In some embodiments, a network-based service charging policy system is used in conjunction with a user service agreement confirmation system, wherein the user agreement confirmation system provides confirmation that the user has agreed to access service usage terms that stipulate a first rate of access service usage accounting or charging when a SIM is detected in association with a device configuration that includes a service processor capability, and a second rate of access service usage accounting or charging when a SIM is detected in association with a device configuration that does not include a service processor capability. In some embodiments, if a user removes or tampers with a device configuration that includes a service processor capability, or if a user installs a SIM in a device that is not configured with a service processor capability, the user service usage billing conditions are changed. In some embodiments, depending on the device configuration (e.g., with or without a service processor capability), the user is billed at a different rate for "bulk" service usage, or is billed at a different rate for one or more classifications of service usage.

In some embodiments, a network-based service charging policy system is used in conjunction with a user service agreement confirmation system, wherein the user agreement confirmation system provides confirmation that the user has agreed to access service usage terms that stipulate a first set of access service privileges when a SIM is detected in association with a device configuration that includes a service processor capability, and a second set of access service privileges when a SIM is detected in association with a device configuration that does not include a service processor capability. In some embodiments, if a user removes or tampers with a device configuration that includes a service processor capability, or if a user installs a SIM in a device that is not configured with a service processor capability, the user service usage permissions are modified. In some embodiments, this modification can include altering the allowed network destinations, altering the allowed network services, altering the allowed network resources, quarantining access or blocking access.

In some embodiments the presence of a device service processor in combination with a SIM results in the service controller providing advantageous network access services to the user. Examples include but are not limited to the sponsored services discussed herein, user-paid application-based services (e.g., user-paid services where access for one or more device applications is included in a service allowance with potentially lower cost than overall internet access), user-paid destination services (e.g., user-paid services where access for one or more network destinations or resources is included in a service allowance with potentially lower cost than overall internet access), roaming services (e.g., services that aid the user when the device is connected to a roaming network, such as by informing the user that she is roaming and asking if she wishes to continue or block roaming service usage, up to date roaming service usage indication or cost indication, roaming service rate indications, allowing a user to decide which device service usage classifications he wishes to allow while roaming, etc.), or service usage notification services (e.g., providing the user with an update of how much service usage or cost has been incurred, informing the user of what service plans are available, informing the user when a service plan sign up may be advantageous to the user based on an activity or group of activities the user is attempting, or providing the user with a set of service plan sign up choices that can be selected and purchased in a device user interface (UI), etc.). In some embodiments, these user services are made possible by the capabilities of the service processor on the device in conjunction with a specific configuration of a service controller or other network elements on an access service provider network.

In some embodiments, if the SIM for a first network service provider is removed from the device and another SIM for a second network or service provider is installed, the user may not have access to the same services. In some embodiments, the service processor on the device detects that the SIM has been changed and informs the user through a device user interface (UI) notification that if the user changes SIMS or service provider networks, the user will lose certain services. In some embodiments, the services that will be lost are listed in a UI notification. In some embodiments the UI notification states that if the user wishes to regain access to certain services, the user can re-install the original SIM.

The above description is provided to enable any person skilled in the art to make and use the invention. Various modifications to the embodiments are possible, and the principles described herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

INCORPORATION BY REFERENCE

This document incorporates by reference for all purposes the following non-provisional U.S. patent applications: application Ser. No. 12/380,778, filed Mar. 2, 2009, entitled VERIFIABLE DEVICE ASSISTED SERVICE USAGE BILLING WITH INTEGRATED ACCOUNTING, MEDIATION ACCOUNTING, AND MULTI-ACCOUNT, now U.S. Pat. No. 8,321,526 (issued Nov. 27, 2012); application Ser. No. 12/380,780, filed Mar. 2, 2009, entitled AUTOMATED DEVICE PROVISIONING AND ACTIVATION, now U.S. Pat. No. 8,839,388 (issued Sep. 16, 2014); application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012); application Ser. No. 12/695,020, filed Jan. 27, 2010, entitled ADAPTIVE AMBIENT SERVICES, now U.S. Pat. No. 8,406,748 (issued Mar. 26, 2013); application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); application Ser. No. 12/694,451, filed Jan. 27, 2010, entitled DEVICE GROUP PARTITIONS AND SETTLEMENT PLATFORM, now U.S. Pat. No. 8,548,428 (issued Oct. 1, 2013); application Ser. No. 12/694,455, filed Jan. 27, 2010, entitled DEVICE ASSISTED SERVICES INSTALL, now U.S. Pat. No. 8,402,111 (issued Mar. 19, 2013); application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); application Ser. No. 13/134,005, filed May 25, 2011, entitled SYSTEM AND METHOD FOR WIRELESS NETWORK OFFLOADING, now U.S. Pat. No. 8,635,335 (issued Jan. 21, 2014); application Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); application Ser. No. 13/229,580, filed Sep. 9, 2011, entitled WIRELESS NETWORK SERVICE INTERFACES, now U.S. Pat. No. 8,626,115 (issued Jan. 7, 2014); application Ser. No. 13/237,827, filed Sep. 20, 2011, entitled ADAPTING NETWORK POLICIES BASED ON DEVICE SERVICE PROCESSOR CONFIGURATION, now U.S. Pat. No. 8,832,777 (issued Sep. 9, 2014); application Ser. No. 13/239,321, filed Sep. 21, 2011, entitled SERVICE OFFER SET PUBLISHING TO DEVICE AGENT WITH ON-DEVICE SERVICE SELECTION, now U.S. Pat. No. 8,898,293 (issued Nov. 25, 2014); application Ser. No. 13/248,028, filed Sep. 28, 2011, entitled ENTERPRISE ACCESS CONTROL AND ACCOUNTING ALLOCATION FOR ACCESS NETWORKS, now U.S. Pat. No.

8,924,469 (issued Dec. 30, 2014); application Ser. No. 13/247,998, filed Sep. 28, 2011, entitled COMMUNICATIONS DEVICE WITH SECURE DATA PATH PROCESSING AGENTS, now U.S. Pat. No. 8,725,123 (issued May 13, 2014); application Ser. No. 13/248,025, filed Sep. 28, 2011, entitled SERVICE DESIGN CENTER FOR DEVICE ASSISTED SERVICES, now U.S. Pat. No. 8,924,543 (issued Dec. 30, 2014); application Ser. No. 13/253,013, filed Oct. 4, 2011, entitled SYSTEM AND METHOD FOR PROVIDING USER NOTIFICATIONS, now U.S. Pat. No. 8,745,191 (issued Jun. 3, 2014); application Ser. No. 13/309,556, filed Dec. 1, 2011, entitled END USER DEVICE THAT SECURES AN ASSOCIATION OF APPLICATION TO SERVICE POLICY WITH AN APPLICATION CERTIFICATE CHECK, now U.S. Pat. No. 8,893,009 (issued Nov. 18, 2014); and application Ser. No. 13/309,463, FILED Dec. 1, 2011, entitled SECURITY, FRAUD DETECTION, AND FRAUD MITIGATION IN DEVICE-ASSISTED SERVICES SYSTEMS, now U.S. Pat. No. 8,793,758 (issued Jul. 29, 2014).

This document incorporates by reference for all purposes the following provisional patent applications: Provisional Application No. 61/206,354, filed Jan. 28, 2009, entitled SERVICES POLICY COMMUNICATION SYSTEM AND METHOD; Provisional Application No. 61/206,944, filed Feb. 4, 2009, entitled SERVICES POLICY COMMUNICATION SYSTEM AND METHOD; Provisional Application No. 61/207,393, filed Feb. 10, 2009, entitled SERVICES POLICY COMMUNICATION SYSTEM AND METHOD; and Provisional Application No. 61/207,739, entitled SERVICES POLICY COMMUNICATION SYSTEM AND METHOD, filed Feb. 13, 2009; Provisional Application No. 61/270,353, filed on Jul. 6, 2009, entitled DEVICE ASSISTED CDR CREATION, AGGREGATION, MEDIATION AND BILLING; Provisional Application No. 61/275,208, filed Aug. 25, 2009, entitled ADAPTIVE AMBIENT SERVICES; and Provisional Application No. 61/237,753, filed Aug. 28, 2009, entitled ADAPTIVE AMBIENT SERVICES; Provisional Application No. 61/252,151, filed Oct. 15, 2009, entitled SECURITY TECHNIQUES FOR DEVICE ASSISTED SERVICES; Provisional Application No. 61/252,153, filed Oct. 15, 2009, entitled DEVICE GROUP PARTITIONS AND SETTLEMENT PLATFORM; Provisional Application No. 61/264,120, filed Nov. 24, 2009, entitled DEVICE ASSISTED SERVICES INSTALL; Provisional Application No. 61/264,126, filed Nov. 24, 2009, entitled DEVICE ASSISTED SERVICES ACTIVITY MAP; Provisional Application No. 61/348,022, filed May 25, 2010, entitled DEVICE ASSISTED SERVICES FOR PROTECTING NETWORK CAPACITY; Provisional Application No. 61/381,159, filed Sep. 9, 2010, entitled DEVICE ASSISTED SERVICES FOR PROTECTING NETWORK CAPACITY; Provisional Application No. 61/381,162, filed Sep. 9, 2010, entitled SERVICE CONTROLLER INTERFACES AND WORKFLOWS; Provisional Application No. 61/384,456, filed Sep. 20, 2010, entitled SECURING SERVICE PROCESSOR WITH SPONSORED SIMS; Provisional Application No. 61/389,547, filed Oct. 4, 2010, entitled USER NOTIFICATIONS FOR DEVICE ASSISTED SERVICES; Provisional Application No. 61/385,020, filed Sep. 21, 2010, entitled SERVICE USAGE RECONCILIATION SYSTEM OVERVIEW; Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; Provisional Application No. 61/387,247, filed September 28, entitled SECURED DEVICE DATA RECORDS, 2010; Provisional Application No. 61/407,358, filed Oct. 27, 2010, entitled SERVICE CONTROLLER AND SERVICE PROCESSOR ARCHITECTURE; Provisional Application No. 61/418,507, filed Dec. 1, 2010, entitled APPLICATION SERVICE PROVIDER INTERFACE SYSTEM; Provisional Application No. 61/418,509, filed Dec. 1, 2010, entitled SERVICE USAGE REPORTING RECONCILIATION AND FRAUD DETECTION FOR DEVICE ASSISTED SERVICES; Provisional Application No. 61/420,727, filed Dec. 7, 2010, entitled SECURE DEVICE DATA RECORDS; Provisional Application No. 61/422,565, filed Dec. 13, 2010, entitled SERVICE DESIGN CENTER FOR DEVICE ASSISTED SERVICES; Provisional Application No. 61/422,572, filed Dec. 13, 2010, entitled SYSTEM INTERFACES AND WORKFLOWS FOR DEVICE ASSISTED SERVICES; Provisional Application No. 61/422,574, filed Dec. 13, 2010, entitled SECURITY AND FRAUD DETECTION FOR DEVICE ASSISTED SERVICES; Provisional Application No. 61/435,564, filed Jan. 24, 2011, entitled FRAMEWORK FOR DEVICE ASSISTED SERVICES; Provisional Application No. 61/472,606, filed Apr. 6, 2011, entitled MANAGING SERVICE USER DISCOVERY AND SERVICE LAUNCH OBJECT PLACEMENT ON A DEVICE; Provisional Application No. 61/550,906, filed Oct. 24, 2011, entitled SECURITY FOR DEVICE-ASSISTED SERVICES.

The invention claimed is:

1. An end-user device, comprising:
one or more modems for enabling the wireless end-user device to communicate over at least a first wireless access network;
memory configured to store
a first application program configured to execute on the wireless end-user device and access one or more data services over at least the first wireless access network,
a known-application credential associated with the first application program,
a first policy comprising one or more first policy instructions to be applied when the first application program initiates or attempts to initiate a communication over the first wireless access network; and
one or more device agents configured to execute from a secure memory partition to
detect an attempted installation of update software on the end-user device, the update software purporting to be a modification, update, or replacement of the first application program,
obtain an update-software credential associated with the update software,
determine whether the update-software credential passes a verification check,
based at least in part on the update-software credential passing the verification check, allow the update software to be installed on the wireless end-user device,
at runtime for the first application program, obtain a runtime credential for the first application credential, and compare the runtime credential to the known-application credential,
based at least in part on a match between the runtime credential and the known-application credential, allow execution of the first application program,
determine when the first application program initiates or attempts to initiate a communication over the first wireless access network, and apply the first policy when the first application program initiates or attempts to initiate a communication over the first wireless access network.

2. The end-user device of claim 1, wherein the one or more device agents include the first application program.

3. The end-user device of claim 1, wherein the first application program comprises a kernel component and/or a library.

4. The end-user device of claim 1, wherein the known-application credential is stored in a secure location in the memory.

5. The end-user device of claim 1, wherein the known-application credential comprises a hash of the software application program.

6. The end-user device of claim 1, wherein the known-application credential comprises a secure signature and/or certificate.

7. The end-user device of claim 1, the one or more device agents further configured to supply the runtime credential to a secure server.

8. The end-user device of claim 1, the one or more device agents further configured to obtain the runtime credential from a secure hash of the first application program.

9. The end-user device of claim 8, wherein the secure hash is based on a key provided by a secure server.

10. The end-user device of claim 1, wherein to determine whether the update-software credential passes a verification check comprises to:
    generate a signed application credential using the update-software credential and a device credential;
    send the signed application credential to a secure server; and
    receive, from the secure server, a message regarding the authenticity of the update software.

11. The end-user device of claim 10, wherein to generate a signed application credential using the update-software credential and a device credential comprises combining the update-software credential and the device credential in a hash.

12. The end-user device of claim 1, wherein to determine whether the update-software credential passes a verification check comprises to:
    receive a signed application credential from a secure server, the signed application credential combining an application credential and a device credential; and
    evaluate the signed application credential using the device credential.

13. The end-user device of claim 1, wherein configured to execute in a secure memory partition comprises storing executable code for the one or more device agents in a secure encrypted form.

* * * * *